United States Patent
Seshimo et al.

(10) Patent No.: US 11,542,397 B2
(45) Date of Patent: Jan. 3, 2023

(54) LIQUID COMPOSITION, QUANTUM DOT-CONTAINING FILM, OPTICAL FILM, LIGHT-EMITTING DISPLAY ELEMENT PANEL, AND LIGHT-EMITTING DISPLAY DEVICE

(71) Applicant: TOKYO OHKA KOGYO CO., LTD., Kawasaki (JP)

(72) Inventors: Takehiro Seshimo, Kawasaki (JP); Kunihiro Noda, Kawasaki (JP); Dai Shiota, Kawasaki (JP)

(73) Assignee: TOKYO OHKA KOGYO CO., LTD., Kanagawa (JP)

( * ) Notice: Subject to any disclaimer, the term of this patent is extended or adjusted under 35 U.S.C. 154(b) by 0 days.

(21) Appl. No.: 17/255,037

(22) PCT Filed: Jun. 24, 2019

(86) PCT No.: PCT/JP2019/024973
§ 371 (c)(1),
(2) Date: Dec. 22, 2020

(87) PCT Pub. No.: WO2020/004336
PCT Pub. Date: Jan. 2, 2020

(65) Prior Publication Data
US 2021/0309866 A1    Oct. 7, 2021

(30) Foreign Application Priority Data

Jun. 26, 2018  (JP) .............................. JP2018-121291
May 10, 2019  (JP) .............................. JP2019-090047

(51) Int. Cl.
| | |
|---|---|
| C09D 5/22 | (2006.01) |
| C09D 7/20 | (2018.01) |
| G02F 1/1335 | (2006.01) |
| C09D 163/00 | (2006.01) |
| C09K 11/08 | (2006.01) |
| C09K 11/70 | (2006.01) |
| C09K 11/02 | (2006.01) |
| B82Y 20/00 | (2011.01) |
| B82Y 40/00 | (2011.01) |

(52) U.S. Cl.
CPC ................ *C09D 5/22* (2013.01); *C09D 7/20* (2018.01); *C09D 163/00* (2013.01); *C09K 11/02* (2013.01); *C09K 11/0883* (2013.01); *C09K 11/703* (2013.01); *G02F 1/133614* (2021.01); *B82Y 20/00* (2013.01); *B82Y 40/00* (2013.01); *G02F 2202/36* (2013.01)

(58) Field of Classification Search
CPC .. C09K 11/02; C09D 5/22; C09D 7/20; G02F 1/133614
See application file for complete search history.

(56) References Cited

U.S. PATENT DOCUMENTS

| | | | |
|---|---|---|---|
| 9,935,270 B2 * | 4/2018 | Yonekawa | ............. H01L 51/005 |
| 2006/0169971 A1 | 8/2006 | Cho et al. | |
| 2008/0084706 A1 | 4/2008 | Roshan et al. | |
| 2011/0017292 A1 | 1/2011 | Cho et al. | |
| 2017/0123317 A1 | 5/2017 | Kamura et al. | |
| 2017/0153382 A1 | 6/2017 | Wang et al. | |
| 2017/0167693 A1 | 6/2017 | Yamazumi et al. | |
| 2018/0237649 A1 | 8/2018 | Pan et al. | |
| 2018/0345638 A1 * | 12/2018 | Smith | ..................... C08L 35/02 |

FOREIGN PATENT DOCUMENTS

| | | |
|---|---|---|
| CN | 105153811 A | 12/2015 |
| EP | 3 345 939 A1 | 7/2018 |
| JP | 2006-216560 A | 8/2006 |
| JP | 2008-112154 A | 5/2008 |
| JP | 2016-058172 A | 4/2016 |
| JP | 2016058172 * | 4/2016 |
| JP | 2017-110060 A | 6/2017 |
| JP | 2017-110061 A | 6/2017 |
| JP | 2017-142486 A | 8/2017 |
| KR | 20160004524 A | 1/2016 |
| WO | 2011/144697 A1 | 11/2011 |
| WO | WO 2015/190594 * | 12/2015 |

OTHER PUBLICATIONS

International Search Report issued in Patent Application No. PCT/JP2019/024973 dated Sep. 24, 2019.

* cited by examiner

*Primary Examiner* — C Melissa Koslow
(74) *Attorney, Agent, or Firm* — Pearne & Gordon LLP

(57) ABSTRACT

The present invention provides: a liquid composition which can be suitably used for production of an optical film having a favorable fluorescence efficiency and includes quantum dots (A), a quantum dot-containing film obtained by drying and/or curing the liquid composition, an optical film for a light-emitting display element made of the quantum dot-containing film, a light-emitting display element panel including the optical film, and a light-emitting display equipped with the light-emitting display element panel. An ionic liquid (B), and a solvent (S) are incorporated into a liquid composition including quantum dots (A), in which the solvent (S) includes a solvent (S1), the solvent (S1) being a compound having a cyclic skeleton and including a heteroatom other than a hydrogen atom and a carbon atom.

12 Claims, No Drawings

LIQUID COMPOSITION, QUANTUM DOT-CONTAINING FILM, OPTICAL FILM, LIGHT-EMITTING DISPLAY ELEMENT PANEL, AND LIGHT-EMITTING DISPLAY DEVICE

TECHNICAL FIELD

The present invention relates to a liquid composition including quantum dots, a quantum dot-containing film obtained by drying and/or curing a coating film formed from the liquid composition, an optical film for a light-emitting display element made of the quantum dot-containing film, a light-emitting display element panel including the optical film, and a light-emitting display equipped with the light-emitting display element panel.

BACKGROUND ART

An extremely small grain (dot) formed to confine electrons has been conventionally called a quantum dot, and the application thereof in a variety of fields has been investigated. Here, the size of one quantum dot is from several nanometers to tens of nanometers in diameter.

Such quantum dot can change light-emitting fluorescent color (emission wavelength) (wavelength conversion) by changing the size thereof (changing band gap). Because of this, it has been diligently investigated that quantum dots are applied to a display element as a wavelength conversion material in recent years (see Patent Documents 1 and 2).

In addition, it has been investigated that an optical film including quantum dots is applied to various optical light-emitting elements and display elements. For example, it has been proposed that a quantum dot sheet including quantum dots dispersed in a matrix made of various polymeric materials is used as an optical film (see Patent Document 3). For example, when light rays emitted from a light source are allowed to pass through an optical film including quantum dots in elements to show an image using light emission of a light source such as a liquid crystal display element and an organic EL display element, green light and red light, which have nigh color purity, can be extracted by wavelength conversion, and therefore, the range of hue reproduction can be enlarged.

Patent Document 1: Japanese Unexamined Patent Application, Publication No. 2006-216560
Patent Document 2: Japanese Unexamined Patent Application, Publication No. 2008-112154
Patent Document 3: Korean Patent Application No. 10-2016-0004524

DISCLOSURE OF THE INVENTION

Problems to be Solved by the Invention

In fact, however, an optical film with good fluorescence efficiency cannot be necessarily produced by simply combining quantum dots with a resin material. The reason has not been clear; however, it is thought that this is because it is difficult to produce an optical film with cohesion between quantum dots inhibited and quantum dots stably dispersed. The quantum dots often have a large specific surface area, a surface atom which can be a coordination site, and high reactivity. Therefore, fine particles of quantum dots very easily cohere.

An object of the present invention is to provide a liquid composition which can be suitably used for the production of an optical film having a favorable fluorescence efficiency and includes quantum dots (A), a quantum dot-containing film obtained by drying and/or curing the liquid composition, an optical film for a light-emitting display element made of the quantum dot-containing film, a light-emitting display element panel including the optical film, and a light-emitting display equipped with the light-emitting display element panel.

Means for Solving the Problems

The present inventors found that the above-mentioned problems can be solved by incorporating an ionic liquid (B) and a solvent (S) into a liquid composition including quantum dots (A), the solvent (S) including a solvent (S1) that is a compound having a cyclic skeleton and including a heteroatom other than a hydrogen atom and a carbon atom, and accomplished the present invention.

A first aspect of the present invention relates to a liquid composition, including quantum dots (A), an ionic liquid (B), and a solvent (S),
in which the solvent (S) includes a solvent (S1), the solvent (S1) being a compound having a cyclic skeleton and including a heteroatom other than a hydrogen atom and a carbon atom.

A second aspect of the present invention relates to a quantum dot-containing film obtained by drying and/or curing a coating film formed from the liquid composition according to the first aspect.

A third aspect of the present invention relates to an optical film for a light-emitting display element made of the quantum dot-containing film according to the second aspect.

A fourth aspect of the present invention relates to a light-emitting display element panel including the optical film for a light-emitting display element according to the third aspect.

A fifth aspect of the present invention relates to a light-emitting display equipped with the light-emitting display element panel according to the fourth aspect.

Effects of the Invention

The present invention can provide a liquid composition including quantum dots (A), which can be suitably used for production of an optical film having a favorable fluorescence efficiency, a quantum dot-containing film obtained by drying and/or curing the liquid composition, an optical film for a light-emitting display element made of the quantum dot-containing film, a light-emitting display element panel including the optical film, and a light-emitting display equipped with the light-emitting display element panel.

PREFERRED MODE FOR CARRYING OUT THE INVENTION

<<Liquid Composition>>

A liquid composition includes quantum dots (A), an ionic liquid (B), and a solvent (S). Since the liquid composition includes the aforementioned ionic liquid (B) and the aforementioned solvent (S) in combination, the solvent (S) including the solvent (S1) meeting the predetermined requirements, the quantum dots (A) are favorably dispersed in the liquid composition. Consequently, the liquid composition can be suitably used for production of an optical film having a favorable fluorescence efficiency. With regard to the liquid composition, a composition not including a base component (C) described later is preferable, and a composition including the base component (C) is also preferable. The former composition can be used for the preparation of various compositions including the quantum dots (A) as a dispersion liquid for the quantum dots (A), whereas the latter composition is typically used for the formation of a quantum dot-containing film in a favorable manner.

Hereinafter, essential or arbitrary components included in the liquid composition will be described.

<Quantum Dot (A)>

The liquid composition includes quantum dots (A). As long as the quantum dots (A) are fine particles showing a function as quantum dots, the structure and constituents thereof are not particularly limited. The quantum dots (A) are a nanoscale material having particular optical characteristics according to quantum mechanics (quantum-confined effect described below), and commonly mean semiconductor nanoparticles. In the description, the quantum dots (A) also include quantum dots in which the surface of semiconductor nanoparticles is further covered to improve a luminescent quantum yield (quantum dots having a shell structure described below) and quantum dots which are surface-modified for stabilization.

The quantum dots (A) are considered as semiconductor nanoparticles which absorb photons having energy larger than a band gap (a difference in energy between a valence band and a conduction band) and emit light with a wavelength depending on the particle diameter thereof. Examples of elements included in materials for the quantum dots (A) include one or more selected from the group consisting of group II elements (group 2A, group 2B), group III elements (particularly group 3A), group IV elements (particularly group 4A), group V elements (particularly group 5A), and group VI elements (particularly group 6A). Examples of preferred compounds or elements as materials for the quantum dots (A) include group II-VI compounds, group III-V compounds, group IV-VI compounds, group IV elements, group IV compounds and combinations thereof.

Examples of group II-VI compounds include at least one compound selected from the group consisting of CdSe, CdTe, ZnS, ZnSe, ZnTe, ZnO, HgS, HgSe, HgTe, MgSe, MgS and mixtures thereof; at least one compound selected from the group consisting of CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS and mixtures thereof; and at least one compound selected from the group consisting of HgZnTeS, CdZnSeS, CdZnSeTe, CdZnSTe, CdHgSeS, CdHgSeTe, CdHgSTe, HgZnSeS, HgZnSeTe, HgZnSTe and mixtures thereof.

Examples of group III-V compounds include at least one compound selected from GaN, GaP, GaAs, GaSb, AlN, AlP, AlAs, AlSb, InN, InP, InAs, InSb and mixtures thereof; at least one compound selected from GaNP, GaNAs, GaNSb, GaPAs, GaPSb, AlNP, AlNAs, AlNSb, AlPAs, AlPSb, InNP, InNAs, InNSb, InPAs, InPSb, GaAlNP and mixtures thereof; and at least one compound selected from GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb and mixtures thereof.

Examples of group IV-VI compounds include at least one compound selected from SnS, SnSe, SnTe, PbS, PbSe, PbTe and mixtures thereof; at least one compound selected from SnSeS, SnSeTe, SnSTe, PbSeS, PbSeTe, PbSTe, SnPbS, SnPbSe, SnPbTe and mixtures thereof; and at least one compound selected from SnPbSSe, SnPbSeTe, SnPbSTe and mixtures thereof.

Examples of group IV elements include at least one compound selected from Si, Ge and mixtures thereof. Examples of group IV compounds include at least one compound selected from SiC, SiGe and mixtures thereof.

The structure of quantum dots (A) can be a homogeneous structure made of one compound, or a composite structure made of two or more compounds. In order to improve luminescent quantum yields of the above compounds, the structure of quantum dots (A) is preferably a core-shell structure in which the core is covered with one or more shell layers, and more preferably a structure in which the surface of a particle of the compound, a core material, is epitaxially covered with a semiconductor material. When group II-VI CdSe, for example, is used as a core material, ZnS, ZnSSe and the like are used as its covering layer (shell). The shell preferably has the same lattice constant as a core material has, and a material combination in which the difference in the lattice constant between the core and shell is small is properly selected.

The quantum dots (A) preferably include a compound including Cd or In as a constituent from the viewpoint of fluorescence efficiency, and more preferably include a compound including In as a constituent when taking into account safety.

Specific suitable examples of quantum dots (A) of the homogeneous structure type not having a shell layer include $AgInS_2$ and Zn-doped $AgInS_2$. Examples of quantum dots (A) of the core-shell type include InP/ZnS, InP/ZnSSe, $CuInS_2$/ZnS, and ($ZnS/AgInS_2$) solid solution/ZnS. It should be noted that materials for quantum dots (A) of the core-shell type are described as (core material)/(shell layer material) in the above description.

In addition, a shell of the core-shell structure has preferably a multi-layer structure from the viewpoint of improvement of safety and a luminescent quantum yield and more preferably two layers. In a core-multilayer shell structure, the material of the core is preferably at least one compound selected from the group consisting of InP, ZnS and ZnSe, and more preferably includes InP. The proportion of InP included is 50% by mass or more and 100% by mass or less of the total mass of the core, preferably 60% by mass or more and 99% by mass or less, and more preferably 82% by mass or more and 95% by mass or less. In addition, the proportion of ZnS and/or ZnSe included is 0% by mass or more and 50% by mass or less of the total mass of the core, preferably 1% by mass or more and 40% by mass or less, and more preferably 5% by mass or more and 18% by mass or less.

In a multilayer shell structure, a material for the first shell is preferably one or more selected from ZnS, ZnSe and ZnSSe. The proportion of one or more selected from ZnS, ZnSe and ZnSSe included is for example 50% by mass or more and 100% by mass or less, preferably 75% by mass or more and 98% by mass or less, and more preferably 80% by mass or more and 97% by mass or less based on the total mass of the first shell. When a material for the first shell is a mixture of ZnS and ZnSe, the mixing ratio (mass ratio) is not particularly limited, and is 1/99 or more and 99/1 or less, and preferably 10/90 or more and 90/10 or less.

In a multilayer shell structure, the second shell is grown on the surface of the first shell. A material for the second shell is preferably equivalent to the material for the first shell (however, differences in the lattice constant with respect to the core differ from each material. That is, a case where 99% or more in the materials have the same quality is excluded). The proportion of one or more selected from ZnS, ZnSe and ZnSSe included is for example 50% by mass or more and 100% by mass or less, preferably 75% by mass or more and 98% by mass or less and more preferably 80% by mass or more and 97% by mass or less based on the total mass of the second shell. When a material for the second shell is a mixture of two selected from ZnS, ZnSe and ZnSSe, the mixing ratio (mass ratio) is not particularly limited, and is 1/99 or more and 99/1 or less, and 10/90 or more and 90/10 or less.

The first shell and the second shell in a multilayer shell structure have different lattice constants. A difference in the lattice constant between the core and the first shell for example is 2% or more and 8% or less, preferably 2% or more and 65 or less, and more preferably 3% or more and 5% or less. In addition, a difference in the lattice constant between the core and the second shell is 5% or more and 13% or less, preferably 5% or more and 12% or less, more preferably 7% or more and 10% or less, and further preferably 8, or more and 10% or less.

In addition, a difference in the lattice constant between the first shell and the second shell is for example 3% or more and 9, or less, preferably 3, or more and 7% or less, and more preferably 4% or more and 6% or less.

The quantum dots (A) by these core-multilayer shell structures can have an emission wavelength in a range of 400 nm or higher and 800 nm or lower (furthermore a range of 470 nm or higher and 650 nm or lower, and particularly a range of 540 nm or higher and 580 nm or lower).

Examples of the quantum dots (A) by these core-multilayer shell structures include InP/ZnS/ZnSe and InP/ZnSe/ZnS.

In addition, the quantum dots (A) may be surface-modified. Examples thereof include phosphorus compounds such as phosphine, phosphine oxide and trialkylphosphines; organic nitrogen compounds such as pyridine, aminoalkanes and tertiary amines; organic sulfur compounds such as mercaptoalcohol, thiol, dialkyl sulfides and dialkyl sulfoxides; higher fatty acids; and surface modifying agents (organic ligands) such as alcohols.

Two or more of the above quantum dots (A) may be used in combination. Quantum dots (A) of the core-(multilayer) shell type and quantum dots (A) of the homogeneous structure type may be used in combination.

The average particle diameter of the quantum dots (A) is not particularly limited as long as the particles can function as quantum dots. The average diameter of the quantum dots (A) is preferably 0.5 nm or more and 20 nm or less, more preferably 1.0 nm or more and 15 nm or less, and further preferably 2 nm or more and 7 nm or less. In quantum dots (A) of the core-(multilayer) shell type, the size of core is for example 0.5 nm or more and 10 nm or less, and preferably 2 nm or more and 5 nm or less. The average thickness of the shell is preferably 0.4 nm or more and 2 nm or less, and more preferably 0.4 nm or more and 1.4 nm or less. When the shell includes the first shell and the second shell, the average thickness of the first shell is for example 0.2 nm or more and 1 nm or less, and preferably 0.2 nm or more and 0.7 nm or less. The average thickness of the second shell does not depend on the average thickness of the first shell, and is for example 0.2 nm or more and 1 nm or less, and preferably 0.2 nm or more and 0.7 nm or less.

The quantum dots (A) having an average particle diameter within such range show a quantum-confined effect and function well as quantum dots, and moreover are easily prepared and have stable fluorescence characteristics. It should be noted that the average particle diameter of quantum dots (A) can be defined by, for example, applying a dispersion liquid of quantum dots (A) onto a substrate and drying the liquid, removing a volatile component and then observing the surface with a transmission electron microscope (TEM). Typically, this average particle diameter can be defined as the number average diameter of circle equivalent diameters of particles obtained by image analysis of the TEM image.

The shape of quantum dots (A) is not particularly limited. Examples of the shape of quantum dots (A) include a spherical shape, a spheroid shape, a cylindrical shape, a polygonal shape, a disk shape, a polyhedral shape and the like. Among these, a spherical shape is preferred from the viewpoint of handleability and availability.

Because the characteristics as an optical film and wavelength conversion characteristics are good, the quantum dots (A) preferably include one or more selected from the group consisting of a compound (A1) having a fluorescence maximum in a wavelength range of 500 nm or higher and 600 nm or lower, and a compound (A2) having a fluorescence maximum in a wavelength range of 600 nm or higher and 700 nm or lower, and more preferably consists of one or more selected from the group consisting of the compound (A1) and the compound (A2).

A method for producing quantum dots (A) is not particularly limited. Quantum dots produced by various well-known methods can be used as the quantum dots (A). As the method for producing the quantum dots (A), for example, a method in which an organometallic compound is thermally decomposed in a coordinating organic solvent can be used. In addition, the quantum dots (A) of the core-shell structure type can be produced by a method in which homogeneous cores are formed by reaction and then a shell layer precursor is allowed to react in the presence of dispersed cores to form a shell layer. In addition, for example, quantum dots (A) having the above core-multilayer shell structure can be produced by the method described in WO 2013/127662. It should be noted that various commercially available quantum dots (A) can also be used.

The content of the quantum dots (A) is not particularly limited as long as the quantum dots (A) can be favorably dispersed in the liquid composition. In the case in which the liquid composition does not include a base component (C) described later, the content of the quantum dots (A) in 100 parts by mass of the liquid composition is preferably 0.1 parts by mass or more and 99 parts by mass or less, more preferably 1 part by mass or more and 90 parts by mass or less, and even more preferably 2 parts by mass or more and 80 parts by mass or less. In the case in which the liquid composition does not include the base component (C) described later, but includes an ionic liquid (B), the content of the quantum dots (A) in terms of a mass ratio relative to the ionic liquid (B), (A):(B), is preferably 90:10 to 10:90, more preferably 60:40 to 15:85, and even more preferably 50:50 to 25:75. In the case in which the liquid composition includes the base component (C) described later, the content of the quantum dots (A) relative to 100 parts by mass of the mass of the liquid composition excluding the mass of the ionic liquid (B) and the mass of the solvent (S) is preferably 0.1 parts by mass or more and 99 parts by mass or less, more preferably 1 part by mass or more and 90 parts by mass or less, and even more preferably 2 parts by mass or more and 80 parts by mass or less. In addition, (A):(C) is preferably 99:1 to 1:99, and more preferably 90:10 to 10:90. In the case in which the liquid composition contains the base component (C) described later, the content of the quantum dots (A) in terms of a ratio relative to the mass of the ionic liquid (B), (A):(B), is preferably 90:10 to 10:90, more preferably 60:40 to 15:85, and even more preferably 50:50 to 25:75.

<Ionic Liquid (B)>

As the ionic liquid (B), ionic liquids that are used in the field of organic synthesis and in electrolytes for batteries etc. can be used without any particular limitation. The ionic liquid (B) is typically a salt capable of being molten in a temperature region of 140° C. or lower, and is preferably a stable salt that is liquid at 140° C. or lower.

The melting point of the ionic liquid (B) is preferably 120° C. or lower, more preferably 100° C. or lower, and even more preferably 80° C. or lower from the viewpoint of, for example, more reliable achievement of the effects of the invention and the handleability of the ionic liquid (B) and the liquid composition.

The ionic liquid (B) is preferably composed of an organic cation and an anion. The ionic liquid (B) is preferably composed of a nitrogen-containing organic cation, a phosphorus-containing organic cation, or a sulfur-containing organic cation, and a counteranion, and more preferably of a nitrogen-containing organic cation or a phosphorus-containing organic cation, and a counteranion.

As the organic cation constituting the ionic liquid (B), at least one selected from the group consisting of an alkyl chain quaternary ammonium cation, a piperidinium cation, a pyrimidinium cation, a pyrrolidinium cation, an imidazolium cation, a pyridinium cation, a pyrazolium cation, a guanidinium cation, a morpholinium cation, a phosphonium cation and a sulfonium cation is preferable, and an alkyl chain quaternary ammonium cation, a piperidinium cation, a pyrrolidinium cation, an imidazolium cation, a morpholinium cation, or a phosphonium cation is more preferable in light of e.g. their favorable affinity for the solvent (S) described later, and a pyrrolidinium cation, an imidazolium cation, or a phosphonium cation is even more preferable from the viewpoint that the effects of the invention are particularly likely to be achieved.

Specific examples of the alkyl chain quaternary ammonium cation include a quaternary ammonium cation represented by the following formula (L1). More specifically, the alkyl chain quaternary ammonium cation is exemplified by, for example, a tetramethylammonium cation, an ethyltrimethylammonium cation, a diethyldimethylammonium cation, a triethylmethylammonium cation, a tetraethylammonium cation, a methyltributylammonium cation, an octyltrimethylammonium cation, a hexyltrimethylammonium cation, a methyltrioctylammonium cation, and the like. Specific examples of the piperidinium cation include a piperidinium cation represented by the following formula (L2). More specifically, the piperidinium cation is exemplified by, for example, a 1-propylpiperidinium cation, a 1-pentylpiperidinium cation, a 1,1-dimethylpiperidinium cation, a 1-methyl-1-ethylpiperidinium cation, a 1-methyl-1-propylpiperidinium cation, a 1-methyl-1-butylpiperidinium cation, a 1-methyl-1-pentylpiperidinium cation, a 1-methyl-1-hexylpiperidinium cation, a 1-methyl-1-heptylpiperidinium cation, a 1-ethyl-1-propylpiperidinium cation, a 1-ethyl-1-butylpiperidinium cation, a 1-ethyl-1-pentylpiperidinium cation, a 1-ethyl-1-hexylpiperidinium cation, a 1-ethyl-1-heptylpiperidinium cation, a 1,1-dipropylpiperidinium cation, a 1-propyl-1-butylpiperidinium cation, a 1,1-dibutylpiperidinium cation, and the like. Specific examples of the pyrimidinium cation include a 1,3-dimethyl-1,4,5,6-tetrahydropyrimidinium cation, a 1,2,3-trimethyl-1,4,5,6-tetrahydropyrimidinium cation, a 1,2,3,4-tetramethyl-1,4,5,6-tetrahydropyrimidinium cation, a 1,2,3,5-tetramethyl-1,4,5,6-tetrahydropyrimidinium cation, a 1,3-dimethyl-1,4-dihydropyrimidinium cation, a 1,3-dimethyl-1,6-dihydropyrimidinium cation, a 1,2,3-trimethyl-1,4-dihydropyrimidinium cation, a 1,2,3-trimethyl-1,6-dihydropyrimidinium cation, a 1,2,3,4-tetramethyl-1,4-dihydropyrimidinium cation, a 1,2,3,4-tetramethyl-1,6-dihydropyrimidinium cation, and the like.

Specific examples of the pyrrolidinium cation include a pyrrolidinium cation represented by the following formula (L3), and more specifically, a 1,1-dimethylpyrrolidinium cation, a 1-ethyl-1-methylpyrrolidinium cation, a 1-methyl-1-propylpyrrolidinium cation, a 1-methyl-1-butylpyrrolidinium cation, a 1-methyl-1-pentylpyrrolidinium cation, a 1-methyl-1-hexylpyrrolidinium cation, a 1-methyl-1-heptylpyrrolidinium cation, a 1-ethyl-1-propylpyrrolidinium cation, a 1-ethyl-1-butylpyrrolidinium cation, a 1-ethyl-1-pentylpyrrolidinium cation, a 1-ethyl-1-hexylpyrrolidinium cation, a 1-ethyl-1-heptylpyrrolidinium cation, a 1,1-dipropylpyrrolidinium cation, a 1-propyl-1-butylpyrrolidinium cation, a 1,1-dibutylpyrrolidinium cation, and the like. Specific examples of the imidazolium cation include an imidazolium cation represented by the following formula (L5), and more specifically, a 1,3-dimethylimidazolium cation, a 1,3-diethylimidazolium cation, a 1-ethyl-3-methylimidazolium cation, a 1-propyl-3-methylimidazolium cation, a 1-butyl-3-methylimidazolium cation, a 1-hexyl-3-methylimidazolium cation, a 1-octyl-3-methylimidazolium cation, a 1-decyl-3-methylimidazolium cation, a 1-dodecyl-3-methylimidazolium cation, a 1-tetradecyl-3-methylimidazolium cation, a 1,2-dimethyl-3-propylimidazolium cation, a 1-ethyl-2,3-dimethylimidazolium cation, a 1-butyl-2,3-dimethylimidazolium cation, a 1-hexyl-2,3-dimethylimidazolium cation, and the like. Specific examples of the pyridinium cation include a pyridinium cation represented by the following formula (L6), and more specifically, a 1-ethylpyridinium cation, a 1-butylpyridinium cation, a 1-hexylpyridinium cation, a 1-butyl-3-methylpyridinium cation, a 1-butyl-4-methylpyridinium cation, a 1-hexyl-3-methylpyridinium cation, a 1-butyl-3,4-dimethylpyridinium cation, and the like.

Specific examples of the pyrazolium cation include a 1,3-dimethyl-1,4,5,6-tetrahydropyrimidinium cation, a 1,2,3-trimethyl-1,4,5,6-tetrahydropyrimidinium cation, a 1,2,3,4-tetramethyl-1,4,5,6-tetrahydropyrimidinium cation, a 1,2,3,5-tetramethyl-1,4,5,6-tetrahydropyrimidinium cation, a 1,3-dimethyl-1,4-dihydropyrimidinium cation, a 1,3-dimethyl-1,6-dihydropyrimidinium cation, a 1,2,3-trimethyl-1,4-dihydropyrimidinium cation, a 1,2,3-trimethyl-1,6-dihydropyrimidinium cation, a 1,2,3,4-tetramethyl-1,4-dihydropyrimidinium cation, a 1,2,3,4-tetramethyl-1,6-dihydropyrimidinium cation, and the like.

Specific examples of the phosphonium cation include a phosphonium cation represented by the following formula (L4). More specifically, the phosphonium cation is exemplified by tetraalkylphosphonium cations such as a tetrabutylphosphonium cation, a tributylmethylphosphonium cation, and a tributylhexylphosphonium cation, and a triethyl(methoxymethyl)phosphonium cation, and the like Specific examples of the sulfonium cation include a triethylsulfonium cation, a dimethylethylsulfonium cation, a triethylsulfonium cation, an ethylmethylpropylsulfonium cation, a butyldimethylsulfonium cation, a 1-methyltetrahydrothiophenium cation, a 1-ethyltetrahydrothiophenium cation, a 1-propyltetrahydrothiophenium cation, a 1-butyltetrahydrothiophenium cation, or a 1-methyl-[1,4]-thioxonium cation, and the like. Among these, as the sulfonium cation, a sulfonium cation having a cyclic structure such as a tetrahydrothiophenium-based or hexahydrothiopyrylium-based 5-membered ring or 6-membered ring is preferable, and the sulfonium cation may have a heteroatom such as an oxygen atom in the cyclic structure.

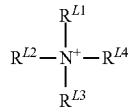
(L1)

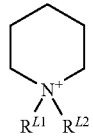
(L2)

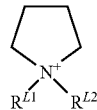
(L3)

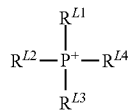
(L4)

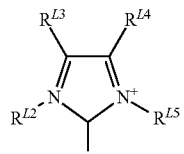
(L5)

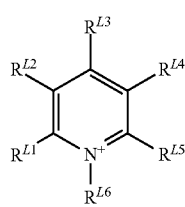
(L6)

In the formulas (L1) to (L4), $R^{L1}$ to $R^{L4}$ each independently represent an alkyl group having 1 or more and 20 or less carbon atoms, or an alkoxyalkyl group represented by $R^{L7}$—O—$(CH_2)_{Ln}$—. $R^{L7}$ represents a methyl group or an ethyl group. Ln represents an integer of 1 or more and 4 or less. In the formula (L5), $R^{L1}$ to $R^{L4}$ each independently represent an alkyl group having 1 or more and 20 or less carbon atoms, an alkoxyalkyl group represented by $R^{L7}$—O—$(CH_2)_{Ln}$—, or a hydrogen atom. $R^{L7}$ represents a methyl group or an ethyl group. Ln represents an integer of 1 or more and 4 or less. In the formula (L6), $R^{L1}$ to $R^{L6}$ each independently represent an alkyl group having 1 or more and 20 or less carbon atoms, an alkoxyalkyl group represented by $R^{L7}$—O—$(CH_2)_{Ln}$—, or a hydrogen atom. $R^{L7}$ represents a methyl group or an ethyl group. Ln represents an integer of 1 or more and 4 or less.

The anion constituting the ionic liquid (B) may be an organic anion or an inorganic anion. The organic anion is preferable because of favorable affinity of the ionic liquid (B) for the solvent (S) described later or for the surface modifying agent of the quantum dots (A). The organic anion is preferably at least one selected from the group consisting of a carboxylic acid-based anion, an N-acylamino acid ion, an acidic amino acid anion, a neutral amino acid anion, an alkyl sulfuric acid-based anion, a fluorine-containing compound-based anion and a phenol-based anion, more preferably a carboxylic acid-based anion, a fluorine-containing compound-based anion or an N-acylamino acid ion, and even more preferably a fluorine-containing compound-based anion.

Specific examples of the carboxylic acid-based anion include an acetate ion, a decanoate ion, a 2-pyrrolidone-5-carboxylate ion, a formate ion, an α-lipoate ion, a lactate ion, a tartarate ion, a hippurate ion, an N-methylhippurate ion, and the like. Among these, an acetate ion, a 2-pyrrolidone-5-carboxylate ion, a formate ion, a lactate ion, a tartarate ion, a hippurate ion and an N-methylhippurate ion are preferable, and an acetate ion, an N-methylhippurate ion and a formate ion are more preferable. Specific examples of the N-acylamino acid ion include an N-benzoylalanine ion, an N-acetylphenylalanine ion, an aspartate ion, a glycine ion, an N-acetylglycine ion, and the like, and among these, an N-benzoylalanine ion, an N-acetylphenylalanine ion and an N-acetylglycine ion are preferable, and an N-acetylglycine ion is more preferable.

Specific examples of the acidic amino acid anion include an aspartate ion, a glutamate ion, and the like, and specific examples of the neutral amino acid anion include a glycine ion, an alanine ion, a phenylalanine ion, and the like. Specific examples of the alkyl sulfuric acid-based anion include a methanesulfonate ion, and the like. Specific examples of the fluorine-containing compound-based anion include a trifluoromethanesulfonate ion, a hexafluorophosphonate ion, a trifluorotris(pentafluoroethyl)phosphonate ion, a bis(fluoroalkylsulfonyl)imide ion (for example, a bis(perfluoroalkylsulfonyl)imide ion having 1 or more and 5 or less carbon atoms, and preferably bis(trifluoromethanesulfonyl)imide ion), a trifluoroacetate ion, a tetrafluoroborate ion, and the like. Specific examples of the phenol-based anion include a phenol ion, a 2-methoxyphenol ion, a 2,6-di-tert-butylphenol ion, and the like.

The inorganic anion is preferably at least one selected from the group consisting of $F^-$, $Cl^-$, $Br^-$, $I^-$, $BF_4^-$, $PF_F^-$ and $N(SO_2F)_2^-$, more preferably $BF_4^-$, $PF_6^-$ or $N(SO_2F)_2^-$, and even more preferably $BF_4^-$ or $PF_6^-$ from the viewpoint of more reliable achievement of the effects of the invention.

The ionic liquid (B) can be produced by, for example, a procedure disclosed in paragraph 0045 of PCT International Publication No. 2014/178254, etc. The ionic liquid (B) can be used individually or two or more ionic liquids (B) can be used in combination. The content of the ionic liquid (B) is not particularly limited as long as the effects of the invention can be achieved. The content of the ionic liquid (B) relative to 100 parts by mass of the quantum dots (A) is preferably 10 parts by mass or more and 500 parts by mass or less, more preferably 90 parts by mass or more and 400 parts by mass or less, and even more preferably 100 parts by mass or more and 300 parts by mass or less from the viewpoint of a favorable effect of dispersion of the quantum dots (A) in the liquid composition.

<Base Component (C)>

The liquid composition preferably includes the base component (C) from the viewpoints of shapability and film formation properties. The base component (C) is a resin material consisting of a polymer compound or a reactive low-molecular-weight compound that forms crosslinking in response to heat or light exposure to give a polymer compound. The resin material used as the base component (C) may contain a functional group that forms crosslinking in response to heat or light exposure. In other words, a thermosetting or photocurable resin may also be used as the base component (C). Further, the resin material used as the base component (C) may be a resin material that is cured by baking.

It is preferable that the base component (C) be a thermosetting or photocurable base component because a shaped body excellent in physical properties such as hardness and tensile elongation tends to be formed. Next, specific examples of the base component (C) are described in order.

[Resin Material]

A non-curable resin material used as the base component (C) is described. The non-curable resin material is not particularly limited as long as it is a non-curable resin material capable of giving the resulting liquid composition with shapability such as film formation properties. Specific examples of the resin material include polyacetal resin, polyamide resin, polycarbonate resin, polyester resin (polybutylene terephthalate, polyethylene terephthalate, polyarylate and the like), FR-AS resin, FR-ABS resin, AS resin, ABS resin, polyphenylene oxide resin, polyphenylene sulfide resin, polysulfone resin, polyethersulfone resin, polyetheretherketone resin, fluorine-based resin, polyimide resin, polyamide imide resin, polyamide bismaleimide resin, polyetherimide resin, polybenzoxazole resin, polybenzothiazole resin, polybenzimidazole resin, silicone resin, BT resin, polymethylpentene, ultra high molecular weight polyethylene, FR-polypropylene, (meta)acrylic resin (polymethylmethacrylate and the like), polystyrene, and the like. Two or more of these resin materials may be used in combination.

The resin material described above is preferably dissolved in the liquid composition. The resin material described above may be a suspension liquid such as a latex as long as the objects of the present invention are not inhibited. In the preparation of the liquid composition in a solution state, in the case in which the resin material is hardly dissolved in the solvent (S1), the liquid composition preferably includes a good solvent for the resin material in addition to the solvent (S1).

[Thermosetting Low-Molecular-Weight Compound]

Examples of the thermosetting low-molecular-weight compound as the base component (C) that forms crosslinking in response to heat to give a polymer compound include an epoxy compound or an oxetane compound. When the composition including an epoxy compound or an oxetane compound as the base component (C) is heated to a predetermined temperature or higher, epoxy groups or oxetanyl groups of the epoxy compound or the oxetane compound crosslink with each other and thereby the resulting cured film becomes excellent in heat resistance and mechanical properties.

The epoxy compound or the oxetane compound is basically used as the thermosetting base component (C). In the case in which the epoxy compound or the oxetane compound is used in combination with an onium salt (D2) described later, the epoxy compound or the oxetane compound may be photo-cured.

(Epoxy Compound)

The epoxy compound is not particularly limited as long as the epoxy compound is curable by heating alone, or by the action of a thermosensitive curing agent or a photosensitive curing agent. The epoxy compound preferably has two or more epoxy groups. Moreover, the epoxy compound preferably includes a cyclic structure other than the oxirane ring. The use of the epoxy compound having such a structure tends to form a quantum dot-containing film that contains the quantum dots (A) in a favorable dispersion state and has a favorable fluorescence efficiency.

For the epoxy compound having a cyclic structure, the cyclic structure included in the epoxy compound is not particularly limited. The cyclic structure can be a cyclic structure including carbon as a ring-forming element such as a hydrocarbon ring structure or a heterocyclic ring structure, or can be a cyclic structure not including carbon as a ring-forming element such as a cyclic siloxane structure. Examples of heteroatoms which can be included in the heterocyclic ring structure include a nitrogen atom, an oxygen atom, a sulfur atom, a selenium atom, a silicon atom and the like. The cyclic structure can be a monocyclic structure or a polycyclic structure. The cyclic structure including carbon as a ring-forming element can be an aromatic ring structure, or an aliphatic ring structure, or a polycyclic structure in which an aromatic ring and an aliphatic ring are condensed.

Examples of rings to give the aromatic ring structure or the ring structure including an aromatic ring include a benzene ring, a naphthalene ring, an anthracene ring, a phenanthrene ring, a tetralin ring, an acenaphthene ring and a fluorene ring, and the like. Examples of rings to give the aliphatic ring structure include a monocycloalkane ring, a bicycloalkane ring, a tricycloalkane ring, a tetracycloalkane ring, and the like. Specific examples thereof include monocycloalkane rings such as a cyclopentane ring, a cyclohexane ring, a cycloheptane ring and a cyclooctane ring, an adamantane ring, a norbornane ring, an isobornane ring, a tricyclodecane ring and a tetracyclododecane ring.

Examples of epoxy compounds which can be suitably used and are widely used include bifunctional epoxy resins such as bisphenol A epoxy resin, bisphenol F epoxy resin, bisphenol S epoxy resin, bisphenol AD epoxy resin, naphthalene epoxy resin and biphenyl epoxy resin; epoxy group-containing fluorene compounds such as 9,9-bis[4-(glycidyloxy)phenyl]-9H-fluorene, 9,9-bis[4-[2-(glycidyloxy)ethoxy]phenyl]-9H-fluorene, 9,9-bis[4-[2-(glycidyloxy)ethyl]phenyl]-9H-fluorene, 9,9-bis[4-(glycidyloxy)-3-methylphenyl]-9H-fluorene, 9,9-bis[4-(glycidyloxy)-3,5-dimethylphenyl]-9H-fluorene and 9,9-bis(6-glycidyloxynaphthalen-2-yl)-9H-fluorene; glycidylamine epoxy resins such as tetraglycidylaminodiphenylmethane, triglycidyl-p-aminophenol, tetraglycidyl methaxylylenediamine and tetraglycidyl bisaminomethylcyclohexane; trifunctional epoxy resins such as phloroglycinol triglycidyl ether, trihydroxybiphenyl triglycidyl ether, trihydroxyphenylmethane triglycidyl ether, 2-[4-(2,3-epoxypropoxy)phenyl]-2-[4-[1,1-bis[4-(2,3-epoxypropoxy)phenyl]ethyl]phenyl]propane and 1,3-bis[4-[1-[4-(2,3-epoxypropoxy)phenyl]-1-[4-[1-[4-(2,3-epoxypropoxy)phenyl]-1-methylethyl]phenyl]ethyl]phenoxy]-2-propanol; tetrafunctional epoxy resins such as tetrahydroxyphenylethane tetraglycidyl ether, tetraglycidylbenzophenone, bisresorcinol tetraglycidyl ether and tetraglycidoxybiphenyl, and a 1,2-epoxy-4-(2-oxiranyl)cyclohexane adduct of 2,2-bis(hydroxymethyl)-1-butanol. The 1,2-epoxy-4-(2-oxiranyl)cyclohexane adduct of 2,2-bis(hydroxymethyl)-1-butanol is commercially available as EHPE-3150 (manufactured by Daicel Corporation).

In addition, an oligomer or polymer type polyfunctional epoxy compound can be preferably used. Typical examples thereof include a phenol novolac epoxy compound, a brominated phenol novolac epoxy compound, an ortho-cresol novolac epoxy compound, a xylenol novolac epoxy compound, a naphthol novolac epoxy compound, a bisphenol A novolac epoxy compound, a bisphenol AD novolac epoxy compound, an epoxylated product of dicyclopentadiene phenol resin, an epoxylated product of naphthalene phenol resin, and the like.

In addition, a compound represented by the following formula (C1) is also given as a preferred example of the oligomer or polymer type polyfunctional epoxy compounds.

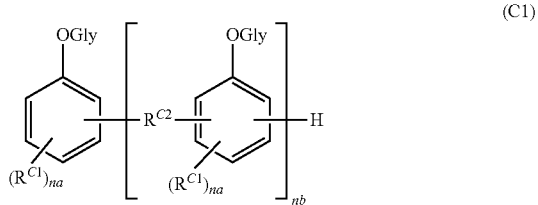

In the formula (C1), OGly is a glycidyloxy group; $R^{C1}$ is a halogen atom or a monovalent group having 1 or more and 8 or less carbon atoms; na is an integer of 0 or more and 4 or less; nb is the number of repetitions of the unit in the brackets; adjacent two $R^{C1}$ on the benzene ring may be bonded to each other to form a ring when na is an integer of 2 or more; and $R^{C2}$ is a divalent aliphatic cyclic group or a group represented by the following formula (C1-1):

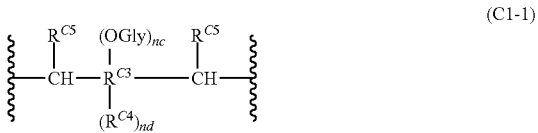

in the formula (C1-1), OGly is a glycidyloxy group; $R^{C3}$ is an aromatic hydrocarbon group; $R^{C4}$ is a halogen atom or an alkyl group having 1 or more and 4 or less carbon atoms; nc is 0 or 1; nd is an integer of 0 or more and 8 or less; $R^{C5}$ is a hydrogen atom or a group represented by the following formula (C1-2):

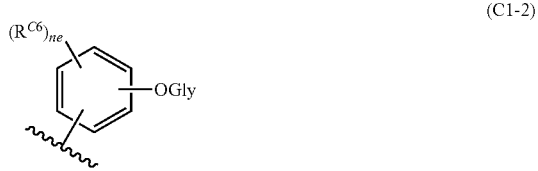

in the formula (C1-2), OGly is a glycidyloxy group; $R^{C6}$ is a halogen atom, an alkyl group having 1 or more and 4 or less carbon atoms or a phenyl group; and ne is an integer of 0 or more and 4 or less.

The epoxy compound represented by the above formula (C1) preferably has an average molecular weight of 800 or more. A cured product with good water resistance and strength is easily formed by using a compound having such an average molecular weight as the epoxy compound represented by the formula (C1). The average molecular weight of the epoxy compound represented by the formula (C1) is preferably 1,000 or more, more preferably 1,200 or more, and particularly preferably 1,500 or more. In addition, the average molecular weight of the epoxy compound represented by the formula (C1) is preferably 50,000 or less and more preferably 20,000 or less.

In the formula (C1), $R^{C1}$ is a halogen atom or a monovalent group having 1 or more and 8 or less carbon atoms. Specific examples of the monovalent group having 1 or more and 8 or less carbon atoms include an alkyl group, an alkoxy group, a phenoxy group, an aliphatic acyl group, an aliphatic acyloxy group, a benzoyl group, a benzyl group, a phenethyl group and an unsaturated aliphatic hydrocarbon group. The alkyl group, alkoxy group, aliphatic acyl group, aliphatic acyloxy group and unsaturated aliphatic hydrocarbon group can be liner or branched.

Suitable examples of the halogen atom as $R^{C1}$ include a fluorine atom, a chlorine atom, a bromine atom and an iodine atom. Suitable examples of the alkyl group as $R^{C1}$ are preferably a methyl group, an ethyl group, an n-propyl group, an isopropyl group, an n-butyl group, an isobutyl group, a sec-butyl group and a tert-butyl group, and more preferably a methyl group and an ethyl group.

When $R^{C1}$ is a monovalent group having 1 or more and 8 or less carbon atoms, the monovalent group is preferably an alkyl group and an alkoxy group. Specific examples of the alkyl group include a methyl group, an ethyl group, an n-propyl group, an isopropyl group, an n-butyl group, an isobutyl group, a sec-butyl group, a tert-butyl group, an n-pentyl group, an n-hexyl group, an n-heptyl group, an n-octyl group and a 2-ethylhexyl group. Specific examples of the alkoxy group include a methoxy group, an ethoxy group, an n-propyloxy group, an isopropyloxy group, an n-butyloxy group, an isobutyloxy group, a sec-butyloxy group, a tert-butyloxy group, an n-pentyloxy group, an n-hexyloxy group, an n-heptyloxy group, an n-octyloxy group and a 2-ethylhexyloxy group.

When na is an integer of 2 or more and 4 or less, adjacent two $R^{C1}$ on the benzene ring of a plurality of $R^{C1}$ may be bonded to each other to form a ring. The ring formed by bonding two $R^{C1}$ can be an aromatic ring or an aliphatic ring, or can be a hydrocarbon ring or a heterocyclic ring. When the ring formed by bonding two $R^{C1}$ is a heterocyclic ring, examples of heteroatoms included in the ring include N, O, S, Se, and the like. Suitable examples of the group formed together with a benzene ring by bonding two $R^{C1}$ include a naphthalene ring and a tetralin ring.

In the formula (C1), the divalent aliphatic cyclic group as $R^{C2}$ is not particularly limited, and can be a polycyclic group of two or more monocyclic groups. It should be noted that the divalent aliphatic cyclic group does not commonly include an epoxy group in the structure, and it is preferred that an epoxy group not be included. Specific examples of the divalent aliphatic cyclic group are a group in which two hydrogen atoms are removed from monocycloalkane, or polycycloalkane such as bicycloalkane, tricycloalkane or tetracycloalkane, and the like. More specific examples thereof include a group in which two hydrogen atoms are removed from monocycloalkane such as cyclopentane or cyclohexane, or polycycloalkane such as adamantane, norbornane, isobornane, tricyclodecane or tetracyclododecane, and the like. The number of carbon atoms in the divalent aliphatic cyclic group is preferably 3 or more and 50 or less, more preferably 3 or more and 30 or less, and particularly preferably 3 or more and 20 or less. The number is most preferably 3 or more and 15 or less.

Specific examples of the divalent aliphatic cyclic group as $R^{C2}$ include groups shown below.

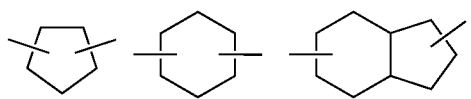

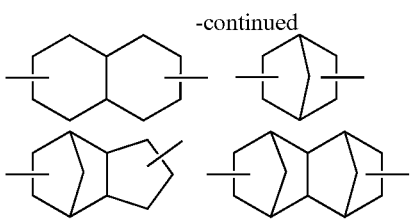

$R^{C3}$ is an aromatic hydrocarbon group. The number of valences in the aromatic hydrocarbon group as $R^{C3}$ is 2+nc+nd. The aromatic hydrocarbon group is not particularly limited. An aromatic hydrocarbon ring forming the aromatic hydrocarbon group is typically a six-membered aromatic hydrocarbon ring (benzene ring) or a ring in which two or more benzene rings are condensed with each other or bonded through a single bond. Specific suitable examples of the aromatic hydrocarbon ring forming the aromatic hydrocarbon group are benzene, naphthalene, anthracene, phenanthrene, biphenyl and terphenyl. Groups obtained by removing the 2+nc+nd number of hydrogen atoms from these aromatic hydrocarbon rings are suitable for the aromatic hydrocarbon group as $R^{C3}$.

In the group represented by the formula (C1-1), nc is 0 or 1. That is, a glycidyloxy group may not be bonded to $R^{C3}$, which is an aromatic hydrocarbon group, or one glycidyloxy group may be bonded thereto.

In the group represented by the formula (C1-1), $R^{C4}$ is a halogen atom or an alkyl group having 1 or more and 4 or less carbon atoms, and d is an integer of 0 or more and 8 or less. That is, $R^{C4}$ is a substituent other than the glycidyloxy group on $R^{C3}$, which is an aromatic hydrocarbon group, and the number of substituents on $R^{C3}$ is 0 or more and 8 or less. nd is preferably an integer of 0 or more and 4 or less, more preferably an integer of 0 or more and 2 or less, and particularly preferably 0 or 1. Suitable examples of the halogen atom as $R^{C4}$ include a fluorine atom, a chlorine atom, a bromine atom and an iodine atom. Suitable examples of the alkyl group as $R^{ca}$ are preferably a methyl group, an ethyl group, an n-propyl group, an isopropyl group, an n-butyl group, an isobutyl group, a sec-butyl group and a tert-butyl group, and more preferably a methyl group and an ethyl group.

In the group represented by the formula (C1-1), $R^{C5}$ is a hydrogen atom or a group represented by the above-described formula (C1-2). $R^{C6}$ in the formula (C1-2) is a halogen atom, an alkyl group having 1 or more and 4 or less carbon atoms, or a phenyl group. Specific examples of the halogen atom and the alkyl group having 1 or more and 4 or less carbon atoms are the same as those of $R^{C4}$.

In the epoxy compound represented by the formula (C1) described above, it is preferred that $R^{C2}$ be a divalent aliphatic cyclic group or a divalent group represented by the above-described formula (C1-1) in which nc is 0 and $R^{C5}$ is a hydrogen atom.

In this case, because a proper distance exists between a plurality of epoxy groups included in the epoxy compound represented by the formula (C1), a cured product with better water resistance is easily formed.

The epoxy compound represented by the formula (C1) can be acquired as a commercial product. Specific examples of the commercial product include NC-series and XD-series manufactured by Nippon Kayaku Co., Ltd. and the like. In addition, equivalent products having a specific structure can be acquired from DIC Corporation and Showa Denko K.K.

Suitable examples of chemical structures of the epoxy compound represented by the formula (C1) are shown below. In the following formulas, OGly represents a glycidyloxy group, and p0 represents the number of repetitions of the unit in brackets.

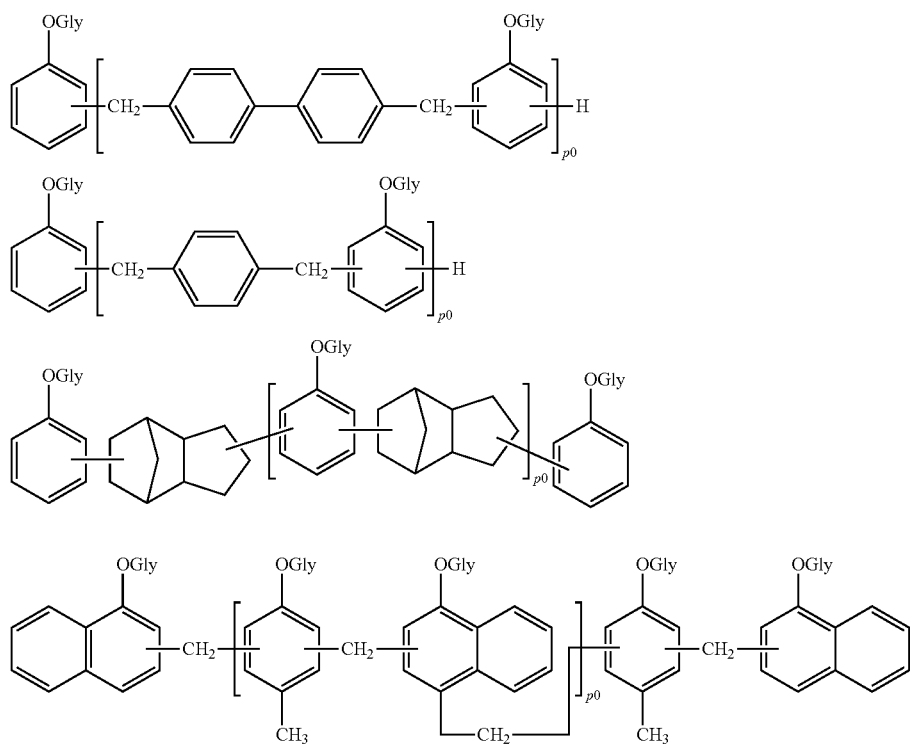

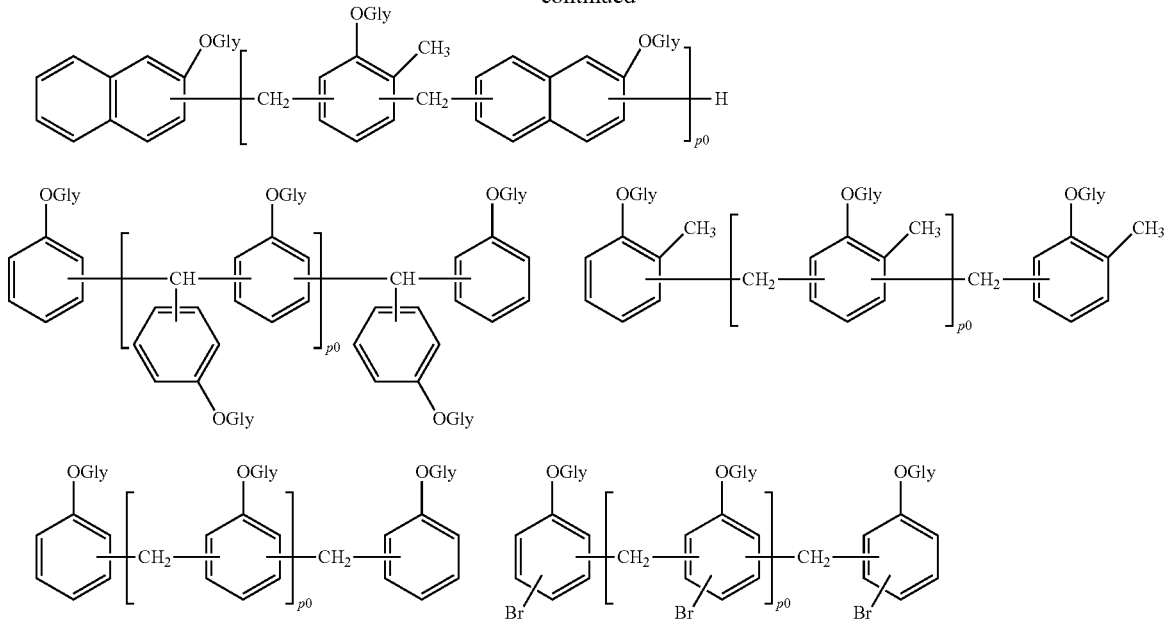

Other examples of suitable epoxy compounds include a polyfunctional alicyclic epoxy compound having an alicyclic epoxy group. Specific examples of the alicyclic epoxy compound include 2-(3,4-epoxycyclohexyl-5,5-spiro-3,4-epoxy)cyclohexane-meta-dioxane, bis(3,4-epoxycyclohexylmethyl)adipate, bis(3,4-epoxy-6-methylcyclohexylmethyl)adipate, 3,4-epoxy-6-methylcyclohexyl-3',4'-epoxy-6'-methylcyclohexanecarboxylate, F-caprolactone-modified 3,4-epoxycyclohexylmethyl-3',4'-epoxycyclohexanecarboxylate, trimethylcaprolactone-modified 3,4-epoxycyclohexylmethyl-3',4'-epoxycyclohexanecarboxylate, β-methyl-δ-valerolactone-modified 3,4-epoxycyclohexylmethyl-3',4'-epoxycyclohexanecarboxylate, methylenebis(3,4-epoxycyclohexane), di(3,4-epoxycyclohexylmethyl) ether of ethylene glycol, ethylenebis(3,4-epoxycyclohexanecarboxylate), a polyfunctional epoxy compound having a tricyclodecene oxide group, and compounds represented by the following formulas (c1-1) to (c1-5). These alicyclic epoxy compounds can be used individually or two or more alicyclic epoxy compounds can be used in combination.

In the formula (c1-1), Z represents a single bond or a linking group (a divalent group having one or more atoms); and $R^{c1}$ to $R^{c18}$ are each independently a group selected from the group consisting of a hydrogen atom, a halogen atom and an organic group.

Examples of the linking group Z can include a divalent group selected form the group consisting of a divalent hydrocarbon group, —O—, —O—CO—, —S—, —SO—, —SO$_2$—, —CBr$_2$—, —C(CBr$_3$)$_2$—, —C(CF$_3$)$_2$— and —$R^{c19}$—O—CO—, and a group formed by bonding a plural of these divalent groups, and the like.

Examples of the divalent hydrocarbon group as a linking group Z can include a linear or branched alkylene group having 1 or more and 18 or less carbon atoms, and a divalent alicyclic hydrocarbon group, and the like. Examples of the linear or branched alkylene group having 1 or more and 18 or less carbon atoms can include a methylene group, a methylmethylene group, a dimethylmethylene group, a dimethylene group, a trimethylene group, and the like. Examples of the above divalent alicyclic hydrocarbon group can include cycloalkylene groups (including cycloalkylidene groups) such as a 1,2-cyclopentylene group, a 1,3-cyclopentylene group, a cyclopentylidene group, a 1,2-cyclohexylene group, a 1,3-cyclohexylene group, a 1,4-cyclohexylene group and cyclohexylidene, and the like.

$R^{c19}$ is an alkylene group having 1 or more and 8 or less carbon atoms and preferably a methylene group or an ethylene group.

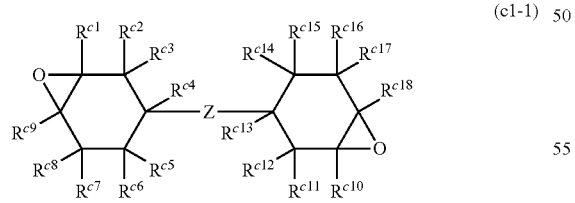

(c1-1)

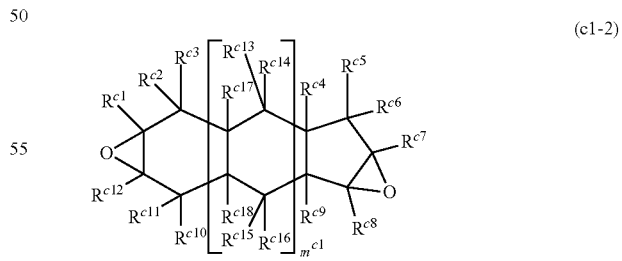

(c1-2)

In the formula (c1-2), $R^{c1}$ to $R^{c13}$ are a group selected from the group consisting of a hydrogen atom, a halogen atom and an organic group; $R^{c2}$ and $R^{c10}$ may be bonded to each other to form a ring; $R^{c13}$ and $R^{c10}$ may be bonded to each other to form a ring; and $m^{c1}$ is 0 or 1.

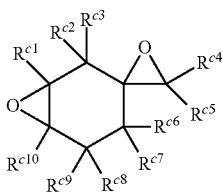

(c1-3)

In the formula (c1-3), $R^{c1}$ to $R^{c10}$ are a group selected from the group consisting of a hydrogen atom, a halogen atom and an organic group, and $R^{c2}$ and $R^{c8}$ may be bonded to each other to form a ring.

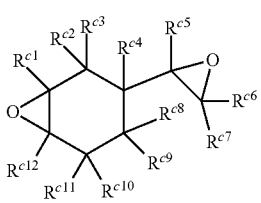

(c1-4)

In the formula (c1-4), $R^{c1}$ to $R^{c12}$ are a group selected from the group consisting of a hydrogen atom, a halogen atom and an organic group, and $R^{c2}$ and $R^{c10}$ may be bonded to each other to form a ring.

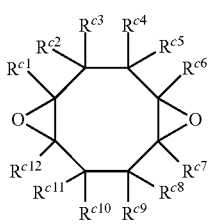

(c1-5)

In the formula (c1-5), $R^{c1}$ to $R^{c12}$ are a group selected from the group consisting of a hydrogen atom, a halogen atom and an organic group.

In the formulas (c1-1) to (c1-5), when $R^{c1}$ to $R^{c18}$ are an organic group, the organic group is not particularly limited as long as the object of the present invention is not inhibited, and the organic group may be a hydrocarbon group, or a group including a carbon atom and a halogen atom, or a group including a heteroatom such as a halogen atom, an oxygen atom, a sulfur atom, a nitrogen atom or a silicon atom, together with a carbon atom and a hydrogen atom. Examples of the halogen atom include a chlorine atom, a bromine atom, an iodine atom and a fluorine atom, and the like.

The organic group is preferably a hydrocarbon group, a group including a carbon atom, a hydrogen atom and an oxygen atom, a halogenated hydrocarbon group, a group including a carbon atom, an oxygen atom and a halogen atom, and a group including a carbon atom, a hydrogen atom, an oxygen atom and a halogen atom. When the organic group is a hydrocarbon group, the hydrocarbon group may be an aromatic hydrocarbon group, or an aliphatic hydrocarbon group, or a group including an aromatic skeleton and an aliphatic skeleton. The number of carbon atoms of the organic group is preferably 1 or more and 20 or less, more preferably 1 or more and 10 or less, and particularly preferably 1 or more and 5 or less.

Specific examples of the hydrocarbon group include chain alkyl groups such as a methyl group, an ethyl group, an n-propyl group, an isopropyl group, an n-butyl group, an isobutyl group, a sec-butyl group, a tert-butyl group, an n-pentyl group, an n-hexyl group, an n-heptyl group, an n-octyl group, a 2-ethylhexyl group, an n-nonyl group, an n-decyl group, an n-undecyl group, an n-tridecyl group, an n-tetradecyl group, an n-pentadecyl group, an n-hexadecyl group, an n-heptadecyl group, an n-octadecyl group, an n-nonadecyl group and an n-icosyl group; chain alkenyl groups such as a vinyl group, a 1-propenyl group, a 2-n-propenyl group (an allyl group), a 1-n-butenyl group, a 2-n-butenyl group and a 3-n-butenyl group; cycloalkyl groups such as a cyclopropyl group, a cyclobutyl group, a cyclopentyl group, a cyclohexyl group and a cycloheptyl group; aryl groups such as a phenyl group, an o-tolyl group, an m-tolyl group, a p-tolyl group, an α-naphthyl group, a β-naphthyl group, a biphenyl-4-yl group, a biphenyl-3-yl group, a biphenyl-2-yl group, an anthryl group and a phenanthryl group; and aralkyl groups such as a benzyl group, a phenethyl group, an α-naphthylmethyl group, a β-naphthylmethyl group, an α-naphthylethyl group and a β-naphthylethyl group.

Specific examples of the halogenated hydrocarbon group are halogenated chain alkyl groups such as a chloromethyl group, a dichloromethyl group, a trichloromethyl group, a bromomethyl group, a dibromomethyl group, a tribromomethyl group, a fluoromethyl group, a difluoromethyl group, a trifluoromethyl group, a 2,2,2-trifluoroethyl group, a pentafluoroethyl group, a heptafluoropropyl group, a perfluorobutyl group and a perfluoropentyl group, a perfluorohexyl group, a perfluoroheptyl group, a perfluorooctyl group, a perfluorononyl group and a perfluorodecyl group; halogenated cycloalkyl groups such as a 2-chlorocyclohexyl group, a 3-chlorocyclohexyl group, a 4-chlorocyclohexyl group, a 2,4-dichlorocyclohexyl group, a 2-bromocyclohexyl group, a 3-bromocyclohexyl group and a 4-bromocyclohexyl group; halogenated aryl groups such as a 2-chlorophenyl group, a 3-chlorophenyl group, a 4-chlorophenyl group, a 2,3-dichlorophenyl group, a 2,4-dichlorophenyl group, a 2,5-dichlorophenyl group, a 2,6-dichlorophenyl group, a 3,4-dichlorophenyl group, a 3,5-dichlorophenyl group, a 2-bromophenyl group, a 3-bromophenyl group, a 4-bromophenyl group, a 2-fluorophenyl group, a 3-fluorophenyl group and a 4-fluorophenyl group; and halogenated aralkyl groups such as a 2-chlorophenylmethyl group, a 3-chlorophenylmethyl group, a 4-chlorophenylmethyl group, a 2-bromophenylmethyl group, a 3-bromophenylmethyl group, a 4-bromophenylmethyl group, a 2-fluorophenylmethyl group, a 3-fluorophenylmethyl group and a 4-fluorophenylmethyl group.

Specific examples of the group including a carbon atom, a hydrogen atom and an oxygen atom are hydroxy chain alkyl groups such as a hydroxymethyl group, a 2-hydroxyethyl group, a 3-hydroxy-n-propyl group and a 4-hydroxy-n-butyl group; hydroxycycloalkyl groups such as a 2-hydroxycyclohexyl group, a 3-hydroxycyclohexyl group and a 4-hydroxycyclohexyl group; hydroxyaryl groups such as a 2-hydroxyphenyl group, a 3-hydroxyphenyl group, a 4-hydroxyphenyl group, a 2,3-dihydroxyphenyl group, a 2,4-dihydroxyphenyl group, a 2,5-dihydroxyphenyl group, a 2,6-dihydroxyphenyl group, a 3,4-dihydroxyphenyl group and a 3,5-dihydroxyphenyl group; hydroxyaralkyl groups such as a 2-hydroxyphenylmethyl group, a 3-hydroxyphenylmethyl group and a 4-hydroxyphenylmethyl group; chain alkoxy groups such as a methoxy group, an ethoxy group, an n-propoxy group, an isopropoxy group, an n-butyloxy group, an isobutyloxy group, a sec-butyloxy group, a tert-butyloxy group, an n-pentyloxy group, an n-hexyloxy group, an n-heptyloxy group, an n-octyloxy group, a 2-ethylhexyloxy group, an n-nonyloxy group, an n-decyloxy group, an n-undecyloxy group, an n-tridecyloxy group, an n-tetradecyloxy group, an n-pentadecyloxy group, an n-hexadecyloxy group, an n-heptadecyloxy group, an n-octadecyloxy group, an n-nonadecyloxy group and an n-icosyloxy group; chain alkenyloxy groups such as a vinyloxy group, a 1-propenyloxy group, a 2-n-propenyloxy group (an allyloxy group), a 1-n-butenyloxy group, a 2-n-butenyloxy group and a 3-n-butenyloxy group; aryloxy groups such as a phenoxy group, an o-tolyloxy group, an m-tolyloxy group, a p-tolyloxy group, an α-naphthyloxy group, a β-naphthyloxy group, a biphenyl-4-yloxy group, a biphenyl-3-yloxy group, a biphenyl-2-yloxy group, an anthryloxy group and a phenanthryloxy group; aralkyloxy groups such as a benzyloxy group, a phenethyloxy group, an α-naphthylmethyloxy group, a β-naphthylmethyloxy group, an α-naphthylethyloxy group and a β-naphthylethyloxy group; alkoxyalkyl groups such as a methoxymethyl group, an ethoxymethyl group, an n-propoxymethyl group, a 2-methoxyethyl group, a 2-ethoxyethyl group, a 2-n-propoxyethyl group, a 3-methoxy-n-propyl group, a 3-ethoxy-n-propyl group, a 3-n-propoxy-n-propyl group, a 4-methoxy-n-butyl group, a 4-ethoxy-n-butyl group and a 4-n-propoxy-n-butyl group; alkoxyalkoxy groups such as a methoxymethoxy group, an ethoxymethoxy group, an n-propoxymethoxy group, a 2-methoxyethoxy group, a 2-ethoxyethoxy group, a 2-n-propoxyethoxy group, a 3-methoxy-n-propoxy group, a 3-ethoxy-n-propoxy group, a 3-n-propoxy-n-propoxy group, a 4-methoxy-n-butyloxy group, a 4-ethoxy-n-butyloxy group and a 4-n-propoxy-n-butyloxy group; alkoxyaryl groups such as a 2-methoxyphenyl group, a 3-methoxyphenyl group and a 4-methoxyphenyl group; alkoxyaryloxy groups such as a 2-methoxyphenoxy group, a 3-methoxyphenoxy group and a 4-methoxyphenoxy group; aliphatic acyl groups such as a formyl group, an acetyl group, a propionyl group, a butanoyl group, a pentanoyl group, a hexanoyl group, a heptanoyl group, an octanoyl group, a nonanoyl group and a decanoyl group; aromatic acyl groups such as a benzoyl group, an α-naphthoyl group and a β-naphthoyl group; chain alkyloxycarbonyl groups such as a methoxycarbonyl group, an ethoxycarbonyl group, an n-propoxycarbonyl group, an n-butyloxycarbonyl group, an n-pentyloxycarbonyl group, an n-hexyloxycarbonyl group, an n-heptyloxycarbonyl group, an n-octyloxycarbonyl group, an n-nonyloxycarbonyl group and an n-decyloxycarbonyl group; aryloxycarbonyl groups such as a phenoxycarbonyl group, an α-naphthoxycarbonyl group and a β-naphthoxycarbonyl group; aliphatic acyloxy groups such as a formyloxy group, an acetyloxy group, a propionyloxy group, a butanoyloxy group, a pentanoyloxy group, a hexanoyloxy group, a heptanoyloxy group, an octanoyloxy group, a nonanoyloxy group and a decanoyloxy group; and aromatic acyloxy groups such as a benzoyloxy group, an α-naphthoyloxy group and a β-naphthoyloxy group.

It is preferred that $R^{c1}$ to $R^{c13}$ be each independently a group selected from the group consisting of a hydrogen atom, a halogen atom, an alkyl group having 1 or more and 5 or less carbon atoms and an alkoxy group having 1 or more and 5 or less carbon atoms, and it is more preferred that all $R^{c1}$ to $R^{c18}$ be hydrogen atoms particularly because a cured film with good mechanical properties is easily formed.

In the formulas (c1-2) to (c1-5), $R^{c1}$ to $R^{c18}$ are the same as $R^{c1}$ to $R^{c10}$ in the formula (c1-1). Examples of the divalent group formed when $R^{c2}$ and $R^{c10}$ are bonded to each other in the formula (c1-2) and the formula (c1-4), when $R^{c13}$ and $R^{c16}$ are bonded to each other in the formula (c1-2), and when $R^{c2}$ and $R^{c8}$ are bonded to each other in the formula (c1-3) include —CH$_2$— and —C(CH$_3$)$_2$—.

Specific examples of suitable compounds of the alicyclic epoxy compound represented by the formula (c1-1) can include alicyclic epoxy compounds represented by the following formulas (c1-1a), (c1-1b) and (c1-1c), 2,2-bis(3,4-epoxycyclohexan-1-yl)propane [=2,2-bis(3,4-epoxycyclohexyl)propane], and the like.

(c1-1a)

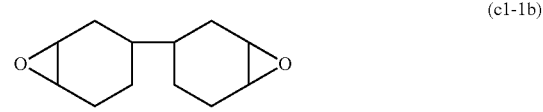

(c1-1b)

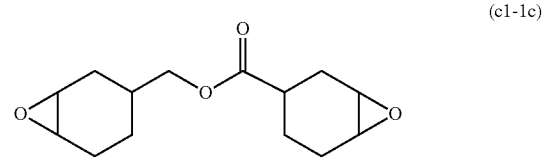

(c1-1c)

Specific examples of suitable compounds of the alicyclic epoxy compound represented by the formula (c1-2) include bicyclononadiene epoxide or dibicyclononadiene epoxide alicyclic epoxy compounds represented by the following formula (c1-2a).

(c1-2a)

(c1-2b)

Specific examples of suitable compounds of the alicyclic epoxy compound represented by the formula (c1-3) include S-spiro[3-oxatricyclo[3.2.1.0$^{2,4}$]octane-6,2'-oxirane], and the like.

Specific examples of suitable compounds of the alicyclic epoxy compound represented by the formula (c1-4) include 4-vinylcyclohexene dioxide, dipentene dioxide, limonene dioxide, 1-methyl-4-(3-methyloxiran-2-yl)-7-oxabicyclo[4.1.0]heptane, and the like.

Specific examples of suitable compounds of the alicyclic epoxy compound represented by the formula (c1-5) include 1,2,5,6-diepoxycyclooctane, and the like.

Furthermore, a compound represented by the following formula (c1) can be suitably used as the epoxy compound.

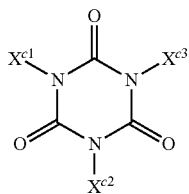

(c1)

In the formula (c1), $X^{c1}$, $X^{c2}$ and $X^{c3}$ are each independently a hydrogen atom or an organic group which may include an epoxy group, and the total number of epoxy groups of $X^{c1}$, $X^{c2}$ and $X^{c3}$ is 2 or more.

The compound represented by the above formula (c1) is preferably a compound represented by the following formula (c1-6).

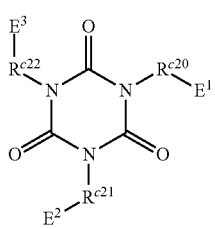

(c1-6)

In the formula (c1-6), $R^{c20}$ to $R^{c22}$ are a linear, branched or cyclic alkylene group, an arylene group, —O—, —C(=O)—, —NH— and a combination thereof, and may be the same or different; $E^1$ to $E^3$ are at least one substituent selected from the group consisting of an epoxy group, an oxetanyl group, an ethylenically unsaturated group, an alkoxysilyl group, an isocyanate group, a blocked isocyanate group, a thiol group, a carboxy group, a hydroxy group and a succinic acid anhydride group, or a hydrogen atom, provided that at least two of $E^1$ to $E^3$ are at least one selected from the group consisting of an epoxy group and an oxetanyl group.

In the formula (c1-6), each of at least two of a group represented by $R^{c20}$ and $E^1$, a group represented by $R^{c21}$ and $E^2$, and a group represented by $R^{c22}$ and $E^3$ is preferably a group represented by the following formula (c1-6a). It is more preferred that all of these groups are groups represented by the following formula (c1-6a). A plurality of groups represented by the formula (c1-6a) bonded to one compound are preferably the same.

-L-C$^c$ (c1-6a)

In the formula (c1-6a), L is a linear, branched or cyclic alkylene group, an arylene group, —O—, —C(=O)—, —NH— and a combination thereof, and C$^c$ is an epoxy group. In the formula (c1-6a), L and C$^c$ may be bonded to each other to form a cyclic structure.

In the formula (c1-6a), the linear, branched or cyclic alkylene group as L is preferably an alkylene group having 1 or more and 10 or less carbon atoms, and additionally the arylene group as L is preferably an arylene group having 5 or more and 10 or less carbon atoms. In the formula (c1-6a), L is preferably a linear alkylene group having 1 or more and 3 or less carbon atoms, a phenylene group, —O—, —C(=O)—, —NH— and a combination thereof, and is preferably at least one of a linear alkylene group having 1 or more and 3 or less carbon atoms such as a methylene group and a phenylene group or a combination of these groups and at least one of —O—, —C(=O)— and —NH—.

As a case where L and C$^c$ are bonded to each other to form a cyclic structure in the formula (c1-6a), for example when a branched alkylene group and an epoxy group are bonded to each other to form a cyclic structure (a structure having an epoxy group of an alicyclic structure), examples thereof include an organic group represented by the following formula (c1-6b) or (c1-6c).

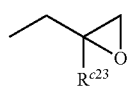

(c1-6b)

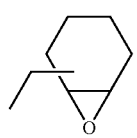

(c1-6c)

In the formula (c1-6b), $R^{c23}$ is a hydrogen atom or a methyl group.

As examples of the compound represented by the formula (c1-6), epoxy compounds having an oxiranyl group or an alicyclic epoxy group will be exemplified. It should be noted, however, that the compound represented by the formula (c1-6) is not limited thereto.

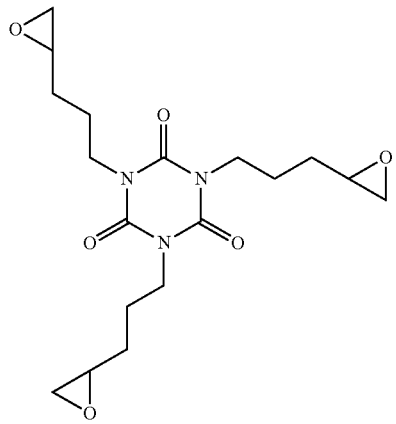

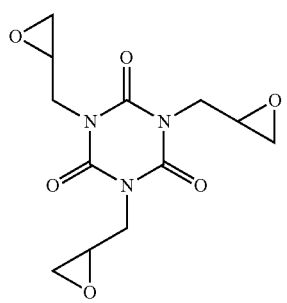

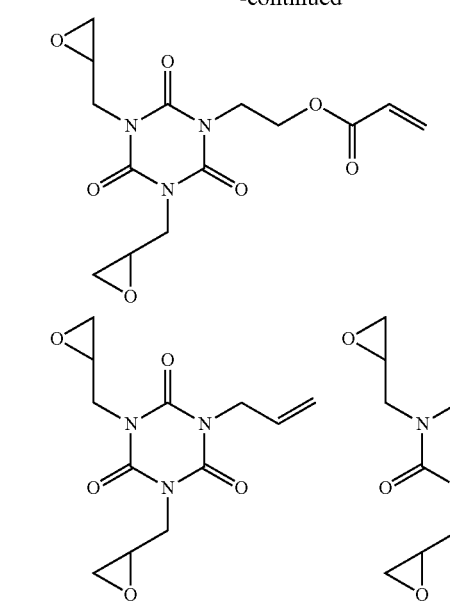
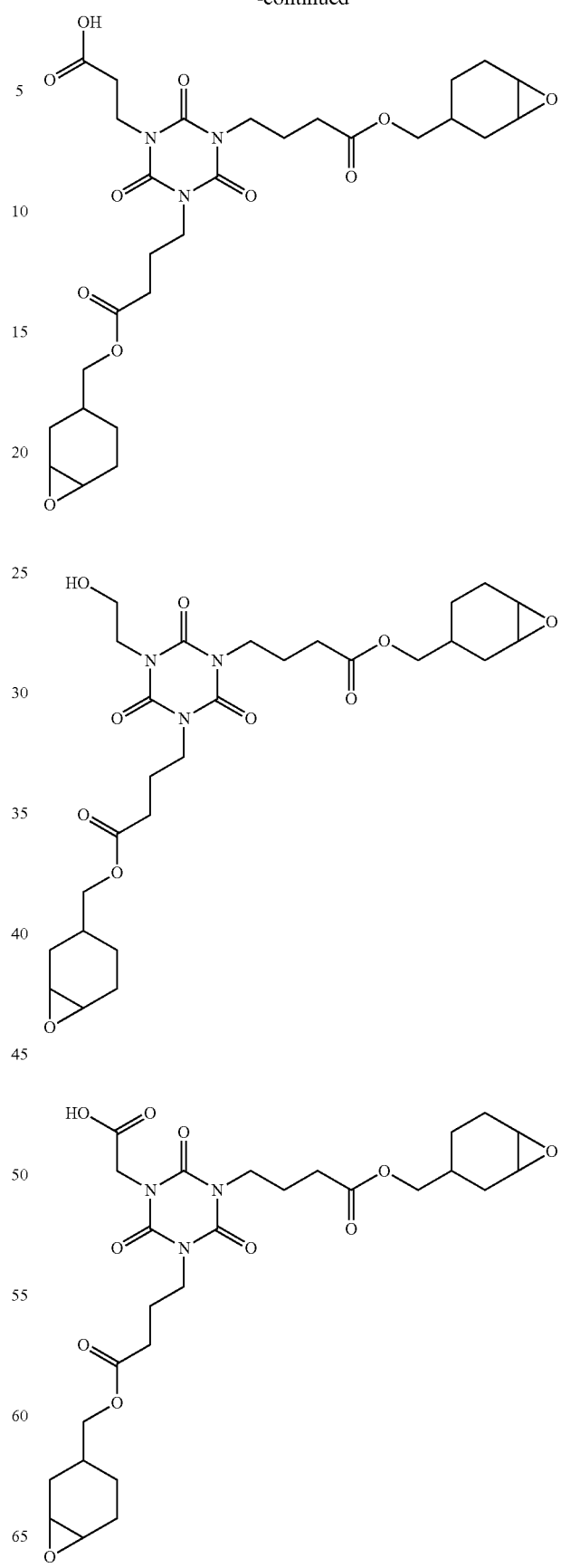

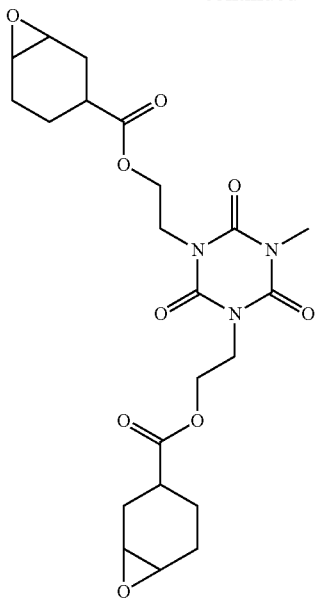

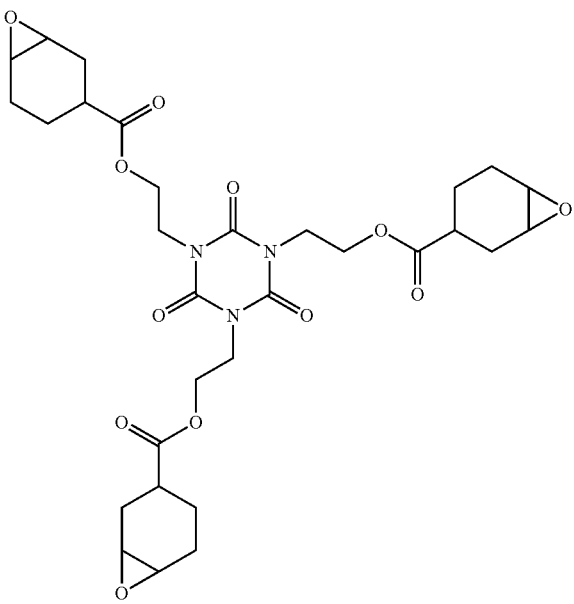 [SMILES: O=C(OCCn1c(=O)n(CCOC(=O)C2CCC3OC3C2)c(=O)n(CCOC(=O)C2CCC3OC3C2)c1=O)C1CCC2OC2C1]

Furthermore, as a compound which can preferably be used as the epoxy compound, a siloxane compound having two or more epoxy groups in a molecule (hereinafter, also simply referred to as "siloxane compound") is exemplified.

The siloxane compound is a compound having a siloxane skeleton constituted with siloxane bonds (Si—O—Si) and two or more glycidyl groups in a molecule. Examples of the siloxane skeleton in the siloxane compound can include a cyclic siloxane skeleton, a polysiloxane skeleton and a basket or ladder type polysilsesquioxane skeleton.

As the siloxane compound, a compound having a cyclic siloxane skeleton represented by the following formula (c1-7) (hereinafter, may be referred to as "cyclic siloxane") is preferred, among others.

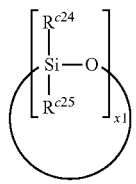

In the formula (c1-7), $R^{c24}$ and $R^{c25}$ represent a monovalent group including an epoxy group, or an alkyl group. However, at least two of the x1 number of $R^{c24}$ and the x1 number of $R^{c25}$ in the compound represented by the formula (c1-7) are a monovalent group including an epoxy group. Furthermore, x1 in the formula (c1-7) represents an integer of 3 or more. It should be noted that $R^{c24}$ and $R^{c25}$ in the compound represented by the formula (c1-7) may be the same or different. In addition, a plurality of $R^{c24}$ may be the same or different. A plurality of $R^{c25}$ may also be the same or different.

The above monovalent group including an epoxy group is preferably a glycidyl ether group represented by -D-O—$R^{c26}$ [where D represents an alkylene group, and $R^{c26}$ represents a glycidyl group.]. Examples of the above D (alkylene group) can include linear or branched alkylene groups having 1 or more and 18 or less carbon atoms such as a methylene group, a methylmethylene group, a dimethylmethylene group, a dimethylene group and a trimethylene group, and the like. In addition, an alicyclic epoxy group-containing group represented by -D-$R^{c27}$ is also preferred. $R^{c27}$ is an epoxycycloalkyl group. D is an alkylene group as described above. Preferred examples of the alkylene group as D are also as described above. The epoxycycloalkyl group as $R^{c27}$ is preferably a 2,3-epoxycyclopentyl group, a 3,4-epoxycyclohexyl group and a 2,3-epoxycyclohexyl group. The group represented by -D-$R^{c77}$ is preferably a 2-(3,4-epoxycyclohexyl)ethyl group.

Preferred examples of the alkyl group as $R^{c24}$ and $R^{c25}$ can include linear or branched alkyl groups having 1 or more and 18 or less carbon atoms (preferably 1 or more and 6 or less carbon atoms, and particularly preferably 1 or more and 3 or less carbon atoms) such as a methyl group, an ethyl group, a propyl group and an isopropyl group.

In the formula (c1-7), x1 represents an integer of 3 or more, and particularly preferably an integer of 3 or more and 6 or less from the viewpoint of good crosslinking reactivity when a cured film is formed.

The number of epoxy groups in the molecule of the siloxane compound is 2 or more, and preferably 2 or more and 6 or less, and particularly preferably 2 or more and 4 or less from the viewpoint of good crosslinking reactivity when a cured film is formed.

The liquid composition may include, in addition to the siloxane compound represented by the formula (c1-7), compounds having a siloxane skeleton such as alicyclic epoxy group-containing cyclic siloxane, an alicyclic epoxy group-containing silicone resin described in Japanese Unexamined Patent Application Publication No. 2008-248169, and an organopolysilsesquioxane resin having at least two epoxy functional groups in one molecule described in Japanese Unexamined Patent Application Publication No. 2008-19422.

More specific examples of the siloxane compound can include cyclic siloxane having two or more epoxy groups in a molecule represented by the following formulas, and the like. In addition, commercial products such as trade name "X-40-2670," "X-40-2701," "X-40-2728," "X-40-2738" and "X-40-2740" (all manufactured by Shinetsu Chemical Co., Ltd.), for example, can be used as the siloxane compound.
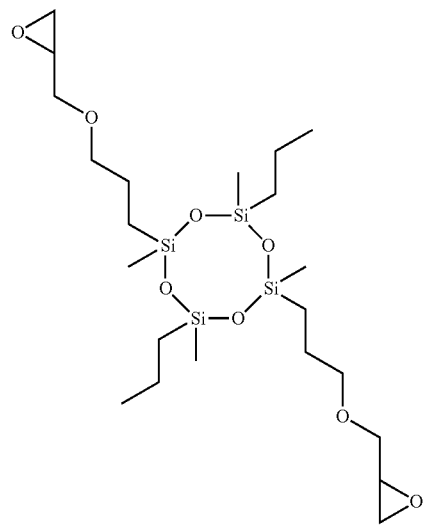
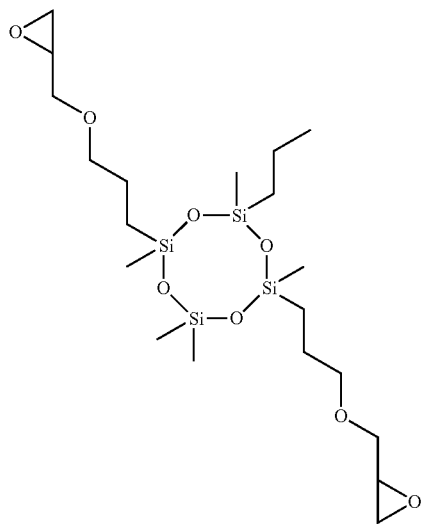
-continued
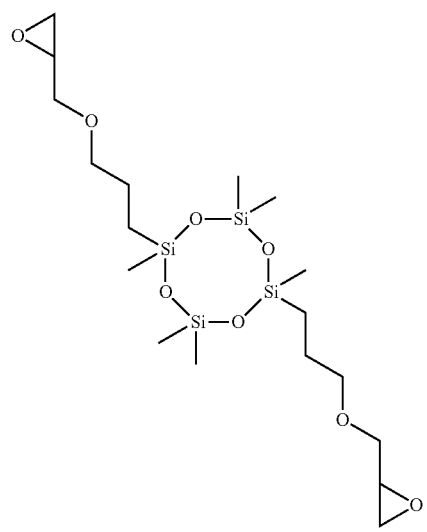
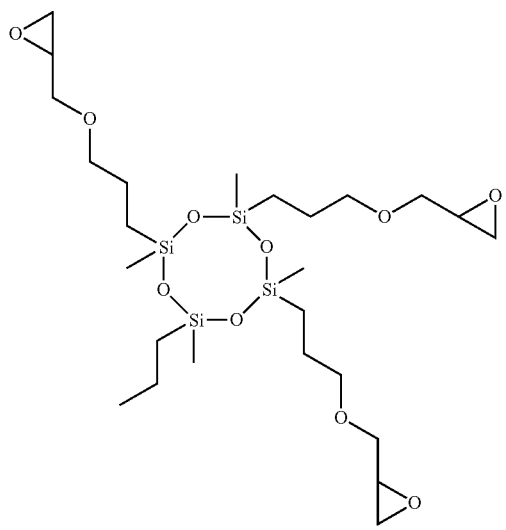
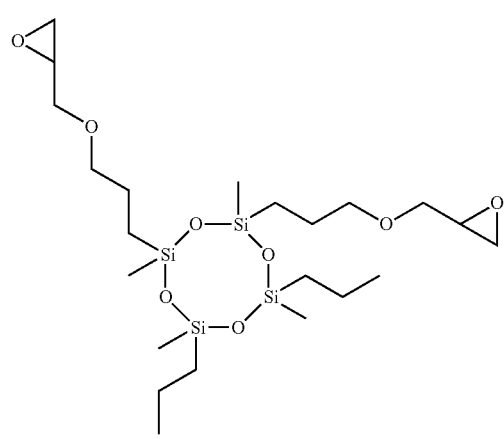
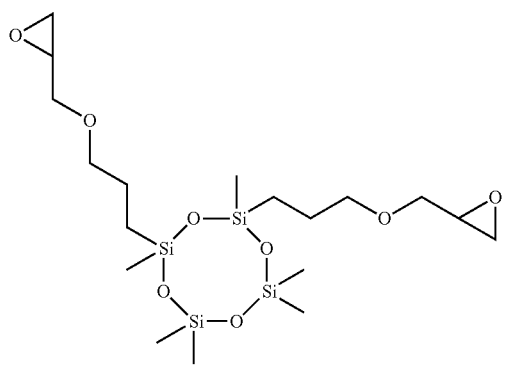

31
-continued
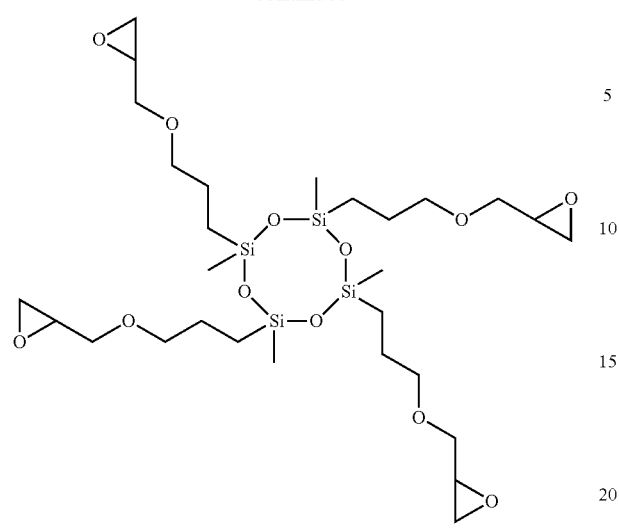
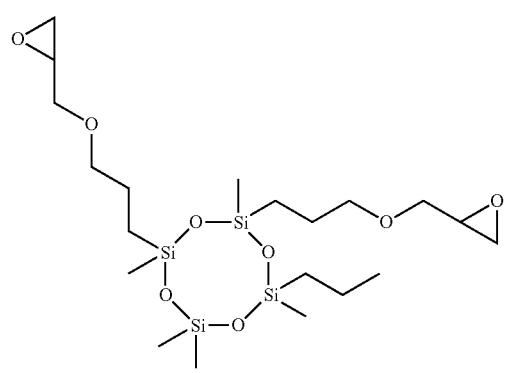
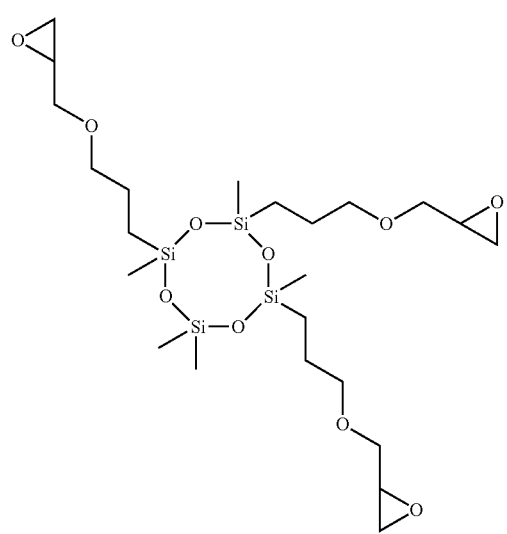
32
-continued
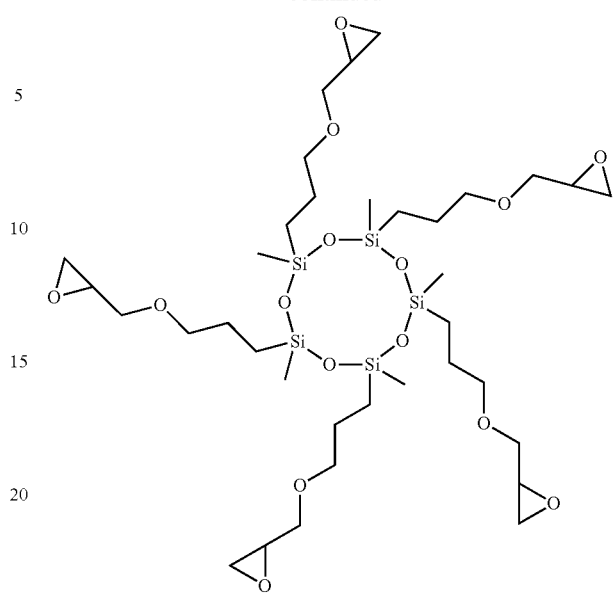
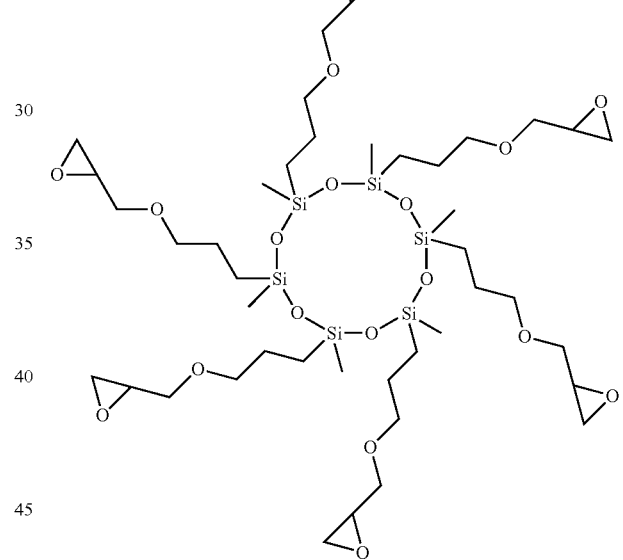
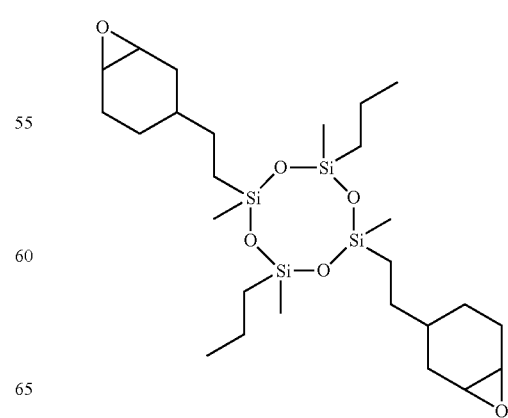

33
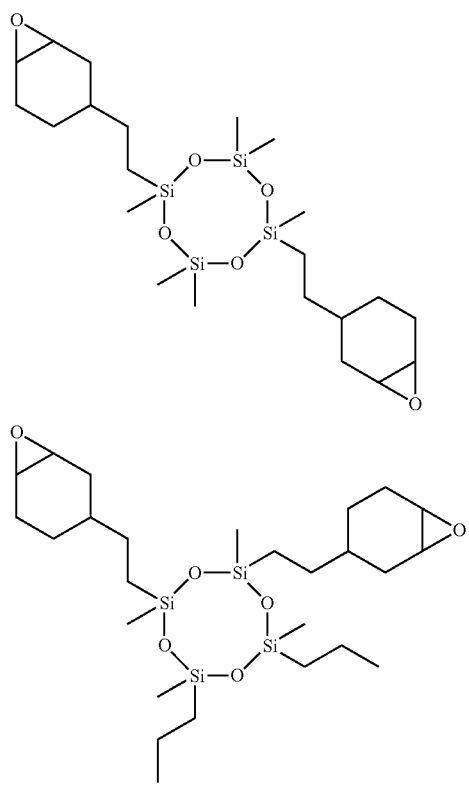
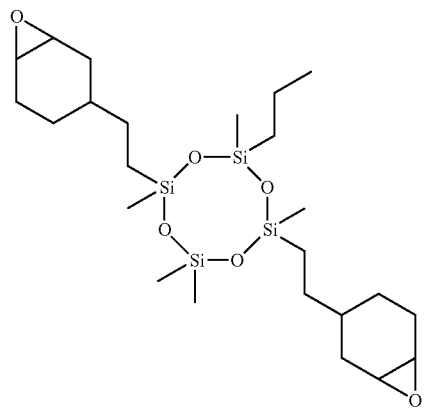
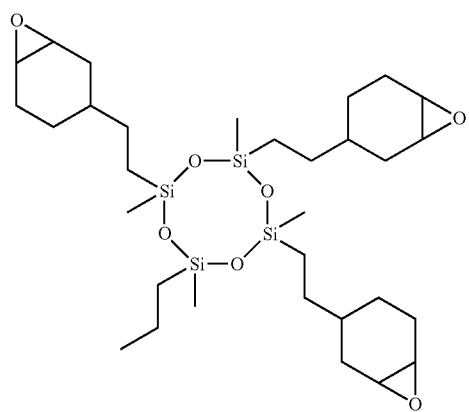
34
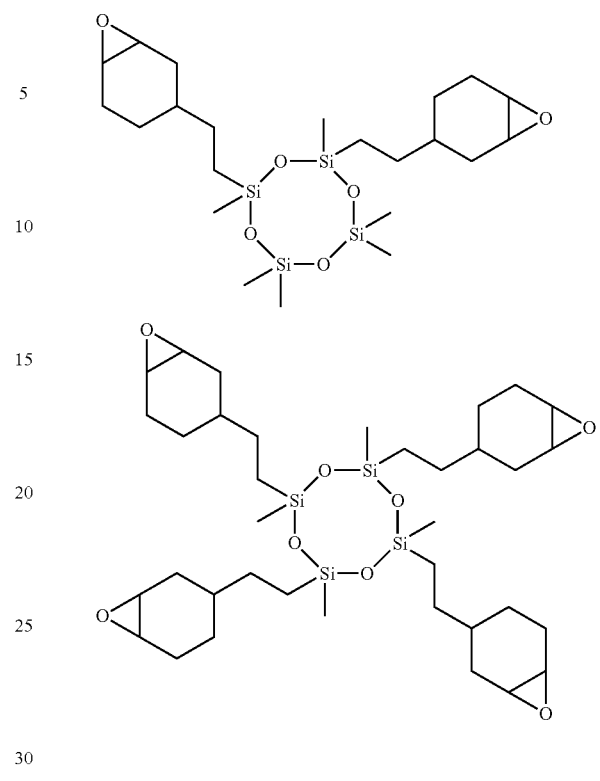
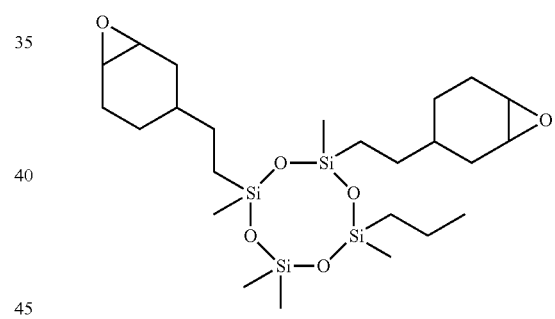
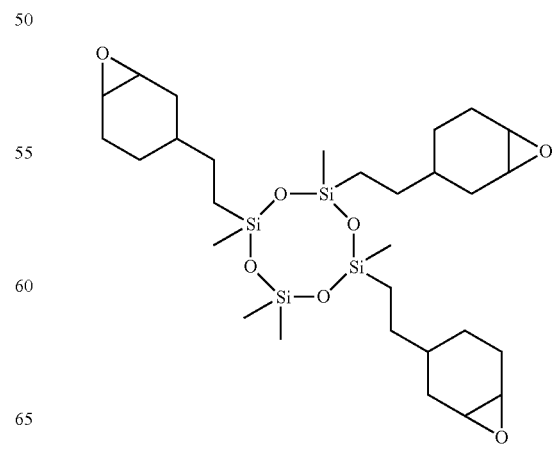

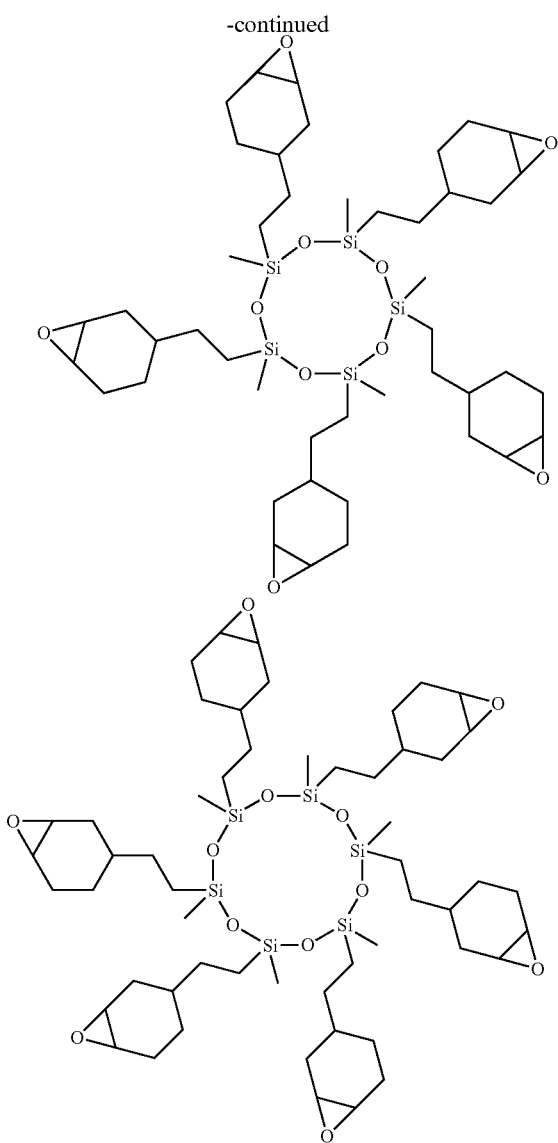

(Oxetane Compound)

Examples of a preferable oxetane compound include 3,3'-(oxybismethylene)bis(3-ethyloxetane), 4,4-bis[(3-ethyl-3-oxetanyl)methyl]biphenyl, 3,7-bis(3-oxetanyl)-5-oxanonane, 3,3'-[1,3-(2-methylenyl)propanediylbis(oxymethylene)]bis(3-ethyloxetane), 1,4-bis[(3-ethyl-3-oxetanyl)methoxymethyl]benzene, 1,2-bis[(3-ethyl-3-oxetanyl)methoxymethyl]ethane, 1,3-bis[(3-ethyl-3-oxetanyl)methoxymethyl]propane, ethylene glycol bis[(3-ethyl-3-oxetanyl)methyl] ether, dicyclopentenylbis[(3-ethyl-3-oxetanyl)methyl] ether, triethylene glycol bis[(3-ethyl-3-oxetanyl)methyl] ether, tetraethylene glycol bis[(3-ethyl-3-oxetanyl)methyl] ether, tricyclodecanediyldimethylenebis[(3-ethyl-3-oxetanyl)methyl] ether, trimethylolpropane tris[(3-ethyl-3-oxetanyl)methyl] ether, 1,4-bis[(3-ethyl-3-oxetanyl)methoxy]butane, 1,6-bis[(3-ethyl-3-oxetanyl)methoxy]hexane, pentaerythritol tris[(3-ethyl-3-oxetanyl)methyl] ether, pentaerythritol tetrakis[(3-ethyl-3-oxetanyl)methyl] ether, polyethylene glycol bis[(3-ethyl-3-oxetanyl)methyl] ether, dipentaerythritol hexakis[(3-ethyl-3-oxetanyl)methyl] ether, dipentaerythritol pentakis[(3-ethyl-3-oxetanyl)methyl] ether, and dipentaerythritol tetrakis[(3-ethyl-3-oxetanyl)methyl] ether.

The oxetane compound may also be, for example, a reaction product of dipentaerythritolhexakis[(3-ethyl-3-oxetanyl)methyl] ether and caprolactone, a reaction product of dipentaerythritolpentakis[(3-ethyl-3-oxetanyl)methyl] ether and caprolactone, a reaction product of ditrimethylolpropanetetrakis[(3-ethyl-3-oxetanyl)methyl] ether, bisphenol A bis[(3-ethyl-3-oxetanyl)methyl] ether, and ethylene oxide, a reaction product of bisphenol A bis[(3-ethyl-3-oxetanyl)methyl] ether and propylene oxide, a reaction product of hydrogenated bisphenol A bis[(3-ethyl-3-oxetanyl)methyl] ether and ethylene oxide, a reaction product of hydrogenated bisphenol A bis[(3-ethyl-3-oxetanyl)methyl] ether and propylene oxide, or a reaction product of bisphenol F bis[(3-ethyl-3-oxetanyl)methyl] ether and ethylene oxide.

[Thermosetting Polymer Compound]

Examples of the thermosetting polymer compound that may be used as the base component (C) include a resin that causes an intramolecular aromatic ring formation reaction and/or an intermolecular crosslinking reaction in response to heat, and a resin for formation of a cured film by baking. In the case in which the liquid composition includes a resin that causes an intramolecular aromatic ring formation reaction and/or an intermolecular crosslinking reaction in response to heat, it is preferable that the liquid composition includes a heat-responsive imidazole generator described in Japanese Unexamined Patent Application, Publication No. 2016-145308, and/or an imidazole compound described in Japanese Unexamined Patent Application, Publication No. 2017-025226 from the viewpoint of acceleration of the intramolecular aromatic ring formation reaction and/or the intermolecular crosslinking reaction in response to heat. The heat-responsive imidazole generator described in Japanese Unexamined Patent Application, Publication No. 2016-145308 will be described later as a curing agent for a silicon-containing resin (D4). A curing agent which may be included by the liquid composition in the case in which the liquid composition includes a resin for formation of a cured film by baking will be described in detail later.

In the case in which an intramolecular aromatic ring formation reaction occurs, the structure of a molecular chain constituting the resin becomes rigid and therefore the resulting composition tends to give a cured film excellent in heat resistance and mechanical properties. Examples of a preferable reaction as the intramolecular aromatic ring formation reaction include reactions shown by the following formulas (I) to (VI). The reactions in the following formulas are mere examples of the aromatic ring formation reaction. The structure of the resin used as the base component (C) that causes an intramolecular aromatic ring formation reaction in response to heat is not limited to the structures of the precursor polymers shown in the following formulas.

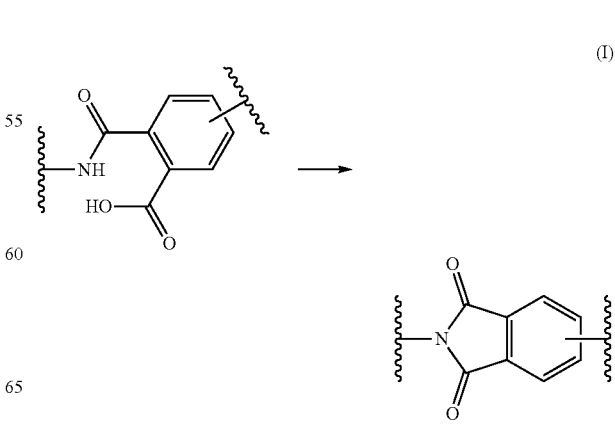

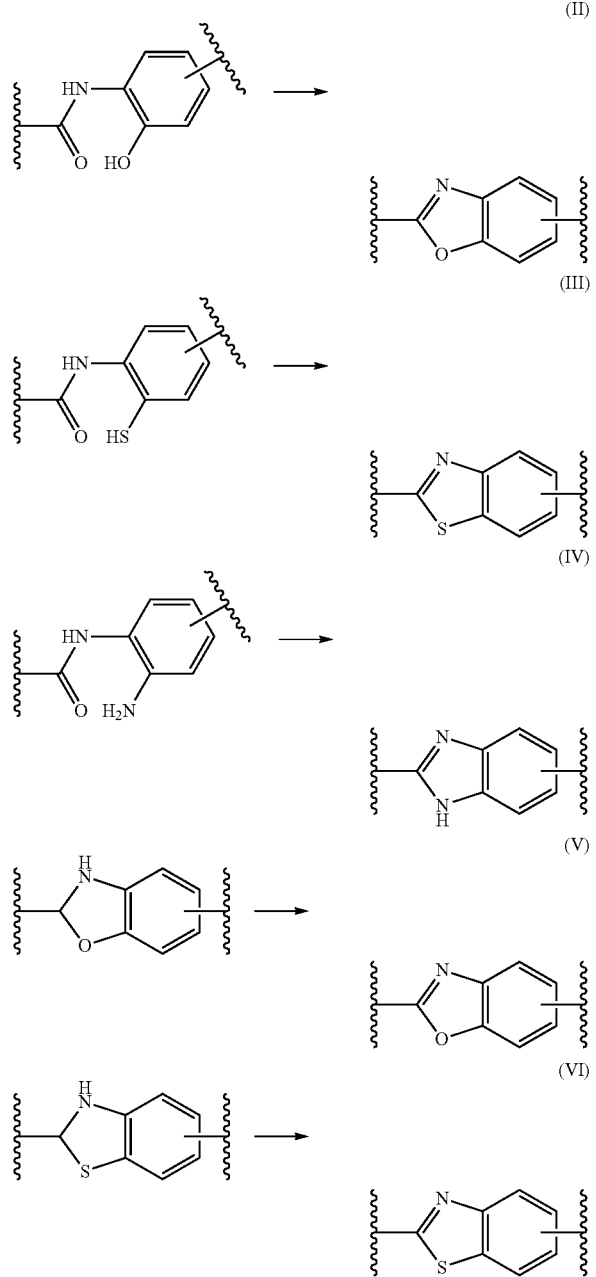

In the case in which an intermolecular crosslinking reaction occurs, molecular chains constituting the resin crosslink to each other and thereby a three-dimensional crosslinked structure is formed. Therefore, by using the composition including a resin that causes a crosslinking reaction in response to heat as the base component (C), a cured film excellent in heat resistance and mechanical properties tends to be obtained.

As the resin that causes an intermolecular crosslinking reaction in response to heat, a resin containing a group selected from a hydroxy group, a carboxylic anhydride group, a carboxy group, and an epoxy group in the molecule is preferable. In the case in which such a resin is used, crosslinking as described below takes place by the action of, for example, the aforementioned heat-responsive imidazole generator and/or the imidazole compound. In the case in which a resin containing a hydroxy group is used, crosslinking via dehydration condensation between hydroxy groups takes place between molecules in the resin. In the case in which a resin containing a carboxylic anhydride group is used, carboxy groups formed by hydrolysis of acid anhydride groups undergo dehydration condensation and thereby form crosslinks. In the case in which a resin containing a carboxy group is used, crosslinking via dehydration condensation between carboxy groups takes place between molecules in the resin. In the case in which a resin containing an epoxy group is used, crosslinking via polyaddition reaction between epoxy groups takes place between molecules in the resin.

Among these compounds that cause an intramolecular aromatic ring formation reaction or an intermolecular crosslinking reaction in response to heat, polyamic acid, a polybenzoxazole precursor, a polybenzothiazole precursor, a polybenzimidazole precursor, a styrene-(maleic acid) copolymer, and an epoxy-group-containing resin are preferable because a shaped body excellent in heat resistance tends to be formed. Next, specific examples of a suitable thermosetting polymer compound are described.

(Hydroxy-Group-Containing Resin)

Examples of a resin containing a hydroxy group in the molecule include a novolac resin. The novolac resin is not particularly limited but it is preferable that the novolac resin be obtained by condensation reaction of 1 mole of phenol with 0.5 moles or more and 1.0 mole or less of a condensation agent such as formaldehyde or paraformaldehyde in the presence of an acidic catalyst.

Examples of the phenol include phenol, cresols such as o-cresol, m-cresol, and p-cresol; xylenols such as 2,3-xylenol, 2,4-xylenol, 2,5-xylenol, 2,6-xylenol, 3,4-xylenol, and 3,5-xylenol; ethylphenols such as o-ethylphenol, m-ethylphenol, and p-ethylphenol, alkylphenols such as 2-isopropylphenol, 3-isopropylphenol, 4-isopropylphenol, o-butylphenol, m-butylphenol, p-butylphenol, and p-tert-butylphenol; trialkylphenols such as 2,3,5-trimethylphenol and 3,4,5-trimethylphenol; polyphenols such as resorcinol, catechol, hydroquinone, hydroquinone monomethyl ether, pyrogallol, and fluoroglycinol; and alkyl polyphenols such as alkylresorcins, alkylcatechols, and alkylhydroquinones (respective alkyl groups have 1 or more and 4 or less carbon atoms), α-naphthol, β-naphthol, hydroxydiphenyl, and bisphenol A. The phenol may be used either individually or in combination of two or more.

Among these phenols, m-cresol and p-cresol are preferable and a combination of m-cresol and p-cresol is more preferable. By adjusting the blending ratio between m-cresol and p-cresol, various properties such as photoresist sensitivity and heat resistance may be adjusted. The blending ratio of m-cresol to p-cresol is not particularly limited but m-cresol/p-cresol=3/7 to 8/2 (mass ratio) is preferable. In the case in which the ratio of m-cresol is lower than the lower limit described above, sensitivity may decrease. In the case in which the ratio of m-cresol is higher than the upper limit described above, heat resistance may decrease.

Examples of the acidic catalyst used for production of the novolac resin include inorganic acids such as hydrochloric acid, sulfuric acid, nitric acid, phosphoric acid, and phosphorous acid, organic acids such as formic acid, oxalic acid, acetic acid, diethyl sulfate, and p-toluenesulfonic acid, and metal salts such as zinc acetate. The acidic catalyst may be used either individually or in combination of two or more.

The mass average molecular weight of the novolac resin in terms of polystyrene measured by gel permeation chromatography (GPC) is preferably 1,000 or more and 50,000 or less.

(Carboxylic-Anhydride-Group-Containing Resin)

As a resin containing a carboxylic anhydride group in the molecule, a copolymer obtained by polymerizing a mixture of unsaturated-double-bond-containing monomers is preferable. The mixture contains one or more monomers selected from maleic anhydride, citraconic anhydride, and itaconic anhydride. The polymer is preferably a styrene-(maleic acid) copolymer.

As a resin containing a carboxy group in the molecule, a resin obtained by hydrolyzing an acid anhydride group in the resin containing a carboxylic anhydride group in the molecule described above and a copolymer obtained by polymerizing a mixture of unsaturated-double-bond-containing monomers are preferable. The mixture contains one or more monomers selected from (meth)acrylic acid, crotonic acid, maleic acid, fumaric acid, citraconic acid, mesaconic acid, and itaconic acid.

(Polyamic Acid)

The polyamic acid is a base component that serves as a precursor of a polyimide resin. In the case in which a coating film formed from the liquid composition including the polyamic acid is heated to an appropriate temperature, a ring closure reaction occurs in which a polyimide resin is produced from polyamic acid and, thereby, a cured film containing a polyimide resin excellent in heat resistance as a matrix is formed.

Molecular weight (mass average molecular weight) of the polyamic acid is preferably 5,000 or more and 30,000 or less, and more preferably 10,000 or more and 20,000 or less. In the case in which a polyamic acid having a mass average molecular weight within this range is used, a shaped body excellent in heat resistance tends to be formed.

As a preferred polyamic acid, polyamic acid consisting of a constituent unit represented by the following formula (c-I) can be exemplified.

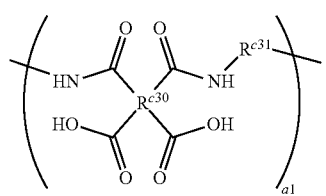

(c-I)

In the formula (c-I), $R^{c30}$ is a tetravalent organic group; $R^{c31}$ is a divalent organic group; and a1 is the number of repetitions of the constituent unit represented by the formula (c-I).

In the formula (c-I), the number of carbon atoms of each of $R^{c30}$ and $R^3$ is preferably 2 or more and 50 or less, and more preferably 2 or more and 30 or less. Each of $R^{c30}$ and $R^{c31}$ may be either an aliphatic group, an aromatic group, or a group with a combination of these structures. $R^{c30}$ and $R^{c31}$ may include, in addition to a carbon atom and a hydrogen atom, a halogen atom, an oxygen atom, and a sulfur atom. In the case in which $R^{c20}$ and $R^{c31}$ include an oxygen atom, a nitrogen atom or a sulfur atom, the oxygen atom, the nitrogen atom or the sulfur atom may be included in $R^{c30}$ and $R^{c31}$ as a group selected from: a nitrogen-containing heterocyclic group; —CONH—; —NH—; —N=N—; —CH=N—; —COO—; —O—; —CO—; —SO—; —SO$_2$—; —S—; and —S—S—, and more preferably included in $R^{c30}$ and $R^{c31}$ as a group selected from: —O—; —CO—; —SO—; —SO$_2$—; —S—; and —S—S—.

Polyamic acid is generally prepared by reacting a tetracarboxylic dianhydride component with a diamine component. Hereinafter, the tetracarboxylic dianhydride component and the diamine component used for preparation of the polyamic acid, and a manufacturing method of the polyamic acid are described.

Tetracarboxylic Dianhydride Component

The tetracarboxylic dianhydride component, which is a synthesis material for the polyamic acid, is not particularly limited as long as it can generate the polyamic acid by reacting with the diamine component. The tetracarboxylic dianhydride component can be appropriately selected from tetracarboxylic dianhydrides which are conventionally used as a synthesis material for the polyamic acid. The tetracarboxylic dianhydride component may be either an aromatic tetracarboxylic dianhydride or an aliphatic tetracarboxylic dianhydride; however, an aromatic tetracarboxylic dianhydride is preferable. The tetracarboxylic dianhydride component may be used in combination of two or more.

Specific examples of preferred aromatic tetracarboxylic dianhydride include: pyromellitic dianhydride; 3,3',4,4'-biphenyltetracarboxylic dianhydride; 2,3,3',4'-biphenyltetracarboxylic dianhydride; 3,3',4,4'-benzophenonetetracarboxylic dianhydride; 4,4'-oxydiphthalic anhydride; 3,3',4,4'-diphenylsulfonetetracarboxylic dianhydride; and the like. Among these, 3,3',4,4'-biphenyltetracarboxylic dianhydride and pyromellitic dianhydride are preferable from the viewpoint of price, availability, and the like.

Diamine Component

The diamine component, which is a synthesis material for the polyamic acid, is not particularly limited as long as it can generate the polyamic acid by reacting with the tetracarboxylic dianhydride component. The diamine component can be appropriately selected from diamines which are conventionally used as a synthesis material for the polyamic acid. The diamine component may be either an aromatic diamine or an aliphatic diamine; however, an aromatic diamine is preferable. The diamine component may be used in combination of two or more.

Specific examples of preferred aromatic diamine include: p-phenylenediamine; m-phenylenediamine; 2,4-diaminotoluene; 4,4'-diaminobiphenyl; 4,4'-diamino-2,2'-bis(trifluoromethyl)biphenyl; 3,3'-diaminodiphenyl sulfone; 4,4'-diaminodiphenyl sulfone; 4,4'-diaminodiphenyl sulfide; 4,4'-diaminodiphenylmethane; 4,4'-diaminodiphenyl ether; 3,4'-diaminodiphenyl ether; 3,3'-diaminodiphenyl ether; 1,4-bis(4-aminophenoxy)benzene; 1,3-bis(4-aminophenoxy)benzene; 1,3-bis(3-aminophenoxy)benzene; 4,4'-bis(4-aminophenoxy)biphenyl; bis[4-(4-aminophenoxy)phenyl] sulfone; bis[4-(3-aminophenoxy)phenyl] sulfone; 2,2-bis[4-(4-aminophenoxy)phenyl]propane; 2,2-bis[4-(4-aminophenoxy)phenyl]hexafluoropropane; 9,9-bis(4-aminophenyl)-9H-fluorene; 9,9-bis(4-amino-3-methylphenyl)-9H-fluorene; 4,4'-[1,4-phenylenebis(1-methylethane-1,1-diyl)]dianiline; and the like. Among these, p-phenylenediamine, m-phenylenediamine, 2,4-diaminotoluene, and 4,4'-diaminodiphenyl ether are preferable from the viewpoint of price, availability, and the like.

Manufacturing Method of Polyamic Acid

The polyamic acid can be obtained by reacting the above described tetracarboxylic dianhydride component with the diamine component in solvent in which both of the components are soluble. Amounts of the tetracarboxylic dianhydride component and the diamine component to be used upon synthesis of the polyamic acid are not particularly limited. However, it is preferable to use 0.50 moles or more and 1.50 moles or less, and more preferable to use 0.60 moles or more and 1.30 moles or less, and particularly preferable to use 0.70 moles or more and 1.20 moles or less of the diamine component relative to 1 mole of the tetracarboxylic dianhydride component.

Solvents which can be used for synthesis of the polyamic acid include, for example: aprotic polar organic solvents such as N,N,N',N'-tetramethylurea, N-methyl-2-pyrrolidone, N,N-dimethylformamide, N,N-dimethylacetamide, hexamethylphosphoramide, 1,3-dimethyl-2-imidazolidinone and the γ-butyrolactone; and glycol ethers such as diethylene glycol dialkyl ether, ethylene glycol monoalkyl ether acetate, diethylene glycol monoalkyl ether acetate, propylene glycol monoalkyl ether acetate and propylene glycol monoalkyl ether propionate. These solvents can be used in combination of two or more. Among these, it is preferable to use N,N,N',N'-tetramethylurea.

An amount of the solvent to be used upon synthesis of the polyamic acid is not particularly limited as long as the polyamic acid of a desired molecular weight can be synthesized. Typically, the amount of the solvent to be used is preferably 100 parts by mass or more and 4,000 parts by mass or less and more preferably 150 parts by mass or more and 2,000 parts by mass or less relative to 100 parts by mass of a combination of the tetracarboxylic dianhydride component and the diamine component.

The temperature at which the reaction between the tetracarboxylic dianhydride component and the diamine component is carried out is not particularly limited as long as the reaction proceeds preferably. Typically, the temperature at which the reaction between the tetracarboxylic dianhydride component and the diamine component is carried out is preferably −5° C. or higher and 150° C. or lower, more preferably 0° C. or higher and 120° C. or lower, and particularly preferably 0° C. or higher and 70° C. or lower. The duration of the reaction between the tetracarboxylic dianhydride component and the diamine component depends on the reaction temperature; however, the duration is preferably 1 hour or longer and 50 hours or shorter, more preferably 2 hours or longer and 40 hours or shorter, and particularly preferably 5 hours or longer and 30 hours or shorter.

By the above method, a solution or a paste of polyamic acid is obtained. The resulting solution or paste may be used as it is for preparation of the composition. Alternatively, the resulting solution or paste of polyamic acid may be subjected to solvent removal and then the resulting solid polyamic acid may be used for preparation of the liquid composition.

(Polybenzoxazole Precursor)

The polybenzoxazole precursor is typically produced by reaction of an aromatic diamine diol with a dicarbonyl compound having a specific structure. Next, the aromatic diamine diol, the dicarbonyl compound, a solvent used for synthesis of the polybenzoxazole precursor, and the method for producing the polybenzoxazole precursor are described.

Aromatic Diamine Diol

The aromatic diamine diol may be any aromatic diamine diol that is conventionally used in polybenzoxazole synthesis. A preferable aromatic diamine diol is a compound represented by the following formula (c-II). The aromatic diamine diol may be used either individually or in combination of two or more.

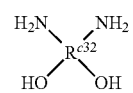

(c-II)

In the formula (c-II), $R^{c32}$ is a tetravalent organic group including one or more aromatic rings; and in either of the two pairs of an amino group and a hydroxy group in the aromatic diamine diol represented by the formula (c-II), the amino group and the hydroxy group are bonded to two carbon atoms that are adjacent to each other on an aromatic ring in $R^{c32}$.

In the formula (c-II), $R^{c32}$ is a tetravalent organic group including one or more aromatic rings and the number of carbon atoms of the tetravalent organic group is preferably 6 or more and 50 or less, more preferably 6 or more and 30 or less. $R^{c32}$ may be an aromatic group or may be a group having two or more aromatic groups bonded to each other via an aliphatic hydrocarbon group and a halogenated aliphatic hydrocarbon group, or a bond including a heteroatom such as an oxygen atom, a sulfur atom, or a nitrogen atom. Examples of the bond including a heteroatom such as an oxygen atom, a sulfur atom, or a nitrogen atom in $R^{c32}$ include —CONH—, —NH—, —N=N—, —CH=N—, —COO—, —O—, —CO—, —SO—, —SO$_2$—, —S—, and —S—S—, and —O—, —CO—, —SO—, —SO$_2$—, —S—, and —S—S— are preferable.

The aromatic ring in $R^{c32}$ may be an aromatic heterocycle. The aromatic ring that is bonded to an amino group and a hydroxy group in $R^{c32}$ is preferably a benzene ring. In the case in which a ring that is bonded to an amino group and a hydroxy group in $R^{c32}$ is a condensed ring including two or more rings, the ring that is bonded to an amino group and a hydroxy group in the condensed ring is preferably a benzene ring.

Suitable examples of $R^{c32}$ include groups represented by the following formulas (c-II-1) to (c-II-9).

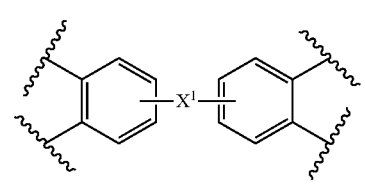

(c-II-1)

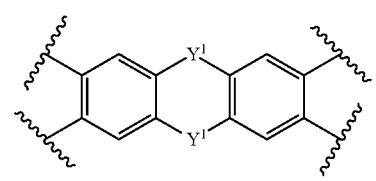

(c-II-2)

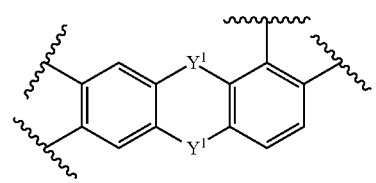

(c-II-3)

(c-II-4)

(c-II-5)

(c-II-6)

(c-II-7)

(c-II-8)

(c-II-9)

In the formula (c-II-1), $X^1$ is one selected from the group consisting of an alkylene group having 1 or more and 10 or less carbon atoms, a fluorinated alkylene group having 1 or more and 10 or less carbon atoms, —O—, —S—, —SO—, —SO$_2$—, —CO—, —COO—, —CONH—, and a single bond. In the formulas (c-II-2) to (c-II-5), each $Y^1$ may be the same as or different from each other, and examples thereof include one selected from the group consisting of —CH$_2$—, —O—, —S—, —SO—, —SO$_2$—, —CO—, and a single bond.

Each of the groups represented by the formulas (c-II-1) to (c-II-9) may have one or a plurality of substituents on the aromatic ring. As a suitable substituent, a fluorine atom, an alkyl group having 1 or more and 6 or less carbon atoms, an alkoxy group having 1 or more and 6 or less carbon atoms, a fluorinated alkyl group having 1 or more and 6 or less carbon atoms, or a fluorinated alkoxy group having 1 or more and 6 or less carbon atoms is preferable. In the case in which the substituent is a fluorinated alkyl group or a fluorinated alkoxy group, the substituent is preferably a perfluoroalkyl group or a perfluoroalkoxy group.

Specific examples of the compound represented by the formula (c-II) include 2,4-diamino-1,5-benzenediol, 2,5-diamino-1,4-benzenediol, 2,5-diamino-3-fluoro-1,4-benzenediol, 2,5-diamino-3,6-difluoro-1,4-benzenediol, 2,6-diamino-1,5-dihydroxynaphthalene, 1,5-diamino-2,6-dihydroxynaphthalene, 2,6-diamino-3,7-dihydroxynaphthalene, 1,6-diamino-2,5-dihydroxynaphthalene, 4,4'-diamino-3,3'-dihydroxybiphenyl, 3,3'-diamino-4,4'-dihydroxybiphenyl, 2,3'-diamino-3,2'-dihydroxybiphenyl, 3,4'-diamino-4,3'-dihydroxybiphenyl, 4,4'-diamino-3,3'-dihydroxy-6,6'-ditrifluoromethylbiphenyl, 3,3'-diamino-4,4'-dihydroxy-6,6'-ditrifluoromethylbiphenyl, 2,3'-diamino-3,2'-dihydroxy-6,6'-ditrifluoromethylbiphenyl, 3,4'-diamino-4,3'-dihydroxy-6,6'-ditrifluoromethylbiphenyl, 4,4'-diamino-3,3'-dihydroxy-5,5'-ditrifluoromethylbiphenyl, 3,3'-diamino-4,4'-dihydroxy-5,5'-ditrifluoromethylbiphenyl, 2,3'-diamino-3,2'-dihydroxy-5,5'-ditrifluoromethylbiphenyl, 3,4'-diamino-4,3'-dihydroxy-5,5'-ditrifluoromethylbiphenyl, bis(4-amino-3-hydroxyphenyl)methane, bis(3-amino-4-hydroxyphenyl)methane, 3,4'-diamino-4,3'-dihydroxydiphenylmethane, bis(4-amino-3-hydroxy-6-trifluoromethyl)methane, bis(3-amino-4-hydroxy-6-trifluoromethyl)methane, 3,4'-diamino-4,3'-dihydroxy-6,6'-ditrifluoromethyldiphenylmethane, bis(4-amino-3-hydroxyphenyl)difluoromethane, bis(3-amino-4-hydroxyphenyl)difluoromethane, 3,4'-diamino-4,3'-dihydroxydiphenyldifluoromethane, bis(4-amino-3-hydroxy-6-trifluoromethylphenyl)difluoromethane, bis(3-amino-4-hydroxy-6-trifluoromethylphenyl)difluoromethane, 3,4'-diamino-4,3'-dihydroxy-6,6'-ditrifluoromethyldiphenyldifluoromethane, bis(4-amino-3-hydroxyphenyl) ether, bis(3-amino-4-hydroxyphenyl) ether, 3,4'-diamino-4,3'-dihydroxydiphenyl ether, bis(4-amino-3-hydroxy-6-trifluoromethylphenyl) ether, bis(3-amino-4-hydroxy-6-trifluoromethylphenyl) ether, 3,4'-diamino-4,3'-dihydroxy-6,6'-ditrifluoromethyldiphenyl ether, bis(4-amino-3-hydroxyphenyl) ketone, bis(3-amino-4-hydroxyphenyl) ketone, 3,4'-diamino-4,3'-dihydroxydiphenyl ketone, bis(4-amino-3-hydroxy-6-trifluoromethyl) ketone, bis(3-amino-4-hydroxy-6-trifluoromethyl) ketone, 3,4'-diamino-4,3'-dihydroxy-6,6'-ditrifluoromethyldiphenyl ketone, 2,2-bis(4-amino-3-hydroxyphenyl)propane, 2,2-bis(3-amino-4-hydroxyphenyl)propane, 2-(3-amino-4-hydroxyphenyl)-2-(4'-amino-3'-hydroxyphenyl)propane, 2,2-bis(4-amino-3-hydroxy-6-trifluoromethylphenyl)propane, 2,2-bis(3-amino-4-hydroxy-6-trifluoromethylphenyl)propane, 2-(3-amino-4-hydroxy-6-trifluoromethylphenyl)-2-(4'-amino-3'-hydroxy-6'-trifluoromethylphenyl)propane, 2,2-bis(3-amino-4-hydroxy-5-trifluoromethylphenyl)propane, 2,2-bis(4-amino-3-hydroxyphenyl)hexafluoropropane, 2,2-bis(3-amino-4-hydroxyphenyl)hexafluoropropane, 2-(3-amino-4-hydroxyphenyl)-2-(4'-amino-3'-hydroxyphenyl)hexafluoropropane, 2,2-bis(4-amino-3-hydroxy-6-trifluoromethylphenyl)hexafluoropropane, 2,2-bis(3-amino-4-hydroxy-6-trifluoromethylphenyl)hexafluoropropane, 2-(3-amino-4-hydroxy-6-trifluoromethylphenyl)-2-(4'-amino-3'-hydroxy-6'-trifluoromethylphenyl)hexafluoropropane, 2,2-bis(3-amino-4-hydroxy-5-trifluoromethylphenyl)hexafluoropropane, bis(4-amino-3-hydroxyphenyl) sulfone, bis(3-amino-4-hydroxyphenyl) sulfone, 3,4'-diamino-4,3'-dihydroxydiphenyl sulfone, bis(4-amino-3-hydroxy-6-trifluoromethyl) sulfone, bis(3-amino-4-hydroxy-6-trifluoromethyl) sulfone, 3,4'-diamino-4,3'-dihydroxy-6,6'-ditrifluoromethyldiphenyl sulfone, bis(4-amino-3-hydroxyphenyl) sulfide, bis(3-amino-4-hydroxyphenyl) sulfide, 3,4'-diamino-4,3'-dihydroxydiphenyl sulfide, bis(4-amino-3-hydroxy-6-trifluoromethyl) sulfide, bis(3-amino-4-hydroxy-6-trifluoromethyl) sulfide, 3,4'-diamino-4,3'-dihydroxy-6,6'-ditrifluoromethyldiphenyl sulfide, (4-amino-3-hydroxyphenyl) 4-amino-3-hydroxyphenylbenzoate, (3-amino-4-hydroxyphenyl) 3-amino-4-hydroxyphenylbenzoate, (3-amino-4-hydroxyphenyl) 4-amino-3-hydroxyphenylbenzoate, (4-amino-3-hydroxyphenyl) 3-amino-4-hydroxyphenylbenzoate, N-(4-amino-3-hydroxyphenyl)-4-amino-3-hydroxybenzamide, N-(3-amino-4-hydroxyphenyl)-3-amino-4-hydroxyphenylbenzamide, N-(3-amino-4-hydroxyphenyl)-4-amino-3-hydroxyphenylbenzamide, N-(4-amino-3-hydroxyphenyl)-3-amino-4-hydroxyphenylbenzamide, 2,4'-bis(4-amino-3-hydroxyphenoxy)biphenyl, 2,4'-bis(3-amino-4-hydroxyphenoxy)biphenyl, 4,4'-bis(4-amino-3-hydroxyphenoxy)biphenyl, 4,4'-bis(3-amino-4-hydroxyphenoxy)biphenyl, di[4-(4-amino-3-hydroxyphenoxy)phenyl] ether, di[4-(3-amino-4-hydroxyphenoxy)phenyl] ether, 2,4'-bis(4-amino-3-hydroxyphenoxy)benzophenone, 2,4'-bis(3-amino-4-hydroxyphenoxy)benzophenone, 4,4'-bis(4-amino-3-hydroxyphenoxy)benzophenone, 4,4'-bis(3-amino-4-hydroxyphenoxy)benzophenone, 2,4'-bis(4-amino-3-hydroxyphenoxy)octafluorobiphenyl, 2,4'-bis(3-amino-4-hydroxyphenoxy)octafluorobiphenyl, 4,4'-bis(4-amino-3-hydroxyphenoxy)octafluorobiphenyl, 4,4'-bis(3-amino-4-hydroxyphenoxy)octafluorobiphenyl, 2,4'-bis(4-amino-3-hydroxyphenoxy)octafluorobenzophenone, 2,4'-bis(3-amino-4-hydroxyphenoxy)octafluorobenzophenone, 4,4'-bis(4-amino-3-hydroxyphenoxy)octafluorobenzophenone, 4,4'-bis(3-amino-4-hydroxyphenoxy)octafluorobenzophenone, 2,2-bis[4-(4-amino-3-hydroxyphenoxy)phenyl]propane, 2,2-bis[4-(3-amino-4-hydroxyphenoxy)phenyl]propane, 2,2-bis[4-(4-amino-3-hydroxyphenoxy)phenyl]hexafluoropropane, 2,2-bis[4-(3-amino-4-hydroxyphenoxy)phenyl]hexafluoropropane, 2,8-diamino-3,7-dihydroxydibenzofuran, 2,8-diamino-3,7-dihydroxyfluorene, 2,6-diamino-3,7-dihydroxyxanthene, 9,9-bis-(4-amino-3-hydroxyphenyl)fluorene, and 9,9-bis-(3-amino-4-hydroxyphenyl)fluorene.

Among these, 4,4'-diamino-3,3'-dihydroxybiphenyl and 2,2-bis(3-amino-4-hydroxyphenyl)hexafluoropropane are preferable.

Dicarbonyl Compound

As a raw material for use in synthesis of the polybenzoxazole precursor, the aromatic diamine diol described above as well as a dicarbonyl compound represented by the following formula (c-III) are used. By condensation of the aromatic diamine diol described above and a dicarbonyl compound represented by the following formula (c-III), a polybenzoxazole precursor is obtained.

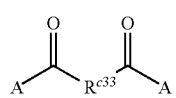
(c-III)

In the formula (c-III), $R^{c33}$ is a divalent organic group; and A represents a hydrogen atom or a halogen atom.

$R^{c33}$ in the formula (c-III) may be an aromatic group, an aliphatic group, or a group consisting of a combination of an aromatic group and an aliphatic group. From the viewpoint that the resulting polybenzoxazole resin is excellent in heat resistance, mechanical properties, chemical resistance, and the like, $R^{c33}$ is preferably a group including an aromatic group and/or an alicyclic group. The aromatic group in $R^{c33}$ may be an aromatic hydrocarbon group or an aromatic heterocyclic group.

$R^{c33}$ may contain a halogen atom, an oxygen atom, and/or a sulfur atom in addition to a carbon atom and a hydrogen atom. In the case in which $R^{c33}$ contains an oxygen atom, a nitrogen atom, or a sulfur atom, the oxygen atom, the nitrogen atom, or the sulfur atom may be contained in $R^{c33}$ in a form of a group selected from a nitrogen-containing heterocyclic group, —CONH—, —NH—, —N=N—, —CH=N—, —COO—, —O—, —CO—, —SO—, —SO$_2$—, —S—, and —S—S—, more preferably may be contained in $R^{c33}$ in a form of a group selected from —O—, —CO—, —SO—, —SO$_2$—, —S—, and —S—S—.

In the formula (c-III), one of the two A may be a hydrogen atom and the other may be a halogen atom, and it is preferable that both of the two A are hydrogen atoms or both of the two A are halogen atoms. In the case in which A is a halogen atom, A is preferably chlorine, bromine, or iodine, and more preferably chlorine.

In the case in which the dicarbonyl compound represented by the formula (c-III) is a dialdehyde compound in which both of the two A are hydrogen atoms, a polybenzoxazole precursor represented by the following formula (C-II-a) is produced.

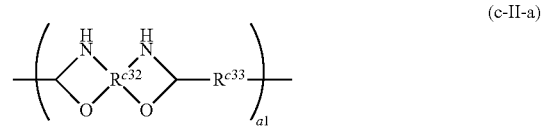
(c-II-a)

In the formula (C-II-a), each of $R^{c32}$ and $R^{c33}$ is the same as those in the formula (c-II) and the formula (c-III); and a1 is the number of repetitions of the unit represented by the formula (C-II-a).

In the case in which the dicarbonyl compound represented by the formula (c-III) is a dicarboxylic dihalide in which both of the two A are halogen atoms, a polybenzoxazole precursor represented by the following formula (C-II-b) is produced.

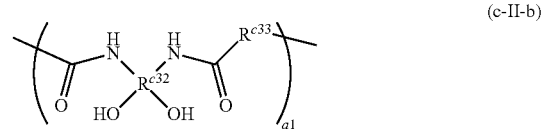
(c-II-b)

In the formula (C-II-b), each of $R^{c32}$ and $R^{c33}$ is the same as those in the formula (c-II) and the formula (c-III); and a1 is the number of repetitions of the unit represented by the formula (C-II-b).

Next, the dialdehyde compound and the dicarboxylic dihalide, which are suitable as a dicarbonyl compound, are described.

Dialdehyde Compound

The dialdehyde compound used as a raw material of the polybenzoxazole precursor is a compound represented by the following formula (c-III-1). The dialdehyde compound may be used either individually or in combination of two or more.

(c-III-1)

In the formula (c-III-1), $R^{c33}$ is the same as that in the formula (c-III).

Examples of an aromatic group or an aromatic-ring-containing group suitable as $R^{c33}$ in the formula (c-III-1) include the following groups.

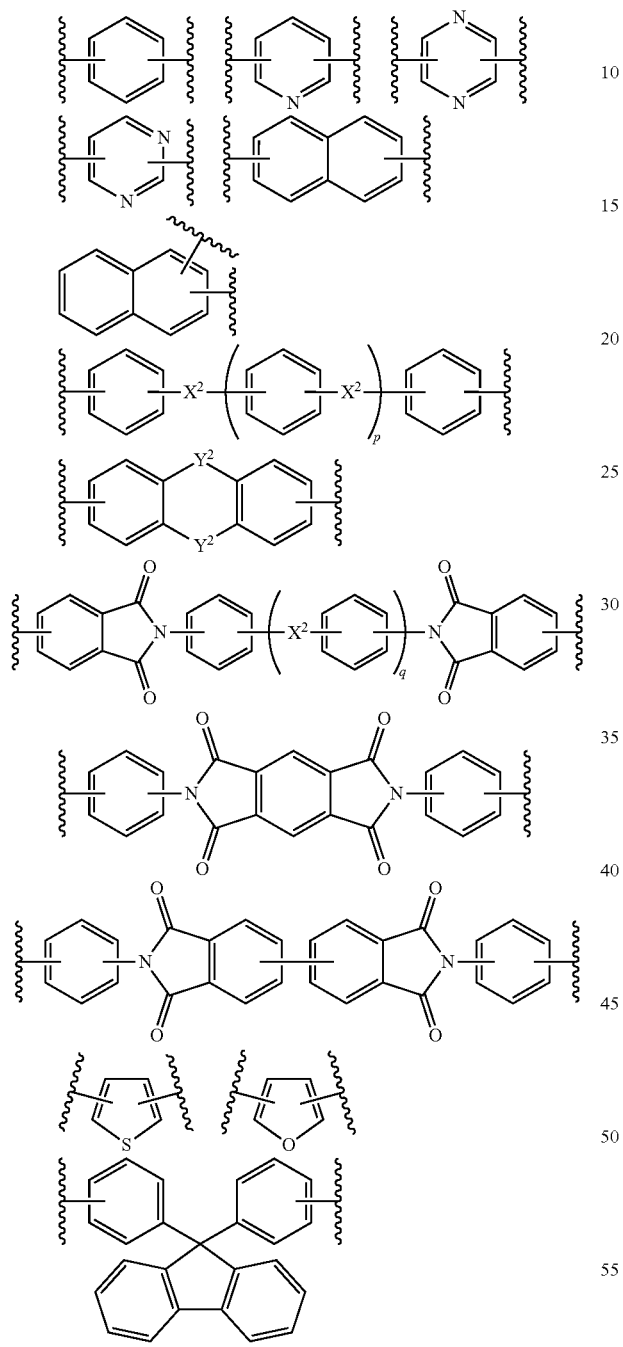

In the formulas, $X^2$ is one selected from the group consisting of an alkylene group having 1 or more and 10 or less carbon atoms, a fluorinated alkylene group having 1 or more and 10 or less carbon atoms, —O—, —S—, —SO—, —SO$_2$—, —CO—, —COO—, —CONH—, and a single bond; in the case in which a plurality of $X^2$ are contained, the plurality of $X^2$ may be the same as or different from each other; each $Y^2$ may be the same as or different from each other and is one selected from the group consisting of —CH$_2$—, —O—, —S—, —SO—, —SO$_2$—, —CO—, and a single bond; and each of p and q is an integer of 0 or more and 3 or less.

Examples of an alicyclic group or an alicyclic-ring-containing group suitable as $R^{c33}$ in the formula (c-III-1) include the following groups.

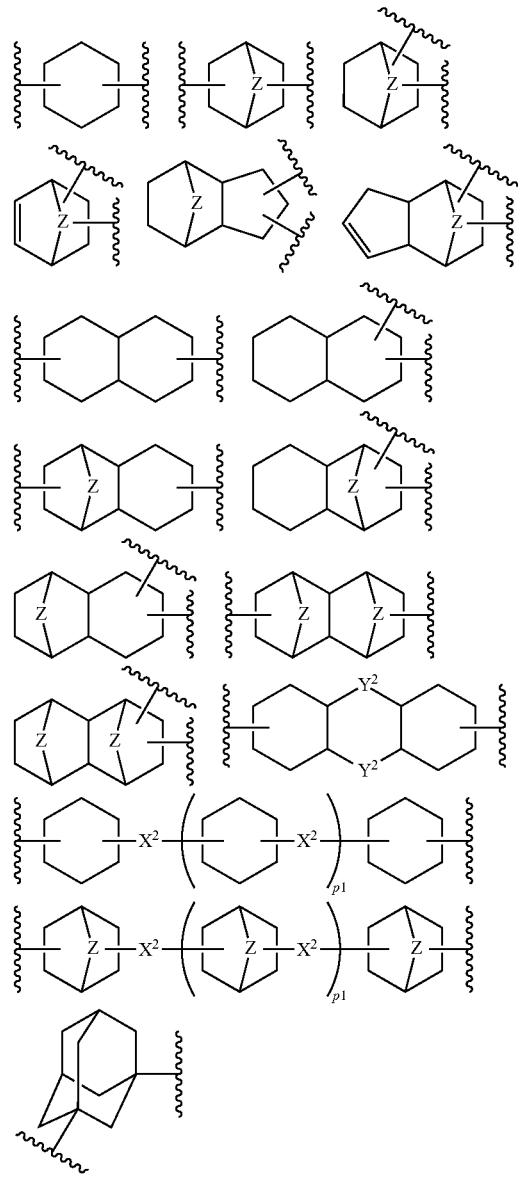

In the formulas, $X^2$ is one selected from the group consisting of an alkylene group having 1 or more and 10 or less carbon atoms, a fluorinated alkylene group having 1 or more and 10 or less carbon atoms, —O—, —S—, —SO—, —SO$_2$—, —CO—, —COO—, —CONH—, and a single bond; in the case in which a plurality of $X^2$ are contained, the plurality of $X^2$ may be the same as or different from each other; each $Y^2$ may be the same as or different from each other and is one selected from the group consisting of —CH$_2$—, —O—, —S—, —SO—, —SO$_2$—, —CO—, and a single bond; Z is one selected from the group consisting of —CH$_2$—, —CH$_2$CH$_2$—, and —CH=CH—; and each p1 is an integer of 0 or more and 3 or less.

An aromatic ring or an alicyclic ring contained in the above group suitable as $R^{c33}$ may have one or a plurality of substituents on the ring. A suitable and preferable substituent is a fluorine atom, an alkyl group having 1 or more and 6 or less carbon atoms, an alkoxy group having 1 or more and 6 or less carbon atoms, a fluorinated alkyl group having 1 or more and 6 or less carbon atoms, or a fluorinated alkoxy group having 1 or more and 6 or less carbon atoms. In the case in which the substituent is a fluorinated alkyl group or a fluorinated alkoxy group, the substituent is preferably a perfluoroalkyl group or a perfluoroalkoxy group.

In the case in which the dialdehyde compound represented by the formula (c-III-1) is an aromatic dialdehyde, suitable examples thereof include benzenedialdehydes, pyridinedialdehydes, pyrazinedialdehydes, pyrimidinedialdehydes, naphthalenedialdehydes, biphenyldialdehydes, diphenyl ether dialdehydes, diphenyl sulfone dialdehydes, diphenyl sulfide dialdehydes, bis(formylphenoxy)benzenes, [1,4-phenylenebis(1-methylethylidene)]bisbenzaldehydes, 2,2-bis[4-(formylphenoxy)phenyl]propanes, bis[4-(formylphenoxy)phenyl]sulfides, bis[4-(formylphenoxy)phenyl] sulfones, and fluorene-containing dialdehydes.

Specific examples of the benzenedialdehydes include phthalaldehyde, isophthalaldehyde, terephthalaldehyde, 3-fluorophthalaldehyde, 4-fluorophthalaldehyde, 2-fluoroisophthalaldehyde, 4-fluoroisophthalaldehyde, 5-fluoroisophthalaldehyde, 2-fluoroterephthalaldehyde, 3-trifluoromethylphthalaldehyde, 4-trifluoromethylphthalaldehyde, 2-trifluoromethylisophthalaldehyde, 4-trifluoromethylisophthalaldehyde, 5-trifluoromethylisophthalaldehyde, 2-trifluoromethylterephthalaldehyde, 3,4,5,6-tetrafluorophthalaldehyde, 2,4,5,6-tetrafluoroisophthalaldehyde, and 2,3,5,6-tetrafluoroterephthalaldehyde.

Specific examples of the pyridinedialdehydes include pyridine-2,3-dialdehyde, pyridine-3,4-dialdehyde, and pyridine-3,5-dialdehyde. Specific examples of the pyrazinedialdehydes include pyrazine-2,3-dialdehyde, pyrazine-2,5-dialdehyde, and pyrazine-2,6-dialdehyde. Specific examples of the pyrimidinedialdehydes include pyrimidine-2,4-dialdehyde, pyrimidine-4,5-dialdehyde, and pyrimidine-4,6-dialdehyde.

Specific examples of the naphthalenedialdehydes include naphthalene-1,5-dialdehyde, naphthalene-1,6-dialdehyde, naphthalene-2,6-dialdehyde, naphthalene-3,7-dialdehyde, 2,3,4,6,7,8-hexafluoronaphthalene-1,5-dialdehyde, 2,3,4,5,6,8-hexafluoronaphthalene-1,6-dialdehyde, 1,3,4,5,7,8-hexafluoronaphthalene-2,6-dialdehyde, 1-trifluoromethylnaphthalene-2,6-dialdehyde, 1,5-bis(trifluoromethyl)naphthalene-2,6-dialdehyde, 1-trifluoromethylnaphthalene-3,7-dialdehyde, 1,5-bis(trifluoromethyl)naphthalene-3,7-dialdehyde, 1-trifluoromethyl-2,4,5,6,8-pentafluoronaphthalene-3,7-dialdehyde, 1-bis(trifluoromethyl)methoxy-2,4,5,6,8-pentafluoronaphthalene-3,7-dialdehyde, 1,5-bis(trifluoromethyl)-2,4,6,8-tetrafluoronaphthalene-3,7-dialdehyde, and 1,5-bis[bis(trifluoromethyl)methoxy]-2,4,6,8-tetrafluoronaphthalene-3,7-dialdehyde.

Specific examples of the biphenyldialdehydes include biphenyl-2,2'-dialdehyde, biphenyl-2,4'-dialdehyde, biphenyl-3,3'-dialdehyde, biphenyl-4,4'-dialdehyde, 6,6'-difluorobiphenyl-3,4'-dialdehyde, 6,6'-difluorobiphenyl-2,4'-dialdehyde, 6,6'-difluorobiphenyl-3,3'-dialdehyde, 6,6'-difluorobiphenyl-3,4'-dialdehyde, 6,6'-difluorobiphenyl-4,4'-dialdehyde, 6,6'-ditrifluoromethylbiphenyl-2,2'-dialdehyde, 6,6'-ditrifluoromethylbiphenyl-2,4'-dialdehyde, 6,6'-ditrifluoromethylbiphenyl-3,3'-dialdehyde, 6,6'-ditrifluoromethylbiphenyl-3,4'-dialdehyde, and 6,6'-ditrifluoromethylbiphenyl-4,4'-dialdehyde.

Specific examples of the diphenyl ether dialdehydes include diphenyl ether-2,4'-dialdehyde, diphenyl ether-3,3'-dialdehyde, diphenyl ether-3,4'-dialdehyde, and diphenyl ether-4,4'-dialdehyde.

Specific examples of the diphenyl sulfone dialdehydes include diphenyl sulfone-3,3'-dialdehyde, diphenyl sulfone-3,4'-dialdehyde, and diphenyl sulfone-4,4'-dialdehyde.

Specific examples of the diphenyl sulfide dialdehydes include diphenyl sulfide-3,3'-dialdehyde, diphenyl sulfide-3,4'-dialdehyde, and diphenyl sulfide-4,4'-dialdehyde.

Specific examples of the diphenyl ketone dialdehydes include diphenyl ketone-3,3'-dialdehyde, diphenyl ketone-3,4'-dialdehyde, and diphenyl ketone-4,4'-dialdehyde.

Specific examples of the bis(formylphenoxy)benzenes include benzene 1,3-bis(3-formylphenoxy)benzene, 1,4-bis(3-formylphenoxy)benzene, and 1,4-bis(4-formylphenoxy)benzene.

Specific examples of the [1,4-phenylenebis(1-methylethylidene)]bisbenzaldehydes include 3,3'-[1,4-phenylenebis(1-methylethylidene)]bisbenzaldehyde, 3,4'-[1,4-phenylenebis(1-methylethylidene)]bisbenzaldehyde, and 4,4'-[1,4-phenylenebis(1-methylethylidene)]bisbenzaldehyde.

Specific examples of the 2,2-bis[4-(formylphenoxy)phenyl]propanes include 2,2-bis[4-(2-formylphenoxy)phenyl]propane, 2,2-bis[4-(3-formylphenoxy)phenyl]propane, 2,2-bis[4-(4-formylphenoxy)phenyl]propane, 2,2-bis[4-(3-formylphenoxy)phenyl]hexafluoropropane, and 2,2-bis[4-(4-formylphenoxy)phenyl]hexafluoropropane.

Specific examples of the bis[4-(formylphenoxy)phenyl] sulfides include bis[4-(3-formylphenoxy)phenyl] sulfide and bis[4-(4-formylphenoxy)phenyl] sulfide.

Specific examples of the bis[4-(formylphenoxy)phenyl] sulfones include bis[4-(3-formylphenoxy)phenyl] sulfone and bis[4-(4-formylphenoxy)phenyl] sulfone.

Specific examples of the fluorene-containing dialdehydes include fluorene-2,6-dialdehyde, fluorene-2,7-dialdehyde, dibenzofuran-3,7-dialdehyde, 9,9-bis(4-formylphenyl)fluorene, 9,9-bis(3-formylphenyl)fluorene, and 9-(3-formylphenyl)-9-(4'-formylphenyl)fluorene.

A diphenylalkanedialdehyde or a diphenylfluoroalkanedialdehyde represented by the following formulas may also be suitable for use as the aromatic dialdehyde compound.

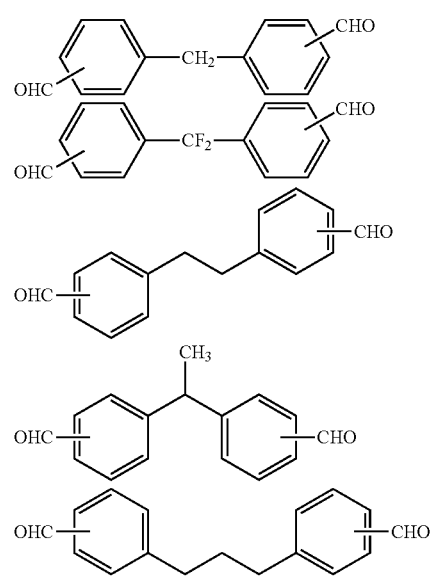

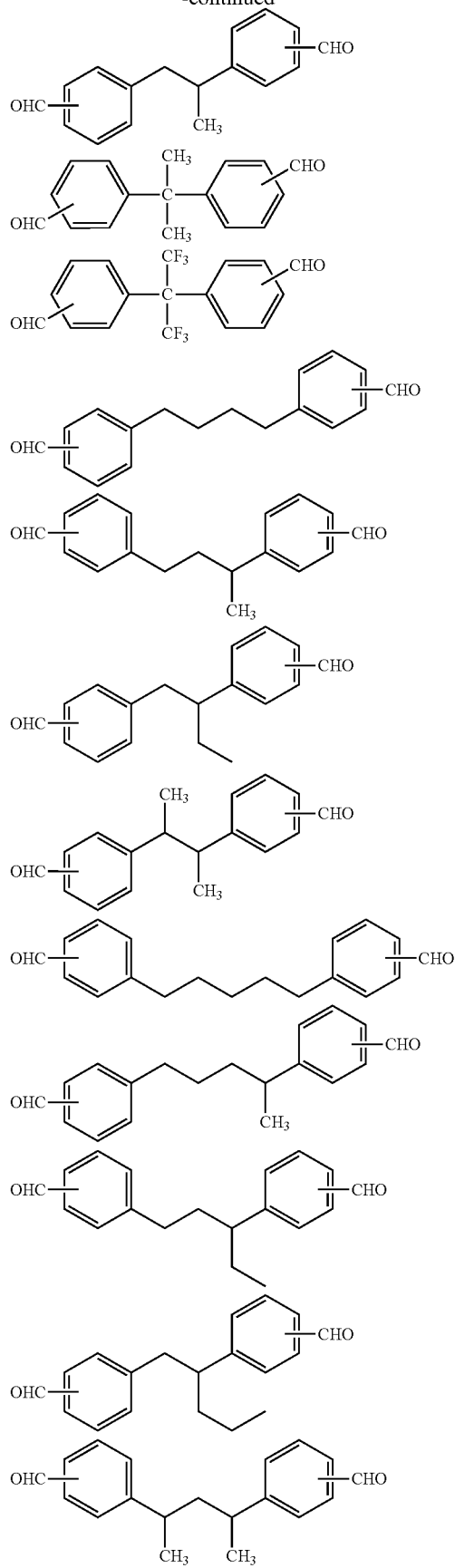
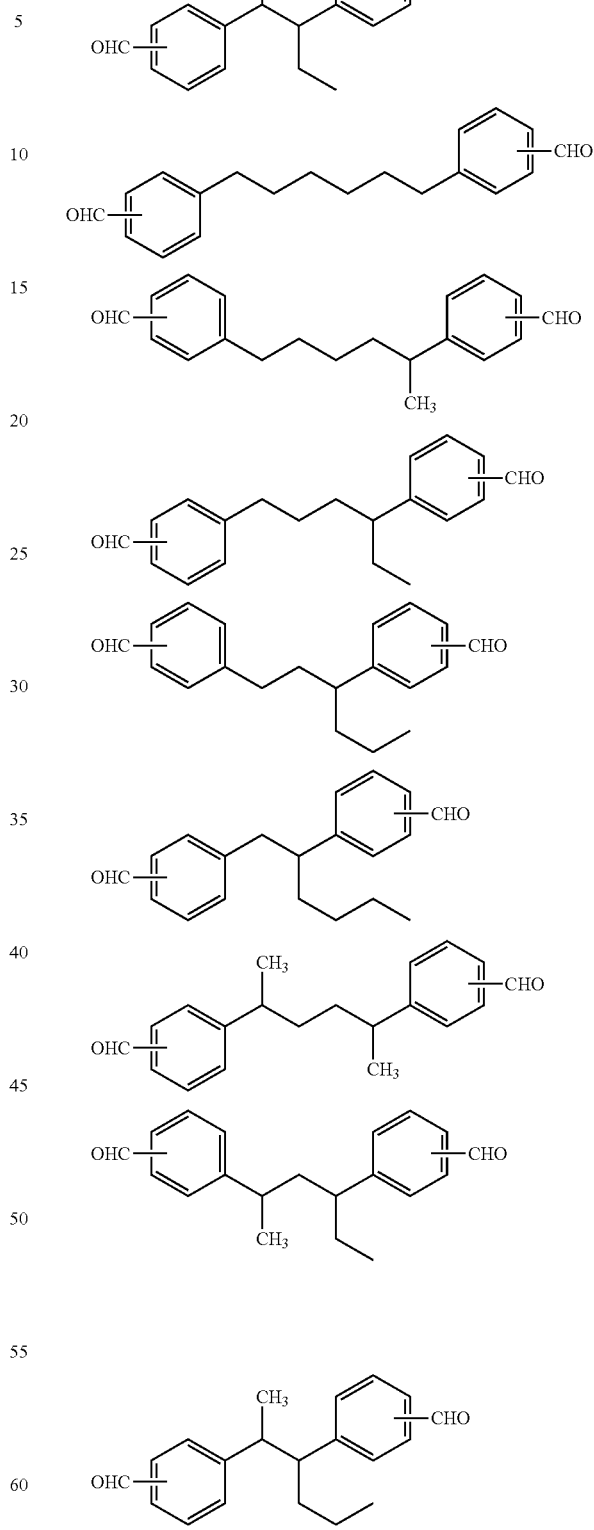
Further, compounds having an imide bond represented by the following formulas may be suitable for use as the aromatic dialdehyde compound.

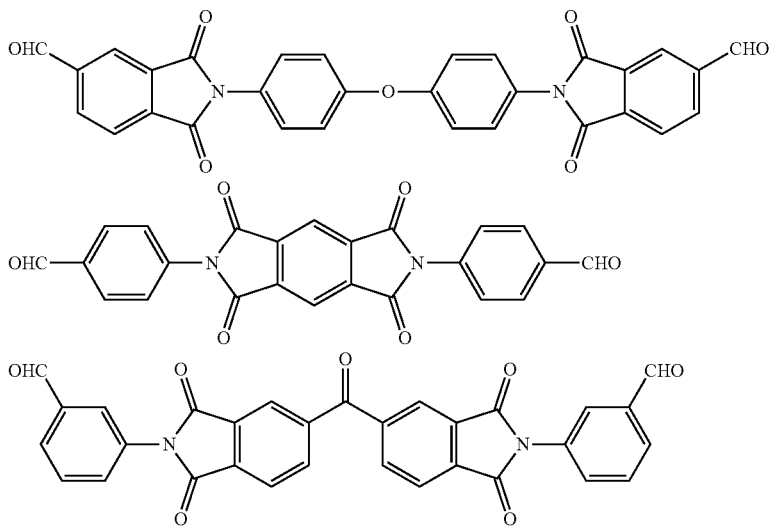

In the case in which the dicarbonyl compound represented by the formula (c-III-1) is an alicyclic dialdehyde having an alicyclic group, suitable examples thereof include cyclohexane-1,4-dialdehyde, cyclohexane-1,3-dialdehyde, bicyclo[2.2.1]heptane-2,5-dialdehyde, bicyclo[2.2.2]octane-2,5-dialdehyde, bicyclo[2.2.2]oct-7-ene-2,5-dialdehyde, bicyclo[2.2.1]heptane-2,3-dialdehyde, bicyclo[2.2.1]hept-5-ene-2,3-dialdehyde, tricyclo[5.2.1.0$^{2,6}$]decane-3,4-dialdehyde, tricyclo[5.2.1.0$^{2,6}$]dec-4-ene-8,9-dialdehyde, perhydronaphthalene-2,3-dialdehyde, perhydronaphthalene-1,4-dialdehyde, perhydronaphthalene-1,6-dialdehyde, perhydro-1,4-methanonaphthalene-2,3-dialdehyde, perhydro-1,4-methanonaphthalene-2,7-dialdehyde, perhydro-1,4-methanonaphthalene-7,8-dialdehyde, perhydro-1,4:5,8-dimethanonaphthalene-2,3-dialdehyde, perhydro-1,4:5,8-dimethanonaphthalene-2,7-dialdehyde, perhydro-1,4:5,8:9,10-trimethanoanthracene-2,3-dialdehyde, bicyclohexyl-4,4'-dialdehyde, dicyclohexyl ether-3,4'-dialdehyde, dicyclohexylmethane-3,3'-dialdehyde, dicyclohexylmethane-3,4'-dialdehyde, dicyclohexylmethane-4,4'-dialdehyde, dicyclohexyldifluoromethane-3,3'-dialdehyde, dicyclohexyldifluoromethane-3,4'-dialdehyde, dicyclohexyldifluoromethane-4,4'-dialdehyde, dicyclohexyl sulfone-3,3'-dialdehyde, dicyclohexyl sulfone-3,4'-dialdehyde, dicyclohexyl sulfone-4,4'-dialdehyde, dicyclohexyl sulfide-3,3'-dialdehyde, dicyclohexyl sulfide-3,4'-dialdehyde, dicyclohexyl sulfide-4,4'-dialdehyde, dicyclohexyl ketone-3,3'-dialdehyde, dicyclohexyl ketone-3,4'-dialdehyde, dicyclohexyl ketone-4,4'-dialdehyde, 2,2-bis(3-formylcyclohexyl)propane, 2,2-bis(4-formylcyclohexyl)propane, 2,2-bis(3-formylcyclohexyl)hexafluoropropane, 2,2-bis(4-formylcyclohexyl)hexafluoropropane, 1,3-bis(3-formylcyclohexyl)benzene, 1,4-bis(3-formylcyclohexyl)benzene, 1,4-bis(4-formylcyclohexyl)benzene, 3,3'-[1,4-cyclohexylenebis(1-methylethylidene)]biscyclohexanecarbaldehyde, 3,4'-[1,4-cyclohexylenebis(1-methylethylidene)]biscyclohexanecarbaldehyde, 4,4'-[1,4-cyclohexylenebis(1-methylethylidene)]biscyclohexanecarbaldehyde, 2,2-bis[4-(3-formylcyclohexyl)cyclohexyl]propane, 2,2-bis[4-(4-formylcyclohexyl)cyclohexyl]propane, 2,2-bis[4-(3-formylcyclohexyl)cyclohexyl]hexafluoropropane, 2,2-bis[4-(4-formylphenoxy)cyclohexyl]hexafluoropropane, bis[4-(3-formylcyclohexyloxy)cyclohexyl] sulfide, bis[4-(4-formylcyclohexyloxy)cyclohexyl] sulfide, bis[4-(3-formylcyclohexyloxy)cyclohexyl] sulfone, bis[4-(4-formylcyclohexyloxy)cyclohexyl] sulfone, 2,2'-bicyclo[2.2.1]heptane-5,6'-dialdehyde, 2,2'-bicyclo[2.2.1]heptane-6,6'-dialdehyde, and 1,3-diformyladamantane.

Among these dialdehyde compounds described above, isophthalaldehyde is preferable because it is easily synthesized and readily available and also tends to give a polybenzoxazole precursor that is capable of yielding a polybenzoxazole resin excellent in heat resistance and mechanical properties.

Dicarboxylic Dihalide

A dicarboxylic dihalide used as a raw material of the polybenzoxazole precursor is a compound represented by the following formula (c-III-2). The dicarboxylic dihalide may be used either individually or in combination of two or more.

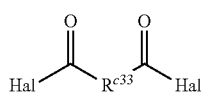

(c-III-2)

In the formula (c-III-2), R$^{c33}$ is the same as that in the formula (c-III); and Hal is a halogen atom.

In the formula (c-III-2), Hal is preferably chlorine, bromine, and iodine, more preferably chlorine.

Examples of a compound suitable as a compound represented by the formula (c-III-2) include a compound obtained by substituting two aldehyde groups of the compound described above suitable as the dialdehyde compound with halocarbonyl groups, preferably with chlorocarbonyl groups.

Among the dicarboxylic dihalides described above, terephthaloyl dichloride is preferable because it is easily synthesized and readily available and also tends to give a polybenzoxazole precursor that is capable of yielding a polybenzoxazole resin excellent in heat resistance and mechanical properties.

Method for Producing Polybenzoxazole Precursor

The polybenzoxazole precursor is produced by subjecting the aromatic diamine diol described above and the dicarbonyl compound to reaction in a solvent by a well-known method. Next, a typical method for producing a polybenzoxazole precursor is described, in which the dicarbonyl compound is a dialdehyde compound or the dicarbonyl compound is a dicarboxylic halide.

Reaction between the aromatic diamine diol and the dialdehyde compound is Schiff base formation reaction and may be allowed to proceed by a well-known method. The reaction temperature is not particularly limited but typically, it is preferably 20° C. or higher and 200° C. or lower, more preferably 20° C. or higher and 160° C. or lower, particularly preferably 100° C. or higher and 160° C. or lower.

The reaction between the aromatic diamine diol and the dialdehyde compound may be allowed to proceed while reflux and dehydration are being conducted with the addition of an entrainer to the solvent. The entrainer is not particularly limited and is selected as appropriate from any organic solvent that is capable of forming an azeotrope with water and forming a two-phase system with water at room temperature. Examples of a suitable entrainer include esters such as isobutyl acetate, allyl acetate, n-propyl propionate, isopropyl propionate, n-butyl propionate, and isobutyl propionate; ethers such as dichloromethyl ether and ethyl isoamyl ether; ketones such as ethyl propyl ketone; and aromatic hydrocarbons such as toluene.

The time of reaction between the aromatic diamine diol and the dialdehyde compound is not particularly limited but typically, it is preferable that the time be about 2 hours or longer and 72 hours or shorter.

The amount of the dialdehyde compound used for production of the polybenzoxazole precursor is preferably 0.5 moles or more and 1.5 moles or less, and more preferably 0.7 moles or more and 1.3 moles or less relative to 1 mole of the aromatic diamine diol.

The amount of the solvent used is not particularly limited as long as the reaction between the aromatic diamine diol and the dialdehyde compound proceeds well. Typically, the mass of the solvent used is 1 or more and 40 or less times, preferably 1.5 or more and 20 or less times the total mass of the aromatic diamine diol and the dialdehyde compound.

It is preferable that the reaction between the aromatic diamine diol and the dialdehyde compound be allowed to proceed until the number average molecular weight of the polybenzoxazole precursor thus produced reaches 1,000 or more and 20,000 or less, preferably 1,200 or more and 5,000 or less.

The temperature for the reaction between the aromatic diamine diol and the dicarboxylic dihalide is not particularly limited but typically, it is preferable that the temperature be −20° C. or higher and 150° C. or lower, more preferably −10° C. or higher and 150° C. or lower, and particularly preferably −5° C. or higher and 70° C. or lower. The reaction between the aromatic diamine diol and the dicarboxylic dihalide generates a hydrogen halide as a by-product. So as to neutralize the hydrogen halide, a small amount of an organic base such as triethylamine, pyridine, or N,N-dimethyl-4-aminopyridine or an alkali metal hydroxide such as sodium hydroxide or potassium hydroxide may be added to the reaction solution.

The time for the reaction between the aromatic diamine diol and the dicarboxylic dihalide is not particularly limited and typically, it is preferable that the time be about 2 hours or more and 72 hours or less.

The amount of the dicarboxylic dihalide used for production of the polybenzoxazole precursor is preferably 0.5 moles or more and 1.5 moles or less, and more preferably 0.7 moles or more and 1.3 moles or less relative to 1 mole of the aromatic diamine diol.

The amount of the solvent used is not particularly limited as long as the reaction between the aromatic diamine diol and the dicarboxylic dihalide proceeds well. Typically, the mass of the solvent is 1 or more and 40 or less times, preferably 1.5 or more and 20 or less times the total mass of the aromatic diamine diol and the dicarboxylic dihalide.

It is preferable that the reaction between the aromatic diamine diol and the dicarboxylic dihalide be allowed to proceed until the number average molecular weight of the polybenzoxazole precursor thus produced reaches 1,000 or more and 20,000 or less, preferably 1,200 or more and 5,000 or less.

By the method described above, a solution of the polybenzoxazole precursor is obtained. This solution of the polybenzoxazole precursor may be used as it is for blending the polybenzoxazole precursor with the liquid composition according to the present invention. Alternatively, the solvent may be at least partially removed from the solution of the polybenzoxazole precursor under reduced pressure at a low temperature at which the polybenzoxazole precursor does not become converted into a polybenzoxazole resin, and the resulting paste or solid of the polybenzoxazole precursor may be used for the preparation of the liquid composition.
(Polybenzothiazole Precursor)

The polybenzothiazole precursor is typically produced by reaction of an aromatic diamine dithiol and a dicarbonyl compound having a specific structure. As the aromatic diamine dithiol, a compound that is obtained by substituting a hydroxy group of the aromatic diamine diol used for synthesis of the polybenzoxazole precursor with a mercapto group may be used. As the dicarbonyl compound, the same dicarbonyl compound as that used in the synthesis of the polybenzoxazole precursor may be used.

The reaction method, reaction conditions, and the like for synthesizing the polybenzothiazole precursor by reaction between the aromatic diamine dithiol and the dicarbonyl compound are the same as those in the synthesis of the polybenzoxazole precursor by reaction between the aromatic diamine diol and the dicarbonyl compound.
(Polybenzimidazole Precursor)

The polybenzimidazole precursor is typically produced by reaction of an aromatic tetraamine and a dicarboxylic dihalide. As the aromatic tetraamine, a compound that is obtained by substituting a hydroxy group of the aromatic diamine diol used for synthesis of the polybenzoxazole precursor with an amino group may be used. As the dicarboxylic dihalide, the same dicarboxylic dihalide as that used in the synthesis of the polybenzoxazole precursor may be used.

The reaction method, reaction conditions, and the like for synthesizing the polybenzimidazole precursor by reaction between the aromatic tetraamine and the dicarboxylic dihalide are the same as those in the synthesis of the polybenzoxazole precursor by reaction between the aromatic diamine diol and the dicarboxylic dihalide.
(Styrene-(Maleic Acid) Copolymer)

The type of the styrene-(maleic acid) copolymer is not particularly limited as long as the object of the present invention is not impaired. The ratio (mass ratio) of styrene to maleic acid in the styrene-(maleic acid) copolymer is preferably 1/9 to 9/1, more preferably 2/8 to 8/1, and particularly preferably 1/1 to 8/1. The molecular weight of the styrene-(maleic acid) copolymer is not particularly limited but is preferably 1,000 or more and 100,000 or less, more preferably 5,000 or more and 12,000 or less in terms of the mass average molecular weight of polystyrene.

(Epoxy-Group-Containing Resin)

The epoxy-group-containing resin may be a polymer that is obtained by polymerizing a monomer having an epoxy group or a monomer mixture containing a monomer having an epoxy group. The epoxy-group-containing resin may be a polymer obtained by introducing an epoxy group into a polymer having a functional reactive group such as a hydroxy group, a carboxy group, or an amino group by using, for example, a compound having an epoxy group such as epichlorohydrin. As the polymer having an epoxy group, a polymer that is obtained by polymerizing a monomer having an epoxy group or a monomer mixture containing a monomer having an epoxy group is preferable because use of this polymer is advantageous in terms of, for example, availability, easy preparation, and easy adjustment of the amount of epoxy groups in the polymer.

Examples of a preferable epoxy-group-containing resin include novolac epoxy resins such as a phenol novolac type epoxy resin, a brominated phenol novolac type epoxy resin, an orthocresol novolac type epoxy resin, a bisphenol A novolac type epoxy resin, and a bisphenol AD novolac type epoxy resin; cyclic aliphatic epoxy resins such as an epoxidized product of a dicyclopentadiene type phenolic resin; and aromatic epoxy resins such as an epoxidized product of a naphthalene type phenolic resin.

Among the epoxy-group-containing resins, the polymer having an epoxy group is preferably a homopolymer of a (meth)acrylic acid ester having an epoxy group, or a copolymer of a (meth)acrylic acid ester having an epoxy group with other monomer in view of ease of preparation and the like.

The (meth)acrylic acid ester having an epoxy group may be either a (meth)acrylic acid ester having a chain aliphatic epoxy group, or the below-mentioned (meth)acrylic acid ester having an alicyclic epoxy group. The (meth)acrylic acid ester having an epoxy group may have an aromatic group. The (meth)acrylic acid ester having an epoxy group is preferably an aliphatic (meth)acrylic acid ester having a chain aliphatic epoxy group or an aliphatic (meth)acrylic acid ester having an alicyclic epoxy group, and more preferably an aliphatic (meth)acrylic acid ester having an alicyclic epoxy group.

Examples of the (meth)acrylic acid ester which has an aromatic group and an epoxy group include 4-glycidyloxyphenyl (meth)acrylate, 3-glycidyloxyphenyl (meth)acrylate, 2-glycidyloxyphenyl (meth)acrylate, 4-glycidyloxyphenylmethyl (meth)acrylate, 3-glycidyloxyphenylmethyl (meth)acrylate, and 2-glycidyloxyphenylmethyl (meth)acrylate.

Examples of the aliphatic (meth)acrylic acid ester having a chain aliphatic epoxy group include (meth)acrylic acid esters in which a chain aliphatic epoxy group is combined with an oxy group (—O—) in an ester group (—O—CO—), such as epoxyalkyl (meth)acrylate and epoxyalkyloxyalkyl (meth)acrylate. Such a chain aliphatic epoxy group possessed by the (meth)acrylic acid ester may have one or a plurality of oxy groups (—O—) in the chain. The number of carbon atoms of the chain aliphatic epoxy group is not particularly limited, and is preferably 3 or more and 20 or less, more preferably 3 or more and 15 or less, and particularly preferably 3 or more and 10 or less.

Specific examples of the aliphatic (meth)acrylic acid ester having a chain aliphatic epoxy group include epoxyalkyl (meth)acrylates such as glycidyl (meth)acrylate, 2-methyl glycidyl (meth)acrylate, 3,4-epoxybutyl (meth)acrylate, and 6,7-epoxyheptyl (meth)acrylate; and epoxyalkyloxyalkyl (meth)acrylates such as 2-glycidyloxyethyl (meth)acrylate, 3-glycidyloxy-n-propyl (meth)acrylate, 4-glycidyloxy-n-butyl (meth)acrylate, 5-glycidyloxy-n-hexyl (meth)acrylate, and 6-glycidyloxy-n-hexyl (meth)acrylate.

Specific examples of the aliphatic (meth)acrylic acid ester having an alicyclic epoxy group include compounds represented by the following formulas (c5-1) to (c5-15). Of these compounds, compounds represented by the following formulas (c5-1) to (c5-5) are preferable, and compounds represented by the following formulas (c5-1) to (c5-3) are more preferable.

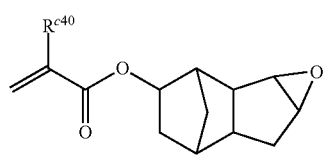

(c5-1)

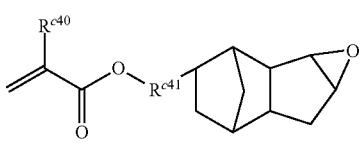

(c5-2)

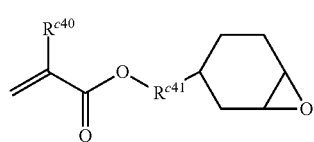

(c5-3)

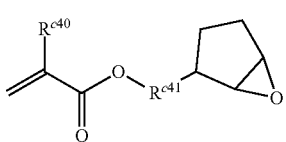

(c5-4)

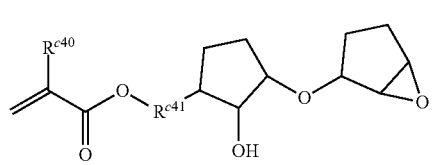

(c5-5)

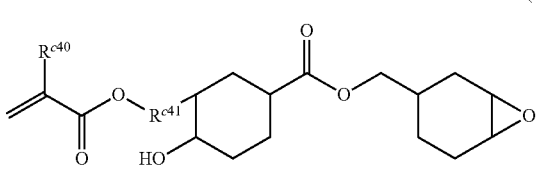

(c5-6)

-continued

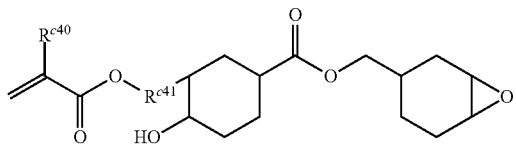
(c5-7)

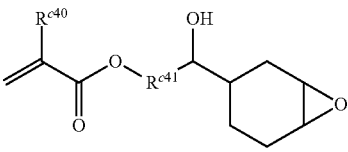
(c5-8)

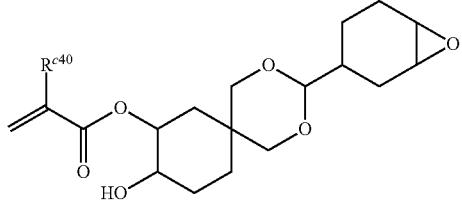
(c5-9)

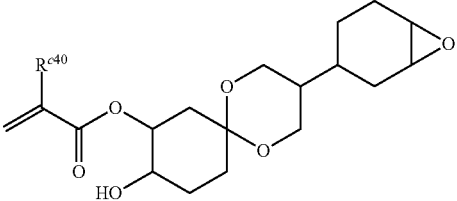
(c5-10)

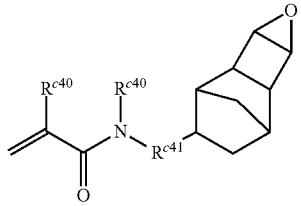
(c5-11)

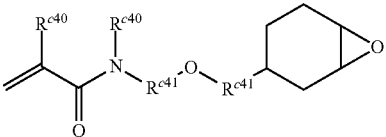
(c5-12)

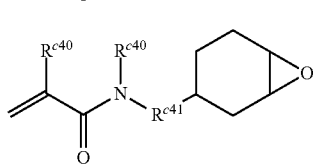
(c5-13)

(c5-14)

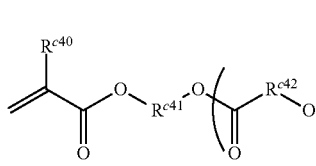
(c5-15)

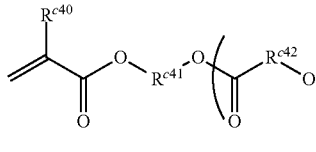

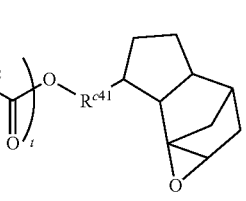

In the above formulas, $R^{c40}$ represents a hydrogen atom or a methyl group; $R^{c41}$ represents a divalent aliphatic saturated hydrocarbon group having 1 or more and 6 or less carbon atoms; $R^{c42}$ represents a divalent hydrocarbon group having 1 or more and 10 or less carbon atoms; and t represents an integer of 0 or more and 10 or less. $R^{c41}$ is a linear or branched alkylene group and is preferably, for example, a methylene group, an ethylene group, a propylene group, a tetramethylene group, an ethylethylene group, a pentamethylene group, or a hexamethylene group. $R^{c42}$ is preferably, for example, a methylene group, an ethylene group, a propylene group, a tetramethylene group, an ethylethylene group, a pentamethylene group, a hexamethylene group, a phenylene group, or a cyclohexylene group.

It is possible to use, as the polymer having an epoxy group, both of a homopolymer of a (meth)acrylic acid ester having an epoxy group, and a copolymer of a (meth)acrylic acid ester having an epoxy group with the other monomer. The content of a unit derived from the (meth)acrylic acid ester having an epoxy group in the polymer having an epoxy group is preferably 70% by mass or more, more preferably 80% by mass or more, particularly preferably 90% by mass or more, and most preferably 100% by mass.

When the polymer having an epoxy group is a copolymer of the (meth)acrylic acid ester having an epoxy group with the other monomer, examples of the other monomer include an unsaturated carboxylic acid, a (meth)acrylic acid ester having no epoxy group, (meth)acrylamides, an allyl compound, vinyl ethers, vinyl esters, styrenes, and the like. These compounds can be used individually, or two or more thereof can be used in combination. In view of storage stability of the liquid composition, and chemical resistance of a cured film formed using the liquid composition against alkali, it is preferred that the copolymer of the (meth)acrylic acid ester having an epoxy group with other monomer does not include a unit derived from an unsaturated carboxylic acid.

Examples of the unsaturated carboxylic acid include (meth)acrylic acid; (meth)acrylic acid amide; crotonic acid;

maleic acid, fumaric acid, citraconic acid, mesaconic acid, itaconic acid, and anhydrides of these dicarboxylic acids.

Examples of the (meth)acrylic acid ester having no epoxy group include linear or branched alkyl (meth)acrylates such as methyl (meth)acrylate, ethyl (meth)acrylate, propyl (meth)acrylate, amyl (meth)acrylate, and t-octyl (meth)acrylate; chloroethyl (meth)acrylate, 2,2-dimethylhydroxypropyl (meth)acrylate, 2-hydroxyethyl (meth)acrylate, trimethylolpropane mono(meth)acrylate, benzyl (meth)acrylate, furfuryl (meth)acrylate; and a (meth)acrylic acid ester having a group with an alicyclic skeleton. Of (meth)acrylic acid esters having no epoxy group, a (meth)acrylic acid ester having a group with an alicyclic skeleton is preferable.

In the (meth)acrylic acid ester having a group with an alicyclic skeleton, an alicyclic group composing the alicyclic skeleton may be either monocyclic or polycyclic. Examples of the monocyclic alicyclic group include a cyclopentyl group, a cyclohexyl group, and the like. Examples of the polycyclic alicyclic group include a norbornyl group, an isobornyl group, a tricyclononyl group, a tricyclodecyl group, a tetracyclododecyl group, and the like.

Examples of the (meth)acrylic acid ester having a group with an alicyclic skeleton include compounds represented by the following formulas (c6-1) to (c6-8). Of these compounds, compounds represented by the following formulas (c6-3) to (c6-8) are preferable, and compounds represented by the following formulas (c6-3) or (c6-4) are more preferable.

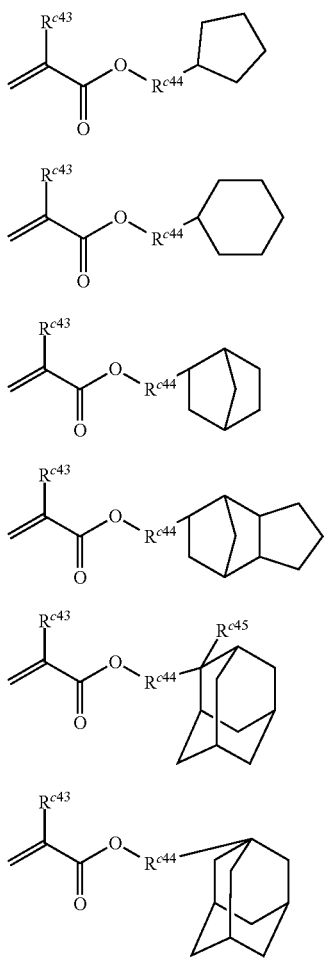

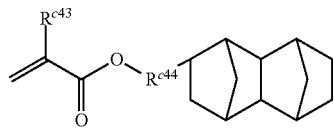

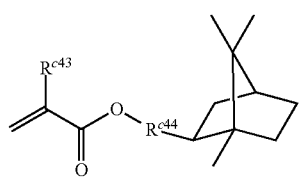

In the above formulas, $R^{c43}$ represents a hydrogen atom or a methyl group; $R^{c44}$ represents a single bond or a divalent aliphatic saturated hydrocarbon group having 1 or more and 6 or less carbon atoms; and $R^{c45}$ represents a hydrogen atom or an alkyl group having 1 or more and 5 or less carbon atoms. $R^{c44}$ is preferably a single bond, or a linear or branched alkylene group, for example, a methylene group, an ethylene group, a propylene group, a tetramethylene group, an ethylethylene group, a pentamethylene group, or a hexamethylene group. $R^{c44}$ is preferably a methyl group or an ethyl group.

Examples of (meth)acrylamides include (meth)acrylamide, N-alkyl(meth)acrylamide, N-aryl(meth)acrylamide, N,N-dialkyl(meth)acrylamide, N,N-aryl(meth)acrylamide, N-methyl-N-phenyl(meth)acrylamide, N-hydroxyethyl-N-methyl(meth)acrylamide, and the like.

Examples of the allyl compound include allyl esters such as allyl acetate, allyl caproate, allyl caprylate, allyl laurate, allyl palmitate, allyl stearate, allyl benzoate, allyl acetoacetate, and allyl lactate; allyloxyethanol, and the like.

Examples of vinyl ethers include aliphatic vinyl ethers such as hexyl vinyl ether, octyl vinyl ether, decyl vinyl ether, ethylhexyl vinyl ether, methoxyethyl vinyl ether, ethoxyethyl vinyl ether, chloroethyl vinyl ether, 1-methyl-2,2-dimethylpropyl vinyl ether, 2-ethylbutyl vinyl ether, hydroxyethyl vinyl ether, diethylene glycol vinyl ether, dimethylaminoethyl vinyl ether, diethylaminoethyl vinyl ether, butylaminoethyl vinyl ether, benzyl vinyl ether, and tetrahydrofurfuryl vinyl ether; vinyl aryl ethers such as vinyl phenyl ether, vinyl tolyl ether, vinyl chlorophenyl ether, vinyl-2,4-dichlorophenyl ether, vinyl naphthyl ether, and vinyl anthranyl ether; and the like.

Examples of vinyl esters include vinyl butyrate, vinyl isobutyrate, vinyl trimethylacetate, vinyl diethylacetate, vinyl valerate, vinyl caproate, vinyl chloroacetate, vinyl dichloroacetate, vinyl methoxyacetate, vinyl butoxyacetate, vinyl phenylacetate, vinyl acetoacetate, vinyl lactate, vinyl β-phenylbutyrate, vinyl benzoate, vinyl salicylate, vinyl chlorobenzoate, vinyl tetrachlorobenzoate, vinyl naphthoate, and the like.

Examples of styrenes include styrene; alkylstyrenes such as methylstyrene, dimethylstyrene, trimethylstyrene, ethylstyrene, diethylstyrene, isopropylstyrene, butylstyrene, hexylstyrene, cyclohexylstyrene, decylstyrene, benzylstyrene, chloromethylstyrene, trifluoromethylstyrene, ethoxymethylstyrene, and acetoxymethylstyrene; alkoxystyrenes such as methoxystyrene, 4-methoxy-3-methylstyrene, and dimethoxystyrene; halostyrenes such as chlorostyrene, dichlorostyrene, trichlorostyrene, tetrachlorostyrene, pentachlorostyrene, bromostyrene, dibromostyrene, iodostyrene, fluorostyrene, trifluorostyrene, 2-bromo-4-trifluoromethylstyrene, and 4-fluoro-3-trifluoromethylstyrene; and the like.

The molecular weight of the epoxy-group-containing resin is not particularly limited as long as the object of the present invention is not impaired, but the molecular weight is preferably 3,000 or more and 30,000 or less, more preferably 5,000 or more and 15,000 or less in terms of the mass average molecular weight of polystyrene.

[Photocurable Low-Molecular-Weight Compound]

The liquid composition may include a photopolymerizable low-molecular-weight compound (photopolymerizable monomer) as the base component (C). In the case in which a polyfunctional photopolymerizable low-molecular-weight compound is included, a photopolymerization initiator described below or the like is preferably contained in the liquid composition. The photopolymerizable low-molecular-weight compound may be a monofunctional monomer or a polyfunctional monomer. Next, the monofunctional monomer and the polyfunctional monomer are described in order.

Examples of the monofunctional monomer include (meth)acrylamide, methylol (meth)acrylamide, methoxymethyl(meth)acrylamide, ethoxymethyl(meth)acrylamide, propoxymethyl(meth)acrylamide, butoxymethoxymethyl(meth)acrylamide, N-methylol (meth)acrylamide, N-hydroxymethyl(meth)acrylamide, (meth)acrylic acid, fumaric acid, maleic acid, maleic anhydride, itaconic acid, itaconic anhydride, citraconic acid, citraconic anhydride, crotonic acid, 2-acrylamide-2-methylpropanesulfonic acid, tert-butylacrylamide sulfonic acid, methyl (meth)acrylate, ethyl (meth)acrylate, butyl (meth)acrylate, 2-ethylhexyl (meth)acrylate, cyclohexyl (meth)acrylate, 2-hydroxyethyl (meth)acrylate, 2-hydroxypropyl (meth)acrylate, 2-hydroxybutyl (meth)acrylate, 2-phenoxy-2-hydroxypropyl (meth)acrylate, 2-(meth)acryloyloxy-2-hydroxypropyl phthalate, glycerol mono(meth)acrylate, tetrahydrofurfuryl (meth)acrylate, N,N-dimethyl-2-aminoethyl (meth)acrylate, glycidyl (meth)acrylate, 2,2,2-trifluoroethyl (meth)acrylate, 2,2,3,3-tetrafluoropropyl (meth)acrylate, and half (meth)acrylates of phthalic acid derivatives. These monofunctional monomers may be used individually, or two or more thereof may be used in combination.

Examples of the polyfunctional monomer include polyfunctional monomers such as ethylene glycol di(meth)acrylate, diethylene glycol di(meth)acrylate, tetraethylene glycol di(meth)acrylate, propylene glycol di(meth)acrylate, polypropylene glycol di(meth)acrylate, butylene glycol di(meth)acrylate, neopentyl glycol di(meth)acrylate, 1,6-hexane glycol di(meth)acrylate, trimethylolpropane tri(meth)acrylate, glycerol di(meth)acrylate, pentaerythritol triacrylate, pentaerythritol tetraacrylate, dipentaerythritol pentaacrylate, dipentaerythritol hexaacrylate, pentaerythritol di(meth)acrylate, pentaerythritol tri(meth)acrylate, pentaerythritol tetra(meth)acrylate, dipentaerythritol penta(meth)acrylate, dipentaerythritol hexa(meth)acrylate, 2,2-bis(4-(meth)acryloxydiethoxyphenyl)propane, 2,2-bis(4-(meth)acryloxypolyethoxyphenyl)propane, 2-hydroxy-3-(meth)acryloyloxypropyl (meth)acrylate, ethylene glycol diglycidyl ether di(meth)acrylate, diethylene glycol diglycidyl ether di(meth)acrylate, phthalic acid diglycidyl ester di(meth)acrylate, glycerol triacrylate, glycerol polyglycidyl ether poly(meth)acrylate, urethane (meth)acrylate (in other words, a reaction product of tolylene diisocyanate, trimethylhexamethylene diisocyanate, hexamethylene diisocyanate, or the like with 2-hydroxyethyl (meth)acrylate), methylenebis(meth)acrylamide, (meth)acrylamide methylene ether, condensates of a polyhydric alcohol and N-methylol (meth)acrylamide, and triacrylformal. These polyfunctional monomers may be used individually, or two or more thereof may be used in combination.

[Photopolymerizable Polymer Compound]

The liquid composition may contain a photopolymerizable polymer compound as the base component (C). As the photopolymerizable polymer compound, a resin containing an ethylenically unsaturated group is preferably used. Examples of the resin containing an ethylenically unsaturated group include oligomers derived from polymerization of (meth)acrylic acid, fumaric acid, maleic acid, monomethyl fumarate, monoethyl fumarate, 2-hydroxyethyl (meth)acrylate, ethylene glycol monomethyl ether (meth)acrylate, ethylene glycol monoethyl ether (meth)acrylate, glycerol (meth)acrylate, (meth)acrylamide, acrylonitrile, methacrylonitrile, methyl (meth)acrylate, ethyl (meth)acrylate, isobutyl (meth)acrylate, 2-ethylhexyl (meth)acrylate, benzyl (meth)acrylate, ethylene glycol di(meth)acrylate, diethylene glycol di(meth)acrylate, triethylene glycol di(meth)acrylate, tetraethylene glycol di(meth)acrylate, butylene glycol di(meth)acrylate, propylene glycol di(meth)acrylate, trimethylolpropane tri(meth)acrylate, tetramethylolpropane tetra (meth)acrylate, pentaerythritol tri(meth)acrylate, pentaerythritol tetra(meth)acrylate, dipentaerythritol penta (meth)acrylate, dipentaerythritol hexa(meth)acrylate, 1,6-hexanediol di(meth)acrylate, and cardo epoxy diacrylate; polyester (meth)acrylates obtained by subjecting a polyester prepolymer derived from condensation between a polyhydric alcohol and a monobasic acid or a polybasic acid to reaction with (meth)acrylic acid; polyurethane (meth)acrylates obtained by subjecting a polyol and a compound having two isocyanate groups to reaction and then subjecting the resulting product to reaction with (meth)acrylic acid; and epoxy (meth)acrylate resins obtained by subjecting an epoxy resin such as a bisphenol A type epoxy resin, a bisphenol F type epoxy resin, a bisphenol S type epoxy resin, a phenol or cresol novolac type epoxy resin, a resole type epoxy resin, a triphenol methane type epoxy resin, a polycarboxylic acid polyglycidyl ester, a polyol polyglycidyl ester, an aliphatic or alicyclic epoxy resin, an amine epoxy resin, or a dihydroxybenzene type epoxy resin to reaction with (meth)acrylic acid. A resin obtained by subjecting an epoxy (meth)acrylate resin to reaction with a polybasic acid anhydride may also be suitable for use. In the present description, "(meth)acryl" means "acryl or methacryl".

A preferable resin containing an ethylenically unsaturated group is a resin obtained by subjecting a product of reaction between an epoxy compound and a carboxylic acid compound containing an unsaturated group to another reaction with a polybasic acid anhydride or a resin obtained by subjecting at least some of the carboxy groups of a polymer including a unit derived from an unsaturated carboxylic acid to reaction with a (meth)acrylic acid ester having an alicyclic epoxy group and/or a (meth)acrylic acid epoxyalkyl ester (hereinafter, these resins are collectively called "resin containing a constituent unit having an ethylenically unsaturated group"). The ethylenically unsaturated group of the constituent unit having an ethylenically unsaturated group is preferably a (meth)acryloyloxy group.

Among these, a resin containing a constituent unit having an ethylenically unsaturated group or a compound represented by the following formula (c7) is preferable. This compound represented by the formula (c7) is preferable because the compound itself is highly photocurable.

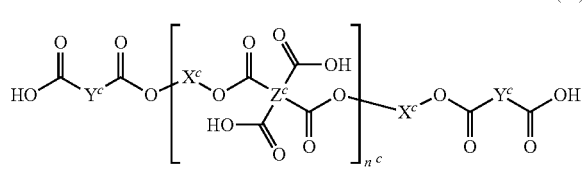
(c7)

In the formula (c7), $X^c$ represents a group represented by the following formula (c8).

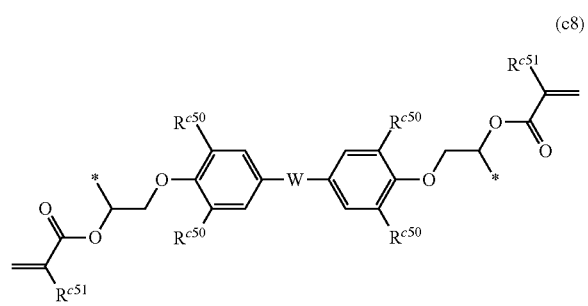
(c8)

In the formula (c8), $R^{c50}$ represents each independently a hydrogen atom, a hydrocarbon group having 1 or more and 6 or less carbon atoms, or a halogen atom; $R^{c51}$ represents each independently a hydrogen atom or a methyl group; and W represents a single bond or a group represented by the following structural formula (c9). In the formulas (c8) and (c9), "*" represents the position where the divalent group is bonded.

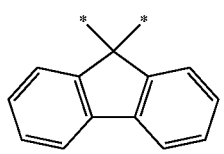
(c9)

In the formula (c7), $Y^c$ represents a residue that is obtained by removing an acid anhydride group (—CO—O—CO—) from a dicarboxylic anhydride. Examples of the dicarboxylic anhydride include maleic anhydride, succinic anhydride, itaconic anhydride, phthalic anhydride, tetrahydrophthalic anhydride, hexahydrophthalic anhydride, methylendomethylene tetrahydrophthalic anhydride, chlorendic anhydride, methyltetrahydrophthalic anhydride, and glutaric anhydride.

In the formula (c7), $Z^c$ represents a residue that is obtained by removing two acid anhydride groups from a tetracarboxylic dianhydride. Examples of the tetracarboxylic dianhydride include pyromellitic anhydride, benzophenonetetracarboxylic dianhydride, biphenyltetracarboxylic dianhydride, and biphenyl ether tetracarboxylic dianhydride. In the formula (c7), $n^c$ represents an integer of 0 or more and 20 or less.

The acid value of the resin containing an ethylenically unsaturated group is preferably 10 mg KOH/g or more and 150 mg KOH/g or less, more preferably 70 mg KOH/g or more and 110 mg KOH/g or less in terms of resin solid content. The acid value is preferably not lower than 10 mg KOH/g to be likely to obtain a liquid composition having sufficient solubility in a developing solution in the case of imparting photolithography properties to the liquid composition. The acid value is preferably not higher than 150 mg KOH/g to obtain sufficient curability and excellent surface properties.

The mass average molecular weight of the resin containing an ethylenically unsaturated group is preferably 1,000 or more and 40,000 or less, more preferably 2,000 or more and 30,000 or less. The mass average molecular weight is preferably not lower than 1,000 to be likely to form a cured film excellent in heat resistance and excellent film strength. The mass average molecular weight is preferably not higher than 40,000 to achieve excellent development.

[Resin for Formation of Cured Film by Baking]

The resin for formation of a cured film a by baking is exemplified by a silicon-containing resin. Examples of a preferred silicon-containing resin include one or more selected from a siloxane resin, and polysilane. Application of the liquid composition including these silicon-containing resins gives a quantum dot-containing film that includes the silicon-containing resin, and baking of the quantum dot-containing film gives a silica-based quantum dot-containing film. Hereinafter, the siloxane resin and the polysilane are described.

(Siloxane Resin)

The siloxane resin is not particularly limited as far as it is a type of resin that is soluble in the solvent (S) including a cycloalkyl acetate with a structure described below. As the siloxane resin, a siloxane resin obtained by hydrolysis and condensation of at least one type selected from a silane compound represented by the following formula (C-a) is suitably used, for example.

$$R_{4-n}Si(OR')_n \tag{C-a}$$

In the formula (C-a), R represents a hydrogen atom, an alkyl group, an aryl group, or an aralkyl group; R' represents an alkyl group or a phenyl group; and n represents an integer of 2 or more and 4 or less. When a plurality of R are bonded to Si, the plurality of R may be the same as or different from each other. A plurality of (OR') groups bonded to Si may also be the same as or different from each other.

The alkyl group as R is preferably a linear or branched alkyl group having 1 or more and 20 or less carbon atoms, more preferably a linear or branched alkyl group having 1 or more and 4 or less carbon atoms.

When R is an aryl group or an aralkyl group, the aryl groups contained in these groups are not particularly limited as long as the objects of the present invention are not inhibited. Examples of a suitable aryl group include the following groups.

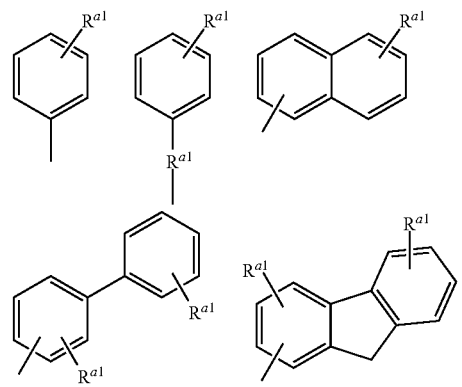

-continued

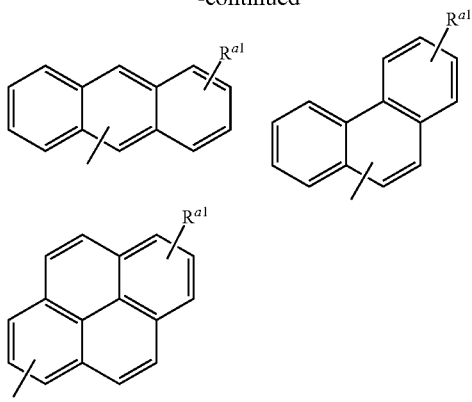

Among the groups represented by the above formulas, groups represented by the following formulas are preferable.

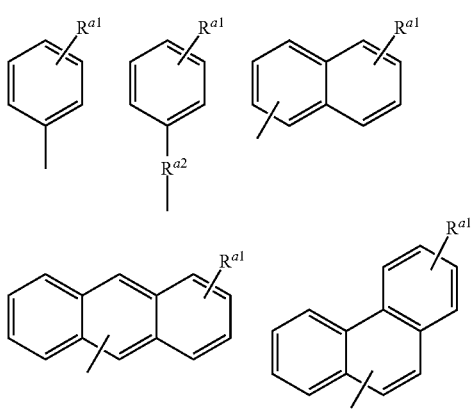

In the above formulas, $R^{a1}$ represents a hydrogen atom; a hydroxy group; an alkoxy group such as a methoxy group, an ethoxy group, a butoxy group, or a propoxy group; or a hydrocarbon group such as a methyl group, an ethyl group, a butyl group, or a propyl group. In the above formulas, $R^{a2}$ represents an alkylene group such as a methylene group, an ethylene group, a propylene group, or a butylene group.

When R is an aryl group or an aralkyl group, specific and suitable examples thereof include a benzyl group, a phenethyl group, a phenyl group, a naphthyl group, an anthracenyl group, a phenanthryl group, a biphenylyl group, a fluorenyl group, and a pyrenyl group.

The number of benzene rings in the aryl group or the aralkyl group is preferably 1 or more and 3 or less. When the number of benzene rings is 1 or more and 3 or less, production of the siloxane resin proceeds well, the resulting high degree of polymerization of the siloxane resin inhibits volatilization thereof during baking, and thereby the silica film is easily formed. The aryl group or the aralkyl group may contain a hydroxy group as a substituent.

The alkyl group as R' is preferably a linear or branched alkyl group having 1 or more and 5 or less carbon atoms. The number of carbon atoms in the alkyl group as R' is preferably 1 or 2 particularly in terms of the hydrolysis rate. When n is 4 in the formula (C-a), the resulting silane compound (i) is represented by the following formula (C-b).

$$Si(OR^1)_{a1}A(OR^2)_{b1}(OR^3)_{c1}(OR^4)_{d1} \quad (C\text{-}b)$$

In the formula (C-b), $R^1$, $R^2$, $R^3$, and $R^4$ each independently represent the same alkyl group or the same phenyl group as in R' above.

a1, b1, c1, and d1 are integers that satisfy $0 \leq a1 \leq 4$, $0 \leq b1 \leq 4$, $0 \leq c1 \leq 4$, $0 \leq d1 \leq 4$, and $a1+b1+c1+d1=4$.

When n is 3 in the formula (C-a), the resulting silane compound (ii) is represented by the following formula (C-c).

$$R^5Si(OR^6)_{e1}(OR^7)_{f1}(OR^8)_{g1} \quad (C\text{-}c)$$

In the formula (C-c), $R^5$ represents a hydrogen atom or the same alkyl group, the same aryl group, or the same aralkyl group as in R above; and
$R^6$, $R^7$, and $R^8$ each independently represent the same alkyl group or the same phenyl group as in R' above.

e1, f1, and g1 are integers that satisfy $0 \leq e1 \leq 3$, $0 \leq f1 \leq 3$, $0 \leq g1 \leq 3$, and $e1+f1+g1=3$.

When n is 2 in the formula (C-a), the resulting silane compound (iii) is represented by the following formula (C-d).

$$R^9R^{10}Si(OR^{11})_{h1}(OR^{12})_{i1} \quad (C\text{-}d)$$

In the formula (C-d), $R^9$ and $R^{10}$ represent a hydrogen atom or the same alkyl group, the same aryl group, or the same aralkyl group as in R above; and $R^{11}$ and $R^{12}$ each independently represent the same alkyl group or the same phenyl group as in R' above.

h1 and i1 are integers that satisfy $0 \leq h1 \leq 2$, $0 \leq i1 \leq 2$, and $h1+i1=2$.

Specific examples of the silane compound (i) include tetraalkoxysilanes such as tetramethoxysilane, tetraethoxysilane, tetrapropoxysilane, tetrabutoxysilane, tetrapentyloxysilane, tetraphenyloxysilane, trimethoxymonoethoxysilane, dimethoxydiethoxysilane, triethoxymonomethoxysilane, trimethoxymonopropoxysilane, monomethoxytributoxysilane, monomethoxytripentyloxysilane, monomethoxytriphenyloxysilane, dimethoxydipropoxysilane, tripropoxymonomethoxysilane, trimethoxymonobutoxysilane, dimethoxydibutoxysilane, triethoxymonopropoxysilane, diethoxydipropoxysilane, tributoxymonopropoxysilane, dimethoxymonoethoxymonobutoxysilane, diethoxymonomethoxymonobutoxysilane, diethoxymonopropoxymonobutoxysilane, dipropoxymonomethoxymonoethoxysilane, dipropoxymonomethoxymonobutoxysilane, dipropoxymonoethoxymonobutoxysilane, dibutoxymonomethoxymonoethoxysilane, dibutoxymonoethoxymonopropoxysilane, and monomethoxymonoethoxymonopropoxymonobutoxysilane. Among these, tetramethoxysilane and tetraethoxysilane are preferable.

Specific examples of the silane compound (ii) include: hydrosilane compounds such as trimethoxysilane, triethoxysilane, tripropoxysilane, tripentyloxysilane, triphenyloxysilane, dimethoxymonoethoxysilane, diethoxymonomethoxysilane, dipropoxymonomethoxysilane, dipropoxymonoethoxysilane, dipentyloxymonomethoxysilane, dipentyloxymonoethoxysilane, dipentyloxymonopropoxysilane, diphenyloxymonomethoxysilane, diphenyloxymonoethoxysilane, diphenyloxymonopropoxysilane, methoxyethoxypropoxysilane, monopropoxydimethoxysilane, monopropoxydiethoxysilane, monobutoxydimethoxysilane, monopentyloxydiethoxysilane, and monophenyloxydiethoxysilane; methylsilane compounds such as methyltrimethoxysilane, methyltriethoxysilane, methyltripropoxysilane, methyltripentyloxysilane, methyltriphenyloxysilane, methylmonomethoxydiethoxysilane, methylmonomethoxydipropoxysilane, methylmonomethoxydipentyloxysilane, methylmonomethoxydiphenyloxysilane, methylmethoxyethoxypropoxysilane, and methylmonomethoxymonoethoxymonobutoxysilane; ethylsilane compounds such as ethyltrimethoxysilane, ethyltriethoxysilane, ethyltripropoxysilane, ethyltripentyloxysilane, ethyltriphenyloxysilane, ethylmonomethoxydiethoxysilane, ethylmonomethoxydipropoxysilane, ethylmonomethoxydipentyloxysilane, ethylmonomethoxydiphenyloxysilane, ethylmethoxyethoxypropoxysilane, and ethylmonomethoxymonoethoxymonobutoxysilane; propylsilane compounds such as propyltrimethoxysilane, propyltriethoxysilane, propyltripropoxysilane, propyltripentyloxysilane, and propyltriphenyloxysilane, propylmonomethoxydiethoxysilane, propylmonomethoxydipropoxysilane, propylmonomethoxydipentyloxysilane, propylmonomethoxydiphenyloxysilane, propylmethoxyethoxypropoxysilane, and propylmonomethoxymonoethoxymonobutoxysilane; butylsilane compounds such as butyltrimethoxysilane, butyltriethoxysilane, butyltripropoxysilane, butyltripentyloxysilane, butyltriphenyloxysilane, butylmonomethoxydiethoxysilane, butylmonomethoxydipropoxysilane, butylmonomethoxydipentyloxysilane, butylmonomethoxydiphenyloxysilane, butylmethoxyethoxypropoxysilane, and butylmonomethoxymonoethoxymonobutoxysilane; phenylsilane compounds such as phenyltrimethoxysilane, phenyltriethoxysilane, phenyltripropoxysilane, phenyltripentyloxysilane, phenyltriphenyloxysilane, phenylmonomethoxydiethoxysilane, phenylmonomethoxydipropoxysilane, phenylmonomethoxydipentyloxysilane, phenylmonomethoxydiphenyloxysilane, phenylmethoxyethoxypropoxysilane, and phenylmonomethoxymonoethoxymonobutoxysilane; hydroxyphenylsilane compounds such as hydroxyphenyltrimethoxysilane, hydroxyphenyltriethoxysilane, hydroxyphenyltripropoxysilane, hydroxyphenyltripentyloxysilane, hydroxyphenyltriphenyloxysilane, hydroxyphenylmonomethoxydiethoxysilane, hydroxyphenylmonomethoxydipropoxysilane, hydroxyphenylmonomethoxydipentyloxysilane, hydroxyphenylmonomethoxydiphenyloxysilane, hydroxyphenylmethoxyethoxypropoxysilane, and hydroxyphenylmonomethoxymonoethoxymonobutoxysilane; naphthylsilane compounds such as naphthyltrimethoxysilane, naphthyltriethoxysilane, naphthyltripropoxysilane, naphthyltripentyloxysilane, naphthyltriphenyloxysilane, naphthylmonomethoxydiethoxysilane, naphthylmonomethoxydipropoxysilane, naphthylmonomethoxydipentyloxysilane, naphthylmonomethoxydiphenyloxysilane, naphthylmethoxyethoxypropoxysilane, and naphthylmonomethoxymonoethoxymonobutoxysilane; benzylsilane compounds such as benzyltrimethoxysilane, benzyltriethoxysilane, benzyltripropoxysilane, benzyltripentyloxysilane, benzyltriphenyloxysilane, benzylmonomethoxydiethoxysilane, benzylmonomethoxydipropoxysilane, benzylmonomethoxydipentyloxysilane, benzylmonomethoxydiphenyloxysilane, benzylmethoxyethoxypropoxysilane, and benzylmonomethoxymonoethoxymonobutoxysilane; and hydroxybenzylsilane compounds such as hydroxybenzyltrimethoxysilane, hydroxybenzyltriethoxysilane, hydroxybenzyltripropoxysilane, hydroxybenzyltripentyloxysilane, hydroxybenzyltriphenyloxysilane, hydroxybenzylmonomethoxydiethoxysilane, hydroxybenzylmonomethoxydipropoxysilane, hydroxybenzylmonomethoxydipentyloxysilane, hydroxybenzylmonomethoxydiphenyloxysilane, hydroxybenzylmethoxyethoxypropoxysilane, and hydroxybenzylmonomethoxymonoethoxymonobutoxysilane.

Specific examples of the silane compound (iii) include: hydrosilane compounds such as dimethoxysilane, diethoxysilane, dipropoxysilane, dipentyloxysilane, diphenyloxysilane, methoxyethoxysilane, methoxypropoxysilane, methoxypentyloxysilane, methoxyphenyloxysilane, ethoxypropoxysilane, ethoxypentyloxysilane, and ethoxyphenyloxysilane; methylhydrosilane compounds such as methyldimethoxysilane, methylmethoxyethoxysilane, methyldiethoxysilane, methylmethoxypropoxysilane, methylmethoxypentyloxysilane, methylethoxypropoxysilane, methyldipropoxysilane, methyldipentyloxysilane, methyldiphenyloxysilane, and methylmethoxyphenyloxysilane; ethylhydrosilane compounds such as ethyldimethoxysilane, ethylmethoxyethoxysilane, ethyldiethoxysilane, ethylmethoxypropoxysilane, ethylmethoxypentyloxysilane, ethylethoxypropoxysilane, ethyldipropoxysilane, ethyldipentyloxysilane, ethyldiphenyloxysilane, and ethylmethoxyphenyloxysilane; propylhydrosilane compounds such as propyldimethoxysilane, propylmethoxyethoxysilane, propyldiethoxysilane, propylmethoxypropoxysilane, propylmethoxypentyloxysilane, propylethoxypropoxysilane, propyldipropoxysilane, propyldipentyloxysilane, propyldiphenyloxysilane, and propylmethoxyphenyloxysilane; butylhydrosilane compounds such as butyldimethoxysilane, butylmethoxyethoxysilane, butyldiethoxysilane, butylmethoxypropoxysilane, butylmethoxypentyloxysilane, butylethoxypropoxysilane, butyldipropoxysilane, butyldipentyloxysilane, butyldiphenyloxysilane, and butylmethoxyphenyloxysilane; phenylhydrosilane compounds such as phenyldimethoxysilane, phenylmethoxyethoxysilane, phenyldiethoxysilane, phenylmethoxypropoxysilane, phenylmethoxypentyloxysilane, phenylethoxypropoxysilane, phenyldipropoxysilane, phenyldipentyloxysilane, phenyldiphenyloxysilane, and phenylmethoxyphenyloxysilane; hydroxyphenylhydrosilane compounds such as hydroxyphenyldimethoxysilane, hydroxyphenylmethoxyethoxysilane, hydroxyphenyldiethoxysilane, hydroxyphenylmethoxypropoxysilane, hydroxyphenylmethoxypentyloxysilane, hydroxyphenylethoxypropoxysilane, hydroxyphenyldipropoxysilane, hydroxyphenyldipentyloxysilane, hydroxyphenyldiphenyloxysilane, and hydroxyphenylmethoxyphenyloxysilane; naphthylhydrosilane compounds such as naphthyldimethoxysilane, naphthylmethoxyethoxysilane, naphthyldiethoxysilane, naphthylmethoxypropoxysilane, naphthylmethoxypentyloxysilane, naphthylethoxypropoxysilane, naphthyldipropoxysilane, naphthyldipentyloxysilane, naphthyldiphenyloxysilane, and naphthylmethoxyphenyloxysilane; benzylhydrosilane compounds such as benzyldimethoxysilane, benzylmethoxyethoxysilane, benzyldiethoxysilane, benzylmethoxypropoxysilane, benzylmethoxypentyloxysilane, benzylethoxypropoxysilane, benzyldipropoxysilane, benzyldipentyloxysilane, benzyldiphenyloxysilane, and benzylmethoxyphenyloxysilane; hydroxybenzylhydrosilane compounds such as hydroxybenzyldimethoxysilane, hydroxybenzylmethoxyethoxysilane, hydroxybenzyldiethoxysilane, hydroxybenzylmethoxypropoxysilane, hydroxybenzylmethoxypentyloxysilane, hydroxybenzylethoxypropoxysilane, hydroxybenzyldipropoxysilane, hydroxybenzyldipentyloxysilane, hydroxybenzyldiphenyloxysilane, and hydroxybenzylmethoxyphenyloxysilane; dimethylsilane compounds such as dimethyldimethoxysilane, dimethylmethoxyethoxysilane, dimethylmethoxypropoxysilane, dimethyldiethoxysilane, dimethyldipentyloxysilane, dimethyldiphenyloxysilane, dimethylethoxypropoxysilane, and dimethyldipropoxysilane; diethylsilane compounds such as diethyldimethoxysilane, diethylmethoxyethoxysilane, diethylmethoxypropoxysilane, diethyldiethoxysilane, diethyldipentyloxysilane, diethyldiphenyloxysilane, diethylethoxypropoxysilane, and diethyldipropoxysilane; dipropoxysilane compounds such as dipropyldimethoxysilane, dipropylmethoxyethoxysilane, dipropylmethoxypropoxysilane, dipropyldiethoxysilane, dipropyldipentyloxysilane, dipropyldiphenyloxysilane, dipropylethoxypropoxysilane, and dipropyldipropoxysilane; dibutylsilane compounds such as dibutyldimethoxysilane, dibutylmethoxyethoxysilane, dibutylmethoxypropoxysilane, dibutyldiethoxysilane, dibutyldipentyloxysilane, dibutyldiphenyloxysilane, dibutylethoxypropoxysilane, and dibutyldipropoxysilane; diphenylsilane compounds such as diphenyldimethoxysilane, diphenylmethoxyethoxysilane, diphenylmethoxypropoxysilane, diphenyldiethoxysilane, diphenyldipentyloxysilane, diphenyldiphenyloxysilane, diphenylethoxypropoxysilane, and diphenyldipropoxysilane; di(hydroxyphenyl)silane compounds such as di(hydroxyphenyl)dimethoxysilane, di(hydroxyphenyl)methoxyethoxysilane, di(hydroxyphenyl)methoxypropoxysilane, di(hydroxyphenyl)diethoxysilane, di(hydroxyphenyl)dipentyloxysilane, di(hydroxyphenyl)diphenyloxysilane, di(hydroxyphenyl)ethoxypropoxysilane, and di(hydroxyphenyl)dipropoxysilane; dinaphthylsilane compounds such as dinaphthyldimethoxysilane, dinaphthylmethoxyethoxysilane, dinaphthylmethoxypropoxysilane, dinaphthyldiethoxysilane, dinaphthyldipentyloxysilane, dinaphthyldiphenyloxysilane, dinaphthylethoxypropoxysilane, and dinaphthyldipropoxysilane; dibenzylsilane compounds such as dibenzyldimethoxysilane, dibenzylmethoxyethoxysilane, dibenzylmethoxypropoxysilane, dibenzyldiethoxysilane, dibenzyldipentyloxysilane, dibenzyldiphenyloxysilane, dibenzylethoxypropoxysilane, and dibenzyldipropoxysilane; di(hydroxybenzyl)silane compounds such as di(hydroxybenzyl)dimethoxysilane, di(hydroxybenzyl)methoxyethoxysilane, di(hydroxybenzyl)methoxypropoxysilane, di(hydroxybenzyl)diethoxysilane, di(hydroxybenzyl)dipentyloxysilane, di(hydroxybenzyl)diphenyloxysilane, di(hydroxybenzyl)ethoxypropoxysilane, and di(hydroxybenzyl)dipropoxysilane; methylethylsilane compounds such as methylethyldimethoxysilane, methylethylmethoxyethoxysilane, methylethylmethoxypropoxysilane, methylethyldiethoxysilane, methylethyldipentyloxysilane, methylethyldiphenyloxysilane, methylethylethoxypropoxysilane, and methylethyldipropoxysilane; methylpropylsilane compounds such as methylpropyldimethoxysilane, methylpropylmethoxyethoxysilane, methylpropylmethoxypropoxysilane, methylpropyldiethoxysilane, methylpropyldipentyloxysilane, methylpropyldiphenyloxysilane, methylpropylethoxypropoxysilane, and methylpropyldipropoxysilane; methylbutylsilane compounds such as methylbutyldimethoxysilane, methylbutylmethoxyethoxysilane, methylbutylmethoxypropoxysilane, methylbutyldiethoxysilane, methylbutyldipentyloxysilane, methylbutyldiphenyloxysilane, methylbutylethoxypropoxysilane, and methylbutyldipropoxysilane; methyl(phenyl)silane compounds such as methyl(phenyl)dimethoxysilane, methyl(phenyl)methoxyethoxysilane, methyl(phenyl)methoxypropoxysilane, methyl(phenyl)diethoxysilane, methyl(phenyl)dipentyloxysilane, methyl(phenyl)diphenyloxysilane, methyl(phenyl)ethoxypropoxysilane, and methyl(phenyl)dipropoxysilane; methyl(hydroxyphenyl)silane compounds such as methyl(hydroxyphenyl)dimethoxysilane, methyl(hydroxyphenyl)methoxyethoxysilane, methyl(hydroxyphenyl)methoxypropoxysilane, methyl(hydroxyphenyl)diethoxysilane, methyl(hydroxyphenyl)dipentyloxysilane, methyl(hydroxyphenyl)diphenyloxysilane, methyl(hydroxyphenyl)ethoxypropoxysilane, and methyl(hydroxyphenyl)dipropoxysilane; methyl(naphthyl)silane compounds such as methyl(naphthyl)dimethoxysilane, methyl(naphthyl)methoxyethoxysilane, methyl(naphthyl)methoxypropoxysilane, methyl(naphthyl)diethoxysilane, methyl(naphthyl)dipentyloxysilane, methyl(naphthyl)diphenyloxysilane, methyl(naphthyl)ethoxypropoxysilane, and methyl(naphthyl)dipropoxysilane; methyl(benzyl)silane compounds such as methyl(benzyl)dimethoxysilane, methyl(benzyl)methoxyethoxysilane, methyl(benzyl)methoxypropoxysilane, methyl(benzyl)diethoxysilane, methyl(benzyl)dipentyloxysilane, methyl(benzyl)diphenyloxysilane, methyl(benzyl)ethoxypropoxysilane, and methyl(benzyl)dipropoxysilane; methyl(hydroxybenzyl)silane compounds such as methyl(hydroxybenzyl)dimethoxysilane, methyl(hydroxybenzyl)methoxyethoxysilane, methyl(hydroxybenzyl)methoxypropoxysilane, methyl(hydroxybenzyl)diethoxysilane, methyl(hydroxybenzyl)dipentyloxysilane, methyl(hydroxybenzyl)diphenyloxysilane, methyl(hydroxybenzyl)ethoxypropoxysilane, and methyl(hydroxybenzyl)dipropoxysilane; ethylpropylsilane compounds such as ethylpropyldimethoxysilane, ethylpropylmethoxyethoxysilane, ethylpropylmethoxypropoxysilane, ethylpropyldiethoxysilane, ethylpropyldipentyloxysilane, ethylpropyldiphenyloxysilane, ethylpropylethoxypropoxysilane, and ethylpropyldipropoxysilane; ethylbutylsilane compounds such as ethylbutyldimethoxysilane, ethylbutylmethoxyethoxysilane, ethylbutylmethoxypropoxysilane, ethylbutyldiethoxysilane, ethylbutyldipentyloxysilane, ethylbutyldiphenyloxysilane, ethylbutylethoxypropoxysilane, and ethylbutyldipropoxysilane; ethyl(phenyl)silane compounds such as ethyl(phenyl)dimethoxysilane, ethyl(phenyl)methoxyethoxysilane, ethyl(phenyl)methoxypropoxysilane, ethyl(phenyl)diethoxysilane, ethyl(phenyl)dipentyloxysilane, ethyl(phenyl)diphenyloxysilane, ethyl(phenyl)ethoxypropoxysilane, and ethyl(phenyl)dipropoxysilane; ethyl(hydroxyphenyl)silane compounds such as ethyl(hydroxyphenyl)dimethoxysilane, ethyl(hydroxyphenyl)methoxyethoxysilane, ethyl(hydroxyphenyl)methoxypropoxysilane, ethyl(hydroxyphenyl)diethoxysilane, ethyl(hydroxyphenyl)dipentyloxysilane, ethyl(hydroxyphenyl)diphenyloxysilane, ethyl(hydroxyphenyl)ethoxypropoxysilane, and ethyl(hydroxyphenyl)dipropoxysilane; ethyl(naphthyl)silane compounds such as ethyl(naphthyl)dimethoxysilane, ethyl(naphthyl)methoxyethoxysilane, ethyl(naphthyl)methoxypropoxysilane, ethyl(naphthyl)diethoxysilane, ethyl(naphthyl)dipentyloxysilane, ethyl(naphthyl)diphenyloxysilane, ethyl(naphthyl)ethoxypropoxysilane, and ethyl(naphthyl)dipropoxysilane; ethyl(benzyl)silane compounds such as ethyl(benzyl)dimethoxysilane, ethyl(benzyl)methoxyethoxysilane, ethyl(benzyl)methoxypropoxysilane, ethyl(benzyl)diethoxysilane, ethyl(benzyl)dipentyloxysilane, ethyl(benzyl)diphenyloxysilane, ethyl(benzyl)ethoxypropoxysilane, and ethyl(benzyl)dipropoxysilane; ethyl(hydroxybenzyl)silane compounds such as ethyl(hydroxybenzyl)dimethoxysilane, ethyl(hydroxybenzyl)methoxyethoxysilane, ethyl(hydroxybenzyl)methoxypropoxysilane, ethyl(hydroxybenzyl) diethoxysilane, ethyl(hydroxybenzyl)dipentyloxysilane, ethyl(hydroxybenzyl)diphenyloxysilane, ethyl(hydroxybenzyl)ethoxypropoxysilane, and ethyl(hydroxybenzyl)dipropoxysilane; propylbutylsilane compounds such as propylbutyldimethoxysilane, propylbutylmethoxyethoxysilane, propylbutylmethoxypropoxysilane, propylbutyldiethoxysilane, propylbutyldipentyloxysilane, propylbutyldiphenyloxysilane, propylbutylethoxypropoxysilane, and propylbutyldipropoxysilane; propyl(phenyl)silane compounds such as propyl(phenyl)dimethoxysilane, propyl(phenyl)methoxyethoxysilane, propyl(phenyl)methoxypropoxysilane, propyl(phenyl)diethoxysilane, propyl(phenyl)dipentyloxysilane, propyl(phenyl)diphenyloxysilane, propyl (phenyl)ethoxypropoxysilane, and propyl(phenyl)dipropoxysilane; propyl(hydroxyphenyl)silane compounds such as propyl(hydroxyphenyl)dimethoxysilane, propyl(hydroxyphenyl)methoxyethoxysilane, propyl(hydroxyphenyl)methoxypropoxysilane, propyl(hydroxyphenyl)diethoxysilane, propyl(hydroxyphenyl)dipentyloxysilane, propyl (hydroxyphenyl)diphenyloxysilane, propyl(hydroxyphenyl)ethoxypropoxysilane, and propyl(hydroxyphenyl)dipropoxysilane; propyl(naphthyl)silane compounds such as propyl(naphthyl)dimethoxysilane, propyl(naphthyl)methoxyethoxysilane, propyl(naphthyl)methoxypropoxysilane, propyl(naphthyl)diethoxysilane, propyl(naphthyl)dipentyloxysilane, propyl(naphthyl)diphenyloxysilane, propyl (naphthyl)ethoxypropoxysilane, and propyl(naphthyl)dipropoxysilane; propyl(benzyl)silane compounds such as propyl(benzyl)dimethoxysilane, propyl(benzyl)methoxyethoxysilane, propyl(benzyl)methoxypropoxysilane, propyl (benzyl)diethoxysilane, propyl(benzyl)dipentyloxysilane, propyl(benzyl)diphenyloxysilane, propyl(benzyl)ethoxypropoxysilane, and propyl(benzyl)dipropoxysilane; and propyl(hydroxybenzyl)silane compounds such as propyl(hydroxybenzyl)dimethoxysilane, propyl(hydroxybenzyl)methoxyethoxysilane, propyl(hydroxybenzyl)methoxypropoxysilane, propyl(hydroxybenzyl)diethoxysilane, propyl(hydroxybenzyl)dipentyloxysilane, propyl(hydroxybenzyl)diphenyloxysilane, propyl(hydroxybenzyl)ethoxypropoxysilane, and propyl(hydroxybenzyl)dipropoxysilane.

By subjecting the silane compound described above to hydrolysis and condensation by a conventional procedure, the siloxane resin is obtained. The mass average molecular weight of the siloxane resin is preferably 300 or more and 30,000 or less, more preferably 500 or more and 10,000 or less. Two or more siloxane resins having different mass average molecular weights may be mixed together. When the mass average molecular weight of the siloxane resin is within the above range, a liquid composition having excellent film-forming properties and capable of forming a flat quantum dot-containing film tends to be obtained.

Examples of a suitable siloxane resin obtained by hydrolysis and condensation of the silane compound described above include a siloxane resin having a structural unit represented by the following formula (C-1-a). In the siloxane resin, the number of carbon atoms per one silicon atom is two or more.

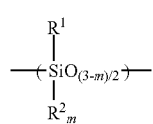

(C-1-a)

In the formula (C-1-a), $R^1$ represents an alkyl group, an aryl group, or an aralkyl group; $R^2$ represents hydrogen, an alkyl group, an aryl group, or an aralkyl group; and m is 0 or 1.

The alkyl group, the aryl group, or the aralkyl group in each of $R^1$ and $R^2$ is the same as the alkyl group, the aryl group, or the aralkyl group in the above formula (C-a). By using the siloxane resin having an alkyl group, an aryl group, or an aralkyl group described above, the resulting liquid composition tends to be capable of forming a silica-based, quantum dot-containing film with excellent durability and to easily fill a very small space.

The alkyl group is preferably an alkyl group having 1 or more and 5 or less carbon atoms, and examples thereof include a methyl group, an ethyl group, an n-propyl group, an i-propyl group, an n-butyl group, and a tert-butyl group. When an alkyl group having 1 or more and 5 or less carbon atoms is contained, a silica film with excellent heat resistance tends to be formed. Examples of the aryl group and the aralkyl group include a benzyl group, a phenethyl group, a phenyl group, a naphthyl group, an anthracenyl group, a phenanthryl group, a biphenyl group, a fluorenyl group, and a pyrenyl group.

Specific and preferable examples of the aryl group and the aralkyl group include those having the following structure.

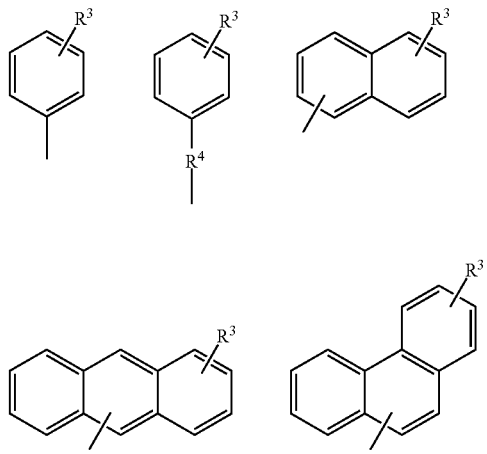

In the above formula, $R^3$ represents a hydrogen atom; a hydroxy group; an alkoxy group such as a methoxy group, an ethoxy group, a butoxy group, or a propoxy group; or a hydrocarbon group such as a methyl group, an ethyl group, a butyl group, or a propyl group, and $R^4$ represents an alkylene group such as a methylene group, an ethylene group, a propylene group, or a butylene group. The aromatic hydrocarbon group needs to have $R^3$ described above on at least one aromatic ring in the aromatic hydrocarbon group, and may have a plurality of $R^3$. When a plurality of $R^3$ are contained, these $R^3$ may be the same as or different from each other.

A group that is particularly preferable as $R^1$ is preferably a group having the following structure ($R^1$-a) or ($R^1$-b), particularly preferably ($R^1$-b).

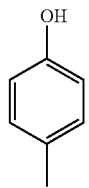

($R^1$-a)

-continued (R¹-b)
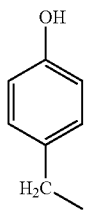

In the formula (C-1-a), m is preferably 0. In the case in which m is 0, the siloxane resin has a silsesquioxane skeleton. The siloxane resin is more preferably a ladder-type silsesquioxane.

The structural unit (unit skeleton) represented by the formula (C-1-a) preferably has 2 or more and 15 or less carbon atoms per one silicon atom.

The siloxane resin may have two or more types of structural units represented by the formula (C-1-a). The siloxane resin may also have a combination of a plurality of siloxane resins constituted of different structural units. Specific examples of the siloxane resin having two or more types of structural units represented by the formula (C-1-a) include siloxane resins represented by the following structural formulas (C-1-1) to (C-1-3).

(C-1-1)
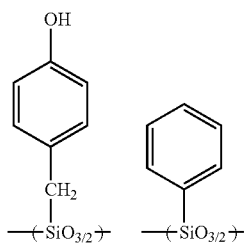

(C-1-2)
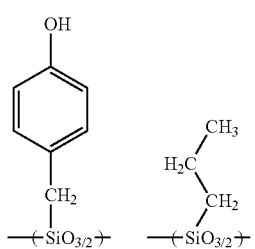

(C-1-3)
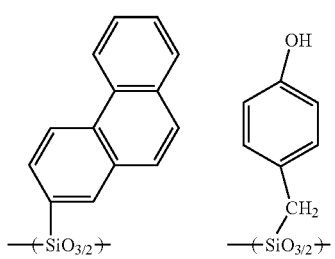

The siloxane resin may have, for example, a constituting unit represented by the following formula (C-1-4).

(C-1-4)

In the formula (C-1-4), $R^{13}$ represents an organic group having at least one group selected from the group consisting of a (meth)acrylic group, a vinyl group, and an epoxy group in the structure. The at least one group selected from the group consisting of a (meth)acrylic group, a vinyl group, and an epoxy group may be bonded to a Si atom directly or via a linking group. The linking group may be, for example, a linear or branched alkylene group having 1 or more and 10 or less carbon atoms, an arylene group having 1 or more and 10 or less carbon atoms, or a divalent group in which these groups are combined. The linking group may have an ether bond, an amino bond, or an amide bond.

Examples of a constituting unit represented by (C-1-4) include, but are not limited to, the following units.

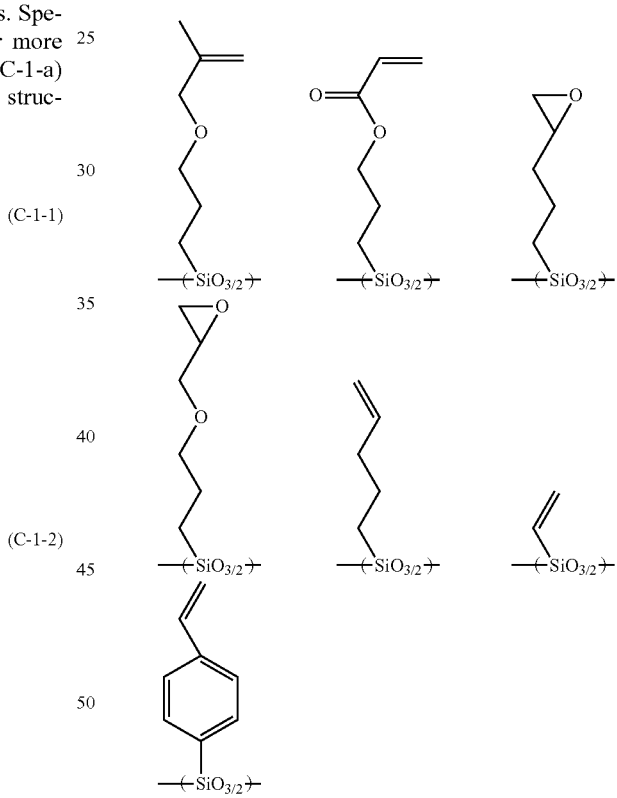

When $R^{13}$ has an epoxy group, examples of suitable $R^{13}$ include a 2-(3,4-epoxycyclohexyl)ethyl group and a 2-(3,4-epoxycyclohexyl)propyl group.

The siloxane resin may have, for example, a constituting unit represented by the following formula (C-1-5).

(C-1-5)

In the formula (C-1-5), $R^{14}$ represents an organic group having at least one carboxy group in the structure. The carboxy group is preferably bonded to a Si atom via a linking group, and the linking group is, for example, a linear or branched alkylene group having 1 or more and 10 or less carbon atoms, a cycloalkylene group having 1 or more and 10 or less carbon atoms, an arylene group having 1 or more and 10 or less carbon atoms, or a divalent group in which these groups are combined. The linking group may have an ether bond, an amino bond, an amide bond, or a vinyl bond, and preferably has an amide bond. Examples of $R^{14}$ include, but are not limited to, the following groups. In the following formulas, * represents the position where $R^{14}$ is bonded to Si in the formula (C-1-5).

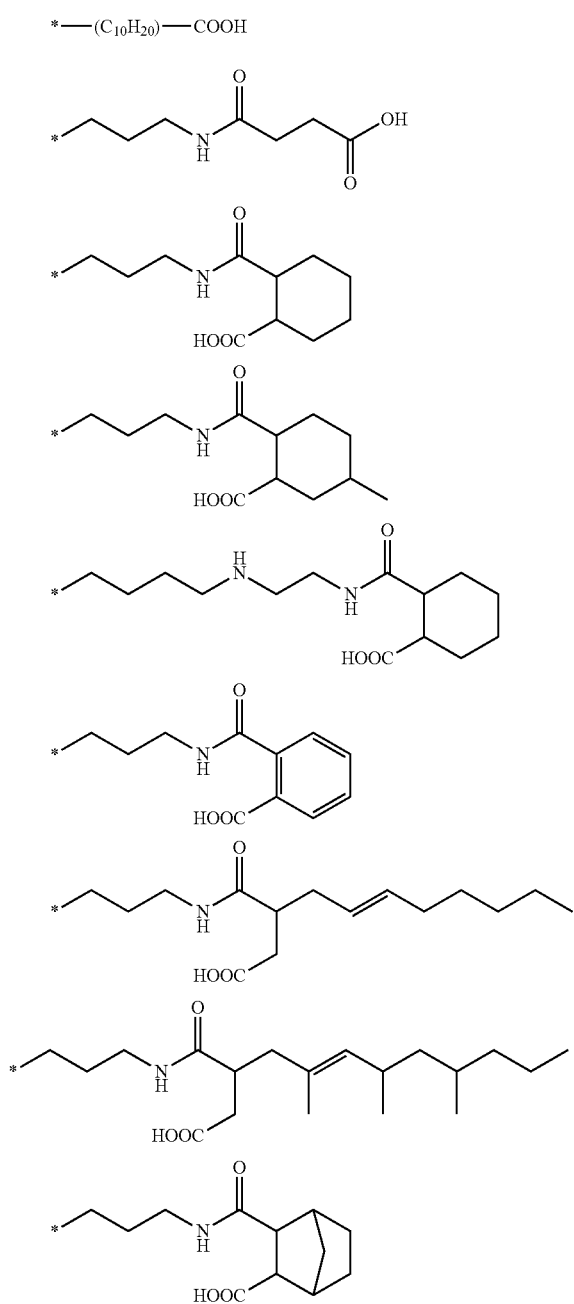

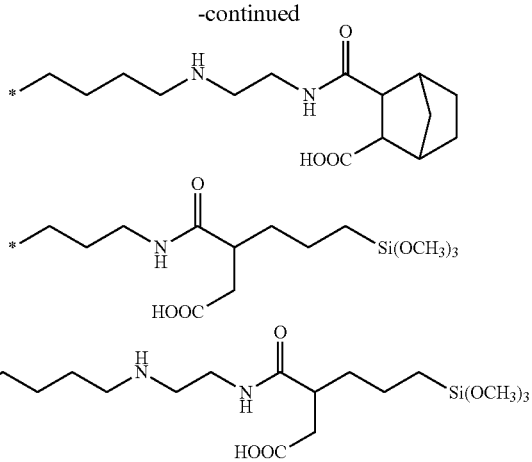

The liquid composition including the silicon-containing resin as the base component (C) may comprise a curing agent (D) described later. When the liquid composition comprises the curing agent (D) and (i) when the curing agent (D) includes a curing agent that generates a basic compounds component by the action of light or heat, (ii) when the liquid composition includes a photopolymerization initiator, a base generator, which will be described below, or the like, or (iii) when a method for producing a quantum dot-containing film described below comprises an exposure step, the siloxane resin preferably has a constituting unit represented by the formula (C-1-4). Similarly, in a case (iv) in which at least one (but except components corresponding to the curing agent (D)) selected from the group consisting of a photopolymerization initiator, an acid generator, and a base generator described below as other components is contained, the siloxane resin preferably has the constituting unit represented by the formula (C-1-4). The proportion of the constituting unit represented by the formula (C-1-4) in the siloxane resin is 10 mol % or more and 80 mole or less, for example. The siloxane resin may further have a structural unit represented by the formula (C-1-a) and/or a constituting unit represented by (C-1-5) as additional constituting units. The siloxane resin may have two or more types of constituting units represented by the respective formulas.

When the method for producing a quantum dot-containing film described below comprises a development step, the siloxane resin preferably has one or more constituting units selected from the group consisting of the constituting unit represented by the formula (C-1-5), a constituting unit having the structure represented by the formula ($R^1$-a), and a constituting unit having the structure represented by the formula ($R^1$-b). The proportion of the constituting unit selected from the group consisting of the constituting unit represented by the formula (C-1-5), the constituting unit having the structure represented by the formula ($R^1$-a), and the constituting unit having the structure represented by the formula ($R^1$-b) in the siloxane resin is 20 mol % or more and 90 mol % or less, for example. In this case, the siloxane resin may further have the structural unit represented by the formula (C-1-a) and/or the constituting unit represented by the formula (C-1-4) as additional constituting units, and the siloxane resin is preferably a siloxane resin having the constituting unit represented by (C-1-4) and the constituting unit represented by (C-1-5). The siloxane resin may have two or more types of constituting units represented by the respective formulas.

(Polysilane)

The structure of the polysilane is not particularly limited. The polysilane may have any of a linear structure, a branched structure, a mesh structure, and a cyclic structure, and preferably has a chain structure, namely, a linear structure or a branched structure. The polysilane may have a silanol group and/or an alkoxy group. Examples of a suitable polysilane include a polysilane essentially having at least one of the units represented by the following formulas (A5) and (A6) and optionally having at least one unit selected from units represented by the following formulas (A7), (A8), and (A9). The polysilane may have a silanol group or an alkoxy group bonded to a silicon atom.

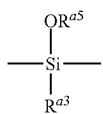 (A5)

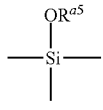 (A6)

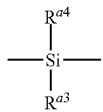 (A7)

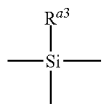 (A8)

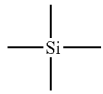 (A9)

In the formulas (A5), (A7), and (A8), $R^{a3}$ and $R^{a4}$ each represent a hydrogen atom, an organic group, or a silyl group; $R^{a5}$ represents a hydrogen atom or an alkyl group; and when $R^{a5}$ is an alkyl group, the alkyl group is preferably an alkyl group having 1 or more and 4 or less carbon atoms, more preferably a methyl group or an ethyl group.

Examples of the organic group as $R^{a3}$ and $R^{a4}$ include hydrocarbon groups such as alkyl groups, alkenyl groups, cycloalkyl groups, cycloalkenyl groups, aryl groups, and aralkyl groups, alkoxy groups, alkenyloxy groups, cycloalkoxy groups, cycloalkenyloxy groups, aryloxy groups, and aralkyloxy groups. Among these groups, alkyl groups, aryl groups, and aralkyl groups are preferable. Examples of suitable alkyl groups, aryl groups, and aralkyl groups are the same as the alkyl groups, the aryl groups, and the aralkyl groups as R in the above formula (C-a).

When each of $R^{a3}$ and $R^{a4}$ is a silyl group, examples of the silyl group include $Si_{1-10}$ silanyl groups (such as $Si_{1-6}$ silanyl groups) such as a silyl group, a disilanyl group and a trisilanyl group. The polysilane preferably has any of units represented by the following (A10) to (A13).

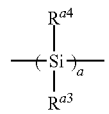 (A10)

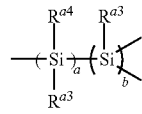 (A11)

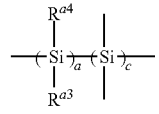 (A12)

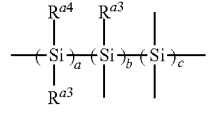 (A13)

In (A10) to (A13), $R^{a3}$ and $R^{a4}$ are the same as $R^{a3}$ and $R^{a4}$ in the formulas (A5), (A7), and (A8). Each of a, b, and c is an integer of 2 or more and 1,000 or less. Each of a, b, and c is preferably 10 or more and 500 or less, more preferably 10 or more and 100 or less. The constituting unit in each unit may be present in the unit either in a random manner or as a block.

Among the polysilanes described above, a polysilane in which an alkyl group is bonded to a silicon atom and an aryl group or an aralkyl group is also bonded to a silicon atom or a polysilane in which an alkyl group alone is bonded to a silicon atom is preferable. More specifically, a polysilane in which a methyl group is bonded to a silicon atom and a benzyl group is also bonded to a silicon atom, a polysilane in which a methyl group is bonded to a silicon atom and a phenyl group is also bonded to a silicon atom, or a polysilane in which a methyl group alone is bonded to a silicon atom is preferably used.

The mass average molecular weight of the polysilane is preferably 300 or more and 100,000 or less, more preferably 500 or more and 70,000 or less, further preferably 800 or more and 30,000 or less. Two or more polysilanes having different mass average molecular weights may be mixed together.

The content of the silicon-containing resin (A) in the liquid composition is not particularly limited and may be determined depending on the desired film thickness. From the viewpoint of film-forming properties, the content of the silicon-containing resin in the liquid composition is preferably 1% by mass or more and 50% by mass or less, more preferably 5% by mass or more and 40% by mass or less, particularly preferably 10, by mass or more and 35% by mass or less.

The content of the base component (C) in the liquid composition is not limited as long as a desired amount of the quantum dots (A) is included in the liquid composition, and (A):(C) in terms of the mass ratio is preferably 99:1 to 1:99, and more preferably 90:10 to 10:90.

<Curing Agent (D)>

In the case in which the liquid composition includes, as the base component (C), a component such as an epoxy compound or an oxetane compound, a photocurable component, and/or a silicon-containing resin, the liquid composition preferably includes a curing agent (D) as a component for curing the base component (C). Here, in the present description, the curing agent (D) is not particularly limited as long as the curing agent (D) can cause curing of the base component (C). For example, the so-called photopolymerization initiator and the like falls under the curing agent (D) in the present description. It should be noted that in the case in which the base component (C) included in the liquid composition is an epoxy compound or an oxetane compound having a functional group such as a carboxy group, a carboxylic anhydride group or an amino group, which is reactive with an epoxy group or an oxetanyl group, the liquid composition does not necessarily contain the curing agent.

[Photopolymerization Initiator (D1)]

A photopolymerization initiator (D1) is used in combination with the photocurable base component (C) having an unsaturated double bond and cures the photocurable base component (C) through light exposure. The photopolymerization initiator (D1) is not particularly limited and may be a conventionally known photopolymerization initiator.

Specific examples of the photopolymerization initiator (D1) include 1-hydroxycyclohexyl phenyl ketone, 2-hydroxy-2-methyl-1-phenylpropan-1-one, 1-[4-(2-hydroxyethoxy)phenyl]-2-hydroxy-2-methyl-1-propan-1-one, 1-(4-isopropylphenyl)-2-hydroxy-2-methylpropan-1-one, 1-(4-dodecylphenyl)-2-hydroxy-2-methylpropan-1-one, 2,2-dimethoxy-1,2-diphenylethan-1-one, bis(4-dimethylaminophenyl) ketone, 2-methyl-1-[4-(methylthio)phenyl]-2-morpholinopropan-1-one, 2-benzyl-2-dimethylamino-1-(4-morpholinophenyl)-butan-1-one, O-acetyl-1-[6-(2-methylbenzoyl)-9-ethyl-9H-carbazol-3-yl]ethanone oxime, (9-ethyl-6-nitro-9H-carbazol-3-yl) [4-(2-methoxy-1-methylethoxy)-2-methylphenyl]methanon O-acetyloxime, 1,2-octanedione, 1-[4-(phenylthio)-, 2-(benzoyloxime), 2,4,6-trimethylbenzoyldiphenylphosphine oxide, 4-benzoyl-4'-methyldimethyl sulfide, 4-dimethylaminobenzoic acid, methyl 4-dimethylaminobenzoate, ethyl 4-dimethylaminobenzoate, butyl 4-dimethylaminobenzoate, 4-dimethylamino-2-ethylhexylbenzoic acid, 4-dimethylamino-2-isoamylbenzoic acid, benzyl-β-methoxyethyl acetal, benzyl dimethyl ketal, 1-phenyl-1,2-propanedion-2-(O-ethoxycarbonyl) oxime, methyl o-benzoylbenzoate, 2,4-diethylthioxanthone, 2-chlorothioxanthone, 2,4-dimethylthioxanthone, 1-chloro-4-propoxythioxanthone, thioxanthene, 2-chlorothioxanthene, 2,4-diethylthioxanthene, 2-methylthioxanthene, 2-isopropylthioxanthene, 2-ethylanthraquinone, octamethylanthraquinone, 1,2-benzanthraquinone, 2,3-diphenylanthraquinone, azobisisobutyronitrile, benzoyl peroxide, cumene hydroperoxide, 2-mercaptobenzimidazole, 2-mercaptobenzoxazole, 2-mercaptobenzothiazole, 2-(o-chlorophenyl)-4,5-di(m-methoxyphenyl)-imidazolyl dimer, benzophenone, 2-chlorobenzophenone, p,p'-bisdimethylaminobenzophenone, 4,4'-bisdiethylaminobenzophenone, 4,4'-dichlorobenzophenone, 3,3-dimethyl-4-methoxybenzophenone, benzil, benzoin, benzoin methyl ether, benzoin ethyl ether, benzoin isopropyl ether, benzoin-n-butyl ether, benzoin isobutyl ether, benzoin butyl ether, acetophenone, 2,2-diethoxyacetophenone, p-dimethylacetophenone, p-dimethylaminopropiophenone, dichloroacetophenone, trichloroacetophenone, p-tert-butylacetophenone, p-dimethylaminoacetophenone, p-tert-butyltrichloroacetophenone, p-tert-butyldichloroacetophenone, α,α-dichloro-4-phenoxyacetophenone, thioxanthone, 2-methylthioxanthone, 2-isopropylthioxanthone, dibenzosuberone, pentyl 4-dimethylaminobenzoate, 9-phenylacridine, 1,7-bis-(9-acridinyl)heptane, 1,5-bis-(9-acridinyl)pentane, 1,3-bis-(9-acridinyl)propane, p-methoxytriazine, 2,4,6-tris(trichloromethyl)-s-triazine, 2-methyl-4,6-bis(trichloromethyl)-s-triazine, 2-[2-(5-methylfuran-2-yl)ethenyl]-4,6-bis(trichloromethyl)-s-triazine, 2-[2-(furan-2-yl)ethenyl]-4,6-bis(trichloromethyl)-s-triazine, 2-[2-(4-diethylamino-2-methylphenyl)ethenyl]-4,6-bis(trichloromethyl)-s-triazine, 2-[2-(3,4-dimethoxyphenyl)ethenyl]-4,6-bis(trichloromethyl)-s-triazine, 2-(4-methoxyphenyl)-4,6-bis(trichloromethyl)-s-triazine, 2-(4-ethoxystyryl)-4,6-bis(trichloromethyl)-s-triazine, 2-(4-n-butoxyphenyl)-4,6-bis(trichloromethyl)-s-triazine, 2,4-bis-trichloromethyl-6-(3-bromo-4-methoxy)phenyl-s-triazine, 2,4-bis-trichloromethyl-6-(2-bromo-4-methoxy)phenyl-s-triazine, 2,4-bis-trichloromethyl-6-(3-bromo-4-methoxy) styrylphenyl-s-triazine, and 2,4-bis-trichloromethyl-6-(2-bromo-4-methoxy)styrylphenyl-s-triazine. The photopolymerization initiator (D1) may be used either individually or in combination of two or more.

Among these, an oxime-type photopolymerization initiator is particularly preferable from the viewpoint of sensitivity. Examples of the particularly preferable oxime-type photopolymerization initiator include O-acetyl-1-[6-(2-methylbenzoyl)-9-ethyl-9H-carbazol-3-yl]ethanone oxime, O-acetyl-1-[6-(2-methylbenzoyl)-9-ethyl-9H-carbazol-3-yl] ethanone oxime, and 1,2-octanedione, 1-[4-(phenylthio)-, 2-(O-benzoyloxime)]. In addition, an oxime ester compound described later as a curing agent for a silicon-containing resin is also preferably used as the photopolymerization initiator.

The content of the photopolymerization initiator (D1) is preferably 0.5 parts by mass or more and 30 parts by mass or less, more preferably 1 part by mass or more and 20 parts by mass or less parts by mass relative to 100 parts by mass of the solid content of the liquid composition.

The photopolymerization initiator (D1) may be used in combination with a photoinitiator aid. Examples of the photoinitiator aid include triethanolamine, methyldiethanolamine, triisopropanolamine, methyl 4-dimethylaminobenzoate, ethyl 4-dimethylaminobenzoate, isoamyl 4-dimethylaminobenzoate, 2-ethylhexyl 4-dimethylaminobenzoate, 2-dimethylaminoethyl benzoate, N,N-dimethyl-p-toluidine, 4,4'-bis(dimethylamino)benzophenone, 9,10-dimethoxyanthracene, 2-ethyl-9,10-dimethoxyanthracene, 9,10-diethoxyanthracene, 2-ethyl-9,10-diethoxyanthracene, and thiol compounds such as 2-mercaptobenzothiazole, 2-mercaptobenzoxazole, 2-mercaptobenzimidazole, 2-mercapto-5-methoxybenzothiazole, 3-mercaptopropionic acid, methyl 3-mercaptopropionate, pentaerythritol tetramercaptoacetate, and 3-mercaptopropionate. The photoinitiator aid may be used either individually or in combination of two or more.

[Onium Salt (D2)]

The onium salt (D2) can be used together with an epoxy-group-containing resin, an epoxy compound, an oxetane compound, or the like, and accelerates curing of the epoxy-group-containing resin, the epoxy compound, the oxetane compound or the like by the action of light or heat. The onium salt is exemplified by a diazonium salt, an ammonium salt, an iodonium salt, a sulfonium salt, a phosphonium salt, an oxonium salt, and the like. Among these, a sulfonium salt and an iodonium salt are preferable in light of availability and favorable curing.

Next, examples of a preferable onium salt (D2) are described. As a preferable example of the onium salt (D2), a sulfonium salt represented by the following formula (D-I) (hereinafter, also referred to as "sulfonium salt (Q)") can be mentioned.

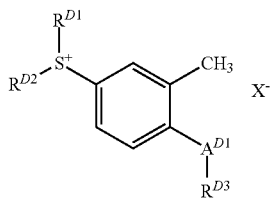
(D-I)

In the formula (D-I), $R^{D1}$ and $R^{D2}$ independently represent an alkyl group optionally substituted with a halogen atom or a group represented by the following formula (D-II); $R^{D1}$ and $R^{D2}$ may be bonded to each other to form a ring together with the sulfur atom in the formula; $R^3$ represents a group represented by the following formula (D-III) or a group represented by the following formula (D-IV); $A^{D1}$ represents S, O or Se; $X^-$ represents a monovalent anion; with the proviso that $R^{D1}$ and $R^{D2}$ are not simultaneously an alkyl group optionally substituted with a halogen atom.

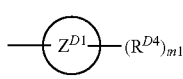
(D-II)

In the formula (D-II), a ring $Z^{D1}$ represents an aromatic hydrocarbon ring; $R^{D4}$ represents an alkyl group optionally substituted with a halogen atom, a hydroxy group, an alkoxy group, an alkylcarbonyl group, an alkoxycarbonyl group, an acyloxy group, an alkylthio group, a thienyl group, a thienylcarbonyl group, a furanyl group, a furanylcarbonyl group, a selenophenyl group, a selenophenylcarbonyl group, a heterocyclic aliphatic group, an alkylsulfinyl group, an alkylsulfonyl group, a hydroxy(poly)alkyleneoxy group, an optionally substituted amino group, a cyano group, a nitro group or a halogen atom; and m1 represents an integer of 0 or more.

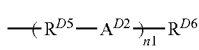
(D-III)

In the formula (D-III), $R^{D5}$ represents an alkylene group optionally substituted with a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, an aryl group, a heterocyclic group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group or a halogen atom, or a group represented by the following formula (D-V); $R^{D6}$ represents an alkyl group optionally substituted with a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, an aryl group, a heterocyclic group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group or a halogen atom, or a group represented by the following formula (D-VI); $A^{D2}$ represents a single bond, S, O, a sulfinyl group or a carbonyl group; and n1 represents 0 or 1.

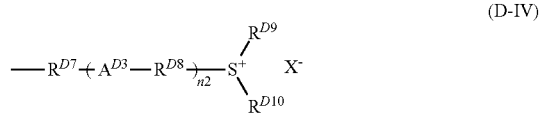
(D-IV)

In the formula (D-IV), $R^{D7}$ and $R^{D8}$ independently represent an alkylene group optionally substituted with a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, an aryl group, a heterocyclic group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group or a halogen atom, or a group represented by the following formula (D-V); $R^{D9}$ and $R^{D10}$ independently represent an alkyl group optionally substituted with a halogen atom or a group represented by the above formula (D-II); $R^{D9}$ and $R^{D10}$ may be bonded to each other to form a ring together with the sulfur atom in the formula; $A^{D3}$ represents a single bond, S, O, a sulfinyl group or a carbonyl group; $X^-$ is the same as defined above; n2 represents 0 or 1; with the proviso that $R^{D9}$ and $R^{D10}$ are not simultaneously an alkyl group optionally substituted with a halogen atom.

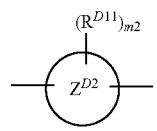
(D-V)

In the formula (D-V), a ring $Z^{D2}$ represents an aromatic hydrocarbon ring; $R^{D11}$ represents an alkyl group optionally substituted with a halogen atom, a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, an aryl group, a heterocyclic group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group or a halogen atom; and m2 represents an integer of 0 or more.

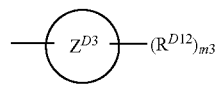
(D-VI)

In the formula (D-VI), a ring $Z^{D3}$ represents an aromatic hydrocarbon ring; $R^{D12}$ represents an alkyl group optionally substituted with a halogen atom, a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, a thienylcarbonyl group, a furanylcarbonyl group, a selenophenylcarbonyl group, an aryl group, a heterocyclic group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group or a halogen atom; and m3 represents an integer of 0 or more.

(Sulfonium Salt (Q))

The sulfonium salt (Q) will now be described. The sulfonium salt (Q) is characterized in that a methyl group is bonded to the carbon atom at the ortho position of the carbon atom to which $A^{D1}$ is bonded in the benzene ring in the above formula (D-I). Because of the methyl group at the above-described position, the sulfonium salt (Q) easily generates a proton and is highly sensitive to active energy rays such as ultraviolet rays compared to conventional sulfonium salts.

In the above formula (D-I), both of $R^{D1}$ and $R^{D2}$ are preferably a group represented by the above formula (D-II). $R^{D1}$ and $R^{D2}$ may be the same or different. In the formula (D-I), when $R^{D1}$ and $R^{D2}$ are bonded to each other to form a ring together with the sulfur atom in the formula, the number of atoms constituting a ring formed is preferably 3 or more and 10 or less including the sulfur atom, and more preferably 5 or more and 7 or less. The ring thus formed may be a polycyclic ring, and is preferably a polycyclic ring obtained by condensation of monocycles in which the number of atoms constituting the rings is 5 or more and 7 or less. In the above formula (D-I), both $R^{D1}$ and $R^{D2}$ are preferably a phenyl group. In the above formula (D-I), $R^{D3}$ is preferably a group represented by the above formula (D-III). In the above formula (D-I), $A^{D1}$ is preferably S or O, and more preferably S.

In the above formula (D-II), $R^{D4}$ is preferably an alkyl group optionally substituted with a halogen atom, a hydroxy group, an alkylcarbonyl group, a thienylcarbonyl group, a furanylcarbonyl group, a selenophenylcarbonyl group, an optionally substituted amino group or a nitro group, and more preferably an alkyl group optionally substituted with a halogen atom, an alkylcarbonyl group or a thienylcarbonyl group. In the above formula (D-II), m1 can be selected depending on the type of the ring $Z^{D1}$, and may be, for example, an integer of 0 or more and 4 or less, preferably an integer of 0 or more and 3 or less, and more preferably an integer of 0 or more and 2 or less.

In the above formula (D-III), $R^{D5}$ is preferably an alkylene group; an alkylene group substituted with a hydroxy group, an optionally substituted amino group or a nitro group; or a group represented by the above formula (D-V); and more preferably a group represented by the above formula (D-V). In the above formula (D-III), $R^{D6}$ is preferably an alkyl group; an alkyl group substituted with a hydroxy group, an optionally substituted amino group or a nitro group; or a group represented by the above formula (D-VI); and more preferably a group represented by the above formula (D-VI). In the above formula (D-III), $A^{D2}$ is preferably S or O, and more preferably S. In the above formula (D-III), n1 is preferably 0.

In the above formula (D-IV), $R^{D7}$ and $R^{D8}$ are independently preferably an alkylene group; an alkylene group substituted with a hydroxy group, an optionally substituted amino group or a nitro group; or a group represented by the above formula (D-V); and more preferably a group represented by the above formula (D-V). $R^{D7}$ and $R^{D8}$ may be the same or different. In the above formula (D-IV), both $R^{D9}$ and $R^{D10}$ are preferably a group represented by the above formula (D-II). $R^{D9}$ and $R^{D10}$ may be the same or different. In the above formula (D-IV), when $R^{D9}$ and $R^{D10}$ are bonded to each other to form a ring together with the sulfur atom in the formula, the number of atoms constituting a ring formed is preferably 3 or more and 10 or less including the sulfur atom, and more preferably 5 or more and 7 or less. The ring thus formed may be a polycyclic ring, and is preferably a polycyclic ring obtained by condensation of monocycles in which the number of atoms constituting the rings is 5 or more and 7 or less. In the above formula (D-IV), $A^{C3}$ is preferably S or O, and more preferably S. In the above formula (D-IV), n2 is preferably 0.

In the above formula (D-V), $R^{D11}$ is preferably an alkyl group optionally substituted with a halogen atom, a hydroxy group, an optionally substituted amino group or a nitro group, and more preferably an alkyl group optionally substituted with a halogen atom. In the above formula (D-V), m2 can be selected depending on the type of the ring $Z^{D2}$, and may be, for example, an integer of 0 or more and 4 or less, preferably an integer of 0 or more and 3 or less, and more preferably an integer of 0 or more and 2 or less.

In the above formula (D-VI), $R^{D12}$ is preferably an alkyl group optionally substituted with a halogen atom, a hydroxy group, an alkylcarbonyl group, a thienylcarbonyl group, a furanylcarbonyl group, a selenophenylcarbonyl group, an optionally substituted amino group or a nitro group, and more preferably an alkyl group optionally substituted with a halogen atom, an alkylcarbonyl group or a thienylcarbonyl group. In the above formula (D-VI), m3 can be selected depending on the type of the ring $Z^{D3}$ and may be, for example, an integer of 0 or more and 4 or less, preferably an integer of 0 or more and 3 or less, and more preferably an integer of 0 or more and 2 or less.

In the above formula (D-I), $X^-$ is a monovalent anion. Suitable examples of $X^-$ include a monovalent polyatomic anion, and $X^-$ is more preferably an anion represented by $MY_a^-$, $(Rf)_b PF_{6-b}^-$, $R^{x1}_c BY_{4-c}^-$, $R^{x1}_c GaY_{4-c}^-$, $R^{x2}SO_3^-$, $(R^{x2}SO_2)_3C^-$ or $(R^{x2}SO_2)_2N^-$. In addition, $X^-$ may be a halogen anion and examples thereof include a fluoride ion, a chloride ion, a bromide ion, an iodide ion and the like.

M represents a phosphorus atom, a boron atom or an antimony atom. Y represents a halogen atom (preferably a fluorine atom).

Rf represents an alkyl group in which 80 mol % or higher of hydrogen atoms are substituted with fluorine atoms (an alkyl group having 1 or more and 8 or less carbon atoms is preferred). Examples of the alkyl group which is used as Rf by fluorine substitution include linear alkyl groups such as methyl, ethyl, propyl, butyl, pentyl and octyl, branched alkyl groups such as isopropyl, isobutyl, sec-butyl and tert-butyl, and cycloalkyl groups such as cyclopropyl, cyclobutyl, cyclopentyl and cyclohexyl and the like. The proportion of hydrogen atoms substituted with fluorine atoms in these alkyl groups in Rf is preferably 80 mol % or higher, further preferably 90% or higher, particularly preferably 100% based on the number of moles of hydrogen atoms included in an original alkyl group. When the proportion of substitution with fluorine atoms is within these preferred ranges, the sulfonium salt (Q) has a further good light sensitivity. Particularly preferred examples of Rf include $CF_3^-$, $CF_3CF_2^-$, $(CF_3)_2CF^-$, $CF_3CF_2CF_2^-$, $CF_3CF_2CF_2CF_2^-$, $(CF_3)_2CFCF_2^-$, $CF_3CF_2(CF_3)CF^-$ and $(CF_3)_3C^-$. The b number of Rf are independent from each other and thus may be the same or different.

P represents a phosphorus atom, and F represents a fluorine atom.

$R^{x1}$ represents a phenyl group in which part of the hydrogen atoms are substituted with at least one element or electron-withdrawing group. Examples of the one element include halogen atoms such as a fluorine atom, a chlorine atom and a bromine atom. Examples of the electron-withdrawing group include a trifluoromethyl group, a nitro group and a cyano group, and the like. Among these, a phenyl group in which at least one hydrogen atom is substituted with a fluorine atom or a trifluoromethyl group is preferred. The c number of $R^{x1}$ are independent from each other and thus may be the same or different.

B represents a boron atom, and Ga represents a gallium atom.

$R^{x2}$ represents an alkyl group having 1 or more and 20 or less carbon atoms, a fluoroalkyl group having 1 or more and 20 or less carbon atoms, or an aryl group having 6 or more and 20 or less carbon atoms, the alkyl group and the fluoroalkyl group may be linear, branched or cyclic, and the alkyl group, fluoroalkyl group or aryl group may be unsubstituted or have a substituent. Examples of the above substituent include a hydroxy group, an optionally substituted amino group (for example, groups exemplified in the description described below regarding the above formulas (D-II) to (D-VI)), and a nitro group, and the like. In addition, the carbon chain of the alkyl group, fluoroalkyl group or aryl group represented by $R^{x2}$ may have a heteroatom such as an oxygen atom, a nitrogen atom or a sulfur atom. In particular, the carbon chain of the alkyl group or fluoroalkyl group represented by $R^{x2}$ may have a divalent functional group (for example, an ether bond, a carbonyl bond, an ester bond, an amino bond, an amide bond, an imide bond, a sulfonyl bond, a sulfonylamide bond, a sulfonylimide bond, a urethane bond, etc.). When the alkyl group, fluoroalkyl group or aryl group represented by $R^{x2}$ has the above substituent, heteroatom or functional group, the number of the above substituents, heteroatoms or functional groups may be one or two or more.

S represents a sulfur atom, O represents an oxygen atom, C represents a carbon atom, and N represents a nitrogen atom.

a represents an integer of 4 or more and 6 or less.

b is preferably an integer of 1 or more and 5 or less, further preferably an integer of 2 or more and 4 or less, and particularly preferably 2 or 3.

c is preferably an integer of 1 or more and 4 or less, and further preferably 4.

Examples of the anion represented by $MY_a^-$ include an anion represented by $SbF_6^-$, $PF_6^-$ or $BF_4^-$, and the like.

Examples of the anion represented by $(Rf)_b PF_{6-b}^-$ include an anion represented by $(CF_3CF_2)_2PF_4^-$, $(CF_3CF_2)_3PF_3^-$, $((CF_3)_2CF)_2PF_4^-$, $((CF_3)_2CF)_3PF_3^-$, $(CF_3CF_2CF_2)_2PF_4^-$, $(CF_3CF_2CF_2)_3PF_3^-$, $((CF_3)_2CFCF_2)_2PF_4^-$, $((CF_3)_2CFCF_2)_3PF_3^-$, $(CF_3CF_2CF_2CF_2)_2PF_4^-$ or $(CF_3CF_2CF_2CF_2)_3PF_3^-$, and the like. Among these, an anion represented by $(CF_3CF_2)_3PF_3^-$, $(CF_3CF_2CF_2)_3PF_3^-$, $((CF_3)_2CF)_3PF_3^-$, $((CF_3)_2CF)_2PF_4^-$, $((CF_3)_2CFCF_2)_3PF_3^-$ or $((CF_3)_2CFCF_2)_2PF_4^-$ is preferred.

The anion represented by $R^{x1}_c BY_{4-c}^-$ is preferably:

$R^{x1}_c BY_{4-c}^-$, herein $R^{x1}$ represents a phenyl group in which at least part of hydrogen atoms are substituted with a halogen atom or an electron-withdrawing group, Y represents a halogen atom, and c represents an integer of 1 or more and 4 or less, and examples thereof include an anion represented by $(C_6F_5)_4B^-$, $((CF_3)_2C_6H_3)_4B^-$, $(CF_3C_6H_4)_4B^-$, $(C_6F_5)_2BF_2^-$, $C_6F_5BF_3^-$ or $(C_6H_3F_2)_4B^-$, and the like. Among these, an anion represented by $(C_6F_5)_4B^-$ or $((CF_3)_2C_6H_3)_4B^-$ is preferred.

Examples of the anion represented by $R^{x1}_c GaY_{4-c}^-$ include an anion represented by $(C_6F_5)_4Ga^-$, $((CF_3)_2C_6H_3)_4Ga^-$, $(CF_3C_6H_4)_4Ga^-$, $(C_6F_5)_2GaF_2^-$, $C_6F_5GaF_3^-$ or $(C_6H_3F_2)_4Ga^-$, and the like. Among these, an anion represented by $(C_6F_5)_4Ga^-$ or $((CF_3)_2C_6H_3)_4Ga^-$ is further preferred.

Examples of the anion represented by $R^{x2}SO_3^-$ include a trifluoromethanesulfonate anion, a pentafluoroethanesulfonate anion, a heptafluoropropanesulfonate anion, a nonafluorobutanesulfonate anion, a pentafluorophenylsulfonate anion, a p-toluenesulfonate anion, a benzenesulfonate anion, a camphorsulfonate anion, a methanesulfonate anion, an ethanesulfonate anion, a propanesulfonate anion and a butanesulfonate anion, and the like. Among these, a trifluoromethanesulfonate anion, a nonafluorobutanesulfonate anion, a methanesulfonate anion, a butanesulfonate anion, a camphorsulfonate anion, a benzenesulfonate anion or a p-toluenesulfonate anion is further preferred.

Examples of the anion represented by $(R^{x2}SO_2)_3C^-$ include an anion represented by $(CF_3SO_2)_3C^-$, $(C_2F_5SO_2)_3C^-$, $(C_3F_7SO_2)_3C^-$ or $(C_4F_9SO_2)_3C^-$, and the like.

Examples of the anion represented by $(R^{x2}SO_2)_2N^-$ include an anion represented by $(CF_3SO_2)_2N^-$, $(C_2F_5SO_2)_2N^-$, $(C_3F_7SO_2)_2N^-$ or $(C_4F_9SO_2)_2N^-$, and the like.

As the monovalent polyatomic anion, in addition to an anion represented by $MY_a^-$, $(Rf)_b PF_{6-b}^-$, $R^{x1}_c BY_{4-c}^-$, $R^{x1}_c GaY_{4-c}^-$, $R^{x2}SO_3^-$, $(R^{x2}SO_2)_3C^-$ or $(R^{x2}SO_2)_2N^-$, perhalogenate ions (such as $ClO_4^-$ and $BrO_4^-$), halogenated sulfonate ions (such as $FSO_3^-$ and $ClSO_3^-$), sulfate ions (such as $CH_3SO_4^-$, $CF_3SO_4^-$ and $HSO_4^-$), carbonate ions (such as $HCO_3^-$ and $CH_3CO_3^-$), aluminate ions (such as $AlCl_4^-$ and $AlF_4^-$), hexafluorobismuthate ion ($BiF_6^-$), carboxylate ions (such as $CH_3COO^-$, $CF_3COO^-$, $C_6H_5COO^-$, $CH_3C_6H_4COO^-$, $C_6H_5COO^-$ and $CF_3C_6H_4COO^-$), arylborate ions (such as $B(C_6H_5)_4^-$ and $CH_3CH_2CH_2CH_2B(C_6H_5)_3^-$), thiocyanate ion ($SCN^-$), and nitrate ion ($NO_3^-$), and the like can be used.

Among these $X^-$, anions represented by $MY_a^-$, $(Rf)_b PF_{6-b}^-$, $R^{x1}_c BY_{4-c}^-$, $R^{x1}_c GaY_{4-c}^-$ and $(R^{x2}SO_2)_3C^-$ are preferred, $SbF_6^-$, $PF_6^-$, $(CF_3CF_2)_3PF_3^-$, $(C_6F_5)_4B^-$, $((CF_3)_2C_6H_3)_4B^-$, $(C_6F_5)_4Ga^-$, $((CF_3)_2C_6H_3)_4Ga^-$ and $(CF_3SO_2)_3C^-$ are more preferred, and $R^{x1}_c BY_{4-c}^-$ is further preferred from the viewpoint of cationic polymerization performance.

Examples of the aromatic hydrocarbon ring in the above formulas (D-II), (D-V) and (D-VI) include a benzene ring, condensed polycyclic aromatic hydrocarbon rings [for example, condensed di- to tetracyclic aromatic hydrocarbon rings such as condensed dicyclic hydrocarbon rings (preferably $C_{3-20}$ condensed dicyclic hydrocarbon rings such as a naphthalene ring, and more preferably $C_{10-16}$ condensed dicyclic hydrocarbon rings) and condensed tricyclic aromatic hydrocarbon rings (for example, an anthracene ring, a phenanthrene ring, etc.)] and the like. The aromatic hydrocarbon ring is preferably a benzene ring or a naphthalene ring, more preferably a benzene ring.

Examples of the halogen atom in the above formulas (D-I) to (D-VI) include a fluorine atom, a chlorine atom, a bromine atom and an iodine atom, and the like.

Examples of the alkyl group in the above formulas (D-I) to (D-VI) include linear alkyl groups having 1 or more and 18 or less carbon atoms such as a methyl group, an ethyl group, an n-propyl group, an n-butyl group, an n-pentyl group, an n-octyl group, an n-decyl group, an n-dodecyl group, an n-tetradecyl group, an n-hexadecyl group, and an n-octadecyl group, branched alkyl groups having 3 or more and 18 or less carbon atoms such as an isopropyl group, an isobutyl group, a sec-butyl group, a tert-butyl group, an isopentyl group, a neopentyl group, a tert-pentyl group, an isohexyl group, and an isooctadecyl group, and cycloalkyl groups having 3 or more and 18 or less carbon atoms such as a cyclopropyl group, a cyclobutyl group, a cyclopentyl group, a cyclohexyl group, and a 4-decylcyclohexyl group. In particular, the alkyl group optionally substituted with a halogen atom in the above formulas (D-I), (D-II) and (D-IV) to (D-VI) means an alkyl group and an alkyl group substituted with a halogen atom. Examples of the alkyl group substituted with a halogen atom include groups in which at least one hydrogen atom in the above linear alkyl groups, branched alkyl groups or cycloalkyl groups is substituted with a halogen atom, and the like. Specific examples of a preferred alkyl group substituted with a halogen atom include a monofluoromethyl group, a difluoromethyl group and a trifluoromethyl group. Among the alkyl groups optionally substituted with a halogen atom, $R^{D1}$, $R^{D2}$, $R^{D9}$ or $R^{D10}$ is particularly preferably a trifluoromethyl group, and $R_{D4}$, $R^{D6}$, $R^{D11}$ or $R^{D12}$ is particularly preferably a methyl group.

Examples of the alkoxy group in the above formulas (D-II) to (D-VI) include linear or branched alkoxy groups having 1 or more and 18 or less carbon atoms such as a methoxy group, an ethoxy group, a propoxy group, an isopropoxy group, a butoxy group, an isobutoxy group, a sec-butoxy group, a tert-butoxy group, a hexyloxy group, a decyloxy group, a dodecyloxy group and an octadecyloxy group, and the like.

Examples of the alkyl group in the alkylcarbonyl group in the above formulas (D-II) to (D-VI) include the above linear alkyl groups having 1 or more and 18 or less carbon atoms, branched alkyl groups having 3 or more and 18 or less carbon atoms, or cycloalkyl groups having 3 or more and 18 or less carbon atoms, and examples of the alkylcarbonyl group include linear, branched or cyclic alkylcarbonyl groups having 2 or more and 18 or less carbon atoms such as an acetyl group, a propionyl group, a butanoyl group, a 2-methylpropionyl group, a heptanoyl group, a 2-methylbutanoyl group, a 3-methylbutanoyl group, an octanoyl group, a decanoyl group, a dodecanoyl group, an octadecanoyl group, a cyclopentanoyl group and a cyclohexanoyl group, and the like.

Examples of the arylcarbonyl group in the above formulas (D-III) to (D-VI) include arylcarbonyl groups having 7 or more and 11 or less carbon atoms such as a benzoyl group and a naphthoyl group, and the like.

Examples of the alkoxycarbonyl group in the above formulas (D-II) to (D-VI) include linear or branched alkoxycarbonyl groups having 2 or more and 19 or less carbon atoms such as a methoxycarbonyl group, an ethoxycarbonyl group, a propoxycarbonyl group, an isopropoxycarbonyl group, a butoxycarbonyl group, an isobutoxycarbonyl group, a sec-butoxycarbonyl group, a tert-butoxycarbonyl group, an octyloxycarbonyl group, a tetradecyloxycarbonyl group and an octadecyloxycarbonyl group, and the like.

Examples of the aryloxycarbonyl group in the above formulas (D-III) to (D-VI) include aryloxycarbonyl groups having 7 or more and 11 or less carbon atoms such as a phenoxycarbonyl group and a naphthoxycarbonyl group, and the like.

Examples of the arylthiocarbonyl group in the above formulas (D-III) to (D-VI) include arylthiocarbonyl groups having 7 or more and 11 or less carbon atoms such as a phenylthiocarbonyl group and a naphthoxythiocarbonyl group, and the like.

Examples of the acyloxy group in the above formulas (D-II) to (D-VI) include linear or branched acyloxy groups having 2 or more and 19 or less carbon atoms such as an acetoxy group, an ethylcarbonyloxy group, a propylcarbonyloxy group, an isopropylcarbonyloxy group, a butylcarbonyloxy group, an isobutylcarbonyloxy group, a sec-butylcarbonyloxy group, a tert-butylcarbonyloxy group, an octylcarbonyloxy group, a tetradecylcarbonyloxy group and an octadecylcarbonyloxy group, and the like.

Examples of the arylthio group in the above formulas (D-III) to (D-VI) include arylthio groups having 6 or more and 20 or less carbon atoms such as a phenylthio group, a 2-methylphenylthio group, a 3-methylphenylthio group, a 4-methylphenylthio group, a 2-chlorophenylthio group, a 3-chlorophenylthio group, a 4-chlorophenylthio group, a 2-bromophenylthio group, a 3-bromophenylthio group, a 4-bromophenylthio group, a 2-fluorophenylthio group, a 3-fluorophenylthio group, a 4-fluorophenylthio group, a 2-hydroxyphenylthio group, a 4-hydroxyphenylthio group, a 2-methoxyphenylthio group, a 4-methoxyphenylthio group, 1-naphthylthio group, 2-naphthylthio group, a 4-[4-(phenylthio)benzoyl]phenylthio group, a 4-[4-(phenylthio)phenoxy]phenylthio group, a 4-[4-(phenylthio)phenyl]phenylthio group, a 4-(phenylthio)phenylthio group, a 4-benzoylphenylthio group, a 4-benzoyl-2-chlorophenylthio group, a 4-benzoyl-3-chlorophenylthio group, a 4-benzoyl-3-methylthiophenylthio group, a 4-benzoyl-2-methylthiophenylthio group, a 4-(4-methylthiobenzoyl)phenylthio group, a 4-(2-methylthiobenzoyl)phenylthio group, a 4-(p-methylbenzoyl)phenylthio group, a 4-(p-ethylbenzoyl)phenylthio group, a 4-(p-isopropylbenzoyl)phenylthio group and a 4-(p-tert-butylbenzoyl)phenylthio group), and the like.

Examples of the alkylthio group in the above formulas (D-II) to (D-VI) include linear or branched alkylthio groups having 1 or more and 18 or less carbon atoms such as a methylthio group, an ethylthio group, a propylthio group, an isopropylthio group, a butylthio group, an isobutylthio group, a sec-butylthio group, a tert-butylthio group, a pentylthio group, an isopentylthio group, a neopentylthio group, a tert-pentylthio group, an octylthio group, a decylthio group, a dodecylthio group and an isooctadecylthio group, and the like.

Examples of the aryl group in the above formulas (D-III) to (D-VI) include aryl groups having 6 or more and 10 or less carbon atoms such as a phenyl group, a tolyl group, a dimethylphenyl group and a naphthyl group, and the like.

Examples of the heterocyclic aliphatic group in the above formula (D-II) include heterocyclic groups having 2 or more and 20 or less (preferably 4 or more and 20 or less) carbon atoms such as a pyrrolidinyl group, a tetrahydrofuranyl group, a tetrahydrothienyl group, a piperidinyl group, a tetrahydropyranyl group, a tetrahydrothiopyranyl group and a morpholinyl group, and the like.

Examples of the heterocyclic group in the above formulas (D-III) to (D-VI) include heterocyclic groups having 4 or more and 20 or less carbon atoms such as a thienyl group, a furanyl group, a selenophenyl group, a pyranyl group, a pyrrolyl group, an oxazolyl group, a thiazolyl group, a pyridyl group, a pyrimidyl group, a pyrazinyl group, an indolyl group, a benzofuranyl group, a benzothienyl group, a quinolyl group, an isoquinolyl group, a quinoxalinyl group, a quinazolinyl group, a carbazolyl group, an acridinyl group, a phenothiazinyl group, a phenazinyl group, a xanthenyl group, a thianthrenyl group, a phenoxazinyl group, a phenoxathiinyl group, a chromanyl group, an isochromanyl group, a dibenzothienyl group, a xanthonyl group, a thioxanthonyl group and a dibenzofuranyl group, and the like.

Examples of the aryloxy group in the above formulas (D-III) to (D-VI) include aryloxy groups having 6 or more and 10 or less carbon atoms such as a phenoxy group and a naphthyloxy group, and the like.

Examples of the alkylsulfinyl group in the above formulas (D-II) to (D-VI) include linear or branched sulfinyl groups having 1 or more and 18 or less carbon atoms such as a methylsulfinyl group, an ethylsulfinyl group, a propylsulfinyl group, an isopropylsulfinyl group, a butylsulfinyl group, an isobutylsulfinyl group, a sec-butylsulfinyl group, a tert-butylsulfinyl group, a pentylsulfinyl group, an isopentylsulfinyl group, a neopentylsulfinyl, a tert-pentylsulfinyl group, an octylsulfinyl group and an isooctadecylsulfinyl group, and the like.

Examples of the arylsulfinyl group in the above formulas (D-III) to (D-VI) include arylsulfinyl groups having 6 or more and 10 or less carbon atoms such as a phenylsulfinyl group, a tolylsulfinyl group and a naphthylsulfinyl group, and the like.

Examples of the alkylsulfonyl group in the above formulas (D-II) to (D-VI) include linear or branched alkylsulfonyl groups having 1 or more and 18 or less carbon atoms such as a methylsulfonyl group, an ethylsulfonyl group, a propylsulfonyl group, an isopropylsulfonyl group, a butylsulfonyl group, an isobutylsulfonyl group, a sec-butylsulfonyl group, a tert-butylsulfonyl group, a pentylsulfonyl group, an isopentylsulfonyl group, a neopentylsulfonyl group, a tert-pentylsulfonyl group, an octylsulfonyl group and an octadecylsulfonyl group, and the like.

Examples of the arylsulfonyl group in the above formulas (D-III) to (D-VI) include arylsulfonyl groups having 6 or more and 10 or less carbon atoms such as a phenylsulfonyl group, a tolylsulfonyl group (a tosyl group) and a naphthylsulfonyl group, and the like.

Examples of the hydroxy(poly)alkyleneoxy group in the above formulas (D-II) to (D-VI) include a hydroxy(poly)alkyleneoxy group represented by $HO(AO)_q$— (wherein AO independently represents an ethyleneoxy group and/or a propyleneoxy group, and q represents an integer of 1 or more and 5 or less), and the like.

Examples of the optionally substituted amino group in the above formulas (D-II) to (D-VI) include an amino group (—$NH_2$) and substituted amino groups having 1 or more and 15 or less carbon atoms such as a methylamino group, a dimethylamino group, an ethylamino group, a methylethylamino group, a diethylamino group, an n-propylamino group, a methyl-n-propylamino group, an ethyl-n-propylamino group, an n-propylamino group, an isopropylamino group, an isopropylmethylamino group, an isopropylethylamino group, a diisopropylamino group, a phenylamino group, a diphenylamino group, a methylphenylamino group, an ethylphenylamino group, an n-propylphenylamino group and an isopropylphenylamino group, and the like.

Examples of the alkylene group in the above formulas (D-III) and (D-IV) include linear or branched alkylene groups having 1 or more and 18 or less carbon atoms such as a methylene group, a 1,2-ethylene group, a 1,1-ethylene group, a propane-1,3-diyl group, a propane-1,2-diyl group, a propane-1,1-diyl group, a propane-2,2-diyl group, a butane-1,4-diyl group, a butane-1,3-diyl group, a butane-1,2-diyl group, a butane-1,1-diyl group, a butane-2,2-diyl group, a butane-2,3-diyl group, a pentane-1,5-diyl group, a pentane-1,4-diyl group, a hexane-1,6-diyl group, a heptane-1,7-diyl group, an octane-1,8-diyl group, a 2-ethylhexane-1,6-diyl group, a nonane-1,9-diyl group, a decane-1,10-diyl group, an undecane-1,11-diyl group, a dodecane-1,12-diyl group, a tridecane-1,13-diyl group, a tetradecane-1,14-diyl group, a pentadecane-1,15-diyl group and a hexadecane-1,16-diyl group, and the like.

The sulfonium salt (Q) can be synthesized, for example, according to the following scheme. Specifically, 1-fluoro-2-methyl-4-nitrobenzene represented by the following formula (D-1) is allowed to react with a compound represented by the following formula (D-2) in the presence of a base such as potassium hydroxide to obtain a nitro compound represented by the following formula (D-3), which is then reduced in the presence of reduced iron to obtain an amine compound represented by the following formula (D-4). This amine compound and a nitrite (for example, sodium nitrite) represented by $MaNO_2$ (wherein Ma represents a metal atom, for example an alkali metal atom such as sodium atom) are allowed to react to obtain a diazo compound, which is then mixed with a cuprous halide represented by CuX' (wherein X' represents a halogen atom such as a bromine atom; the same applies hereinafter) and a hydrogen halide represented by HX', and reaction is allowed to proceed to obtain a halide represented by the following formula (D-5). Grignard reagent is prepared from this halide and magnesium, and a sulfonium salt represented by the following formula (D-7) can be then obtained by the reaction of this Grignard reagent and a sulfoxide compound represented by the following formula (D-6) in the presence of chlorotrimethylsilane. Furthermore, this sulfonium salt is allowed to react with a salt represented by $Mb^+X'''^-$ (wherein $Mb^+$ represents a metal cation, for example an alkali metal cation such as a potassium ion and $X'''^-$ represents a monovalent anion represented by $X^-$ (excluding halogen anions)) to carry out salt conversion, and a sulfonium salt represented by the following formula (D-8) can be obtained thereby. In the following formulas (D-2) to (D-8), $R^{D1}$ to $R^{D3}$ and $A^{D1}$ are the same as those of the above formula (D-I).

<Scheme>

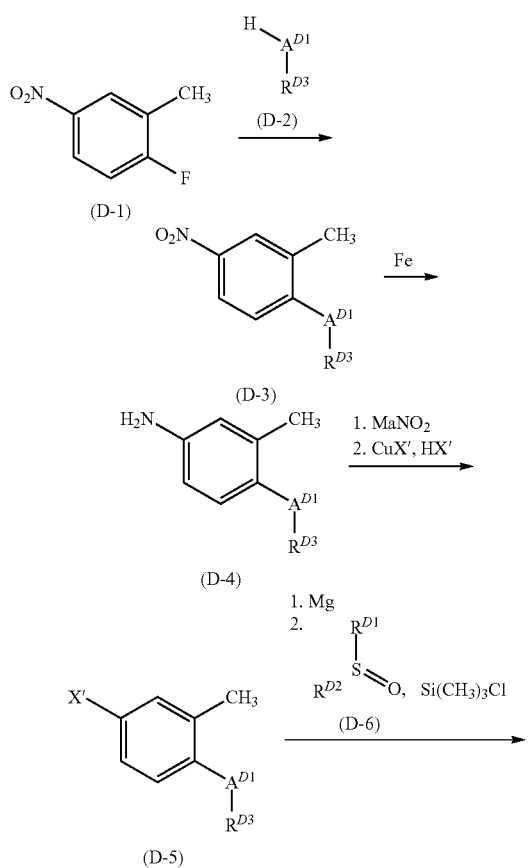

-continued

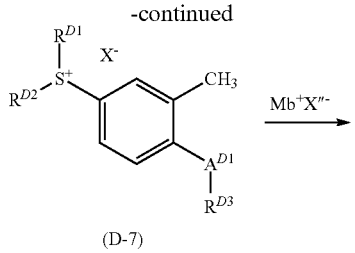

(D-7)

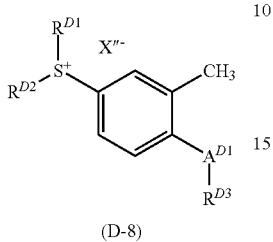

(D-8)

Specific examples of the cation portion of the sulfonium salt (Q) represented by the above formula (D-I) are given below. Specific examples of the anion portion of the sulfonium salt (Q) represented by the above formula (D-I) can include conventionally known anions such as anions mentioned in the above description of X⁻. The sulfonium salt (Q) represented by the above formula (D-I) can be synthesized according to the above scheme, and the cation portion can be combined with a desired anion portion by further salt conversion as needed. In particular, a combination with an anion represented by $R^{x1}_c BY_{4-c}^-$ (wherein $R^{x1}$ represents a phenyl group in which at least part of the hydrogen atoms are substituted with a halogen atom or an electron-withdrawing group; Y represents a halogen atom; and c represents an integer of 1 or more and 4 or less) is preferred.

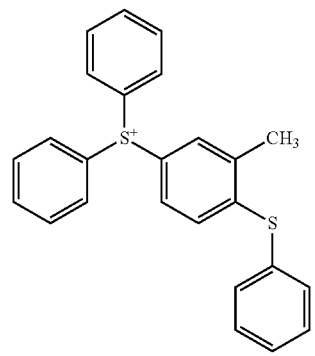

-continued

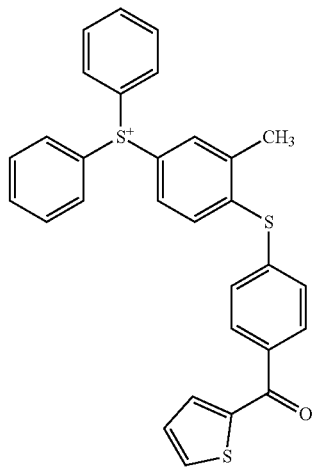 [SMILES: Cc1cc([S+](c2ccccc2)c2ccccc2)ccc1Oc1ccc(C(=O)c2cccs2)cc1]

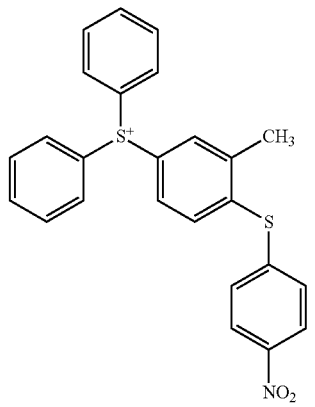

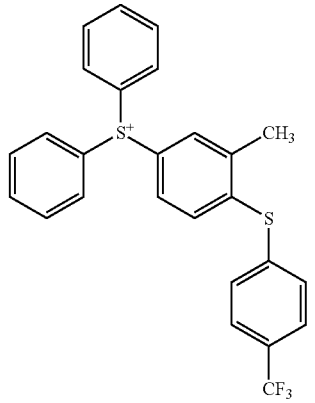

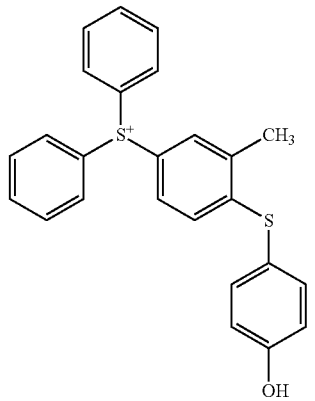

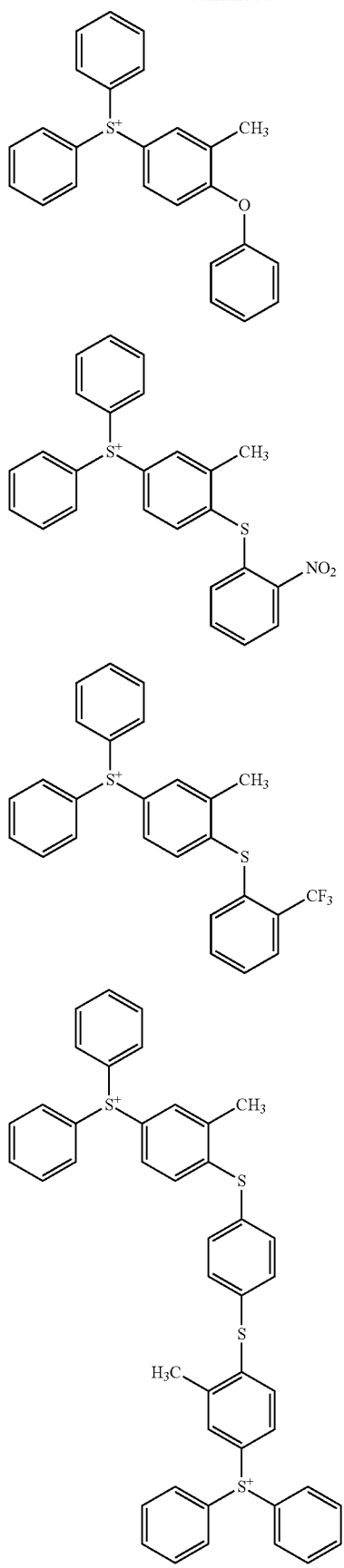

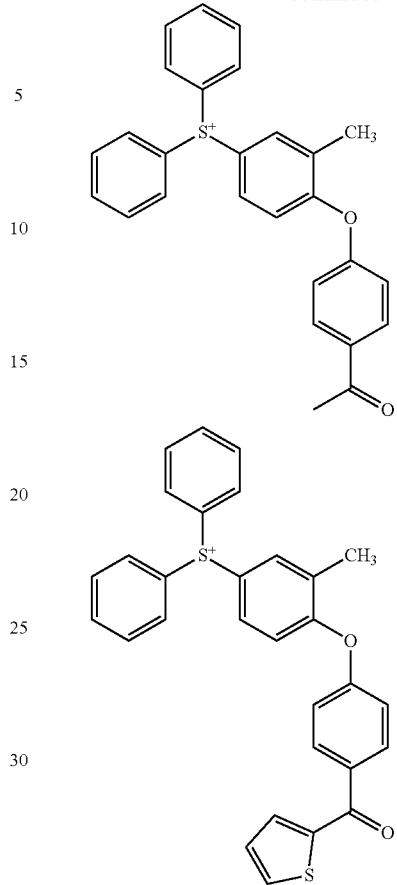

Among the aforementioned group of preferred cation portions, the cation portion represented by the following formula is more preferable.

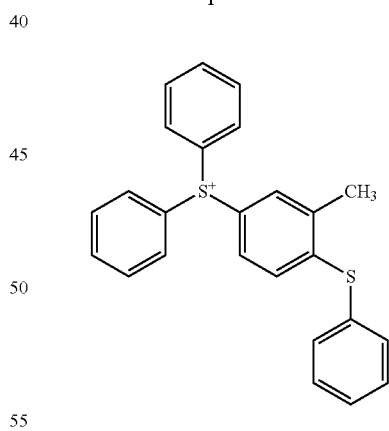

The content of the onium salt (D2) in the liquid composition is not particularly limited as long as the curing of the liquid composition favorably proceeds. The content of the onium salt (D2) in the liquid composition relative to 100 parts by mass of the material to be cured by the onium salt (D2) such as the epoxy-group-containing resin, the epoxy compound, or the oxetane compound is typically 0.01 parts by mass or more and 50 parts by mass or less, preferably 0.01 parts by mass or more and 30 parts by mass or less, more preferably 0.01 parts by mass or more and 20 parts by mass or less, even more preferably 0.05 parts by mass or more and 15 parts by mass or less, and particularly preferably 1 part by mass or more and 10 parts by mass or less from the viewpoint of ease of favorably curing the liquid composition.

[Curing Agent for Epoxy-Group-Containing Resin, Epoxy Compound or Oxetane Compound (D3)]

A curing agent for an epoxy-group-containing resin, an epoxy compound or an oxetane compound (D3) (hereinafter, also referred to as "curing agent (D3)") can be appropriately selected from curing agents which are conventionally known and other than the onium salt (D2) described above. The curing agent (D3) can be used together with the epoxy-group-containing resin, the epoxy compound or the oxetane compound, and contributes to curing by heating.

Examples of the curing agent (D3) include a phenol-based curing agent, an acid anhydride-based curing agent, a polyamine-based curing agent, and catalytic curing agent. The amount of the phenol-based curing agent and the acid anhydride-based curing agent used relative to 100 parts by mass of the amount of the base component (C) in the liquid composition is preferably 1 part by mass or more and 200 parts by mass or less, more preferably 50 parts by mass or more and 150 parts by mass or less, and particularly preferably 80 parts by mass or more and 120 parts by mass or less. The phenol-based curing agent, and the acid anhydride-based curing agent can be each used individually or two or more thereof can be used in combination. The amount of the polyamine-based curing agent used relative to 100 parts by mass of the amount of the base component (C) in the liquid composition is preferably 0.1 parts by mass or more and 50 parts by mass or less, more preferably 0.5 parts by mass or more and 30 parts by mass or less, and particularly preferably 1 part by mass 15 parts by mass. These polyamine-based curing agents can be used individually or two or more polyamine-based curing agents can be used in combination. The amount of the catalytic curing agent used relative to 100 parts by mass of the amount of the base component (C) in the liquid composition is preferably 1 part by mass or more and 100 parts by mass or less, more preferably 1 part by mass or more and 80 parts by mass or less, and particularly preferably 1 part by mass or more and 50 parts by mass or less. These catalytic curing agents can be used individually or two or more catalytic curing agents can be used in combination. It should be noted that the amount of the base component (C) is, in particular, the total of the amount of the epoxy compound and the amount of the oxetanyl compound. The amount of the epoxy compound and the amount of the oxetanyl compound include the amount of the resin including the epoxy group and/or the oxetanyl group.

[Curing Agent for Silicon-Containing Resin (D4)]

The liquid composition including the silicon-containing resin as the base component (C) may comprise a curing agent for a silicon-containing resin (D4) (hereinafter, referred to as "curing agent (D4)"). When the liquid composition including the silicon-containing resin comprises the curing agent (D4), it is likely to form a quantum dot-containing film that is not readily subjected to dissolution, swelling, or deformation by the action of an organic solvent such as N-methyl-2-pyrrolidone and thus has an excellent organic solvent resistance.

Examples of a suitable curing agent (D4) include Brønsted acids such as hydrochloric acid, sulfuric acid, nitric acid, benzenesulfonic acid, and p-toluenesulfonic acid; imidazoles such as 2-methylimidazole and 2-ethyl-4-methylimidazole; organic amines such as 2,4,6-tris(dimethylaminomethyl)phenol, benzylmethylamine, DBU (1,8-diazabicyclo[5.4.0]-7-undecene), and DCMU (3-(3,4-dichlorophenyl)-1,1-dimethylurea);

phosphorus compounds represented by $PX_3$ (in the formula, X represents a halogen atom, a hydroxyl group, or an alkoxy group having 1 or more and 6 or less carbon atoms) such as phosphorus trichloride, phosphorus tribromide, phosphorous acid, trimethyl phosphite, triethyl phosphite and tripropyl phosphite;

phosphorus compounds represented by $POX_3$ (in the formula, X represents a halogen atom, a hydroxyl group, or an alkoxy group having 1 or more and 6 or less carbon atoms) such as oxyphosphorus trichloride, oxyphosphorus tribromide, phosphoric acid, trimethyl phosphate, triethyl phosphate and tripropyl phosphate; phosphorus pentoxide;

phosphorus compounds represented by $H(HPO_3)_xOH$ (in the formula, x is an integer of 1 or more) such as polyphosphoric acid and polyphosphoric acid esters;

phosphorus compounds represented by $R^{DO}PX_2$ (in the formula, $R^{DO}$ represents a hydrogen atom or an organic group having 1 or more and 30 or less carbon atoms, in which a hydrogen atom in the organic group is optionally substituted with a halogen atom; X represents a halogen atom, a hydroxyl group, or an alkoxy group having 1 or more and 6 or less carbon atoms) such as methyldichlorophosphine, ethyldichlorophosphine and methoxydichlorophosphine;

phosphorus compounds represented by represented by $R^{DO}POX_2$ (in the formula, $R^{DO}$ represents a hydrogen atom or an organic group having 1 or more and 30 or less carbon atoms, in which a hydrogen atom in the organic group is optionally substituted with a halogen atom; X represents a halogen atom, a hydroxyl group, or an alkoxy group having 1 or more and 6 or less carbon atoms such as dimethyl phosphite, diethyl phosphite, methylphosphonic acid, dimethyl methylphosphonate, methylphosphonic dichloride, phenylphosphonic acid, phenylphosphonic dichloride and diethyl benzylphosphonate; organophosphorus compounds such as tributylphosphine, triphenylphosphine, tris(p-tolyl)phosphine, tris(m-tolyl)phosphine, tris(o-tolyl)phosphine, diphenylcyclohexylphosphine, tricyclohexylphosphine, tris(dimethoxyphenyl)phosphine, ethyltriphenylphosphonium bromide, benzyltriphenylphosphonium chloride, and 1,4-bis(diphenylphosphino)butane;

boron compounds represented by $BX_3$ (in the formula, X represents a halogen atom, a hydroxyl group, or an alkoxy group having 1 or more and 6 or less carbon atoms) such as boron trifluoride, boron trichloride, boric acid, trimethyl borate, triethyl borate, tripropyl borate, tributyl borate, triamyl borate, trihexyl borate, tricyclopentyl borate, tricyclohexyl borate, triallyl borate, triphenyl borate and ethyl dimethyl borate; boron oxide ($B_2O_3$);

boron compounds represented by $R^{DO}BX_2$ (in the formula, $R^{DO}$ represents a hydrogen atom or an organic group having 1 or more and 30 or less carbon atoms, in which a hydrogen atom in the organic group is optionally substituted with a halogen atom; X represents a halogen atom, a hydroxyl group, or an alkoxy group having 1 or more and 6 or less carbon atoms) such as phenylboronic acid, diisopropoxy(methyl)borane, methylboronic acid and cyclohexylboronic acid;

organophosphorus compound complexes such as triphenylphosphine triphenylborane, tetraphenylphosphonium tetra-p-tolylborate, tetraphenylphosphonium tetraphenylborate, tetraphenylphosphonium thiocyanate, tetraphenylphosphonium dicyanamide, and n-butyltriphenylphosphonium dicyanamide; complexes of a Lewis acid such as boron trifluoride and an organic amine (the organic amine is piperidine, for example); and amidines such as azabicycloundecene, diazabicycloundecene toluenesulfonic acid salt, and diazabicycloundecene octylic acid salt.

When the polysilane is used as the base component (C), it is preferable to use, in addition to the curing agent (D4) or alone, a curing agent that generates a basic compounds component by the action of light or heat.

(Curing Agent that Generates Basic Compounds Component by Action of Heat)

The curing agent that generates a basic compounds component by the action of heat is not particularly limited as far as it is a compound conventionally used as a heat-responsive base generator. As the curing agent that generates a basic compounds component by the action of heat, 2-benzyl-2-dimethylamino-1-(4-morpholinophenyl)-butan-1-one may be used, for example. 2-Benzyl-2-dimethylamino-1-(4-morpholinophenyl)-butan-1-one also generates a base by the action of light.

A compound that generates an imidazole compound represented by the following formula (d1) by the action of heat (hereinafter, this compound is also referred to as a heat-responsive imidazole generator) is also preferably used as the curing agent.

(d1)

In the formula (d1), $R^{d1}$, $R^{d2}$, and $R^{d3}$ each independently represent a hydrogen atom, a halogen atom, a hydroxy group, a mercapto group, a sulfide group, a silyl group, a silanol group, a nitro group, a nitroso group, a phosphino group, a sulfonato group, a phosphinyl group, a phosphonato group, or an organic group.

As the organic group in $R^{d1}$, $R^{d2}$, and $R^{d3}$, an alkyl group, an alkenyl group, a cycloalkyl group, a cycloalkenyl group, an aryl group, an aralkyl group, and the like can be exemplified. The organic group can include a bond or a substituent other than a hydrocarbon group such as a heteroatom. In addition, the organic group can be either linear, branched, or cyclic. The organic group is generally monovalent; however, it can also be an organic group of divalent or more in a case of forming a cyclic structure or the like.

$R^{d1}$ and $R^{d2}$ can bind to form a cyclic structure, and can further include a heteroatom bond. As the cyclic structure, a heterocycloalkyl group, a heteroaryl group and the like can be exemplified, and the cyclic structure can also be a condensed ring.

A bond included in the organic group of $R^{d1}$, $R^{d2}$, and $R^{d3}$ is not particularly limited as long as the effect of the present invention is not impaired. The organic group can include a bond including a heteroatom such as an oxygen atom, a nitrogen atom, a silicon atom and the like. Specific examples of the bond including a heteroatom include an ether bond, a thioether bond, a carbonyl bond, a thiocarbonyl bond, an ester bond, an amide bond, a urethane bond, an imino bond (—N═C(—$R^{d0}$)—, —C(═N$R^{d0}$)—: $R^{d0}$ representing a hydrogen atom or an organic group), a carbonate bond, a sulfonyl bond, a sulfinyl bond, an azo bond and the like.

As the bond including a heteroatom which can be included in the organic group of $R^{d1}$, $R^{d2}$, and $R^{d3}$, an ether bond, a thioether bond, a carbonyl bond, a thiocarbonyl bond, an ester bond, an amide bond, a urethane bond, an imino bond (—N═C(—$R^{d0}$)—, —C(═N$R^{d0}$)—: $R^{d0}$ representing a hydrogen atom or an organic group), a carbonate bond, a sulfonyl bond, and a sulfinyl bond are preferable from the viewpoint of thermal resistance of the imidazole compound.

In the case in which the organic group of $R^{d1}$, $R^{d2}$, and $R^{d3}$ is a substituent other than a hydrocarbon group, $R^{d1}$, $R^{d2}$, and $R^{d3}$ are not particularly limited as long as the effect of the present invention is not impaired. Specific examples of $R^{d1}$, $R^{d2}$, and $R^{d3}$ include a halogen atom, a hydroxyl group, a mercapto group, a sulfide group, a cyano group, an isocyano group, a cyanato group, an isocyanato group, a thiocyanato group, an isothiocyanato group, a silyl group, a silanol group, an alkoxy group, an alkoxycarbonyl group, a carbamoyl group, a thiocarbamoyl group, a nitro group, a nitroso group, a carboxylate group, an acyl group, an acyloxy group, a sulfino group, a sulfonato group, a phosphino group, a phosphinyl group, a phosphonato group, an alkyl ether group, an alkenylether group, an alkylthioether group, an alkenylthioether group, an arylether group, an arylthioether group and the like. The hydrogen atom included in the substituent can be substituted by a hydrocarbon group. The hydrocarbon group included in the aforementioned substituent can be either linear, branched, or cyclic.

As $R^{d1}$, $R^{d2}$, and $R^{d3}$, a hydrogen atom, an alkyl group having 1 or more and 12 or less carbon atoms, an aryl group having 1 or more and 12 or less carbon atoms, an alkoxy group having 1 or more and 12 or less carbon atoms, and a halogen atom are preferable, and a hydrogen atom is more preferable.

The heat-responsive imidazole generator is not particularly limited, as long as the imidazole compound represented by the formula (d1) is generated by the action of heat. Compounds which are used as a heat-responsive imidazole generator are obtained by replacing the skeleton originating from amines which are generated upon heating from the compounds (heat-responsive base generator) which have been conventionally contained in various compositions and generate amines by the action of heat, with the skeleton originating from the imidazole compounds represented by the formula (d1).

Examples of the preferred heat-responsive imidazole generator include the compounds represented by the following formula (d2):

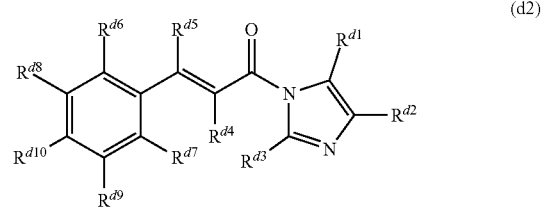

(d2)

wherein, in the formula (d2), $R^{d1}$, $R^{d2}$, and $R^{d3}$ each independently represent a hydrogen atom, a halogen atom, a hydroxy group, a mercapto group, a sulfide group, a silyl group, a silanol group, a nitro group, a nitroso group, a sulfonato group, a phosphino group, a phosphinyl group, a phosphonato group, or an organic group;

$R^{d4}$ and $R^{d5}$ each independently represent a hydrogen atom, a halogen atom, a hydroxy group, a mercapto group, a sulfide group, a silyl group, a silanol group, a nitro group, a nitroso group, a sulfino group, a sulfo group, a sulfonato group, a phosphino group, a phosphinyl group, a phosphono group, a phosphonato group, or an organic group;

$R^{d6}$, $R^{d7}$, $R^{d8}$, $R^{d9}$, and $R^{d10}$ each independently represent a hydrogen atom, a halogen atom, a hydroxy group, a mercapto group, a sulfide group, a silyl group, a silanol group, a nitro group, a nitroso group, a sulfino group, a sulfo group, a sulfonato group, a phosphino group, a phosphinyl group, a phosphono group, a phosphonato group, an amino group, an ammonio group, or an organic group;

and two or more of $R^{d6}$, $R^{d7}$, $R^{d8}$, $R^{d9}$, and $R^{d10}$ may join together to form a cyclic structure, or may include a bond of a heteroatom.

In the formula (d2), $R^{d1}$, $R^{d2}$, and $R^{d3}$ are the same as $R^{d1}$, $R^{d2}$, and $R^{d3}$ in the formula (d1).

In the formula (d2), $R^{d4}$ and $R^{d5}$ each independently represent a hydrogen atom, a halogen atom, a hydroxyl group, a mercapto group, a sulfide group, a silyl group, a silanol group, a nitro group, a nitroso group, a sulfino group, a sulfo group, a sulfonato group, a phosphino group, a phosphinyl group, a phosphono group, a phosphonato group or an organic group.

As the organic group in $R^{d4}$ and $R^{d5}$, the organic group listed for $R^{d1}$, $R^{d2}$, and $R^{d3}$ can be exemplified. The organic group can include a heteroatom, as in the case of $R^{d1}$, $R^{d2}$, and $R^{d3}$. The organic group can be either linear, branched, or cyclic.

Among the above, $R^{d4}$ and $R^{d5}$ are preferably, each independently, a hydrogen atom, an alkyl group having 1 or more and 10 or less carbon atoms, a cycloalkyl group having 4 or more and 13 or less carbon atoms, a cycloalkenyl group having 4 or more and 13 or less carbon atoms, an aryloxyalkyl group having 7 or more and 16 or less carbon atoms, an aralkyl group having 7 or more and 20 or less carbon atoms, an alkyl group having 2 or more and 11 or less carbon atoms substituted with a cyano group, an alkyl group having 1 or more and 10 or less carbon atoms substituted with a hydroxyl group, an alkoxy group having 1 or more and 10 or less carbon atoms, an amido group having 2 or more and 11 or less carbon atoms, an alkylthio group having 1 or more and 10 or less carbon atoms, an acyl group having 1 or more and 10 or less carbon atoms, an ester group (—COOR$^d$, —OCOR$^d$: R$^d$ representing a hydrocarbon group) having 2 or more and 11 or less carbon atoms, an aryl group having 6 or more and 20 or less carbon atoms, an aryl group having 6 or more and 20 or less carbon atoms in which an electron-donating group and/or an electron-withdrawing group are substituted, a benzyl group in which an electron-donating group and/or an electron-withdrawing group are substituted, a cyano group, and a methylthio group. More preferably, $R^{d4}$ and $R^{d5}$ are both hydrogen atoms; or $R^{d4}$ is a methyl group and $R^{d5}$ is a hydrogen atom.

In the formula (d2), $R^{d6}$, $R^{d7}$, $R^{d8}$, $R^{d9}$, and $R^{d10}$ each independently represent a hydrogen atom, a halogen atom, a hydroxyl group, a mercapto group, a sulfide group, a silyl group, a silanol group, a nitro group, a nitroso group, a sulfino group, a sulfo group, a sulfonato group, a phosphino group, a phosphinyl group, a phosphono group, a phosphonato group, an amino group, an ammonio group, or an organic group.

As the organic group in $R^{d5}$, $R^{d7}$, $R^{d8}$, $R^{d9}$, and $R^{d10}$, the organic group listed for $R^{d1}$, $R^{d2}$, and $R^{d3}$ can be exemplified. As in the case of $R^{d1}$ and $R^{d2}$, the organic group can include a bond or a substituent other than a hydrocarbon group such as a heteroatom. The organic group can be either linear, branched, or cyclic.

At least two of $R^{d6}$, $R^{d7}$, $R^{d8}$, $R^{d9}$, and $R^{d10}$ can bind to form a cyclic structure, and these can further include a bond of heteroatoms. As the cyclic structure, a heterocycloalkyl group, a heteroaryl group and the like can be exemplified, and the cyclic structure can also be a condensed ring. For example, $R^{d6}$, $R^{d7}$, $R^{d8}$, $R^{d9}$, and $R^{d10}$ can form a condensed ring such as naphthalene, anthracene, phenanthrene, indene and the like, through bonding of at least two of these and sharing of an atom of a benzene ring to which $R^{d6}$, $R^{d7}$, $R^{d8}$, $R^{d9}$, and $R^{d10}$ are bound.

Among the above, $R^{d6}$, $R^{d7}$, $R^{d8}$, $R^{d9}$, and $R^{d10}$ are, preferably, each independently a hydrogen atom, an alkyl group having 1 or more and 10 or less carbon atoms, a cycloalkyl group having 4 or more and 13 or less carbon atoms, a cycloalkenyl group having 4 or more and 13 or less carbon atoms, an aryloxyalkyl group having 7 or more and 16 or less carbon atoms, an aralkyl group having 7 or more and 20 or less carbon atoms, an alkyl group having 2 or more and 11 or less carbon atoms substituted with a cyano group, an alkyl group having 1 or more and 10 or less carbon atoms substituted with a hydroxyl group, an alkoxy group having 1 or more and 10 or less carbon atoms, an amido group having 2 or more and 11 or less carbon atoms, an alkylthio group having 1 or more and 10 or less carbon atoms, an acyl group having 1 or more and 10 or less carbon atoms, an ester group having 2 or more and 11 or less carbon atoms, an aryl group having 6 or more and 20 or less carbon atoms, an aryl group having 6 or more and 20 or less carbon atoms in which an electron-donating group and/or an electron-withdrawing group are substituted, a benzyl group in which an electron-donating group and/or an electron-withdrawing group are substituted, a cyano group, a methylthio group and a nitro group.

A case where two or more of $R^{d6}$, $R^{d7}$, $R^{d8}$, $R^{d9}$, and $R^{d10}$ join together to form a condensed ring such as naphthalene, anthracene, phenanthrene and indene by sharing the atoms of the benzene ring to which $R^{d6}$, $R^{d7}$, $R^{d8}$, $R^{d9}$, and $R^{d10}$ are attached is also preferred.

Among the compounds represented by the formula (d2), compounds represented by the following formula (d3);

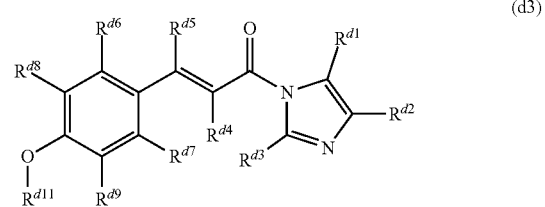

(d3)

wherein, in the formula (d3), $R^{d1}$, $R^{d2}$, and $R^{d3}$ are as defined in the formulas (d1) and (d2);
$R^{d4}$ to $R^{d9}$ are as defined in the formula (d2);
$R^{d11}$ represents a hydrogen atom or an organic group;
$R^{d6}$ and $R^{d7}$ shall not be a hydroxyl group;
and two or more of $R^{d6}$, $R^{d7}$, $R^{d8}$, and $R^{d9}$ may join together to form a cyclic structure, or may include a bond of a heteroatom, are preferred.

The compounds represented by the formula (d3) have good solubility in organic solvents because they have a substituent —O—$R^{d11}$.

In the formula (d3), $R^{d11}$ is a hydrogen atom or an organic group. In a case where $R^{d11}$ is an organic group, the organic group exemplified with regard to $R^{d1}$, $R^{d2}$, and $R^{d3}$ may be referred to as the organic group. This organic group may include a heteroatom in the organic group. This organic group may be either linear, branched, or cyclic. For $R^{d11}$, a hydrogen atom or an alkyl or alkoxyalkyl group having 1 or more and 12 or less carbon atoms is preferred, and a methyl group, an ethyl group, an n-propyl group, an isopropyl group, an n-butyl group, an isobutyl group, a tert-butyl group, a methoxymethyl group, an ethoxymethyl group, a methoxyethyl group, an ethoxyethyl group, a propoxymethyl group, or a butoxymethyl group is more preferred.

Specific examples of the compounds particularly suitable for the heat-responsive imidazole generator are shown below.

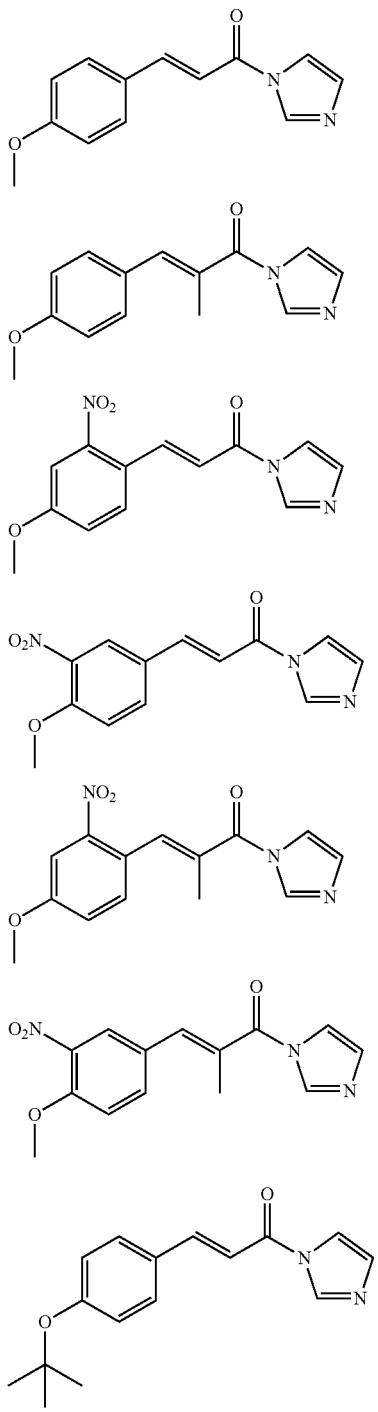

-continued

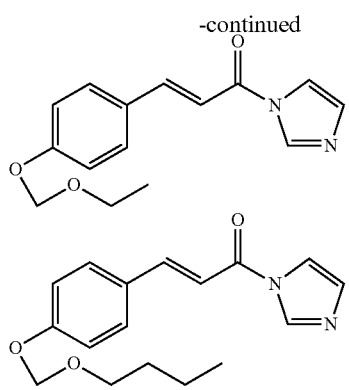

(Oxime Ester Compound)

An oxime ester compound degrades by the action of light and generates a base. Examples of a suitable oxime ester compound include a compound represented by the following formula (d4).

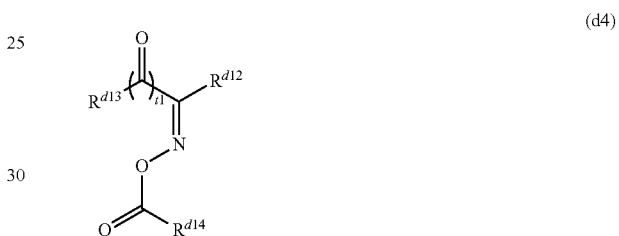

(d4)

In the formula (d4), $R^{d12}$ represents an alkyl group having 1 or more and 10 or less carbon atoms, an optionally substituted phenyl group, or an optionally substituted carbazolyl group;

t1 is 0 or 1;

$R^{d13}$ represents an optionally substituted alkyl group having 1 or more and 10 or less carbon atoms, an optionally substituted phenyl group, or an optionally substituted carbazolyl group;

and $R^{d14}$ represents a hydrogen atom, an alkyl group having 1 or more and 6 or less carbon atoms, or an optionally substituted phenyl group.

When $R^{d12}$ is an alkyl group having 1 or more and 10 or less carbon atoms, the alkyl group may be linear or branched. In this case, the number of carbon atoms in the alkyl group is preferably 1 or more and 8 or less, and more preferably 1 or more and 5 or less.

When $R^{d12}$ is an optionally substituted phenyl group, the type of the substituent is not particularly limited as long as the objects of the present invention are not inhibited. Examples of a suitable substituent that the phenyl group may have include an alkyl group, an alkoxy group, an cycloalkyl group, an cycloalkoxy group, a saturated aliphatic acyl group, an alkoxycarbonyl group, a saturated aliphatic acyloxy group, an optionally substituted phenyl group, an optionally substituted phenoxy group, an optionally substituted benzoyl group, an optionally substituted phenoxycarbonyl group, an optionally substituted benzoyloxy group, an optionally substituted phenylalkyl group, an optionally substituted naphthyl group, an optionally substituted naphthoxy group, an optionally substituted naphthoyl group, an optionally substituted naphthoxycarbonyl group, an optionally substituted naphthoyloxy group, an optionally substituted naphthylalkyl group, an optionally substituted heterocyclyl group, an amino group, an amino group substituted with one or two organic groups, a morpholin-1-yl group, a piperazin-1-yl group, a halogen, a nitro group, a cyano group, and the like. When $R^{d12}$ is an optionally substituted phenyl group and the phenyl group has a plurality of substituents, the plurality of substituents may be the same as or different from each other.

When a substituent of the phenyl group is an alkyl group, the number of carbon atoms of the alkyl group is preferably 1 or more and 20 or less, more preferably 1 or more and 10 or less, further preferably 1 or more and 6 or less, particularly preferably 1 or more and 3 or less, and most preferably 1. The alkyl group may be linear or branched. When a substituent of the phenyl group is an alkyl group, specific examples thereof include a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, an n-hexyl group, an n-heptyl group, an n-octyl group, an isooctyl group, a sec-octyl group, a tert-octyl group, an n-nonyl group, an isononyl group, an n-decyl group, an isodecyl group, and the like. The alkyl group may have an ether bond (—O—) in the carbon chain. In this case, examples of a substituent of the phenyl group include an alkoxyalkyl group and an alkoxyalkoxyalkyl group. When a substituent of the phenyl group is an alkoxyalkyl group, a group represented by —$R^{d15}$—O—$R^{d16}$ is preferable. $R^{d15}$ represents a linear or branched alkylene group having 1 or more and 10 or less carbon atoms. $R^{d16}$ represents a linear or branched alkyl group having 1 or more and 10 or less carbon atoms. The number of carbon atoms of $R^{d15}$ is preferably 1 or more and 8 or less, more preferably 1 or more and 5 or less, and particularly preferably 1 or more and 3 or less. The number of carbon atoms of $R^{d16}$ is preferably 1 or more and 8 or less, more preferably 1 or more and 5 or less, particularly preferably 1 or more and 3 or less, and most preferably 1. Examples of the alkyl group having an ether bond in the carbon chain include a methoxyethyl group, an ethoxyethyl group, a methoxyethoxyethyl group, an ethoxyethoxyethyl group, a propyloxyethoxyethyl group, a methoxypropyl group, and the like.

When a substituent of the phenyl group is an alkoxy group, the number of carbon atoms of the alkoxy group is preferably 1 or more and 20 or less, and more preferably 1 or more and 6 or less. The alkoxy group may be linear or branched. When a substituent of the phenyl group is an alkoxy group, specific examples thereof include a methoxy group, an ethoxy group, an n-propyloxy group, an isopropyloxy group, an n-butyloxy group, an isobutyloxy group, a sec-butyloxy group, a tert-butyloxy group, an n-pentyloxy group, an isopentyloxy group, a sec-pentyloxy group, a tert-pentyloxy group, an n-hexyloxy group, an n-heptyloxy group, an n-octyloxy group, an isooctyloxy group, a sec-octyloxy group, a tert-octyloxy group, an n-nonyloxy group, an isononyloxy group, an n-decyloxy group, an isodecyloxy group, and the like. The alkoxy group may include an ether bond (—O—) in the carbon chain. Examples of the alkoxy group having an ether bond in the carbon chain include a methoxyethoxy group, an ethoxyethoxy group, a 2-methoxy-1-methylethoxy group, a methoxyethoxyethoxy group, an ethoxyethoxyethoxy group, a propyloxyethoxyethoxy group, a methoxypropyloxy group, and the like.

When a substituent of the phenyl group is a cycloalkyl group or a cycloalkoxy group, the number of carbon atoms of the cycloalkyl group or the cycloalkoxy group is preferably 3 or more and 10 or less, and more preferably 3 or more and 6 or less. When a substituent of the phenyl group is a cycloalkyl group, specific examples thereof include a cyclopropyl group, a cyclobutyl group, a cyclopentyl group, a cyclohexyl group, a cycloheptyl group, a cyclooctyl group, and the like. When a substituent of the phenyl group is a cycloalkoxy group, specific examples include a cyclopropyloxy group, a cyclobutyloxy group, a cyclopentyloxy group, a cyclohexyloxy group, a cycloheptyloxy group, a cyclooctyloxy group, and the like.

When a substituent of the phenyl group is a saturated aliphatic acyl group or a saturated aliphatic acyloxy group, the number of carbon atoms of the saturated aliphatic acyl group or the saturated aliphatic acyloxy group is preferably 2 or more and 20 or less, and more preferably 2 or more and 7 or less. When a substituent of the phenyl group is a saturated aliphatic acyl group, specific examples thereof include an acetyl group, a propanoyl group, an n-butanoyl group, a 2-methylpropanoyl group, an n-pentanoyl group, a 2,2-dimethylpropanoyl group, an n-hexanoyl group, an n-heptanoyl group, an n-octanoyl group, an n-nonanoyl group, an n-decanoyl group, an n-undecanoyl group, an n-dodecanoyl group, an n-tridecanoyl group, an n-tetradecanoyl group, an n-pentadecanoyl group, an n-hexadecanoyl group, and the like. When a substituent of the phenyl group is a saturated aliphatic acyloxy group, specific examples thereof include an acetyloxy group, a propanoyloxy group, an n-butanoyloxy group, a 2-methylpropanoyloxy group, an n-pentanoyloxy group, a 2,2-dimethylpropanoyloxy group, an n-hexanoyloxy group, an n-heptanoyloxy group, an n-octanoyloxy group, an n-nonanoyloxy group, an n-decanoyloxy group, an n-undecanoyloxy group, an n-dodecanoyloxy group, an n-tridecanoyloxy group, an n-tetradecanoyloxy group, an n-pentadecanoyloxy group, an n-hexadecanoyloxy group, and the like.

When a substituent of the phenyl group is an alkoxycarbonyl group, the number of carbon atoms of the alkoxycarbonyl group is preferably 2 or more and 20 or less, and more preferably 2 or more and 7 or less. When a substituent of the phenyl group is an alkoxycarbonyl group, specific examples thereof include a methoxycarbonyl group, an ethoxycarbonyl group, an n-propyloxycarbonyl group, an isopropyloxycarbonyl group, an n-butyloxycarbonyl group, an isobutyloxycarbonyl group, a sec-butyloxycarbonyl group, a tert-butyloxycarbonyl group, an n-pentyloxycarbonyl group, an isopentyloxycarbonyl group, a sec-pentyloxycarbonyl group, a tert-pentyloxycarbonyl group, an n-hexyloxycarbonyl group, an n-heptyloxycarbonyl group, an n-octyloxycarbonyl group, an isooctyloxycarbonyl group, a sec-octyloxycarbonyl group, a tert-octyloxycarbonyl group, an n-nonyloxycarbonyl group, an isononyloxycarbonyl group, an n-decyloxycarbonyl group, an isodecyloxycarbonyl group, and the like.

When a substituent of the phenyl group is a phenylalkyl group, the number of carbon atoms of the phenylalkyl group is preferably 7 or more and 20 or less, more preferably 7 or more and 10 or less. When a substituent of the phenyl group is a naphthylalkyl group, the number of carbon atoms of the naphthylalkyl group is preferably 11 or more and 20 or less, more preferably 11 or more and 14 or less. When a substituent of the phenyl group is a phenylalkyl group, specific examples thereof include a benzyl group, a 2-phenylethyl group, a 3-phenylpropyl group, and a 4-phenylbutyl group. When a substituent of the phenyl group is a naphthylalkyl group, specific examples include an α-naphthylmethyl group, a β-naphthylmethyl group, a 2-(α-naphthyl)ethyl group, and a 2-(β-naphthyl)ethyl group. When a substituent of the phenyl group is a phenylalkyl group or a naphthylalkyl group, the substituent may further have a substituent on the phenyl group or the naphthyl group.

When a substituent of the phenyl group is a heterocyclyl group, the heterocyclyl group is a 5- or 6-membered monocycle including one or more N, S, and O, or a heterocyclyl group in which these monocycles are condensed with each other, or the monocycle and a benzene ring are condensed. When the heterocyclyl group is a condensed ring, the number of rings constituting the condensed ring is 3 or less. Examples of the heterocycle constituting the heterocyclyl group include furan, thiophene, pyrrole, oxazole, isoxazole, thiazole, thiadiazole, isothiazole, imidazole, pyrazole, triazole, pyridine, pyrazine, pyrimidine, pyridazine, benzofuran, benzothiophene, indole, isoindole, indolizine, benzimidazole, benzotriazole, benzoxazole, benzothiazole, carbazole, purine, quinoline, isoquinoline, quinazoline, phthalazine, cinnoline, quinoxaline, and the like. When a substituent of the phenyl group is a heterocyclyl group, the heterocyclyl group may further have a substituent.

When a substituent of the phenyl group is an amino group substituted with one or two organic groups, suitable examples of the organic group include an alkyl group having 1 or more and 20 or less carbon atoms, a cycloalkyl group having 3 or more and 10 or less carbon atoms, a saturated aliphatic acyl group having 2 or more and 20 or less carbon atoms, a saturated aliphatic acyloxy group having 2 or more and 20 or less carbon atoms, an optionally substituted phenyl group, an optionally substituted benzoyl group, an optionally substituted phenylalkyl group having 7 or more and 20 or less carbon atoms, an optionally substituted naphthyl group, an optionally substituted naphthoyl group, an optionally substituted naphthylalkyl group having 11 or more and 20 or less carbon atoms, a heterocyclyl group, and the like. Specific examples of suitable organic groups are the same as the groups described above as the substituent of the phenyl group. Specific examples of the amino group substituted with one or two organic groups include a methylamino group, an ethylamino group, a diethylamino group, an n-propylamino group, a di-n-propylamino group, an isopropylamino group, an n-butylamino group, a di-n-butylamino group, an n-pentylamino group, an n-hexylamino group, an n-heptylamino group, an n-octylamino group, an n-nonylamino group, an n-decylamino group, a phenylamino group, a naphthylamino group, an acetylamino group, a propanoylamino group, an n-butanoylamino group, an n-pentanoylamino group, an n-hexanoylamino group, an n-heptanoylamino group, an n-octanoylamino group, an n-decanoylamino group, a benzoylamino group, an α-naphthoylamino group, a β-naphthoylamino group, an N-acetyl-N-acetyloxyamino group, and the like.

When a phenyl group, a naphthyl group, and a heterocyclyl group included in a substituent of the phenyl group further have a substituent, examples of the further substituent include an alkyl group having 1 or more and 6 or less carbon atoms, an alkoxy group having 1 or more and 6 or less carbon atoms, a saturated aliphatic acyl group having 2 or more and 7 or less carbon atoms, an alkoxycarbonyl group having 2 or more and 7 or less carbon atoms, a saturated aliphatic acyloxy group having 2 or more and 7 or less carbon atoms, a monoalkylamino group which has an alkyl group having 1 or more and 6 or less carbon atoms, a dialkylamino group which has an alkyl group having 1 or more and 6 or less carbon atoms, a morpholin-1-yl group, a piperazin-1-yl group, halogen, a nitro group, a cyano group, and the like. When a phenyl group, a naphthyl group, and a heterocyclyl group included in a substituent of the phenyl group further have a substituent, the number of further substituents is not particularly limited as long as the object of the present invention is not inhibited, and is preferably 1 or more and 4 or less. When a phenyl group, a naphthyl group, and a heterocyclyl group included in a substituent of the phenyl group have a plurality of substituents, the plurality of substituents may be the same as or different from each other.

Substituents for the case in which $R^{d12}$ is an optionally substituted phenyl group are described above. Among those substituents, an alkyl group or an alkoxyalkyl group is preferable.

When $R^{d12}$ is an optionally substituted phenyl group, neither the number of substituents nor the position to which a substituent is bonded is particularly limited as long as the objects of the present invention are not inhibited. When $R^{d12}$ is an optionally substituted phenyl group, the optionally substituted phenyl group is preferably an optionally substituted o-tolyl group for excellent efficiency of base generation.

When $R^{d12}$ is an optionally substituted carbazolyl group, the type of the substituent is not particularly limited as long as the objects of the present invention are not inhibited. Examples of a suitable substituent that the carbazolyl group may have on a carbon atom include an alkyl group having 1 or more and 20 or less carbon atoms, an alkoxy group having 1 or more and 20 or less carbon atoms, a cycloalkyl group having 3 or more and 10 or less carbon atoms, a cycloalkoxy group having 3 or more and 10 or less carbon atoms, a saturated aliphatic acyl group having 2 or more and 20 or less carbon atoms, an alkoxycarbonyl group having 2 or more and 20 or less carbon atoms, a saturated aliphatic acyloxy group having 2 or more and 20 or less carbon atoms, an optionally substituted phenyl group, an optionally substituted phenoxy group, an optionally substituted phenylthio group, an optionally substituted phenylcarbonyl group, an optionally substituted benzoyl group, an optionally substituted phenoxycarbonyl group, an optionally substituted benzoyloxy group, an optionally substituted phenylalkyl group having 7 or more and 20 or less carbon atoms, an optionally substituted naphthyl group, an optionally substituted naphthoxy group, an optionally substituted naphthylcarbonyl group, an optionally substituted naphthoyl group, an optionally substituted naphthoxycarbonyl group, an optionally substituted naphthoyloxy group, an optionally substituted naphthylalkyl group having 11 or more and 20 or less carbon atoms, an optionally substituted heterocyclyl group, an optionally substituted heterocyclylcarbonyl group, an amino group, an amino group substituted with one or two organic groups, a morpholin-1-yl group, a piperazin-1-yl group, a halogen, a nitro group, and a cyano group.

When $R^{d12}$ is an optionally substituted carbazolyl group, examples of a suitable substituent that the carbazolyl group may have on the nitrogen atom include an alkyl group having 1 or more and 20 or less carbon atoms, a cycloalkyl group having 3 or more and 10 or less carbon atoms, a saturated aliphatic acyl group having 2 or more and 20 or less carbon atoms, an alkoxycarbonyl group having 2 or more and 20 or less carbon atoms, an optionally substituted phenyl group, an optionally substituted benzoyl group, an optionally substituted phenoxycarbonyl group, an optionally substituted phenylalkyl group having 7 or more and 20 or less carbon atoms, an optionally substituted naphthyl group, an optionally substituted naphthoyl group, an optionally substituted naphthoxycarbonyl group, an optionally substituted naphthylalkyl group having 11 or more and 20 or less carbon atoms, an optionally substituted heterocyclyl group, and an optionally substituted heterocyclylcarbonyl group.

Among these substituents, an alkyl group having 1 or more and 20 or less carbon atoms is preferable, an alkyl group having 1 or more and 6 or less carbon atoms is more preferable, and an ethyl group is particularly preferable.

For an alkyl group, an alkoxy group, a cycloalkyl group, a cycloalkoxy group, a saturated aliphatic acyl group, an alkoxycarbonyl group, a saturated aliphatic acyloxy group, an optionally substituted phenylalkyl group, an optionally substituted naphthylalkyl group, an optionally substituted heterocyclyl group, and an amino group substituted with one or two organic groups, specific examples of the substituent that the carbazolyl group may have are the same as the examples of a substituent of the phenyl group when $R^{d12}$ is an optionally substituted phenyl group.

For $R^{d12}$, when a phenyl group, a naphthyl group, and a heterocyclyl group in a substituent of the carbazolyl group further have a substituent, examples of the further substituent include an alkyl group having 1 or more and 6 or less carbon atoms; an alkoxy group having 1 or more and 6 or less carbon atoms; a saturated aliphatic acyl group having 2 or more and 7 or less carbon atoms; an alkoxycarbonyl group having 2 or more and 7 or less carbon atoms; a saturated aliphatic acyloxy group having 2 or more and 7 or less carbon atoms; a phenyl group; a naphthyl group; a benzoyl group; a naphthoyl group; a benzoyl group substituted with a group selected from the group consisting of an alkyl group having 1 or more and 6 or less carbon atoms, a morpholin-1-yl group, a piperazin-1-yl group, and a phenyl group; a monoalkylamino group having an alkyl group having 1 or more and 6 or less carbon atoms; a dialkylamino group having an alkyl group having 1 or more and 6 or less carbon atoms; a morpholin-1-yl group; a piperazin-1-yl group; a halogen; a nitro group; and a cyano group. When a phenyl group, a naphthyl group, and a heterocyclyl group in a substituent of the carbazolyl group further have a substituent, the number of further substituents is not limited as long as the objects of the present invention are not inhibited, and is preferably 1 or more and 4 or less. When the phenyl group, the naphthyl group, and the heterocyclyl group have a plurality of substituents, the plurality of substituents may be the same as or different from each other.

$R^{d13}$ represents an optionally substituted alkyl group having 1 or more and 10 or less carbon atoms, an optionally substituted phenyl group, or an optionally substituted carbazolyl group.

When $R^{d13}$ is an optionally substituted alkyl group having 1 or more and 10 or less carbon atoms, the alkyl group may be linear or branched. In this case, the number of carbon atoms of the alkyl group is preferably 1 or more and 8 or less, and more preferably 1 or more and 5 or less.

For $R^{d13}$, there is no particular limitation for substituents on the alkyl group, the phenyl group, or the carbazolyl group as long as the object of the present invention is not inhibited. Examples of suitable substituents which the alkyl group may have on the carbon atom include an alkoxy group having 1 or more and 20 or less carbon atoms, a cycloalkyl group having 3 or more and 10 or less carbon atoms, a cycloalkoxy group having 3 or more and 10 or less carbon atoms, a saturated aliphatic acyl group having 2 or more and 20 or less carbon atoms, an alkoxycarbonyl group having 2 or more and 20 or less carbon atoms, a saturated aliphatic acyloxy group having 2 or more and 20 or less carbon atoms, an optionally substituted phenyl group, an optionally substituted phenoxy group, an optionally substituted phenylthio group, an optionally substituted benzoyl group, an optionally substituted phenoxycarbonyl group, an optionally substituted benzoyloxy group, an optionally substituted phenylalkyl group having 7 or more and 20 or less carbon atoms, an optionally substituted naphthyl group, an optionally substituted naphthoxy group, an optionally substituted naphthoyl group, an optionally substituted naphthoxycarbonyl group, an optionally substituted naphthoyloxy group, an optionally substituted naphthylalkyl group having 11 or more and 20 or less carbon atoms, an optionally substituted heterocyclyl group, an optionally substituted heterocyclylcarbonyl group, an amino group, an amino group substituted with one or two organic groups, a morpholin-1-yl group, a piperazin-1-yl group, halogen, a nitro group, a cyano group and the like. Examples of a suitable substituent that the phenyl group and the carbazolyl group may have on a carbon atom include the above examples of groups as a suitable substituent that the alkyl group may have on a carbon atom and an alkyl group having 1 or more and 20 or less carbon atoms.

For an alkyl group, an alkoxy group, a cycloalkyl group, a cycloalkoxy group, a saturated aliphatic acyl group, an alkoxycarbonyl group, a saturated aliphatic acyloxy group, an optionally substituted phenylalkyl group, an optionally substituted naphthylalkyl group, an optionally substituted heterocyclyl group and an amino group substituted with one or two organic groups, specific examples of optional substituents on the alkyl group, the phenyl group, or the carbazolyl group are the same as the examples of a substituent of the phenyl group when $R^{d12}$ is an optionally substituted phenyl group.

In a case where the phenyl group, the naphthyl group and the heterocyclyl group included in the substituent on the alkyl group, the phenyl group, or the carbazolyl group in $R^{d13}$ further have a substituent, examples of the further substituent include an alkyl group having 1 or more and 6 or less carbon atoms; an alkoxy group having 1 or more and 6 or less carbon atoms; a saturated aliphatic acyl group having 2 or more and 7 or less carbon atoms; an alkoxycarbonyl group having 2 or more and 7 or less carbon atoms; a saturated aliphatic acyloxy group having 2 or more and 7 or less carbon atoms; a phenyl group; a naphthyl group; a benzoyl group; a naphthoyl group; a benzoyl group substituted with a group selected from the group consisting of an alkyl group having 1 or more and 6 or less carbon atoms, a morpholin-1-yl group, a piperazin-1-yl group and a phenyl group; a monoalkylamino group having an alkyl group having 1 or more and 6 or less carbon atoms; a dialkylamino group having an alkyl group having 1 or more and 6 or less carbon atoms; a morpholin-1-yl group; a piperazin-1-yl group; halogen; a nitro group; and a cyano group. In a case where the phenyl group, the naphthyl group and the heterocyclyl group included in the substituent on the alkyl group or the phenyl group further have a substituent, the number of further substituents is not limited as long as the objects of the present invention are not inhibited, and is preferably 1 or more and 4 or less. In a case where the phenyl group, the naphthyl group and the heterocyclyl group have a plurality of substituents, the substituents may be the same as or different from each other.

From a viewpoint of efficiency of base generation of the compound represented by the formula (d4), as $R^{d13}$, a group represented by the following formula (d5):

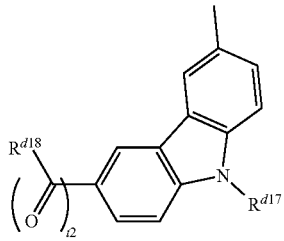

(d5)

and a group represented by the following formula (d6):

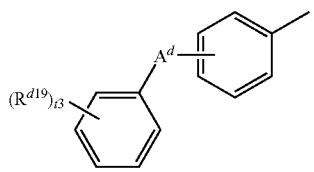

(d6)

are preferable.

In the formula (d5), $R^{d17}$ and $R^{d18}$ each represent a monovalent organic group and t2 is 0 or 1. In the formula (d6), $R^{d19}$ represents a group selected from the group consisting of a monovalent organic group, an amino group, a halogen, a nitro group, and a cyano group, $A^d$ represents S or O, and t3 is an integer of 0 or more and 4 or less.

$R^{d17}$ in the formula (d5) may be selected from various organic groups as long as the objects of the present invention are not inhibited. Examples of suitable $R^{d17}$ include an alkyl group having 1 or more and 20 or less carbon atoms, a cycloalkyl group having 3 or more and 10 or less carbon atoms, a saturated aliphatic acyl group having 2 or more and 20 or less carbon atoms, an alkoxycarbonyl group having 2 or more and 20 or less carbon atoms, an optionally substituted phenyl group, an optionally substituted benzoyl group, an optionally substituted phenoxycarbonyl group, an optionally substituted phenylalkyl group having 7 or more and 20 or less carbon atoms, an optionally substituted naphthyl group, an optionally substituted naphthoyl group, an optionally substituted naphthoxycarbonyl group, an optionally substituted naphthylalkyl group having 11 or more and 20 or less carbon atoms, an optionally substituted heterocyclyl group, and an optionally substituted heterocyclylcarbonyl group.

Among the above groups as $R^{d17}$, an alkyl group having 1 or more and 20 or less carbon atoms is preferable, an alkyl group having 1 or more and 6 or less carbon atoms is more preferable, and an ethyl group is particularly preferable.

$R^{d18}$ in the formula (d5) is not particularly limited as long as the objects of the present invention are not inhibited, and may be selected from various organic groups. Specific examples of a suitable group as $R^{d18}$ include an alkyl group having 1 or more and 20 or less carbon atoms, an optionally substituted phenyl group, an optionally substituted naphthyl group, and an optionally substituted heterocyclyl group. Among these groups, $R^{d18}$ is more preferably an optionally substituted phenyl group and an optionally substituted naphthyl group, and particularly preferably a 2-methylphenyl group and a naphthyl group.

When a phenyl group, a naphthyl group, and a heterocyclyl group in $R^{d17}$ or $R^{d18}$ further have a substituent, examples of the substituent include an alkyl group having 1 or more and 6 or less carbon atoms, an alkoxy group having 1 or more and 6 or less carbon atoms, a saturated aliphatic acyl group having 2 or more and 7 or less carbon atoms, an alkoxycarbonyl group having 2 or more and 7 or less carbon atoms, a saturated aliphatic acyloxy group having 2 or more and 7 or less carbon atoms, a monoalkylamino group having an alkyl group having 1 or more and 6 or less carbon atoms, a dialkylamino group having an alkyl group having 1 or more and 6 or less carbon atoms, a morpholin-1-yl group, a piperazin-1-yl group, a halogen, a nitro group, and a cyano group. When a phenyl group, a naphthyl group, and a heterocyclyl group in $R^{d17}$ or $R^{d18}$ further have a substituent, the number of substituents is not limited as long as the objects of the present invention are not inhibited, and is preferably 1 or more and 4 or less. When a phenyl group, a naphthyl group, and a heterocyclyl group in $R^{d17}$ or $R^{d18}$ has a plurality of substituents, the plurality of substituents may be the same as or different from each other.

When $R^{d19}$ in the formula (d6) is an organic group, $R^{d19}$ can be selected from various types of organic groups as long as the objects of the present invention are not inhibited. Preferred examples when $R^{d19}$ is an organic group in the formula (d6) include alkyl groups having 1 or more and 6 or less carbon atoms; alkoxy groups having 1 or more and 6 or less carbon atoms; saturated aliphatic acyl groups having 2 or more and 7 or less carbon atoms; alkoxycarbonyl groups having 2 or more and 7 or less carbon atoms; saturated aliphatic acyloxy groups having 2 or more and 7 or less carbon atoms; a phenyl group; a naphthyl group; a benzoyl group; a naphthoyl group; benzoyl groups substituted with a group selected from the group consisting of an alkyl group having 1 or more and 6 or less carbon atoms, a morpholin-1-yl group, a piperazin-1-yl group and a phenyl group; monoalkylamino groups having an alkyl group having 1 or more and 6 or less carbon atoms; dialkylamino groups having alkyl groups having 1 or more and 6 or less carbon atoms; a morpholin-1-yl group; a piperazin-1-yl group; halogen; a nitro group; a cyano group; a 2-methylphenylcarbonyl group; a 4-(piperazin-1-yl)phenylcarbonyl group; and a 4-(phenyl)phenylcarbonyl group.

Among $R^{d19}$, a benzoyl group; a naphthoyl group; a benzoyl groups substituted with a group selected from the group consisting of an alkyl group having 1 or more and 6 or less carbon atoms, a morpholin-1-yl group, a piperazin-1-yl group, and a phenyl group; and a nitro group are preferred, and a benzoyl group; a naphthoyl group; a 2-methylphenylcarbonyl group; a 4-(piperazine-1-yl)phenylcarbonyl group; and a 4-(phenyl)phenylcarbonyl group are more preferred.

In the formula (d6), t3 is preferably an integer of 0 or more and 3 or less, more preferably an integer of 0 or more and 2 or less, and particularly preferably 0 or 1. When t3 is 1, the position at which $R^{d19}$ bonds is preferably the para-position to the bonding through which the phenyl group (to which $R^{d19}$ bonds) bonds to a sulfur atom.

$R^{d14}$ represents a hydrogen atom, an alkyl group having 1 or more and 6 or less carbon atoms, or an optionally substituted phenyl group. When an optionally substituted phenyl group is represented, the substituent that the phenyl group may have is the same as the substituent for the case in which $R^{d12}$ is an optionally substituted phenyl group. $R^{d14}$ is preferably a methyl group, an ethyl group, or a phenyl group, and more preferably a methyl group or a phenyl group.

Examples of the compound represented by the formula (d4) include a compound represented by the following formula (d7).

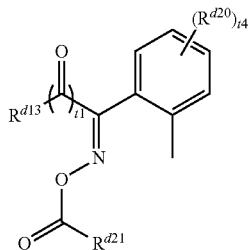

(d7)

In the formula (d7), t1 and $R^{d13}$ are as described above. $R^{d20}$ represents a group selected from the group consisting of a monovalent organic group, an amino group, a halogen, a nitro group, and a cyano group, t4 is an integer of 0 or more and 4 or less, and $R^{d21}$ represents a hydrogen atom or an alkyl group having 1 or more and 6 or less carbon atoms.

In the formula (d7), $R^{d20}$ is not particularly limited as long as the objects of the present invention are not inhibited, and when it is an organic group, it is appropriately selected from various organic groups. Suitable examples of $R^{d20}$ include an alkyl group, an alkoxy group, a cycloalkyl group, a cycloalkoxy group, a saturated aliphatic acyl group, an alkoxycarbonyl group, a saturated aliphatic acyloxy group, an optionally substituted phenyl group, an optionally substituted phenoxy group, an optionally substituted benzoyl group, an optionally substituted phenoxycarbonyl group, an optionally substituted benzoyloxy group, an optionally substituted phenylalkyl group, an optionally substituted naphthyl group, an optionally substituted naphthoxy group, an optionally substituted naphthoyl group, an optionally substituted naphthoxycarbonyl group, an optionally substituted naphthoyloxy group, an optionally substituted naphthylalkyl group, an optionally substituted heterocyclyl group, an amino group, an amino group substituted with one or two organic groups, a morpholin-1-yl group, a piperazin-1-yl group, a halogen, a nitro group, and a cyano group. When t4 is an integer of 2 or more and 4 or less, $R^{d20}$ may be the same as or different from each other. The number of carbon atoms of the substituent does not include the number of carbon atoms of any further substituents of the substituent.

When $R^{d20}$ is an alkyl group, the number of carbon atoms is preferably 1 or more and 20 or less, and more preferably 1 or more and 6 or less. When $R^{d20}$ is an alkyl group, the alkyl group may be a linear or branched alkyl group. When $R^{d20}$ is an alkyl group, specific examples thereof include a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, an n-hexyl group, an n-heptyl group, an n-octyl group, an isooctyl group, a sec-octyl group, a tert-octyl group, an n-nonyl group, an isononyl group, an n-decyl group, an isodecyl group, and the like. When $R^{d20}$ is an alkyl group, the alkyl group may contain an ether bond (—O—) in the carbon chain. Examples of the alkyl group having an ether bond in the carbon chain include a methoxyethyl group, an ethoxyethyl group, a methoxyethoxyethyl group, an ethoxyethoxyethyl group, a propyloxyethoxyethyl group, a methoxypropyl group, and the like.

When $R^{d20}$ is an alkoxy group, the number of carbon atoms is preferably 1 or more and 20 or less, and more preferably 1 or more and 6 or less. When $R^{d20}$ is an alkoxy group, the alkoxy group may be linear or branched. When $R^{d20}$ is an alkoxy group, specific examples thereof include a methoxy group, an ethoxy group, an n-propyloxy group, an isopropyloxy group, an n-butyloxy group, an isobutyloxy group, a sec-butyloxy group, a tert-butyloxy group, an n-pentyloxy group, an isopentyloxy group, a sec-pentyloxy group, a tert-pentyloxy group, an n-hexyloxy group, an n-heptyloxy group, an n-octyloxy group, an isooctyloxy group, a sec-octyloxy group, a tert-octyloxy group, an n-nonyloxy group, an isononyloxy group, an n-decyloxy group, and an isodecyloxy group. When $R^{d20}$ is an alkoxy group, the alkoxy group may contain an ether bond (—O—) in the carbon chain. Examples of the alkoxy group having an ether bond in the carbon chain include a methoxyethoxy group, an ethoxyethoxy group, a methoxyethoxyethoxy group, an ethoxyethoxyethoxy group, a propyloxyethoxyethoxy group, and a methoxypropyloxy group.

When $R^{d20}$ is a cycloalkyl group or a cycloalkoxy group, the number of carbon atoms is preferably 3 or more and 10 or less, and more preferably 3 or more and 6 or less. When $R^{d20}$ is a cycloalkyl group, specific examples thereof include a cyclopropyl group, a cyclobutyl group, a cyclopentyl group, a cyclohexyl group, a cycloheptyl group, and a cyclooctyl group. When $R^{d20}$ is a cycloalkoxy group, specific examples thereof include a cyclopropyloxy group, a cyclobutyloxy group, a cyclopentyloxy group, a cyclohexyloxy group, a cycloheptyloxy group, and a cyclooctyloxy group.

When $R^{d20}$ is a saturated aliphatic acyl group or a saturated aliphatic acyloxy group, the number of carbon atoms is preferably 2 or more and 20 or less, and more preferably 2 or more and 7 or less. When $R^{d20}$ is a saturated aliphatic acyl group, specific examples thereof include an acetyl group, a propanoyl group, an n-butanoyl group, a 2-methylpropanoyl group, an n-pentanoyl group, a 2,2-dimethylpropanoyl group, an n-hexanoyl group, an n-heptanoyl group, an n-octanoyl group, an n-nonanoyl group, an n-decanoyl group, an n-undecanoyl group, an n-dodecanoyl group, an n-tridecanoyl group, an n-tetradecanoyl group, an n-pentadecanoyl group, and an n-hexadecanoyl group. When $R^{d20}$ is a saturated aliphatic acyloxy group, specific examples thereof include an acetyloxy group, a propanoyloxy group, an n-butanoyloxy group, a 2-methylpropanoyloxy group, an n-pentanoyloxy group, a 2,2-dimethylpropanoyloxy group, an n-hexanoyloxy group, an n-heptanoyloxy group, an n-octanoyloxy group, an n-nonanoyloxy group, an n-decanoyloxy group, an n-undecanoyloxy group, an n-dodecanoyloxy group, an n-tridecanoyloxy group, an n-tetradecanoyloxy group, an n-pentadecanoyloxy group, and an n-hexadecanoyloxy group.

When $R^{d20}$ is an alkoxycarbonyl group, the number of carbon atoms is preferably 2 or more and 20 or less, and preferably 2 or more and 7 or less. When $R^{d20}$ is an alkoxycarbonyl group, specific examples thereof include a methoxycarbonyl group, an ethoxycarbonyl group, an n-propyloxycarbonyl group, an isopropyloxycarbonyl group, an n-butyloxycarbonyl group, an isobutyloxycarbonyl group, a sec-butyloxycarbonyl group, a tert-butyloxycarbonyl group, an n-pentyloxycarbonyl group, an isopentyloxycarbonyl group, a sec-pentyloxycarbonyl group, a tert-pentyloxycarbonyl group, an n-hexyloxycarbonyl group, an n-heptyloxycarbonyl group, an n-octyloxycarbonyl group, an isooctyloxycarbonyl group, a sec-octyloxycarbonyl group, a tert-octyloxycarbonyl group, an n-nonyloxycarbonyl group, an isononyloxycarbonyl group, an n-decyloxycarbonyl group, and an isodecyloxycarbonyl group.

When $R^{d20}$ is a phenylalkyl group, the number of carbon atoms is preferably 7 or more and 20 or less, and more preferably 7 or more and 10 or less. When $R^{d20}$ is a naphthylalkyl group, the number of carbon atoms is preferably 11 or more and 20 or less, and more preferably 11 or more and 14 or less. When $R^{d20}$ is a phenylalkyl group, specific examples thereof include a benzyl group, a 2-phenylethyl group, a 3-phenylpropyl group, and a 4-phenylbutyl group. When $R^{d20}$ is a naphthylalkyl group, specific examples thereof include an α-naphthylmethyl group, a β-naphthylmethyl group, a 2-(α-naphthyl)ethyl group, and a 2-(β-naphthyl)ethyl group. When $R^{d20}$ is a phenylalkyl group or a naphthylalkyl group, $R^{d20}$ may further have a substituent on a phenyl group or a naphthyl group.

When $R^{d20}$ is a heterocyclyl group, the heterocyclyl group is a 5- or 6-membered monocycle including one or more N, S, and O, or a heterocyclyl group in which these monocycles are condensed with each other, or the monocycle and a benzene ring are condensed. When the heterocyclyl group is a condensed ring, the number of rings constituting the condensed ring is 3 or less. Examples of the heterocycle constituting the heterocyclyl group include furan, thiophene, pyrrole, oxazole, isoxazole, thiazole, thiadiazole, isothiazole, imidazole, pyrazole, triazole, pyridine, pyrazine, pyrimidine, pyridazine, benzofuran, benzothiophene, indole, isoindole, indolizine, benzimidazole, benzotriazole, benzoxazole, benzothiazole, carbazole, purine, quinoline, isoquinoline, quinazoline, phthalazine, cinnoline, quinoxaline, and the like. When $R^{d21}$ is a heterocyclyl group, the heterocyclyl group may have a further substituent.

When $R^{d20}$ is an amino group substituted with one or two organic groups, suitable examples of the organic group include an alkyl group having 1 or more and 20 or less carbon atoms, a cycloalkyl group having 3 or more and 10 or less carbon atoms, a saturated aliphatic acyl group having 2 or more and 20 or less carbon atoms, an optionally substituted phenyl group, an optionally substituted benzoyl group, an optionally substituted phenylalkyl group having 7 or more and 20 or less carbon atoms, an optionally substituted naphthyl group, an optionally substituted naphthoyl group, an optionally substituted naphthylalkyl group having 11 or more and 20 or less carbon atoms, a heterocyclyl group, and the like. Specific examples of suitable organic group are the same as those in $R^{d20}$. Specific examples of the amino group substituted with one or two organic groups include a methylamino group, an ethylamino group, a diethylamino group, an n-propylamino group, a di-n-propylamino group, an isopropylamino group, an n-butylamino group, a di-n-butylamino group, an n-pentylamino group, an n-hexylamino group, an n-heptylamino group, an n-octylamino group, an n-nonylamino group, an n-decylamino group, a phenylamino group, a naphthylamino group, an acetylamino group, a propanoylamino group, an n-butanoylamino group, an n-pentanoylamino group, an n-hexanoylamino group, an n-heptanoylamino group, an n-octanoylamino group, an n-decanoylamino group, a benzoylamino group, an α-naphthoylamino group, a β-naphthoylamino group, and the like.

When a phenyl group, a naphthyl group, and a heterocyclyl group included in $R^{d20}$ further have a substituent, examples of the substituent include an alkyl group having 1 or more and 6 or less carbon atoms, an alkoxy group having 1 or more and 6 or less carbon atoms, a saturated aliphatic acyl group having 2 or more and 7 or less carbon atoms, an alkoxycarbonyl group having 2 or more and 7 or less carbon atoms, a saturated aliphatic acyloxy group having 2 or more and 7 or less carbon atoms, a monoalkylamino group which has an alkyl group having 1 or more and 6 or less carbon atoms, a dialkylamino group which has an alkyl group having 1 or more and 6 or less carbon atoms, a morpholin-1-yl group, a piperazin-1-yl group, halogen, a nitro group, a cyano group, and the like. When a phenyl group, a naphthyl group, and a heterocyclyl group included in $R^{d21}$ further have a substituent, the number of substituents is not particularly limited as long as the object of the present invention is not inhibited, and is preferably 1 or more and 4 or less. When a phenyl group, a naphthyl group, and a heterocyclyl group included in $R^{d20}$ have a plurality of substituents, the plurality of substituents may be the same as or different from each other.

Among $R^{d20}$, a group selected from the group consisting of an alkyl group having 1 or more and 6 or less carbon atoms, an alkoxy group having 1 or more and 6 or less carbon atoms, and a saturated aliphatic acyl group having 2 or more and 7 or less carbon atoms is preferable, an alkyl having 1 or more and 6 or less carbon atoms is more preferable, and a methyl group is particularly preferable, since these are chemically stable and facilitate the synthesis of an oxime ester compound due to little steric hindrance.

When the position of a bond of the phenyl group and the main skeleton of an oxime ester compound is regarded as the 1-position and the position of the methyl group is regarded as the 2-position with respect to the phenyl group to which $R^{d20}$ is bonded, the position at which $R^{d20}$ is bonded to the phenyl group is preferably the 4-position or the 5-position, and more preferably the 5-position.

t4 is preferably an integer of 0 or more and 3 or less, more preferably an integer of 0 or more and 2 or less, and particularly preferably 0 or 1.

$R^{d21}$ in the formula (d7) is a hydrogen atom, or an alkyl group having 1 or more and 6 or less carbon atoms. $R^{d21}$ is preferably a methyl group or an ethyl group, and more preferably a methyl group.

Specific examples of a particularly suitable compound as an oxime ester compound represented by the formula (d4) are as follows.

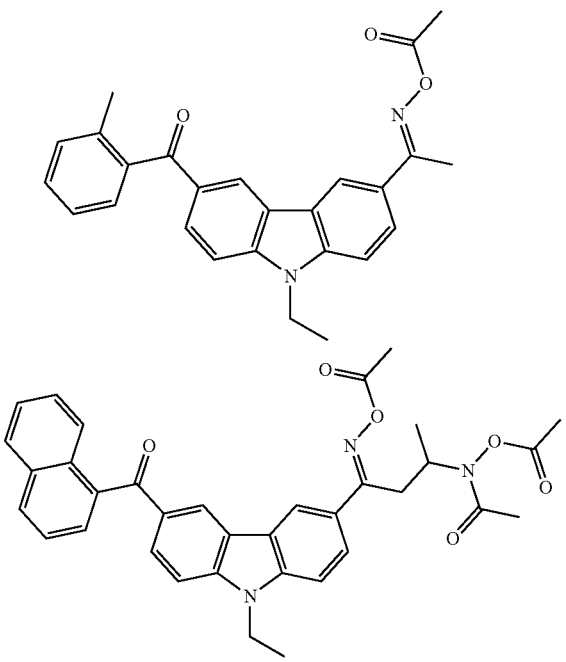

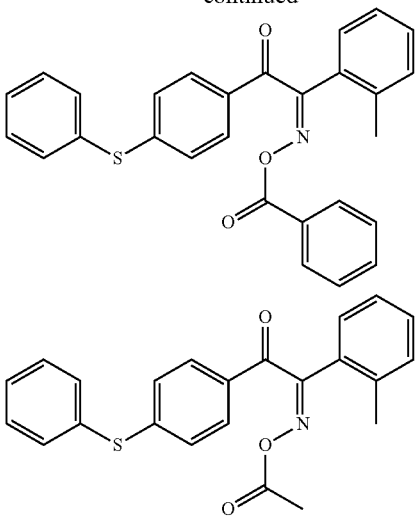

A compound represented by the following formula (d8) is also suitably used as an oxime ester compound.

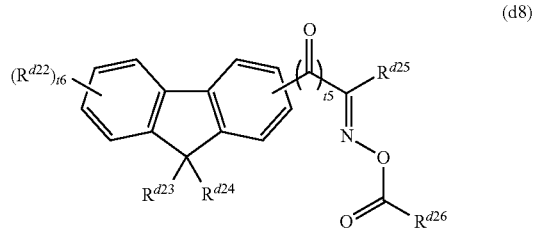

In the formula (d8), $R^{d22}$ is a hydrogen atom, a nitro group, or a monovalent organic group; $R^{d23}$ and $R^{d24}$ each represent an optionally substituted chain alkyl group, an optionally substituted cyclic organic group, or a hydrogen atom, and $R^{d23}$ and $R^{d24}$ may be bonded to one another to form a ring; $R^{d25}$ is a monovalent organic group; $R^{d26}$ is a hydrogen atom, an optionally substituted alkyl group having 1 or more and 11 or less carbon atoms, or an optionally substituted aryl group; t6 is an integer of 0 or more and 4 or less; and t5 is 0 or 1.

In the formula (d8), $R^{d22}$ is a hydrogen atom, a nitro group, or a monovalent organic group. $R^{d22}$ is bonded to a 6-membered aromatic ring which is different from the 6-membered aromatic ring bonded to a group represented as —(CO)$_{t5}$— on a fluorene ring in the formula (d8). In the formula (d8), the bond position of $R^{d22}$ to a fluorene ring is not particularly limited. When a compound represented by the formula (d8) has one or more $R^{d22}$, one of the one or more $R^{d22}$ is preferably bonded at the 2-position in the fluorene ring since synthesis of the compound represented by the formula (d8) becomes easy. When a plurality of $R^{d22}$ exist, the plurality of $R^{d22}$ may be the same or different.

When $R^{d22}$ is an organic group, $R^{d22}$ is not particularly limited as long as the object of the present invention is not inhibited, and is appropriately selected from various organic groups. When $R^{d22}$ is an organic group, suitable examples thereof include an alkyl group, an alkoxy group, a cycloalkyl group, a cycloalkoxy group, a saturated aliphatic acyl group, an alkoxycarbonyl group, a saturated aliphatic acyloxy group, an optionally substituted phenyl group, an optionally substituted phenoxy group, an optionally substituted benzoyl group, an optionally substituted phenoxycarbonyl group, an optionally substituted benzoyloxy group, an optionally substituted phenylalkyl group, an optionally substituted naphthyl group, an optionally substituted naphthoxy group, an optionally substituted naphthoyl group, an optionally substituted naphthoxycarbonyl group, an optionally substituted naphthoyloxy group, an optionally substituted naphthylalkyl group, an optionally substituted heterocyclyl group, an optionally substituted heterocyclylcarbonyl group, an amino group substituted with one or two organic groups, a morpholin-1-yl group, and a piperazin-1-yl group.

When $R^{d22}$ is an alkyl group, the number of carbon atoms of the alkyl group is preferably 1 or more and 20 or less, and more preferably 1 or more and 6 or less. When $R^{d22}$ is an alkyl group, the alkyl group may be a linear or branched alkyl group. When $R^{d22}$ is an alkyl group, specific examples thereof include a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, an n-hexyl group, an n-heptyl group, an n-octyl group, an isooctyl group, a sec-octyl group, a tert-octyl group, an n-nonyl group, an isononyl group, an n-decyl group, an isodecyl group, and the like. When $R^{d22}$ is an alkyl group, the alkyl group may contain an ether bond (—O—) in the carbon chain. Examples of the alkyl group having an ether bond in the carbon chain include a methoxyethyl group, an ethoxyethyl group, a methoxyethoxyethyl group, an ethoxyethoxyethyl group, a propyloxyethoxyethyl group, a methoxypropyl group, and the like.

When $R^{d22}$ is an alkoxy group, the number of carbon atoms of the alkoxy group is preferably 1 or more and 20 or less, and more preferably 1 or more and 6 or less. When $R^{d22}$ is an alkoxy group, the alkoxy group may be linear or branched. When $R^{d22}$ is an alkoxy group, specific examples thereof include a methoxy group, an ethoxy group, an n-propyloxy group, an isopropyloxy group, an n-butyloxy group, an isobutyloxy group, a sec-butyloxy group, a tert-butyloxy group, an n-pentyloxy group, an isopentyloxy group, a sec-pentyloxy group, a tert-pentyloxy group, an n-hexyloxy group, an n-heptyloxy group, an n-octyloxy group, an isooctyloxy group, a sec-octyloxy group, a tert-octyloxy group, an n-nonyloxy group, an isononyloxy group, an n-decyloxy group, and an isodecyloxy group. When $R^{d22}$ is an alkoxy group, the alkoxy group may contain an ether bond (—O—) in the carbon chain. Examples of the alkoxy group having an ether bond in the carbon chain include a methoxyethoxy group, an ethoxyethoxy group, a methoxyethoxyethoxy group, an ethoxyethoxyethoxy group, a propyloxyethoxyethoxy group, and a methoxypropyloxy group.

When $R^{d22}$ is a cycloalkyl group or a cycloalkoxy group, the number of carbon atoms of the cycloalkyl group or cycloalkoxy group is preferably 3 or more and 10 or less, and more preferably 3 or more and 6 or less. When $R^{d22}$ is a cycloalkyl group, specific examples thereof include a cyclopropyl group, a cyclobutyl group, a cyclopentyl group, a cyclohexyl group, a cycloheptyl group, and a cyclooctyl group. When $R^{d22}$ is a cycloalkoxy group, specific examples thereof include a cyclopropyloxy group, a cyclobutyloxy group, a cyclopentyloxy group, a cyclohexyloxy group, a cycloheptyloxy group, and a cyclooctyloxy group.

When $R^{d22}$ is a saturated aliphatic acyl group or a saturated aliphatic acyloxy group, the number of carbon atoms of the saturated aliphatic acyl group or saturated aliphatic acyloxy group is preferably 2 or more and 21 or less, and more preferably 2 or more and 7 or less. When $R^{d22}$ is a saturated aliphatic acyl group, specific examples thereof include an acetyl group, a propanoyl group, an n-butanoyl group, a 2-methylpropanoyl group, an n-pentanoyl group, a 2,2-dimethylpropanoyl group, an n-hexanoyl group, an n-heptanoyl group, an n-octanoyl group, an n-nonanoyl group, an n-decanoyl group, an n-undecanoyl group, an n-dodecanoyl group, an n-tridecanoyl group, an n-tetradecanoyl group, an n-pentadecanoyl group, and an n-hexadecanoyl group. When $R^{d22}$ is a saturated aliphatic acyloxy group, specific examples thereof include an acetyloxy group, a propanoyloxy group, an n-butanoyloxy group, a 2-methylpropanoyloxy group, an n-pentanoyloxy group, a 2,2-dimethylpropanoyloxy group, an n-hexanoyloxy group, an n-heptanoyloxy group, an n-octanoyloxy group, an n-nonanoyloxy group, an n-decanoyloxy group, an n-undecanoyloxy group, an n-dodecanoyloxy group, an n-tridecanoyloxy group, an n-tetradecanoyloxy group, an n-pentadecanoyloxy group, and an n-hexadecanoyloxy group.

When $R^{d22}$ is an alkoxycarbonyl group, the number of carbon atoms of the alkoxycarbonyl group is preferably 2 or more and 20 or less, and more preferably 2 or more and 7 or less. When $R^{d22}$ is an alkoxycarbonyl group, specific examples thereof include a methoxycarbonyl group, an ethoxycarbonyl group, an n-propyloxycarbonyl group, an isopropyloxycarbonyl group, an n-butyloxycarbonyl group, an isobutyloxycarbonyl group, a sec-butyloxycarbonyl group, a tert-butyloxycarbonyl group, an n-pentyloxycarbonyl group, an isopentyloxycarbonyl group, a sec-pentyloxycarbonyl group, a tert-pentyloxycarbonyl group, an n-hexyloxycarbonyl group, an n-heptyloxycarbonyl group, an n-octyloxycarbonyl group, an isooctyloxycarbonyl group, a sec-octyloxycarbonyl group, a tert-octyloxycarbonyl group, an n-nonyloxycarbonyl group, an isononyloxycarbonyl group, an n-decyloxycarbonyl group, and an isodecyloxycarbonyl group.

When $R^{d22}$ is a phenylalkyl group, the number of carbon atoms of the phenylalkyl group is preferably 7 or more and 20 or less, and more preferably 7 or more and 10 or less. When $R^{d22}$ is a naphthylalkyl group, the number of carbon atoms of the naphthylalkyl group is preferably 11 or more and 20 or less, and more preferably 11 or more and 14 or less. When $R^{d22}$ is a phenylalkyl group, specific examples thereof include a benzyl group, a 2-phenylethyl group, a 3-phenylpropyl group, and a 4-phenylbutyl group. When $R^{d22}$ is a naphthylalkyl group, specific examples thereof include an α-naphthylmethyl group, a β-naphthylmethyl group, a 2-(α-naphthyl)ethyl group, and a 2-(β-naphthyl)ethyl group. When $R^{d22}$ is a phenylalkyl group or a naphthylalkyl group, $R^{d22}$ may further have a substituent on the phenyl group or the naphthyl group.

When $R^{d22}$ is a heterocyclyl group, the heterocyclyl group is a 5- or 6-membered monocycle including one or more N, S, and O, or a heterocyclyl group in which these monocycles are condensed with each other, or the monocycle and a benzene ring are condensed. When the heterocyclyl group is a condensed ring, the number of rings constituting the condensed ring is 3 or less. The heterocyclyl group may be an aromatic group (heteroaryl group) or a non-aromatic group. Examples of the heterocycle constituting the heterocyclyl group include furan, thiophene, pyrrole, oxazole, isoxazole, thiazole, thiadiazole, isothiazole, imidazole, pyrazole, triazole, pyridine, pyrazine, pyrimidine, pyridazine, benzofuran, benzothiophene, indole, isoindole, indolizine, benzimidazole, benzotriazole, benzoxazole, benzothiazole, carbazole, purine, quinoline, isoquinoline, quinazoline, phthalazine, cinnoline, quinoxaline, piperidine, piperazine, morpholine, piperidine, tetrahydropyran, and tetrahydrofuran. When $R^{d22}$ is a heterocyclyl group, the heterocyclyl group may further have a substituent.

When $R^{d22}$ is a heterocyclylcarbonyl group, the heterocyclyl group included in the heterocyclylcarbonyl group is the same as that in the case where $R^{d22}$ is a heterocyclyl group.

When $R^{d22}$ is an amino group substituted with one or two organic groups, suitable examples of the organic groups include an alkyl group having 1 or more and 20 or less carbon atoms, a cycloalkyl group having 3 or more and 10 or less carbon atoms, a saturated aliphatic acyl group having 2 or more and 21 or less carbon atoms, an optionally substituted phenyl group, an optionally substituted benzoyl group, an optionally substituted phenylalkyl group having 7 or more and 20 or less carbon atoms, an optionally substituted naphthyl group, an optionally substituted naphthoyl group, an optionally substituted naphthylalkyl group having 11 or more and 20 or less carbon atoms, and a heterocyclyl group. The specific examples of these suitable organic groups are the same as those of $R^{d22}$. Specific examples of the amino group substituted with one or two organic groups include a methylamino group, an ethylamino group, a diethylamino group, an n-propylamino group, a di-n-propylamino group, an isopropylamino group, an n-butylamino group, a di-n-butylamino group, an n-pentylamino group, an n-hexylamino group, an n-heptylamino group, an n-octylamino group, an n-nonylamino group, an n-decylamino group, a phenylamino group, a naphthylamino group, an acetylamino group, a propanoylamino group, an n-butanoylamino group, an n-pentanoylamino group, an n-hexanoylamino group, an n-heptanoylamino group, an n-octanoylamino group, an n-decanoylamino group, a benzoylamino group, an α-naphthoylamino group, and a β-naphthoylamino group.

When the phenyl group, the naphthyl group, and the heterocyclyl group included in $R^{d22}$ further have a substituent, examples thereof include an alkyl group having 1 or more and 6 or less carbon atoms, an alkoxy group having 1 or more and 6 or less carbon atoms, a saturated aliphatic acyl group having 2 or more and 7 or less carbon atoms, an alkoxycarbonyl group having 2 or more and 7 or less carbon atoms, a saturated aliphatic acyloxy group having 2 or more and 7 or less carbon atoms, a monoalkylamino group having an alkyl group which has 1 or more and 6 or less carbon atoms, a dialkylamino group having an alkyl group which has 1 or more and 6 or less carbon atoms, a morpholin-1-yl group, a piperazin-1-yl group, halogen, a nitro group, and a cyano group. When a phenyl group, a naphthyl group, and a heterocyclyl group included in $R^{d22}$ further have substituents, the number of substituents is not particularly limited as long as the object of the present invention is not inhibited, and is preferably 1 or more and 4 or less. When a phenyl group, a naphthyl group, and a heterocyclyl group included in $R^{d22}$ have a plurality of substituents, the plurality of substituents may be the same or different.

Among the above-described groups, $R^{d22}$ is preferably a nitro group or a group represented as $R^{d27}$—CO— since the sensitivity tends to be improved. $R^{d27}$ is not particularly limited as long as the object of the present invention is not inhibited, and can be selected from various organic groups. Examples of the group suitable as $R^{d27}$ include an alkyl group having 1 or more and 20 or less carbon atoms, an optionally substituted phenyl group, an optionally substituted naphthyl group, and an optionally substituted heterocyclyl group. Among these groups, $R^{d27}$ is particularly preferably a 2-methylphenyl group, a thiophen-2-yl group, and an α-naphthyl group. $R^{d22}$ is also preferably a hydrogen atom. When $R^{d22}$ is a hydrogen atom, $R^{d25}$ is preferably a group represented by the following formula (d10).

In the formula (d8), $R^{d23}$ and $R^{d24}$ each represent an optionally substituted chain alkyl group, an optionally substituted cyclic organic group, or a hydrogen atom. $R^{d23}$ and $R^{d24}$ may be bonded to one another to form a ring. Among these groups, preferably, $R^{d23}$ and $R^{d24}$ are optionally substituted chain alkyl groups. When $R^{d23}$ and $R^{d24}$ are optionally substituted chain alkyl groups, a chain alkyl group may be a linear alkyl group or a branched alkyl group.

When $R^{d23}$ and $R^{d24}$ are chain alkyl groups having no substituents, the number of carbon atoms of the chain alkyl group is preferably 1 or more and 20 or less, more preferably 1 or more and 10 or less, and particularly preferably 1 or more and 6 or less. When $R^{d23}$ and $R^{d24}$ are chain alkyl groups, specific examples thereof include a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, an n-hexyl group, an n-heptyl group, an n-octyl group, an isooctyl group, a sec-octyl group, a tert-octyl group, an n-nonyl group, an isononyl group, an n-decyl group, and an isodecyl group. When $R^{d23}$ and $R^{d24}$ are alkyl groups, the alkyl group may have an ether bond (—O—) in a carbon chain. Examples of the alkyl group having an ether bond in a carbon chain include a methoxyethyl group, an ethoxyethyl group, a methoxyethoxyethyl group, an ethoxyethoxyethyl group, a propyloxyethoxyethyl group, and a methoxypropyl group.

When $R^{d23}$ and $R^{d24}$ are chain alkyl groups having a substituent, the number of carbon atoms of the chain alkyl group is preferably 1 or more and 20 or less, more preferably 1 or more and 10 or less, and particularly preferably 1 or more and 6 or less. In this case, the number of carbon atoms of the substituent is not included in the number of carbon atoms of the chain alkyl group. The chain alkyl group having a substituent is preferably a linear group. The substituent, with which the alkyl group is optionally substituted, is not particularly limited as long as the object of the present invention is not inhibited. Suitable examples of the substituent include a cyano group, a halogen atom, a cyclic organic group, and an alkoxycarbonyl group. Examples of the halogen atom include a fluorine atom, a chlorine atom, a bromine atom, and an iodine atom. Among these, a fluorine atom, a chlorine atom, and a bromine atom are preferable. Examples of the cyclic organic group include a cycloalkyl group, an aromatic hydrocarbon group, and a heterocyclyl group. Specific examples of the cycloalkyl group are the same as suitable examples in the case where $R^{d22}$ is a cycloalkyl group. Specific examples of the aromatic hydrocarbon group include a phenyl group, a naphthyl group, a biphenylyl group, an anthryl group, and a phenanthryl group. Specific examples of the heterocyclyl group are the same as suitable examples in the case where $R^{d22}$ is a heterocyclyl group. When $R^{d22}$ is an alkoxycarbonyl group, the alkoxy group included in the alkoxycarbonyl group may be a linear or branched group, and preferably a linear group. The number of carbon atoms of an alkoxy group included in the alkoxycarbonyl group is preferably 1 or more and 10 or less, and more preferably 1 or more and 6 or less.

When the chain alkyl group has a substituent, the number of substituents is not particularly limited. The number of substituents preferably varies depending on the number of carbon atoms of the chain alkyl group. The number of substituents is typically 1 or more and 20 or less, preferably 1 or more and 10 or less, and more preferably 1 or more and 6 or less.

When $R^{d23}$ and $R^{d24}$ are cyclic organic groups, the cyclic organic groups may be an alicyclic group or an aromatic group. Examples of the cyclic organic group include an aliphatic cyclic hydrocarbon group, an aromatic hydrocarbon group, and a heterocyclyl group. When $R^{d23}$ and $R^{d24}$ are cyclic organic groups, the substituent, with which the cyclic organic group is optionally substituted, is the same as in the case where $R^{d23}$ and $R^{d24}$ are chain alkyl groups.

When $R^{d23}$ and $R^{d24}$ are aromatic hydrocarbon groups, the aromatic hydrocarbon group is preferably a phenyl group, or a group formed by bonding multiple benzene rings through a carbon-carbon bond, or a group formed by condensing multiple benzene rings. When the aromatic hydrocarbon group is a phenyl group, or a group formed by bonding or condensing multiple benzene rings, the number of benzene rings included in the aromatic hydrocarbon group is not particularly limited, and is preferably 3 or less, more preferably 2 or less, and particularly preferably 1. Preferred specific examples of the aromatic hydrocarbon group include a phenyl group, a naphthyl group, a biphenylyl group, an anthryl group, and a phenanthryl group.

When $R^{d23}$ and $R^{d24}$ are aliphatic cyclic hydrocarbon groups, the aliphatic cyclic hydrocarbon group may be a monocyclic or polycyclic group. The number of carbon atoms of the aliphatic cyclic hydrocarbon group is not particularly limited, and is preferably 3 or more and 20 or less, and more preferably 3 or more and 10 or less. Examples of the monocyclic cyclic hydrocarbon group include cyclopropyl group, a cyclobutyl group, a cyclopentyl group, a cyclohexyl group, a cycloheptyl group, a cyclooctyl group, a norbornyl group, an isobornyl group, a tricyclononyl group, a tricyclodecyl group, a tetracyclododecyl group, and an adamantyl group.

When $R^{d23}$ and $R^{d24}$ are heterocyclyl groups, the heterocyclyl group is a 5- or 6-membered monocycle including one or more N, S, and O, or a heterocyclyl group in which these monocycles are condensed with each other, or the monocycle and a benzene ring are condensed. When the heterocyclyl group is a condensed ring, the number of rings constituting the condensed ring is 3 or less. The heterocyclyl group may be an aromatic group (heteroaryl group) or a non-aromatic group. Examples of the heterocycle constituting the heterocyclyl group include furan, thiophene, pyrrole, oxazole, isoxazole, thiazole, thiadiazole, isothiazole, imidazole, pyrazole, triazole, pyridine, pyrazine, pyrimidine, pyridazine, benzofuran, benzothiophene, indole, isoindole, indolizine, benzimidazole, benzotriazole, benzoxazole, benzothiazole, carbazole, purine, quinoline, isoquinoline, quinazoline, phthalazine, cinnoline, quinoxaline, piperidine, piperazine, morpholine, piperidine, tetrahydropyran, and tetrahydrofuran.

$R^{d23}$ and $R^{d24}$ may be bonded to one another to form a ring. The group composed of the ring formed by $R^{d23}$ and $R^{d24}$ is preferably a cycloalkylidene group. When $R^{d23}$ and $R^{d24}$ are bonded to form a cycloalkylidene group, the ring constituting the cycloalkylidene group is preferably a 5- to 6-membered ring, and more preferably a 5-membered ring.

When the group formed by bonding $R^{d23}$ and $R^{d24}$ is a cycloalkylidene group, the cycloalkylidene group may be condensed with one or more other rings. Examples of the ring which may be condensed with the cycloalkylidene group include a benzene ring, a naphthalene ring, a cyclobutane ring, a cyclopentane ring, a cyclohexane ring, a cycloheptane ring, a cyclooctane ring, a furan ring, a thiophene ring, a pyrrole ring, a pyridine ring, a pyrazine ring, a pyrimidine ring, and the like.

Examples of a suitable group among $R^{d23}$ and $R^{d24}$ described above include a group represented by the formula: -$A^{d1}$-$A^{d2}$. In the formula, $A^{d1}$ is a linear alkylene group, and $A^{d2}$ is an alkoxy group, a cyano group, a halogen atom, a halogenated alkyl group, a cyclic organic group, or an alkoxycarbonyl group.

The number of carbon atoms of the linear alkylene group for $A^{d1}$ is preferably 1 or more and 10 or less, and more preferably 1 or more and 6 or less. When $A^{d2}$ is an alkoxy group, the alkoxy group may be a linear or branched alkoxy group, and preferably a linear alkoxy group. The number of carbon atoms of the alkoxy group is preferably 1 or more and 10 or less, and more preferably 1 or more and 6 or less. When $A^{d2}$ is a halogen atom, a fluorine atom, a chlorine atom, a bromine atom, or an iodine atom is preferable, and a fluorine atom, a chlorine atom, or a bromine atom is more preferable. When $A^{d2}$ is a halogenated alkyl group, a halogen atom included in the halogenated alkyl group is preferably a fluorine atom, a chlorine atom, a bromine atom, or an iodine atom, and more preferably is a fluorine atom, a chlorine atom, or a bromine atom. The halogenated alkyl group may be a linear or branched halogenated alkyl group, preferably a linear halogenated alkyl group. When $A^{d2}$ is a cyclic organic group, examples of the cyclic organic group are the same as the cyclic organic group possessed by $R^{d23}$ and $R^{d24}$ as a substituent. When $A^{d2}$ is an alkoxycarbonyl group, examples of the alkoxycarbonyl group are the same as the alkoxycarbonyl group possessed by $R^{d23}$ and $R^{d24}$ as a substituent.

Suitable specific examples of $R^{d23}$ and $R^{d24}$ include alkyl groups such as an ethyl group, an n-propyl group, an n-butyl group, an n-hexyl group, an n-heptyl group, and an n-octyl group; alkoxyalkyl groups such as a 2-methoxyethyl group, a 3-methoxy-n-propyl group, a 4-methoxy-n-butyl group, a 5-methoxy-n-pentyl group, a 6-methoxy-n-hexyl group, a 7-methoxy-n-heptyl group, a 8-methoxy-n-octyl group, a 2-ethoxyethyl group, a 3-ethoxy-n-propyl group, a 4-ethoxy-n-butyl group, a 5-ethoxy-n-pentyl group, a 6-ethoxy-n-hexyl group, a 7-ethoxy-n-heptyl group, and a 8-ethoxy-n-octyl group; cyanoalkyl groups such as a 2-cyanoethyl group, a 3-cyano-n-propyl group, a 4-cyano-n-butyl group, a 5-cyano-n-pentyl group, a 6-cyano-n-hexyl group, a 7-cyano-n-heptyl group, and a 8-cyano-n-octyl group; phenylalkyl groups such as a 2-phenylethyl group, a 3-phenyl-n-propyl group, a 4-phenyl-n-butyl group, a 5-phenyl-n-pentyl group, a 6-phenyl-n-hexyl group, a 7-phenyl-n-heptyl group, and a 8-phenyl-n-octyl group; cycloalkylalkyl groups such as a 2-cyclohexylethyl group, a 3-cyclohexyl-n-propyl group, a 4-cyclohexyl-n-butyl group, a 5-cyclohexyl-n-pentyl group, a 6-cyclohexyl-n-hexyl group, a 7-cyclohexyl-n-heptyl group, a 8-cyclohexyl-n-octyl group, a 2-cyclopentylethyl group, a 3-cyclopentyl-n-propyl group, a 4-cyclopentyl-n-butyl group, a 5-cyclopentyl-n-pentyl group, a 6-cyclopentyl-n-hexyl group, a 7-cyclopentyl-n-heptyl group, and a 8-cyclopentyl-n-octyl group; alkoxycarbonylalkyl groups such as a 2-methoxycarbonylethyl group, a 3-methoxycarbonyl-n-propyl group, a 4-methoxycarbonyl-n-butyl group, a 5-methoxycarbonyl-n-pentyl group, a 6-methoxycarbonyl-n-hexyl group, a 7-methoxycarbonyl-n-heptyl group, a 8-methoxycarbonyl-n-octyl group, a 2-ethoxycarbonylethyl group, a 3-ethoxycarbonyl-n-propyl group, a 4-ethoxycarbonyl-n-butyl group, a 5-ethoxycarbonyl-n-pentyl group, a 6-ethoxycarbonyl-n-hexyl group, a 7-ethoxycarbonyl-n-heptyl group, and a 8-ethoxycarbonyl-n-octyl group; and halogenated alkyl groups such as a 2-chloroethyl group, a 3-chloro-n-propyl group, a 4-chloro-n-butyl group, a 5-chloro-n-pentyl group, a 6-chloro-n-hexyl group, a 7-chloro-n-heptyl group, a 8-chloro-n-octyl group, a 2-bromoethyl group, a 3-bromo-n-propyl group, a 4-bromo-n-butyl group, a 5-bromo-n-pentyl group, a 6-bromo-n-hexyl group, a 7-bromo-n-heptyl group, a 8-bromo-n-octyl group, a 3,3,3-trifluoropropyl group, and a 3,3,4,4,5,5,5-heptafluoro-n-pentyl group.

Among groups mentioned above, groups suitable as $R^{23}$ and $R^{d24}$ are an ethyl group, an n-propyl group, an n-butyl group, an n-pentyl group, a 2-methoxyethyl group, a 2-cyanoethyl group, a 2-phenylethyl group, a 2-cyclohexylethyl group, a 2-methoxycarbonylethyl group, a 2-chloroethyl group, a 2-bromoethyl group, a 3,3,3-trifluoropropyl group, and a 3,3,4,4,5,5,5-heptafluoro-n-pentyl group.

In the same manner as $R^{d22}$, examples of a suitable organic group for $R^{d25}$ include an alkyl group, an alkoxy group, a cycloalkyl group, a cycloalkoxy group, a saturated aliphatic acyl group, an alkoxycarbonyl group, a saturated aliphatic acyloxy group, an optionally substituted phenyl group, an optionally substituted phenoxy group, an optionally substituted benzoyl group, an optionally substituted phenoxycarbonyl group, an optionally substituted benzoyloxy group, an optionally substituted phenylalkyl group, an optionally substituted naphthyl group, an optionally substituted naphthoxy group, an optionally substituted naphthoyl group, an optionally substituted naphthoxycarbonyl group, an optionally substituted naphthoyloxy group, an optionally substituted naphthylalkyl group, an optionally substituted heterocyclyl group, an optionally substituted heterocyclylcarbonyl group, an amino group substituted with one or two organic groups, a morpholin-1-yl group, a piperazin-1-yl group, and the like. Specific examples of these groups are the same as the specific examples described for $R^{d22}$. $R^{d25}$ is also preferably a cycloalkylalkyl group, a phenoxyalkyl group which may have a substituent on the aromatic ring, and a phenylthioalkyl group which may have a substituent on the aromatic ring. The substituent which may be possessed by a phenoxyalkyl group and phenylthioalkyl group is the same as the substituent which may be possessed by a phenyl group included in $R^{d22}$.

Among the organic groups, $R^{d25}$ is preferably an alkyl group, a cycloalkyl group, an optionally substituted phenyl group or cycloalkylalkyl group, or a phenylthioalkyl group which may have a substituent on the aromatic ring. The alkyl group is preferably an alkyl group having 1 or more and 20 or less carbon atoms, more preferably an alkyl group having 1 or more and 8 or less carbon atoms, particularly preferably an alkyl group having 1 or more and 4 or less carbon atoms, and most preferably a methyl group. Among an optionally substituted phenyl groups, a methylphenyl group is preferable, and a 2-methylphenyl group is more preferable. The number of carbon atoms of the cycloalkyl group included in the cycloalkylalkyl group is preferably 5 or more and 10 or less, more preferably 5 or more and 8 or less, and particularly preferably 5 or 6. The number of carbon atoms of the alkylene group included in the cycloalkylalkyl group is preferably 1 or more and 8 or less, more preferably 1 or more and 4 or less, and particularly preferably 2. Among cycloalkylalkyl groups, a cyclopentylethyl group is preferable. The number of carbon atoms of the alkylene group included in the phenylthioalkyl group which may have a substituent on the aromatic ring is preferably 1 or more and 8 or less, more preferably 1 or more and 4 or less, and particularly preferably 2. Among the phenylthioalkyl groups which may have a substituent on the aromatic ring, a 2-(4-chlorophenylthio) ethyl group is preferable.

$R^{d25}$ is also preferably a group represented by -$A^{d3}$-CO—O-$A^{d4}$. $A^{d3}$ is a divalent organic group, preferably a divalent hydrocarbon group, and more preferably an alkylene group. $A^{d4}$ is a monovalent organic group, and preferably a monovalent hydrocarbon group.

When $A^{d3}$ is an alkylene group, the alkylene group may be a linear or branched alkylene group, preferably a linear alkylene group. When $A^{d3}$ is an alkylene group, the number of carbon atoms of the alkylene group is preferably 1 or more and 10 or less, more preferably 1 or more and 6 or less, and particularly preferably 1 or more and 4 or less.

Suitable examples of $A^{d4}$ include an alkyl group having 1 or more and 10 or less carbon atoms, an aralkyl group having 7 or more and 20 or less carbon atoms, and an aromatic hydrocarbon group having 6 or more and 20 or less carbon atoms. Suitable specific examples of $A^{d4}$ include a methyl group, an ethyl group, an n-propyl group, an isopropyl group, an n-butyl group, an isobutyl group, a sec-butyl group, a tert-butyl group, an n-pentyl group, an n-hexyl group, a phenyl group, a naphthyl group, a benzyl group, a phenethyl group, an α-naphthylmethyl group, a Q-naphthylmethyl group, and the like.

Specific examples of a suitable group represented by -$A^{d3}$-CO—O-$A^{d4}$ include a 2-methoxycarbonylethyl group, a 2-ethoxycarbonylethyl group, a 2-n-propyloxycarbonylethyl group, a 2-n-butyloxycarbonylethyl group, a 2-n-pentyloxycarbonylethyl group, a 2-n-hexyloxycarbonylethyl group, a 2-benzyloxycarbonylethyl group, a 2-phenoxycarbonylethyl group, a 3-methoxycarbonyl-n-propyl group, a 3-ethoxycarbonyl-n-propyl group, a 3-n-propyloxycarbonyl-n-propyl group, a 3-n-butyloxycarbonyl-n-propyl group, a 3-n-pentyloxycarbonyl-n-propyl group, a 3-n-hexyloxycarbonyl-n-propyl group, a 3-benzyloxycarbonyl-n-propyl group, a 3-phenoxycarbonyl-n-propyl group, and the like.

While $R^{d25}$ has been described above, $R^{d25}$ is preferably a group represented by the following formula (d9) or (d10):

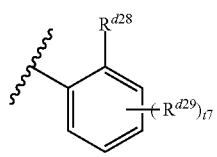

(d9)

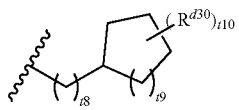

(d10)

in which, in the formulas (d9) and (d10), $R^{d28}$ and $R^{d29}$ are each an organic group; t7 is an integer of 0 or more and 4 or less; when $R^{d28}$ and $R^{d29}$ are adjacent to each other on the benzene ring, $R^{d28}$ and $R^{d29}$ may be bonded to each other to form a ring; t8 is an integer of 1 or more and 8 or less; t9 is an integer of 1 or more and 5 or less; t10 is an integer of 0 or more and (t9+3) or less; and $R^{d30}$ represents an organic group.

Examples of the organic group for $R^{d28}$ and $R^{d29}$ in the formula (d9) are the same as those in $R^{d22}$. $R^{d28}$ is preferably an alkyl group or a phenyl group. When $R^{d28}$ is an alkyl group, the number of carbon atoms thereof is preferably 1 or more and 10 or less, more preferably 1 or more and 5 or less, particularly preferably 1 or more and 3 or less, and most preferably 1. Namely, $R^{d28}$ is most preferably a methyl group. When $R^{d28}$ and $R^{d29}$ are bonded to form a ring, the ring may be an aromatic ring or an aliphatic ring. Suitable examples of the group represented by the formula (d9) in which $R^{d28}$ and $R^{d29}$ form a ring include a naphthalen-1-yl group, a 1,2,3,4-tetrahydronaphthalen-5-yl group, and the like. In the above formula (d9), t7 is an integer of 0 or more and 4 or less, preferably 0 or 1, and more preferably 0.

In the above formula (d10), $R^{d30}$ is an organic group. Examples of the organic group include the same groups as the organic groups described for $R^{d22}$. Among the organic groups, an alkyl group is preferable. The alkyl group may be a linear or branched alkyl group. The number of carbon atoms of the alkyl group is preferably 1 or more and 10 or less, more preferably 1 or more and 5 or less, and particularly preferably 1 or more and 3 or less. Preferable examples of $R^{d30}$ include a methyl group, an ethyl group, an isopropyl group, a butyl group and the like. Among these, a methyl group is more preferable.

In the formula (d10), t9 is an integer of 1 or more and 5 or less, preferably an integer of 1 or more and 3 or less, more preferably 1 or 2. In the formula (d10), t10 is 0 or more and (t9+3) or less, preferably an integer of 0 or more and 3 or less, more preferably an integer of 0 or more and 2 or less, particularly preferably 0. In the formula (d10), t8 is an integer of 1 or more and 8 or less, preferably an integer of 1 or more and 5 or less, more preferably an integer of 1 or more and 3 or less, particularly preferably 1 or 2.

In the formula (d8), $R^{d26}$ is a hydrogen atom, an optionally substituted alkyl group having 1 or more and 11 or less carbon atoms, or an optionally substituted aryl group. When $R^{d26}$ is an alkyl group, preferable examples of the substituent which may be possessed include a phenyl group, a naphthyl group, or the like. When $R^{d22}$ is an aryl group, preferable examples of the substituent which may be possessed include an alkyl group having 1 or more and 5 or less carbon atoms, an alkoxy group, a halogen atom, or the like.

In the formula (d8), preferable examples of $R^{d26}$ include a hydrogen atom, a methyl group, an ethyl group, an n-propyl group, an isopropyl group, an n-butyl group, a phenyl group, a benzyl group, a methylphenyl group, a naphthyl group, and the like. Among these, a methyl group or a phenyl group is more preferable.

The method of producing the compound represented by the formula (d8) is not particularly limited, and the compound represented by the formula (d8) can be obtained by a known method.

Specific examples of a suitable compound represented by the formula (d8) include the following compounds 1 to 41.

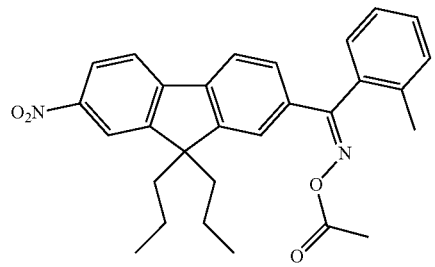

Compound 1

Compound 2
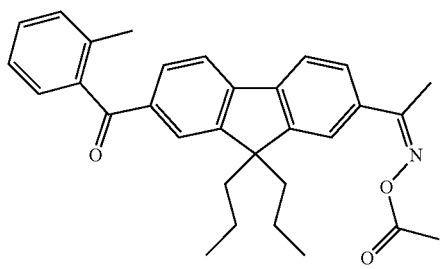
Compound 3
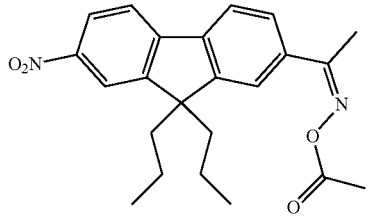
Compound 4
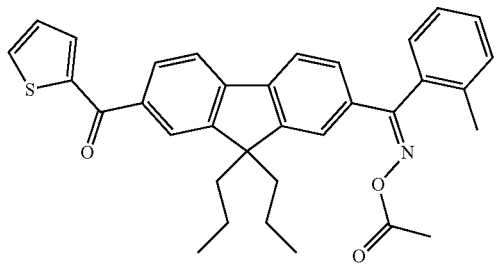
Compound 5
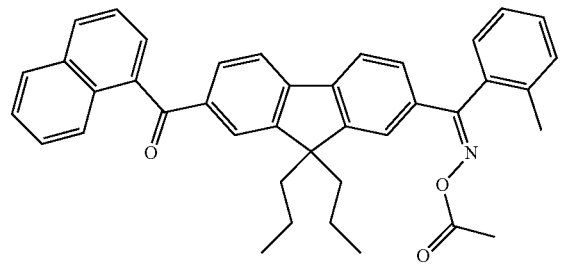
Compound 6
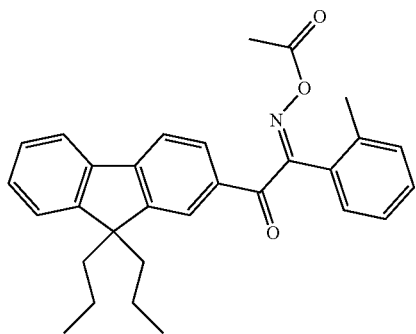
Compound 7
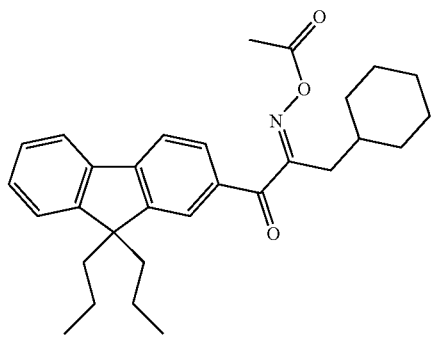
Compound 8
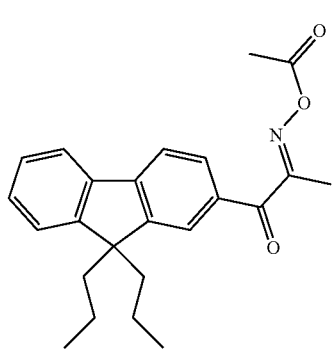
Compound 9
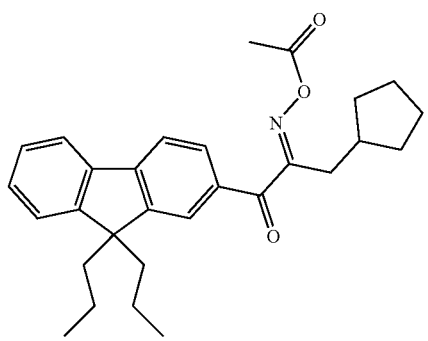
Compound 10
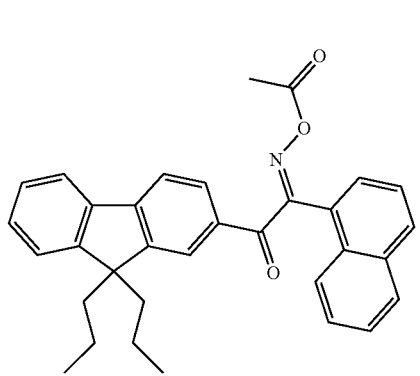

Compound 11
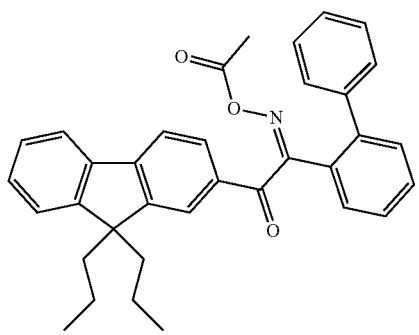
Compound 15
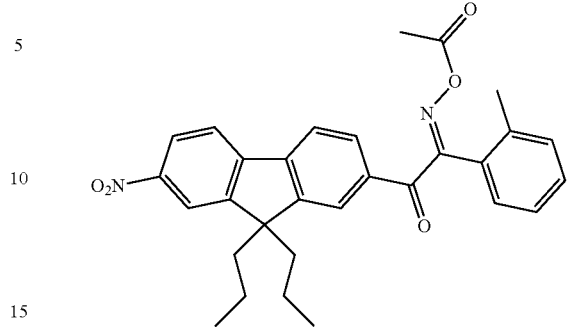
Compound 12
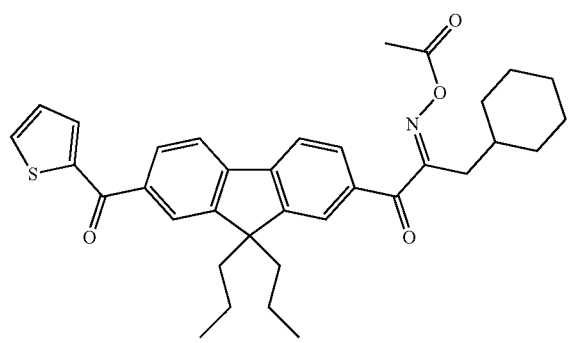
Compound 16
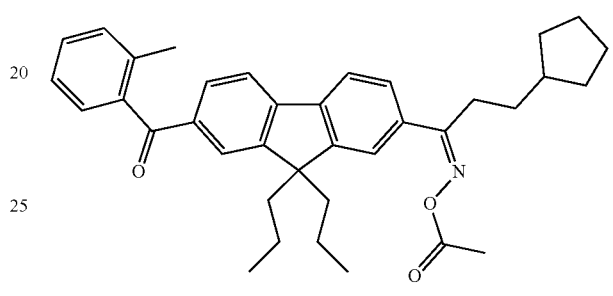
Compound 13
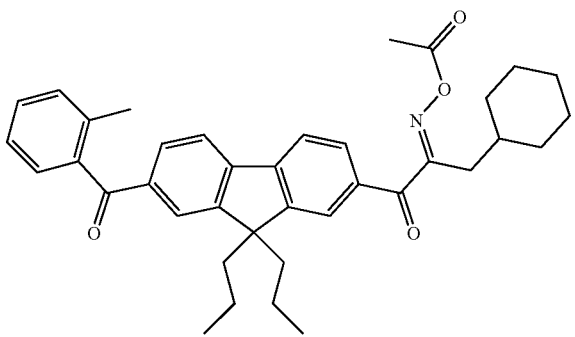
Compound 17
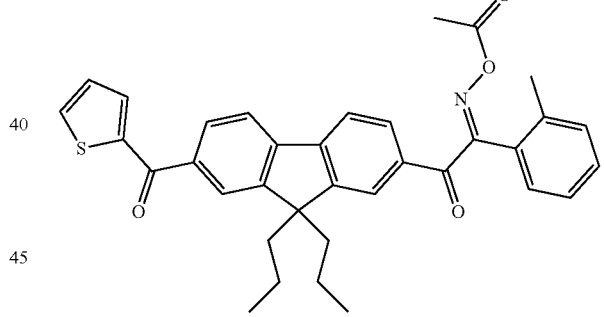
Compound 14
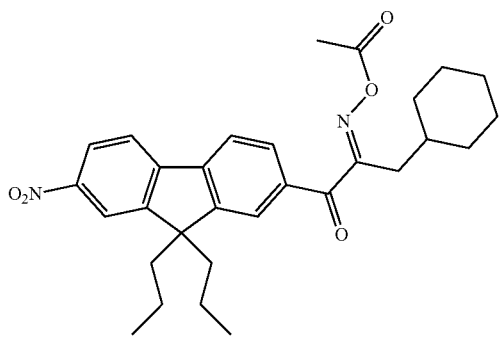
Compound 18
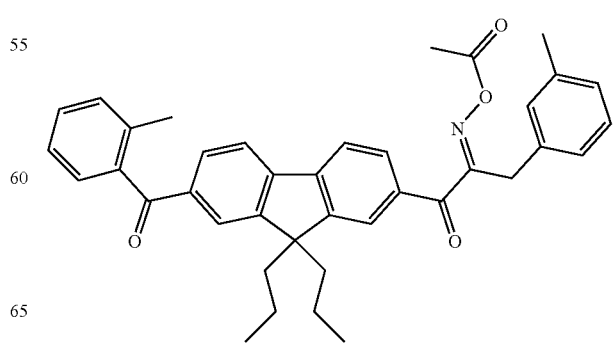

Compound 19
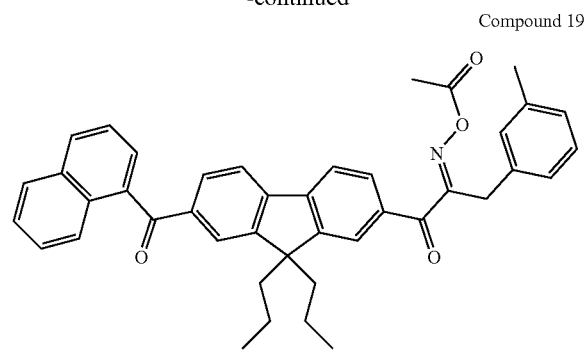
Compound 20
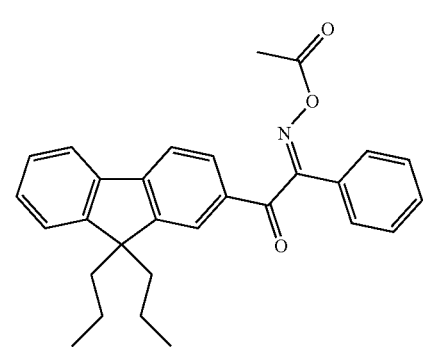
Compound 21
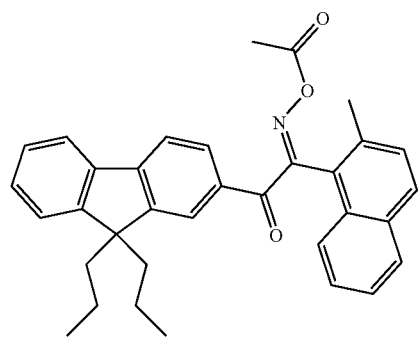
Compound 22
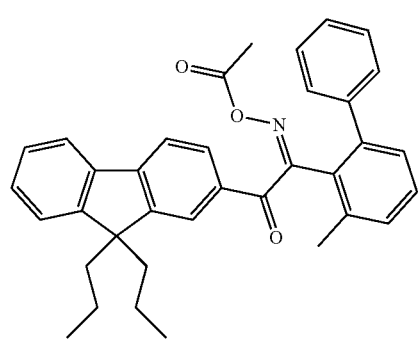
Compound 23
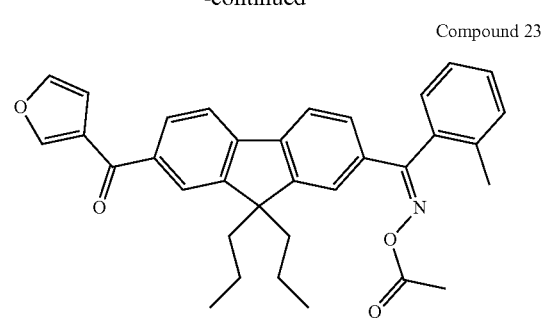
Compound 24
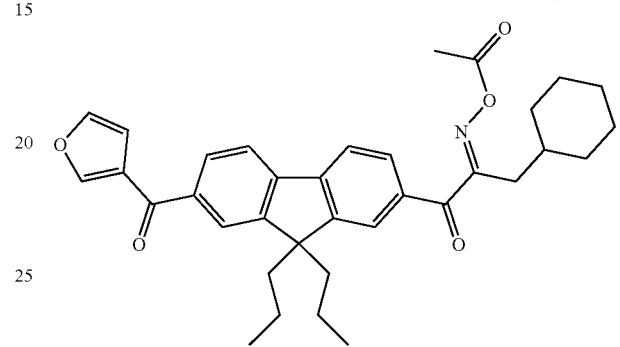
Compound 25
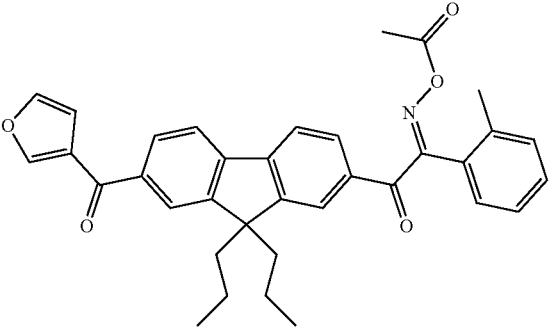
Compound 26
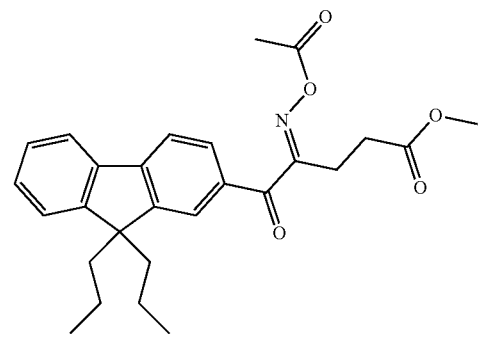

Compound 27
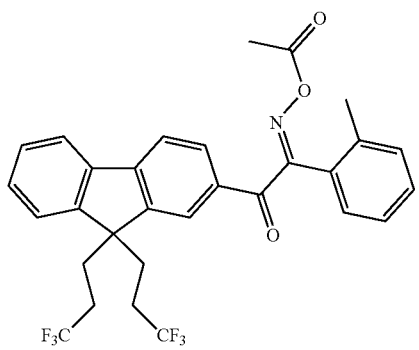
Compound 28
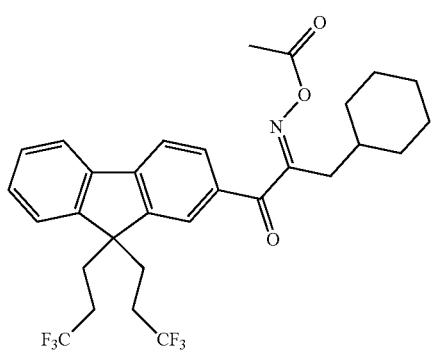
Compound 29
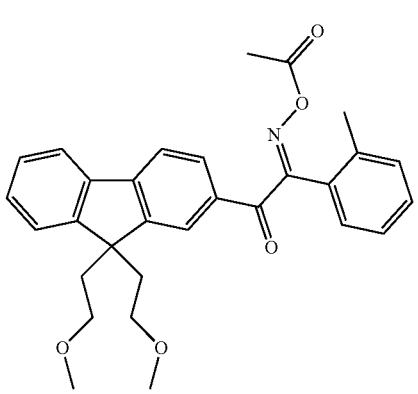
Compound 30
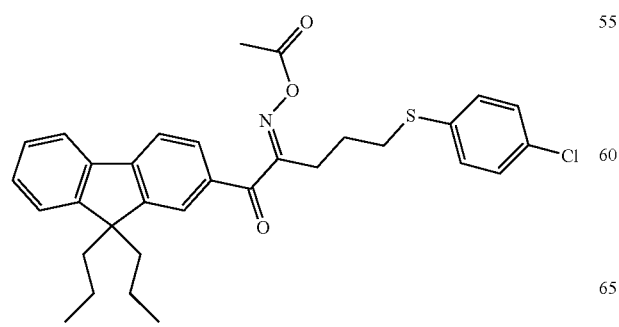
Compound 31
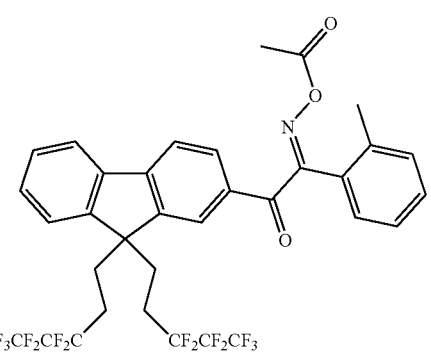
Compound 32
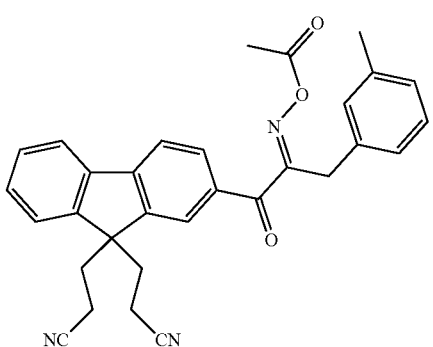
Compound 33
Compound 34
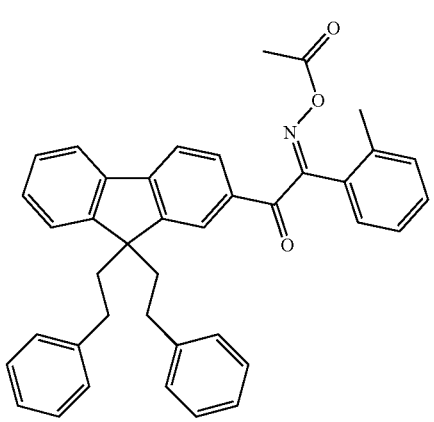

-continued

Compound 35

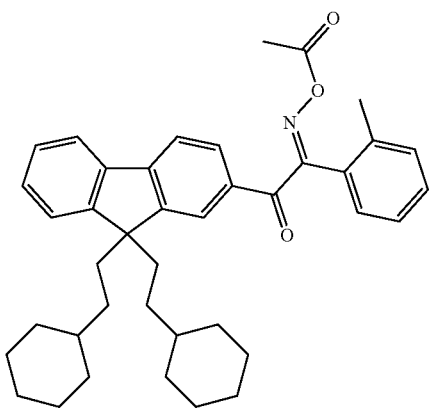

Compound 36

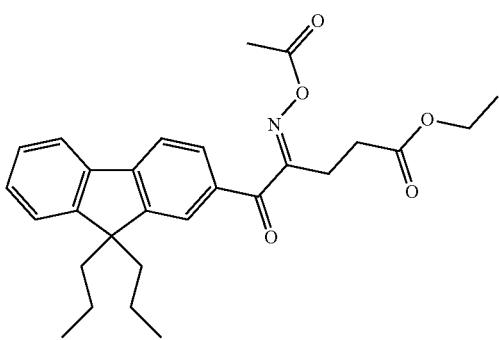

Compound 37

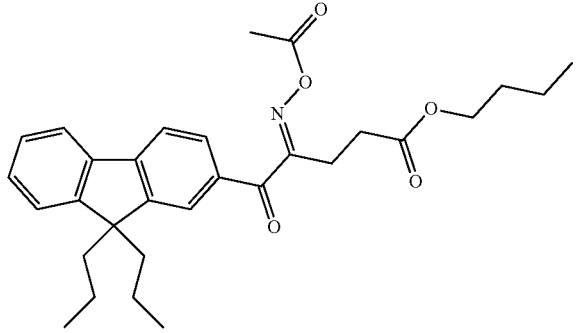

Compound 38

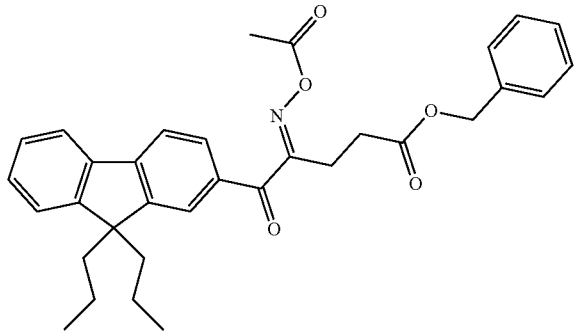

-continued

Compound 39

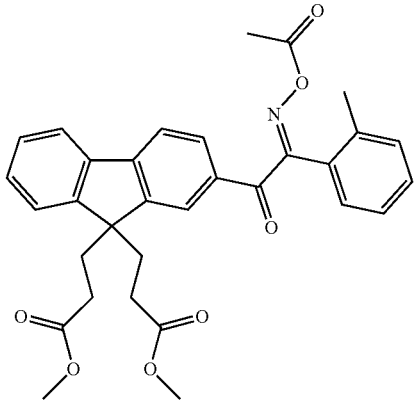

Compound 40

Compound 41

The curing agent (D4) in the liquid composition may contain two or more curing agents in different categories or of different types. Typically, the content of the curing agent (D4) in the liquid composition is preferably 0.01% by mass or more and 40% by mass or less, more preferably 0.1% by mass or more and 20% by mass or less, and particularly preferably 1% by mass or more and 10% by mass or less relative to the mass of the solid content of the liquid composition.

<Solvent (S)>

The liquid composition includes a solvent (S) together with the ionic liquid (B). The solvent (S) includes a solvent (S1) that is a compound having a cyclic skeleton and including a heteroatom other than a hydrogen atom and a carbon atom. That is, the solvent (S1) is a non-hydrocarbon solvent. The heteroatom which may be included in the solvent (S1) is exemplified by N, O, S, P, and the like.

The reasons for promoting dispersion of the quantum dots (A) and the stabilization of the dispersion by the use of the ionic liquid (B) and the solvent (S1) in combination are unclear. For example, it is inferred that the cyclic skeleton included in the solvent (S1) exerts the effect of inhibiting cohesion of the quantum dots (A) and the ionic liquid (B) enhances the effect of inhibiting the cohesion. In addition, since the solvent (S1) includes the heteroatom, the solvent (S1) has favorable affinity for the ionic liquid (B). For these reasons, it is considered that the use of the ionic liquid (B) and the solvent (S1) in combination enables the desired effects for an improvement of the dispersibility of the quantum dots (A) to be attained.

From the viewpoint of promoting dispersion and the stabilization of the dispersion in the process for forming the quantum dot-containing film, the boiling point of the solvent (S1) under atmospheric pressure is preferably 150° C. or higher, more preferably 165° C. or higher and 240° C. or lower, and even more preferably 170° C. or higher and 230° C. or lower. From the viewpoint of promoting dispersion and the stabilization of the dispersion, the cyclic skeleton included in the solvent (S1) is preferably an alicyclic skeleton. Herein, a cyclic skeleton which exhibits no aromaticity is deemed as an alicyclic skeleton. In addition, in the case in which the solvent (S1) has both an aromatic ring skeleton and an alicyclic skeleton like a tetralin ring, the solvent (S1) is deemed as having an alicyclic skeleton. It is inferred that greater bulkiness of the alicyclic skeleton to some extent than the aromatic ring skeleton, which has a planar steric structure, favorably contributes to promoting dispersion of the quantum dots (A) and the stabilization of the dispersion, although the reasons therefor are unclear. From the viewpoint of an improvement of quantum yield (QY), as the cyclic skeleton included in the solvent (S1), a skeleton including an aromatic ring is preferable, and a skeleton constituted of only an aromatic ring is more preferable. As the aromatic ring, a benzene ring or a naphthalene ring is preferable, and a benzene ring is more preferable.

The solvent (S1) preferably has at least one type of bond selected from the group consisting of an ester bond (—CO—O—), an amide bond (—CO—NH—), a carbonate bond (—O—CO—O—), a ureido bond (—NH—CO—NH—), and a urethane bond (—O—CO—NH—). In the present description, when the ester bond and the amide bond are simply referred to, the ester bond and the amide bond respectively mean a "carboxylic acid ester bond" and a "carboxylic acid amide bond". In the amide bond, the ureido bond, and the urethane bond, an organic group may be bonded to a nitrogen atom. The type of the organic group is not particularly limited. The organic group is preferably an alkyl group, more preferably an alkyl group having 1 or more and 6 or less carbon atoms, and even more preferably a methyl group or an ethyl group. In the case in which the solvent (S1) includes an ester bond, an amide bond, a carbonate bond, a ureido bond, and/or a urethane bond, the affinity of the solvent (S1) for the ionic liquid (B) is particularly favorable, and the effects desired from the use of the ionic liquid (B) and the solvent (S1) in combination is likely to be attained. In addition, in the case in which the solvent (S1) includes any of these bonds, for the liquid composition including the base component (C), the base component (C) is likely to be favorably dissolved in the liquid composition.

Preferred examples of the solvent (S1) include: aromatic solvents such as ethyl benzoate, methyl benzoate, anisole, phenetole, propyl phenyl ether, butyl phenyl ether, cresyl methyl ether, ethyl benzyl ether, diphenyl ether, dibenzyl ether, acetophenone, propiophenone, benzophenone, pyridine, pyrimidine, pyrazine, and pyridazine; alicyclic alcohols such as cyclopentanol, cyclohexanol, 1,4-cyclohexanediol, 1,3-cyclohexanediol, 1,4-cyclohexanedimethanol, and 1,3-cyclohexanedimethanol; alicyclic ethers such as cyclohexyl methyl ether, cyclohexyl ethyl ether, tetrahydrofuran, tetrahydropyran, and dioxane; alicyclic ketones such as cyclopentanone, cyclohexanone, cycloheptanone, 2-methylcyclohexanone, 1,4-cyclopentanedione, and 1,3-cyclopentanedione; lactones such as β-propiolactone, γ-butyrolactone, β-methyl-γ-butyrolactone, δ-valerolactone, ε-valerolactone, ε-caprolactone, α-methyl-ε-caprolactone, and ε-methyl-ε-caprolactone; cyclic amides or cyclic ureas such as N-methyl-2-pyrrolidone, N-ethyl-2-pyrrolidone, 1,3-dimethyl-2-imidazolidinone, and N,N-dimethylpropyleneurea; cyclic carbonate such as ethylene carbonate, and propylene carbonate; and the like.

In addition, as the solvent (S1), a cycloalkyl ester of carboxylic acid is preferable. The cycloalkyl ester of carboxylic acid is preferably a cycloalkyl ester of carboxylic acid represented by the following formula (s1):

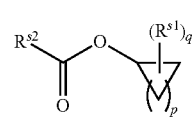

(s1)

in which in the formula (S1), $R^{s1}$ represents an alkyl group having 1 or more and 3 or less carbon atoms; $R^{s2}$ represents an alkyl group having 1 or more and 6 or less carbon atoms; p is an integer of 1 or more and 6 or less; and q is an integer of 0 or more and (p+1) or less.

$R^{s1}$ in the formula (s1) is exemplified by a methyl group, an ethyl group, an n-propyl group, and an isopropyl group, and is preferably a methyl group. $R^{s2}$ in the formula (s1) is exemplified by a methyl group, an ethyl group, an n-propyl group, an isopropyl group, an n-butyl group, an isobutyl group, a sec-butyl group, a tert-butyl group, an n-pentyl group, and an n-hexyl group. As the alkyl group represented by $R^{s2}$, a methyl group, an ethyl group, an n-propyl group, an isopropyl group, an n-butyl group, and an isobutyl group are preferable, and a methyl group and an ethyl group are more preferable.

Preferred examples of the carboxylic acid cycloalkyl ester represented by the formula (s1) include cyclopropyl acetate, cyclobutyl acetate, cyclopentyl acetate, cyclohexyl acetate, cycloheptyl acetate, cyclooctyl acetate, 1R-(−)-menthyl acetate, cyclopropyl propionate, cyclobutyl propionate, cyclopentyl propionate, cyclohexyl propionate, cycloheptyl propionate, cyclooctyl propionate, cyclopropyl butyrate, cyclobutyl butyrate, cyclopentyl butyrate, cyclohexyl butyrate, cycloheptyl butyrate, cyclooctyl butyrate, 1R-(−)-menthyl butyrate, cyclopropyl valerate, cyclobutyl valerate, cyclopentyl valerate, cyclohexyl valerate, cycloheptyl valerate, cyclooctyl valerate, 1R-(−)-menthyl valerate, cyclopropyl isovalerate, cyclobutyl isovalerate, cyclopentyl isovalerate, cyclohexyl isovalerate, cycloheptyl isovalerate, cyclooctyl isovalerate, and 1R-(−)-menthyl isovalerate. Among these, cyclopentyl acetate and cyclohexyl acetate are preferable, since they are readily available and have a preferable boiling point.

Among the solvents (S1) described above, the carboxylic acid cycloalkyl ester represented by the formula (s1) is preferable, and cyclopentyl acetate and cyclohexyl acetate are particularly preferable.

The solvent (S) may contain a solvent (S2) other than the solvent (S1). Examples of such other solvents (S2) include: alcohols such as methanol, ethanol, propanol and n-butanol; polyhydric alcohols such as ethylene glycol, diethylene glycol, propylene glycol and dipropylene glycol; ketones such as acetone, methyl ethyl ketone, methyl n-amyl ketone, methyl isoamyl ketone and 2-heptanone; compounds having an ester bond such as ethylene glycol monoacetate, diethylene glycol monoacetate, propylene glycol monoacetate, or dipropylene glycol monoacetate; ether derivatives such as monomethyl ethers, monoethyl ethers, monopropyl ethers, monobutyl ethers, monophenyl ethers or the like of the polyhydric alcohols or the compounds having an ester bond; esters such as methyl lactate, ethyl lactate, methyl acetate, ethyl acetate, butyl acetate, methyl pyruvate, ethyl pyruvate, methyl methoxypropionate and ethyl ethoxypropionate; aromatic organic solvents such as ethylbenzene, diethylbenzene, amylbenzene, isopropylbenzene, toluene, xylene, cymene and mesitylene; nitrogen-containing organic solvents such as N,N,N',N'-tetramethylurea, N,N,2-trimethylpropionamide, N,N-dimethylacetamide, N,N-dimethylformamide, N,N-diethylacetamide, N,N-diethylformamide and N-ethylpyrrolidone. Two or more of these solvents may be used in combination.

As the other solvent (S2), propylene glycol monomethyl ether acetate (PGMEA), propylene glycol monomethyl ether (PGME), N,N,N',N'-tetramethylurea, and butanol are preferable.

The solvent (S) preferably includes only the solvent (S1). In the case in which the solvent (S) includes the solvent (S1) and another solvent (S2), the proportion of the mass of the other solvent (S2) to the mass of the solvent (S) may be, for example, 70% by mass or less, preferably 0.01, by mass or more and 55% by or less, and more preferably 1% by mass or more and 50% by mass or less.

In the case in which the liquid composition includes polysilane as the base component (C), the amount of moisture in the liquid composition is preferably 1.0; by mass or less, more preferably 0.5% by mass or less, even more preferably 0.3% by mass or less, and particularly preferably less than 0.3% by mass from the viewpoint of suppression of cracks of the quantum dot-containing film. It should be noted that the amount of moisture in the liquid composition can be measured according to a Karl Fischer measurement method. The moisture in the liquid composition is often originated from the solvent (S). Thus, the solvent (S) is preferably dehydrated such that the amount of moisture in the liquid composition falls within the range described above.

The amount of the solvent (S) used is not particularly limited as long as the objects of the present invention are not inhibited. In light of film-forming properties, the solvent (S) is used such that the solid content concentration of the liquid composition is preferably 1% by mass or more and 50% by mass or less, more preferably 10% by mass or more and 40% by mass or less.

<Other Component>

The liquid composition may include various additives which have been conventionally added to a dispersion liquid of quantum dots or a liquid composition for use in formation of a quantum dot-containing film, as long as the objects of the present invention are not inhibited. Examples of such additives include a base generator, a catalyst, a sensitizer, a silane coupling agent, an adhesion enhancer, a dispersant, a surfactant, an ultraviolet ray-absorbing agent, an antioxidant, an antifoaming agent, a viscosity modifier, a resin, rubber particles, a colorant, and the like. It should be noted that in the case in which the liquid composition includes an alkali-soluble resin as a resin, alkali developability is imparted to the liquid composition. Moreover, in the case in which the liquid composition includes the rubber particles, elasticity is imparted to the formed quantum dot-containing film, and thereby the brittleness of the quantum dot-containing film is likely to be eliminated.

In addition, in the case in which the liquid composition includes a silicon-containing resin as the base component (C), the liquid composition is preferably a nitroxy compound which is a compound capable of being stably present as a nitroxide radical. It is preferable that the liquid composition includes a nitroxy compound, since a residue of a quantum dot-containing film (impurities derived from silica formed during baking) can be reduced even when the baking temperature in the formation of a silica-based quantum dot-containing film is as low as, for example, 250° C. or lower (for example, the range of 200° C. or higher and 250° C. or lower). A small amount of the residue in the quantum dot-containing film allows for suppression of generation of a gas derived from the residue itself and/or decomposition products of the residue from the quantum dot-containing film, even when the quantum dot-containing film is placed in a high temperature atmosphere or a reduced pressure atmosphere.

Specific examples of a preferable nitroxy compound include di-tert-butyl nitroxide, di-1,1-dimethylpropyl nitroxide, di-1,2-dimethylpropyl nitroxide, di-2,2-dimethylpropyl nitroxide, and compounds represented by the following formulas. In the following formulas, $R^{01}$ each independently represent an optionally substituted alkyl group having 1 or more and 20 or less carbon atoms, an optionally substituted aromatic group, or an optionally substituted alicyclic group.

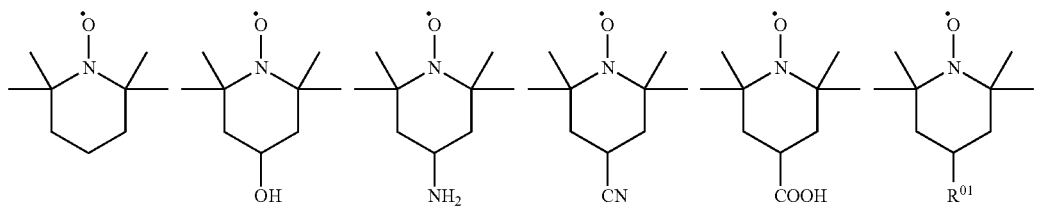

-continued
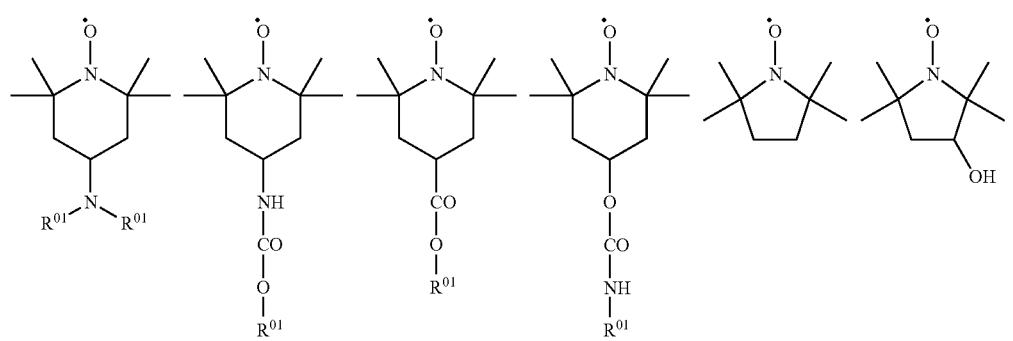
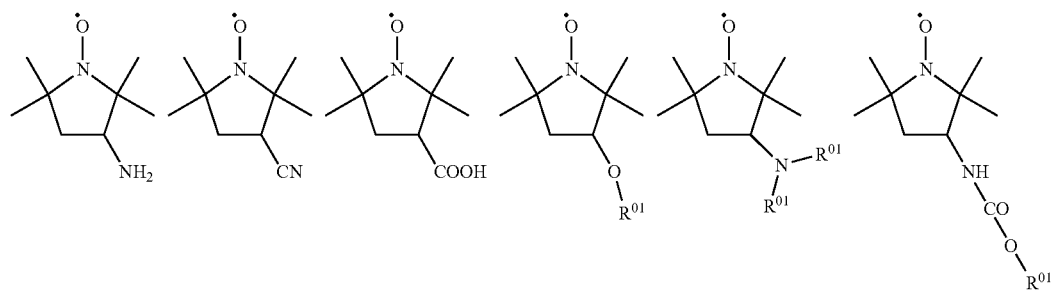
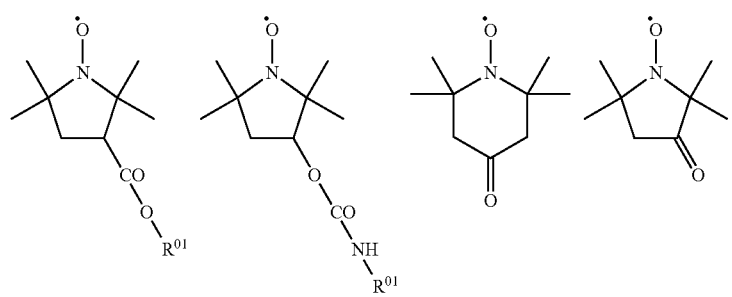
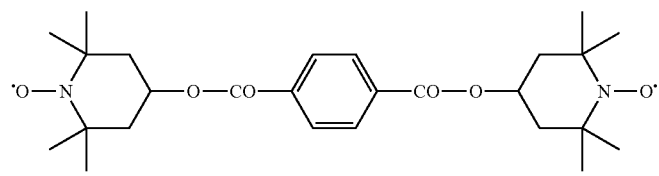
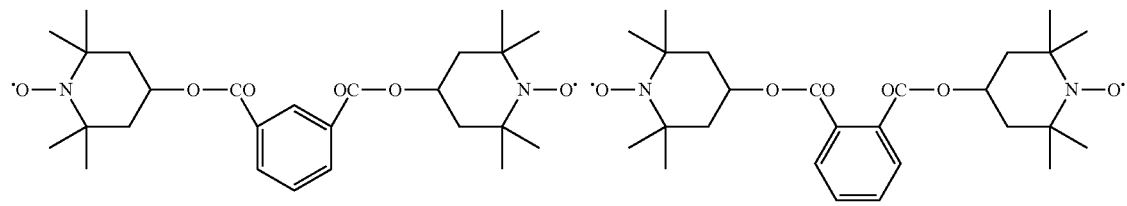
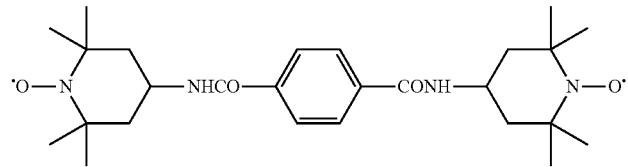
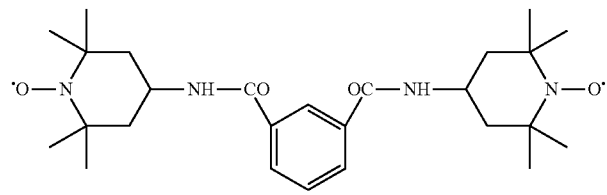

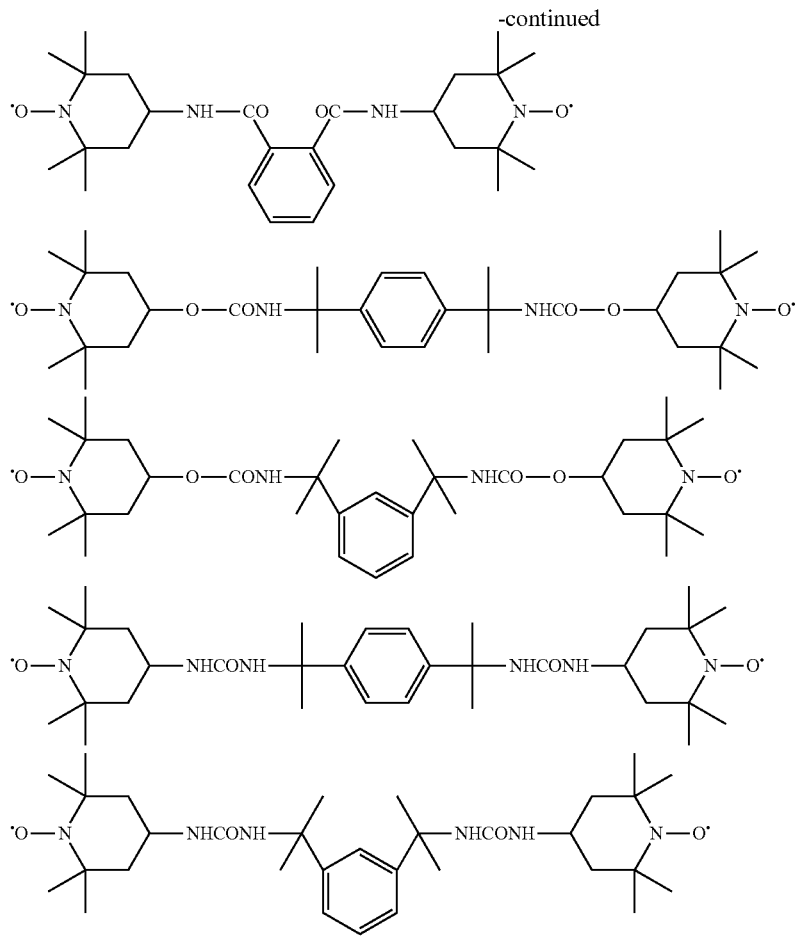

From the viewpoint of particular ease of reducing the residue even in baking at lower temperatures, examples of a further preferable nitroxy compound include 2,2,6,6-tetramethylpiperidine 1-oxyl free radical, 4-hydroxy-2,2,6,6-tetramethylpiperidine 1-oxyl free radical, 4-amino-2,2,6,6-tetramethylpiperidine 1-oxyl free radical, 4-carboxy-2,2,6,6-tetramethylpiperidine 1-oxyl free radical, 4-cyano-2,2,6,6-tetramethylpiperidine 1-oxyl free radical, 4-(methacrylic acid)-2,2,6,6-tetramethylpiperidine 1-oxyl free radical, 4-(acrylic acid)-2,2,6,6-tetramethylpiperidine 1-oxyl free radical, 4-oxo-2,2,6,6-tetramethylpiperidine 1-oxyl free radical, 3-carboxy-2,2,5,5-tetramethylpyrrolidine 1-oxyl free radical, 4-acetamido-2,2,6,6-tetramethylpiperidine 1-oxyl free radical, 4-(2-chloroacetamido)-2,2,6,6-tetramethylpiperidine 1-oxyl free radical, 4-hydroxy-2,2,6,6-tetramethylpiperidine 1-oxyl benzoate free radical, 4-isothiocyanato-2,2,6,6-tetramethylpiperidine 1-oxyl free radical, 4-(2-iodoacetamido)-2,2,6,6-tetramethylpiperidine 1-oxyl free radical, and 4-methoxy-2,2,6,6-tetramethylpiperidine 1-oxyl free radical. The nitroxy compound may be used individually or as a combination of two or more of these.

The content of the nitroxy compound in the liquid composition including the silicon-containing resin may be very small. From the viewpoint of particular ease of reducing the residue even in baking at lower temperatures, the content of the nitroxy compound in the liquid composition including the silicon-containing resin is preferably 0.005% by mass or more, and more preferably 0.009, by mass or more relative to the total mass of all the components of the liquid composition except for the solvent (S). The content of the nitroxy compound in liquid composition including the silicon-containing resin is preferably 2% by mass or less, more preferably 1% by mass or less relative to the total mass of all the components of the liquid composition except for the solvent (S).

In the case in which the liquid composition includes a silicon-containing resin as the base component (C), the liquid composition preferably includes an antioxidant. When the liquid composition including the silicon-containing resin as the base component (C) includes the antioxidant, a reduction of the light-emitting property of the quantum dot-containing film is likely to be suppressed. The antioxidant preferably includes at least one selected from the group consisting of a phosphorus-based antioxidant, a sulfur-based antioxidant and a phenol-based antioxidant.

The type of the phosphorus-based antioxidant is not particularly limited, and specifical examples of the phosphorus-based antioxidant include 3,9-bis(2,6-di-tert-butyl-4-methylphenoxy)-2,4,8,10-tetraoxa-3,9-diphosphaspiro [5.5]undecane, diisodecylpentaerythritol diphosphite, bis(2, 4-di-t-butylphenyl) pentaerythritol diphosphite, 2,2'-methylenebis(4,6-di-t-butyl-1-phenyloxy) (2-ethylhexyloxy)phosphorus, 6-[3-(3-t-butyl-4-hydroxy-5-methylphenyl)propoxy]-2,4,8,10-tetra-t-butyl dibenz[d,f][1, 3,2]dioxaphosphepin, triphenyl phosphite, diphenylisodecyl phosphite, phenyldiisodecyl phosphite, 4,4'-butylidene-bis (3-methyl-6-t-butylphenylditridecyl) phosphite, octadecyl phosphite, tris(nonylphenyl) phosphite, 9,10-dihydro-9-oxa- 10-phosphaphenanthrene-10-oxide, 10-(3,5-di-t-butyl-4-hydroxybenzyl)-9,10-dihydro-9-oxa-10-phosphaphenanthrene-10-oxide, 10-decyloxy-9,10-dihydro-9-oxa-10-phosphaphenanthrene-10-oxide, tris(2,4-di-t-butylphenyl) phosphite, cyclic neopentanetetraylbis(2,4-di-t-butylphenyl) phosphite, cyclic neopentanetetraylbis(2,6-di-t-butylphenyl) phosphite, 2,2-methylenebis(4,6-di-t-butylphenyl) octyl phosphite, tris(2,4-di-t-butylphenyl) phosphite, tetrakis(2,4-di-t-butylphenyl) [1,1-biphenyl]-4,4'-diyl bisphosphonite, bis[2,4-bis(1,1-dimethylethyl)-6-methylphenyl]ethyl ester, phosphonic acid, and the like.

In an aspect of heat resistance and heat resistance to thermal-coloration inhibition, among the phosphorus-based antioxidants, 2,2'-methylenebis(4,6-di-t-butyl-1-phenyloxy) (2-ethylhexyloxy)phosphorus, 3,9-bis(2,6-di-tert-butyl-4-methylphenoxy)-2,4,8,10-tetraoxa-3,9-diphosphaspiro[5.5]undecane, 6-[3-(3-t-butyl-4-hydroxy-5-methylphenyl)propoxy]-2,4,8,10-tetra-t-butyldibenz[d,f][1,3,2]dioxaphosphepin and the like are preferable.

Examples of commercially available products of the phosphorus-based antioxidant include Irgafos 168 (manufactured by BASF SE), Sumilizer GP (manufactured by Sumitomo Chemical Co., Ltd.), and the like.

The type of the sulfur-based antioxidant is not particularly limited, and specifical examples of the sulfur-based antioxidant include 2,2-bis({[3-(dodecylthio)propionyl]oxy}methyl)-1,3-propanediyl-bis[3-(dodecylthio)propionate], 2-mercaptobenzimidazole, dilauryl-3,3'-thiodipropionate, dimyristyl-3,3'-thiodipropionate, distearyl-3,3'-thiodipropionate, pentaerythrityl-tetrakis(3-laurylthiopropionate), 2-mercaptobenzimidazole, and the like.

In an aspect of heat resistance and heat resistance to thermal-coloration inhibition, among the sulfur-based antioxidants, 2,2-bis({3-(dodecylthio)propionyl}oxy)methyl) 1,3-propanediyl-bis[3-(dodecylthio)propionate], 2-mercaptobenzimidazole and the like are preferable.

Examples of commercially available products of the sulfur-based antioxidant include Irganox 1035 (manufactured by BASF SE), and the like.

The type of the phenol-based antioxidant is not particularly limited, and specifical examples of the phenol-based antioxidant include 3,9-bis[2-[3-(3-t-butyl-4-hydroxy-5-methylphenyl)propionyloxy]-1,1-dimethylethoxy]-2,4,8,10-tetraoxaspiro[5.5]undecane, pentaerythrityl tetrakis[3-(3,5-di-t-butyl-4-hydroxyphenyl)propionate], 1,3,5-trimethyl-2,4,6-tris(3',5'-di-t-butyl-4-hydroxybenzyl)benzene, triethylene glycol-bis[3-(3-t-butyl-5-methyl-4-hydroxyphenyl)propionate], 4,4'-thiobis(6-t-butyl-3-methylphenol), tris-(3,5-di-t-butyl-4-hydroxybenzyl)-isocyanurate, 1,3,5-tris(4-t-butyl-3-hydroxy-2,6-dimethylbenzyl)-isocyanurate, 1,6-hexanediol-bis[3-(3,5-di-t-butyl-4-hydroxyphenyl)propionate], 2,2-thio-diethylenebis[3-(3,5-di-t-butyl-4-hydroxyphenyl)propionate], N,N'-hexamethylenebis(3,5-di-t-butyl-4-hydroxy-hydrocinnamamide), 1,3,5-trimethyl-2,4,6-tris(3,5-di-t-butyl-4-hydroxybenzyl)benzene, 2,4-bis[(octylthio)methyl]-O-cresol, 1,6-hexanediol-bis-[3-(3,5-di-t-butyl-4-hydroxyphenyl)propionate], octadecyl-[3-(3,5-di-t-butyl-4-hydroxyphenyl)propionate, 2,2'-methylenebis(4-methyl-6-t-butylphenol), 4,4'-butylidene-bis(3-methyl-6-t-butylphenol), 1,1,3-tris(2-methyl-4-hydroxy-5-t-butylphenyl)butane, 1,3,5-tris(4-hydroxybenzyl)benzene, tetrakis[methylene-3-(3,5'-di-t-butyl-4'-hydroxyphenylpropionate)]methane, and the like.

In an aspect of heat resistance and heat resistance to thermal-coloration inhibition, among the phenol-based antioxidant, 3,9-bis[2-[3-(3-t-butyl-4-hydroxy-5-methylphenyl)propionyloxy]-1,1-dimethylethoxy]-2,4,8,10-tetraoxaspiro[5.5]undecane, 1,3,5-trimethyl-2,4,6-tris(3',5'-di-t-butyl-4-hydroxybenzyl)benzene, pentaerythrityl tetrakis [3-(3,5-di-t-butyl-4-hydroxyphenyl)propionate], triethylene glycol-bis[3-(3-t-butyl-5-methyl-4-hydroxyphenyl)propionate], 4,4'-thiobis(6-t-butyl-3-methylphenol), tris-(3,5-di-t-butyl-4-hydroxybenzyl)-isocyanurate, 1,3,5-tris(4-t-butyl-3-hydroxy-2,6-dimethylbenzyl)-isocyanurate, 1,6-hexanediol-bis[3-(3,5-di-t-butyl-4-hydroxyphenyl)propionate], 2,2-thio-diethylenebis[3-(3,5-di-t-butyl-4-hydroxyphenyl)propionate], N,N'-hexamethylenebis(3,5-di-t-butyl-4-hydroxy-hydrocinnamamide), 1,3,5-trimethyl-2,4,6-tris(3,5-di-t-butyl-4-hydroxybenzyl)benzene, 2,4-bis[(octylthio)methyl]-O-cresol, and the like are preferable.

Examples of commercially available products of the phenol-based antioxidant include Irganox 1010 (manufactured by BASF SE), ADK STAB AO-80 (manufactured by ADEKA), and the like.

The content of the antioxidant in the total mass of the solid content of the liquid composition is, for example, 0.01% by mass or more and 30% by mass or less, preferably 0.1% by mass or more and 10% by mass or less, more preferably 0.5% by mass or more and 8% by mass or more, and even more preferably 1% by mass or more and 5% by mass or less. When the content of the antioxidant falls within the above range, a reduction of the light-emitting property can be suppressed, and a quenching phenomenon in a baking (hard baking) step can be suppressed. In addition, when patterning is performed via a printing procedure using the liquid composition including a silicon-containing resin, peeling of the formed pattern is likely to be suppressed.

<<Production Method of Liquid Composition>>

A method for producing the liquid composition described above is not particularly limited. Typically, the liquid composition is produced by a method including:

(a) mixing the quantum dots (A) with the ionic liquid (B) and/or the solvent (S), and (b1) in the case in which a liquid (L) obtained in the step (a) and including the quantum dots (A) does not contain the solvent (S), further including mixing the liquid (L) with the solvent (S), or (b2) in the case in which a liquid (L) obtained in the step (a) and including the quantum dots (A) does not contain the ionic liquid (B), further including mixing the liquid (L) with the ionic liquid (B).

In the step (a), the mixing of the quantum dots (A) with the ionic liquid (B) and/or the solvent (S) is preferably performed by mixing a dispersion liquid of the quantum dots (A) with a liquid including the ionic liquid (B) and/or the solvent (S). A dispersion medium contained in the dispersion liquid of the quantum dots (A) is not particularly limited. As the dispersion medium, any solvent which may be used as the solvent (S) may be employed.

By homogeneously mixing the components described above in a predetermined proportion, the liquid composition can be produced. A mixing device which can be used in the production of the liquid composition is not particularly limited. Examples of the mixing device include a bead mill, a two-roll mill, a three-roll mill, and the like. In the case in which the liquid composition has a sufficient low viscosity, the liquid composition may be filtered using a filter with a mesh of a desired size, as needed, to remove insoluble foreign substances.

A preferred example of the liquid composition produced by the method described above includes a liquid composition that includes the quantum dots (A), the ionic liquid (B), and the solvent (S), and does not include either the base component (C) or the curing agent (D). In addition, a liquid composition that includes the quantum dots (A), the ionic liquid (B), the solvent (S), an epoxy compound as the base component (C), and the curing agent (D) capable of curing the epoxy compound is also preferable from the viewpoint that a quantum dot-containing film excellent in heat resistance and mechanical properties is likely to be easily formed. As the curing agent (D) capable of curing the epoxy compound, for example, the onium salt (d2) and the curing agent (D3) described above can be used. Further, a liquid composition that includes the quantum dots (A), the ionic liquid (B), the solvent (S), a silicon-containing resin as the base component (C), and the curing agent (D4) described above is also preferable from the viewpoint that a quantum dot-containing film excellent in optical properties, light resistance, solvent resistance, resistance to chemicals and the like is likely to be formed.

The liquid composition may be a composition obtained from any conventionally known various negative or positive photosensitive composition by replacing a solvent with the ionic liquid (B) and the solvent (S) described above and thereafter adding the quantum dots (A) thereto. Application of a well-known photolithography process to such a liquid composition enables a patterned quantum dot-containing film to be formed.

<<Quantum Dot-Containing Film>>

A quantum dot-containing film is formed by drying and/or curing a coating film formed from the liquid composition described above. When the liquid composition is cured, a curing method is not particularly limited, and heating, light exposure, or a combination of heating and light exposure may be employed. The quantum dot-containing film is suitably used as an optical film for a light-emitting display element.

A typical example of a method for producing the quantum dot-containing film is described below. The quantum dot-containing film may be directly formed on various functional layers in a laminated body, a light-emitting display element panel or the like, or may be formed on a substrate of any material such as a metal substrate, a glass substrate or the like, and then peeled from the substrate for use. In addition, the quantum dot-containing film may be formed in a region surrounded by light-shielding partition walls that define pixels in a light-emitting display element panel or the like.

First, the liquid composition is coated on e.g. any substrate or a functional layer to form a coating film. Examples of the coating method include methods in which a contact transfer-type applicator such as a roll coater, a reverse coater or a bar coater, and a non-contact type applicator such as a spinner (a rotary applicator), a slit coater, or a curtain flow coater are used. After adjusting the viscosity of the liquid composition within an appropriate range, the liquid composition may be coated by a printing method such as ink-jet printing or screen printing to form a coating film which is patterned into a desired shape.

Then, a volatile component such as the solvent (S) is removed as needed to dry the coating film. The method of drying is not particularly limited, and examples thereof include a method in which the coating film is dried under reduced pressure at room temperature using a vacuum dryer (VCD) and then dried on a hot plate at a temperature of 60° C. or higher and 120° C. or lower, and preferably 70° C. or higher and 100° C. or lower, for 60 seconds or longer and 180 seconds or shorter. After forming the coating film in this manner, the coating film is subjected to light exposure and/or heating. Light exposure is carried out by irradiation with active energy rays such as excimer laser light. The dose of energy used in the irradiation varies depending on the composition of the liquid composition, and is for example preferably 30 mJ/cm$^2$ or more and 2,000 mJ/cm$^2$ or less, and more preferably 50 mJ/cm$^2$ or more and 500 mJ/cm$^2$ or less. The temperature for heating is not particularly limited, and is preferably 180° C. or higher and 280° C. or lower, more preferably 200° C. or higher and 260° C. or lower, and particularly preferably 220° C. or higher and 250° C. or lower. The heating time is typically preferably 1 minute or longer and 60 minutes or shorter, more preferably 10 minutes or longer and 50 minutes or shorter, and particularly preferably 20 minutes or longer and 40 minutes or shorter.

It should be noted that in the case in which the liquid composition includes a silicon-containing resin as the base component (C), a coating film of the liquid composition is baked to produce the quantum dot-containing film. In this case, the material of the substrate is not particularly limited as long as the material can withstand the baking. Preferable examples of the material of the substrate include inorganic materials such as metals, silicon, and glass, and heat-resistant materials such as polycarbonate, polyethylene terephthalate, polyethersulfone, polyimide resin, and polyamide imide resin. The thickness of the substrate is not particularly limited, and the substrate may be in the form of a film or a sheet.

The substrate including the coating film is then baked. The baking method is not particularly limited, but the baking is typically conducted using electric furnace or the like. Typically, the baking temperature is preferably 300° C. or higher, and more preferably 350° C. or higher. The upper limit of the baking temperature is not particularly limited, but is, for example, 1,000° C. or lower. In the case in which the liquid composition includes the curing agent (D4) and/or the nitroxy compound described above, the quantum dot-containing film, which is a silica film, can have a reduced amount of residue (impurities derived from the silica film) even when the lower limit of the baking temperature is decreased to 200° C. A baking atmosphere is not particularly limited, and the baking may be conducted in an inert gas atmosphere such as a nitrogen atmosphere or an argon atmosphere, under vacuum, or under reduced pressure. The baking may be conducted in ambient air, or under appropriate control of the oxygen concentration.

The film thickness of the dot-containing film is not particularly limited. The film thickness of the dot-containing film is typically 0.1 μm or more and 10 μm or less, preferably 0.2 μm or more and 5 μm or less, and more preferably 0.5 μm or more and 3 μm or less.

A dot-containing film including quantum dots (A) formed by the method described above can be suitably used as an optical film for a light-emitting display element because of good fluorescence efficiency, and also can be suitably used to produce a laminated body suitably used in a light-emitting display element.

<<Laminated Body>>

The laminated body is a laminated body including the dot-containing film formed using the liquid composition. Such a laminated body can be a laminated body made of only a dot-containing film including the quantum dots (A), or a laminated body made of a dot-containing film including the quantum dots (A) and other functional layers.

<Laminated Body of Quantum Dot-Containing Film>

Examples of the laminated body include a laminated body in which two or more quantum dot-containing films including quantum dots (A) dispersed in various matrix materials are laminated, and a quantum dot-containing film formed using the liquid composition described above is included. Such a laminated body may be a laminated body in which only quantum dot-containing films formed using the aforementioned liquid composition are laminated, or a laminated body in which a quantum dot-containing film formed using the aforementioned liquid composition, and another film including quantum dots (A) other than the quantum dot-containing film formed using the aforementioned liquid composition are laminated.

It is preferred that a film including quantum dots (A) include quantum dots producing red light by wavelength conversion of incident light from a light source, and quantum dots producing green light by wavelength conversion of incident light from a light source. It is also preferred that a film including quantum dots producing red light and a film including quantum dots producing green light be alternately laminated. When a laminated body having such a structure is applied to a light-emitting display element panel, because green light and red light having high color purity can be extracted by wavelength conversion, the range of hue reproduction in a light-emitting display equipped with the light-emitting display element panel can be enlarged. It should be noted that blue light and white light can be typically used as a light source. Red light, green light and blue light having high color purity can be extracted by using such a light source in combination with the above laminated body, and a clear image with good hues can be shown.

The light-emitting display is not particularly limited as long as it is a device to show an image using light emission of a light source, and examples thereof include a liquid crystal display, an organic EL display and the like.

<Laminated Body Including Film Including Quantum Dots (A) and Other Functional Layers>

It is also preferred that the quantum dot-containing film formed using the aforementioned liquid composition, which is a film including quantum dots (A), be laminated with other functional layers. It is preferred that a quantum dot-containing film include quantum dots producing red light by wavelength conversion of incident light from a light source, and quantum dots producing green light by wavelength conversion of incident light from a light source. In addition, blue light and white light can be typically used as a light source.

Examples of other functional layers include a diffusion layer to diffuse light rays, a low refractive index layer having a lower refractive index than that of the quantum dot-containing film, a reflection layer to reflect part of the incident light from a light source, a light guide plate to allow light emitted by a light source to enter the laminated body and the like. In addition, a gap may be provided in the laminated body as needed. The gap may be, for example, an air layer, and a layer of an inert gas such as nitrogen.

As the diffusion layer, various diffusion layers which have been conventionally used for various displays and optical devices can be used without particular limitation. Typical examples thereof include a film having a fine structure such as a prism on the surface thereof, a film in which beads are scattered or embedded on the surface thereof, and a film including fine particles and e.g. an interface or a gap structured to scatter light rays in the inside thereof.

The low refractive index layer is not particularly limited as long as it is a film having a lower refractive index than that of the above-described quantum dot-containing film and the above-described silica film, and films made of various materials can be used.

Examples of the reflection layer include a reflective polarizing film, a film having a fine structure such as a prism on the surface thereof to reflect part of the incident light, a metallic foil, a multilayer optical film and the like. The reflection layer reflects preferably 30% or more of the incident light, more preferably 40% or more and particularly preferably 50% or more. It is preferred that the reflection layer be provided so that light having passed through a quantum dot-containing film is reflected and reflected light is allowed to enter the quantum dot-containing film again. The color purity of green light and red light emitted from a quantum dot-containing film can be increased by reflecting light incident from a reflection layer to a quantum dot-containing film in the direction of the reflection layer again by e.g. a diffusion layer, compared to a case where a reflection layer is not used.

As the light guide plate, various light guide plates which have been conventionally used for various displays and optical devices can be used without particular limitation.

Typical examples of preferred layer constitution of the laminated body including a quantum dot-containing film and other functional layers include layer constitution in 1) to 8) below. It should be noted that in laminated bodies having the constitution in 1) to 8), light rays emitted from a light source are allowed to enter the layer described on the leftmost end, and light rays after wavelength conversion by a quantum dot-containing film are extracted from the layer described on the rightmost end. A display panel is commonly provided so that light rays extracted from a laminated body are allowed to enter, and red light, green light and blue light having high color purity are used to show an image.

1) Diffusion layer/quantum dot-containing film/low refractive index layer/reflection layer,
2) light guide plate/diffusion layer/quantum dot-containing film/low refractive index layer/reflection layer,
3) low refractive index layer/quantum dot-containing film/gap/reflection layer,
4) light guide plate/low refractive index layer/quantum dot-containing film/gap/reflection layer,
5) low refractive index layer/quantum dot-containing film/low refractive index layer/reflection layer,
6) light guide plate/low refractive index layer/quantum dot-containing film/low refractive index layer/reflection layer,
7) reflection layer/low refractive index layer/quantum dot-containing film/low refractive index layer/reflection layer, and
8) light guide plate/reflection layer/low refractive index layer/quantum dot-containing film/low refractive index layer/reflection layer.

It should be noted that in the laminated bodies described above, the quantum dot-containing film formed using the aforementioned liquid composition is preferably produced in accordance with the above-described method.

<<Light-Emitting Display Element Panel and Light-Emitting Display>>

The quantum dot-containing film formed using the above-described liquid composition and the above-described laminated body are incorporated into various light-emitting display element panels, and are preferably used to extract red light, green light and blue light having high color purity from light rays emitted from a light source. Here, "quantum dot sheet" is a general term for the quantum dot-containing film formed using the above-described liquid composition and the above-described laminated body.

The light-emitting display element panel typically includes the combination of a backlight as a light source, a quantum dot sheet and a display panel. When the quantum dot sheet is equipped with a light guide plate, a light source is typically provided so that light rays are allowed to enter the lateral side of the light guide plate. The light rays having entered from the lateral side of the light guide plate pass through the quantum dot sheet and enter the display panel. When the quantum dot sheet is not equipped with a light guide plate, light rays from a surface light source are allowed to enter the main surface of the quantum dot sheet, and light rays having passed through the quantum dot sheet are allowed to enter the display panel. The type of the display panel is not particularly limited as long as an image can be formed using light rays having passed through a quantum dot sheet, and the type is typically a liquid crystal display panel.

Because red light, green light and blue light having particularly high color purity are easily extracted from light rays emitted from a light source, the quantum dot sheet is preferably the above-described laminated body. When the quantum dot sheet is a laminated body, preferred combinations of constitution of a light-emitting display element panel include the following a) to h) combinations. In the combinations described in a) to h) below, laminating is carried out from the constitution described on the leftmost end in the order described to form a light-emitting display element panel.

a) Surface light source/diffusion layer/quantum dot sheet/ low refractive index layer/reflection layer/display panel,
b) light guide plate with light source/diffusion layer/quantum dot sheet/low refractive index layer/reflection layer/ display panel,
c) surface light source/low refractive index layer/quantum dot sheet/gap/reflection layer/display panel,
d) light guide plate with light source/low refractive index layer/quantum dot sheet/gap/reflection layer/display panel,
e) surface light source/low refractive index layer/quantum dot sheet/low refractive index layer/reflection layer/display panel,
f) light guide plate with light source/low refractive index layer/quantum dot sheet/low refractive index layer/reflection layer/display panel,
g) surface light source/reflection layer/low refractive index layer/quantum dot sheet/low refractive index layer/reflection layer/display panel, and
h) light guide plate with light source/reflection layer/low refractive index layer/quantum dot sheet/low refractive index layer/reflection layer/display panel.

By using the light-emitting display element panel described above, a light-emitting display, which has a wide range of hue reproduction and can show a clear image with good hues, can be produced.

EXAMPLES

Hereinafter, the present invention is described in more detail by way of Examples, but the present invention is not limited to these Examples.

Example 1, Comparative Examples 1 to 5, and Reference Example

Hexane was removed from a quantum dots dispersion liquid in hexane (note that the quantum dots (A) were quantum dots (emission maximum: 550 nm) in which particles having a core made from InP and coated with a shell layer made from ZnS were coordinated by a ligand) using a rotary evaporator, to obtain solid quantum dots. The solid quantum dots obtained thus in an amount of 0.1 parts by mass were dispersed again in 9.9 parts by mass of a solvent of the type described in Table 1, to obtain dispersion liquids according to Example 1 and Comparative Examples 1 to 5. It should be noted that in Example 1, Comparative Example 2, and Comparative Example 4, 0.13 parts by mass of an ionic liquid composed of a tributylmethylphosphonium cation and a bis(trifluoromethylsulfonyl)imide ion as a counteranion was further added. In addition, the dispersion liquid used for the preparation of the solid quantum dots was used as a dispersion liquid according to the Reference Example.

The dispersion liquid according to each Example and Comparative Example obtained thus was coated on a glass substrate by spin coating under the conditions of 100 rpm and 5 sec. The glass substrate including the coating film was heat-treated under the conditions of 100° C. and 10 minutes, or the conditions of 230° C. and 10 minutes. A thin film formed on the glass substrate after the heat-treatment and made of the quantum dots was rinsed away by adding 5 to 7 cc of hexane dropwise onto the glass substrate, and the resulting liquid including the quantum dots was used as a sample for quantum yield measurement, and quantum yield measurement was performed using Quantaurus-QY C11347 (manufactured by Hamamatsu Photonics). Further, the measurement of the quantum yield was performed on the dispersion liquid according to the Reference Example in a similar manner. The relative value of the quantum yield of the quantum dots after the heat-treatment of the coating film formed from the dispersion liquid according to each Example and Comparative Example assuming that the quantum yield obtained in the measurement using the dispersion liquid according to the Reference Example was 100% is shown in Table 1.

TABLE 1

| | Solvent | Addition of ionic liquid (B) | Quantum yield (relative value) | |
| --- | --- | --- | --- | --- |
| | | | After heating at 100° C. | After heating at 230° C. |
| Reference example | Hexane | No | 100% (unheated) | 100% (unheated) |
| Example 1 | Cyclohexyl acetate | Yes | 87.6% | 95.1% |
| Comparative example 1 | Cyclohexyl acetate | No | 80.2% | 71.9% |
| Comparative example 2 | Propylene glycol | Yes | 24.3% | 34.1% |
| Comparative example 3 | dimethyl ether | No | 24.1% | 32.0% |
| Comparative example 4 | Hexane | Yes | 79.3% | 38.2% |
| Compartive examples 5 | | No | 77.9% | 40.2% |

According to Table 1, it can be seen that in the case in which a coating film formed using the dispersion liquid according to Example 1, which included cyclohexyl acetate, i.e. the solvent (S1) having a cyclic skeleton and including a heteroatom, and the ionic liquid (B) in combination, was heated, the quantum dots after the heating exhibited a high quantum yield close to that of the quantum dots in the dispersion liquid according to the Reference Example. On the other hand, in the case in which coating films formed using the dispersion liquids according to the Comparative Examples, which did not include the ionic liquid (B) or did not include the solvent (S1) meeting the predetermined requirements, was heated, the quantum dots after the heating exhibited a quantum yield significantly lower than the quantum yield of the quantum dots in the dispersion liquid according to the Reference Example. It is inferred that extremely inferior measurement results of the quantum yield for the dispersion liquids according to Comparative Examples 2 and 3, which used propylene glycol dimethyl ether, are due to deterioration of the quantum dots by propylene glycol dimethyl ether per se.

It should be noted that the ionic liquid used in the Example and Comparative Examples described above was homogeneously miscible with cyclohexyl acetate and propylene glycol dimethyl ether, both of which include a heteroatom, whereas the ionic liquid was clearly separated from hexane.

Example 2 to Example 9, Comparative Example 6, and Comparative Example 7

In Example 2 to Example 9, Comparative Example 6, and Comparative Example 7, an epoxy compound represented by the following formula was used as the base component (C).

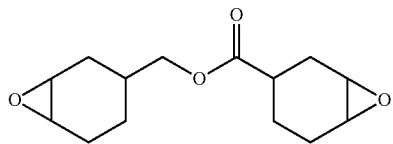 [SMILES: O=C(OCC1CCC2OC2C1)C1CCC2OC2C1]

In Example 2 to Example 9, Comparative Example 6, and Comparative Example 7, as the quantum dots (A), a dispersion liquid of quantum dots (emission maximum: 550 nm) in which particles having a core made from InP and coated with a shell layer made from ZnS were coordinated by a ligand were used. The dispersion medium was cyclohexyl acetate (with the proviso that Comparative Example 7 used propylene glycol monomethyl ether acetate), and the concentration of the quantum dots was about 25% by mass.

In Example 2 and Examples 7 to 9, as the ionic liquid (B), an ionic liquid B-1 composed of a 1-methyl-1-butylpyrrolidinium cation and a bis(trifluoromethylsulfonyl)imide ion as a counteranion was used. In Example 3 and Comparative Example 7, an ionic liquid B-2 composed of a triethyl (methoxymethyl)phosphonium cation and a bis(trifluoromethylsulfonyl)imide ion, which was a counteranion, was used. In Example 4, an ionic liquid B-3 composed of a methyltributylammonium cation and a bis(trifluoromethylsulfonyl)imide ion as a counteranion was used. In Example 5, an ionic liquid B-4 composed of a 1-butyl-3-methylimidazolium cation and a bis(trifluoromethylsulfonyl)imide ion as a counteranion was used. In Example 6, an ionic liquid B-5 composed of a triethylsulfonium cation and a bis (trifluoromethylsulfonyl)imide ion as a counteranion was used. In Comparative Example 6, the ionic liquid (B) was not used.

In Example 2 to Example 6, and Comparative Example 6, cyclohexyl acetate (S-1), which falls under the category of the solvent (S1), was used as the solvent (S). In Example 7, cyclohexyl isovalerate (S-3), which falls under the category of the solvent (S1), was used. In Example 8, 1R-(–)-menthyl acetate (S-4), which falls under the category of the solvent (S1), was used. In Example 9, ethyl benzoate (S-5), which falls under the category of the solvent (S1), was used. In Comparative Example 7, propylene glycol monomethyl ether acetate (PGMEA, S-2), which did not fall under the category of the solvent (S1), was used as the solvent (S).

In Example 2 to Example 9, Comparative Example 6, and Comparative Example 7, the following compound was used as the onium salt (D2) which was a curing agent (D) for curing the epoxy compound.

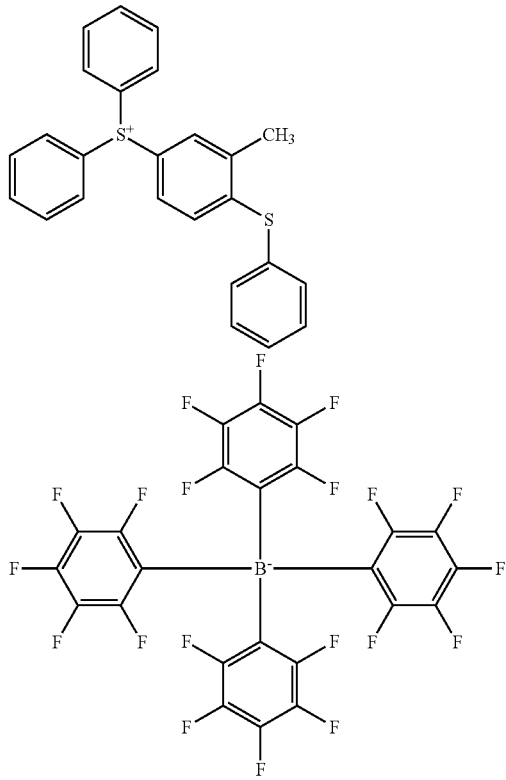

Liquid compositions according to Example 2 to Example 9, Comparative Example 6, and Comparative Example 7 were obtained by homogeneously mixing 100 parts by mass of an epoxy compound, 13.5 parts by mass of quantum dots (A) (in terms of the solid content of the quantum dots), 13.5 parts by mass of an ionic liquid (B) of the type described in Table 2, 100 parts by mass of a solvent (S) of the type described in Table 2, and 5 parts by mass of the curing agent (D).

The liquid compositions according to Example 2 to Example 9, Comparative Example 6, and Comparative Example 7 were each coated on a glass substrate by spin coating, and then prebaking was performed under the conditions of 100° C. and 1 minute. Then, light exposure of the prebaked coating film was conducted under the condition of an exposure dose of 50 mJ/cm$^2$, to cause the curing of the coating film. The cured coating film was post-baked under the conditions of 150° C. and 20 minutes, or 200° C. and 20 minutes. The post-baked cured film was used as a sample, and a quantum yield was measured using Quantaurus-QY C11347 (manufactured by Hamamatsu Photonics). The relative values of the quantum yield in the case of using the liquid compositions according to Example 2 to Example 9, and Comparative Example 7 assuming that the quantum yield in the case of using the liquid composition according to Comparative Example 6 was 100 are shown in Table 2.

TABLE 2

|  | Type of ionic liquid (B) | Type of solvent (S) | Quantum yield (relative value) 200° C., 20 min |
|---|---|---|---|
| Example 2 | B-1 | S-1 | 121% |
| Example 3 | B-2 | S-1 | 125% |

TABLE 2-continued

| | Type of ionic liquid (B) | Type of solvent (S) | Quantum yield (relative value) 200° C., 20 min |
|---|---|---|---|
| Example 4 | B-3 | S-1 | 122% |
| Example 5 | B-4 | S-1 | 120% |
| Example 6 | B-5 | S-1 | 120% |
| Example 7 | B-1 | S-3 | 127% |
| Example 8 | B-1 | S-4 | 126% |
| Example 9 | B-1 | S-5 | 130% |
| Comparative example 6 | Not used | S-1 | 100% |
| Comparative example 7 | B-2 | S-2 | 113% |

According to Table 2, it can be seen that in the case in which the cured films formed using the liquid compositions according to Example 2 to Example 9, which contained the solvent (S1) having a cyclic skeleton and including a heteroatom, and the ionic liquid (B) in combination, were heated, the quantum dots after the heating were advantageously higher as compared with the case in which the cured films formed using the liquid composition according to Comparative Example 6 and Comparative Example 7, which did not include the ionic liquid (B) or contained propylene glycol monomethyl ether acetate (S-2), which was a solvent not falling under the category of the solvent (S1), were heated. This is inferred to be due to the fact that for the liquid compositions according to Example 2 and Example 3, cohesion of the quantum dots (A) is suppressed in the liquid composition, in the coating film, or in the cured film, and the quantum dots (A) are favorably dispersed.

The invention claimed is:

1. A liquid composition, comprising quantum dots (A), an ionic liquid (B), and a solvent (S),
    wherein the solvent (S) comprises a solvent (S1), the solvent (S1) being a compound having a cyclic skeleton and comprising a heteroatom other than a hydrogen atom and a carbon atom, and
    wherein the solvent (Si) has one or more bonds selected from the group consisting of an ester bond, an amide bond, a carbonate bond, a ureido bond, and a urethane bond.

2. The liquid composition according to claim 1, wherein a boiling point of the solvent (S1) under atmospheric pressure is 150° C. or higher.

3. The liquid composition according to claim 1, wherein the solvent (S1) has an alicyclic skeleton as the cyclic skeleton.

4. The liquid composition according to claim 1, wherein the solvent (S1) is a cycloalkyl ester of carboxylic acid.

5. The liquid composition according to claim 4, wherein the solvent (S1) is a cycloalkyl acetate represented by formula (s1):

wherein in the formula (s1), $R^{s1}$ represents an alkyl group having 1 or more and 3 or less carbon atoms; $R^{s2}$ represents an alkyl group having 1 or more and 6 or less carbon atoms; p is an integer of 1 or more and 6 or less; and q is an integer of 0 or more and (p+1) or less.

6. The liquid composition according to claim 1, wherein the ionic liquid (B) comprises a nitrogen-containing organic cation, a phosphorus-containing organic cation, or a sulfur-containing organic cation, and a counteranion.

7. The liquid composition according to claim 1, further comprising a base component (C).

8. The liquid composition according to claim 7, comprising an epoxy compound as the base component (C), and a curing agent (D) capable of curing the epoxy compound.

9. A quantum dot-containing film obtained by drying and/or curing a coating film formed from a liquid composition,
    wherein the liquid composition comprises quantum dots (A), an ionic liquid (B), a solvent (S), an epoxy compound as a base component (C), and a curing agent (D) capable of curing the epoxy compound,
    wherein the epoxy compound has two or more epoxy groups, and includes a cyclic structure other than an oxirane ring,
    wherein the solvent (S) comprises a solvent (S1), the solvent (S1) being a compound having a cyclic skeleton and comprising a heteroatom other than a hydrogen atom and a carbon atom, and
    wherein the solvent (S1) has one or more bonds selected from the group consisting of an ester bond, an amide bond, a carbonate bond, a ureido bond, and a urethane bond.

10. An optical film for a light-emitting display element, made of the quantum dot-containing film according to claim 9.

11. A light-emitting display element panel comprising the optical film for a light-emitting display element according to claim 10.

12. A light-emitting display equipped with the light-emitting display element panel according to claim 11.

* * * * *